(12) United States Patent
Burks et al.

(10) Patent No.: US 11,097,937 B2
(45) Date of Patent: *Aug. 24, 2021

(54) STRUCTURAL FOOD PREPARATION SYSTEMS AND METHODS

(71) Applicant: RESTAURANT TECHNOLOGY INC., Oak Brook, IL (US)

(72) Inventors: Michael Burks, Romeoville, IL (US); Michael Beebe, Romeoville, IL (US); Laura Ermer, Oak Brook, IL (US); Vijan Bhaumik, Oak Brook, IL (US); Angelo Frigo, Romeoville, IL (US); Kyle Crouse, New York, NY (US); Roger D. Carroll, Romeoville, IL (US); Natalie Muhs, Oak Brook, IL (US); Jeff Pollard, Mooresville, NC (US); Jeffrey Steres, Oak Brook, IL (US); Kim Wilson, Oak Brook, IL (US)

(73) Assignee: RESTAURANT TECHNOLOGY INC., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,264

(22) Filed: May 4, 2020

(65) Prior Publication Data

US 2020/0265501 A1 Aug. 20, 2020

Related U.S. Application Data

(63) Continuation of application No. 15/095,133, filed on Apr. 10, 2016, now Pat. No. 10,640,357, which is a
(Continued)

(51) Int. Cl.
*G06Q 30/00* (2012.01)
*B67D 1/08* (2006.01)
(Continued)

(52) U.S. Cl.
CPC ............ *B67D 1/0888* (2013.01); *A47J 31/46* (2013.01); *B67D 1/0858* (2013.01); *B67D 1/10* (2013.01);
(Continued)

(58) Field of Classification Search
CPC ...... B67D 1/0888; B67D 1/0858; B67D 1/10; A47J 31/46; G06Q 20/18; G06Q 20/204;
(Continued)

(56) References Cited

U.S. PATENT DOCUMENTS

| 8,660,906 | B2 * | 2/2014 | Woycik | G06Q 20/367 |
|---|---|---|---|---|
| | | | | 705/26.1 |
| 8,660,965 | B1 * | 2/2014 | Bickerstaff | G06Q 20/20 |
| | | | | 705/64 |

(Continued)

OTHER PUBLICATIONS

Casati et al., Dynamic and adaptive composition of e-services: Information Systems; vol. 26, Issue 3, May 2001, pp. 143-163. https://www.sciencedirect.com/science/article/pii/S030643790100014X (Year: 2001).*

*Primary Examiner* — Patricia H Munson
*Assistant Examiner* — Uche Byrd
(74) *Attorney, Agent, or Firm* — James P. Muraff; McDonald Hopkins LLC

(57) ABSTRACT

An ordering app running on a mobile device, one or more central servers, one or more venue servers, one or more ordering apps, plug-ins, kiosks, point of sale systems, beacons, pucks, tents, and automated appliances cooperate to prepare orders for a customer. Methods embodied as software programs running on the venue servers and the central servers advance the customer's order through various modules hosted on the venue server. A final module causes the customer's order to be prepared.

20 Claims, 68 Drawing Sheets

Related U.S. Application Data continuation-in-part of application No. 14/937,112, filed on Nov. 10, 2015, now Pat. No. 10,373,223, which is a continuation of application No. 14/078,396, filed on Nov. 12, 2013, now abandoned, which is a continuation-in-part of application No. 12/760,534, filed on Apr. 14, 2010, now abandoned.

(60) Provisional application No. 61/725,379, filed on Nov. 12, 2012.

(51) Int. Cl.
    *B67D 1/10*     (2006.01)
    *G06Q 30/06*     (2012.01)
    *G06Q 20/32*     (2012.01)
    *G06Q 20/20*     (2012.01)
    *G06Q 50/12*     (2012.01)
    *A47J 31/46*     (2006.01)
    *G06Q 20/18*     (2012.01)
    *H04W 4/021*     (2018.01)

(52) U.S. Cl.
CPC ........... *G06Q 20/18* (2013.01); *G06Q 20/204* (2013.01); *G06Q 20/322* (2013.01); *G06Q 20/3274* (2013.01); *G06Q 30/0609* (2013.01); *G06Q 30/0633* (2013.01); *G06Q 30/0635* (2013.01); *G06Q 30/0641* (2013.01); *G06Q 50/12* (2013.01); *H04W 4/021* (2013.01)

(58) Field of Classification Search
CPC ............. G06Q 20/322; G06Q 20/3274; G06Q 30/0609; G06Q 30/0633; G06Q 30/0635; G06Q 30/0641; G06Q 50/12; H04W 4/021

See application file for complete search history.

(56) References Cited

U.S. PATENT DOCUMENTS

| | | | | |
|---|---|---|---|---|
| 2003/0078793 | A1* | 4/2003 | Toth | G06Q 50/12 705/15 |
| 2006/0270421 | A1* | 11/2006 | Phillips | H04W 4/021 455/457 |
| 2009/0241481 | A1* | 10/2009 | Sus | G06Q 50/12 53/474 |
| 2012/0088487 | A1* | 4/2012 | Khan | G06Q 20/322 455/418 |
| 2013/0124314 | A1* | 5/2013 | Navar | G06Q 30/0251 705/14.53 |
| 2016/0063606 | A1* | 3/2016 | Fedak | G01S 5/0252 705/15 |
| 2016/0142872 | A1* | 5/2016 | Nicholson | H04L 67/26 455/456.1 |

* cited by examiner

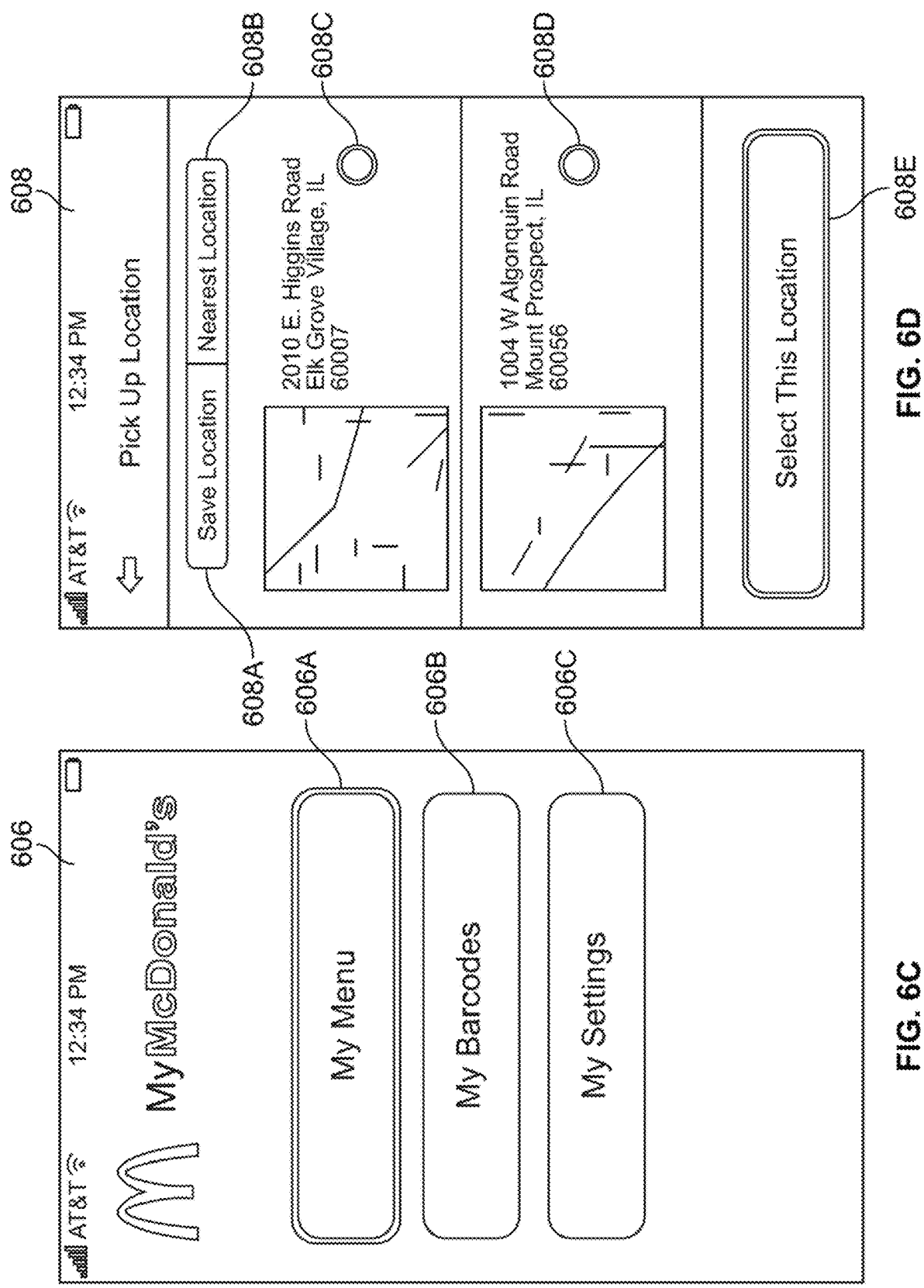

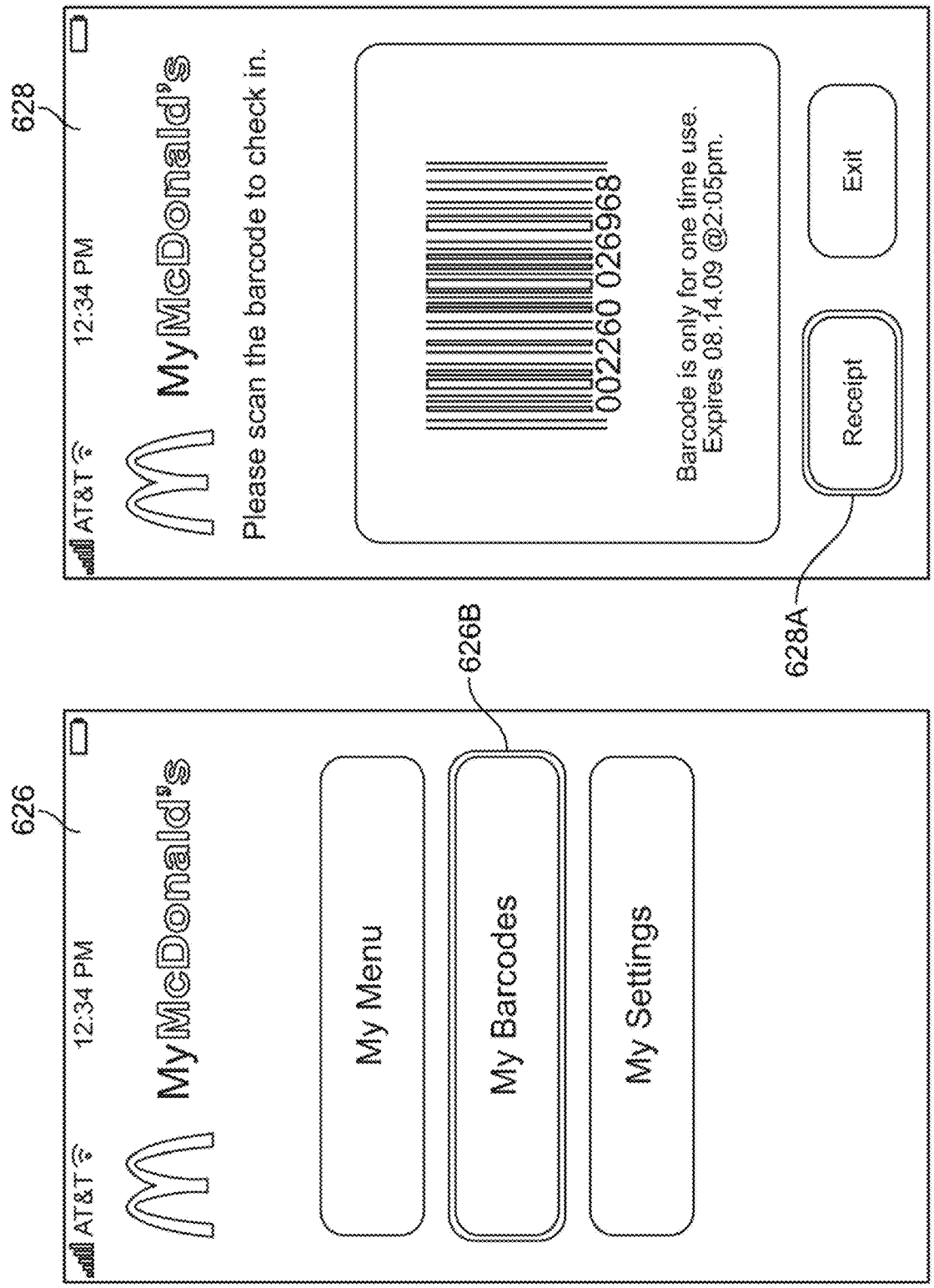

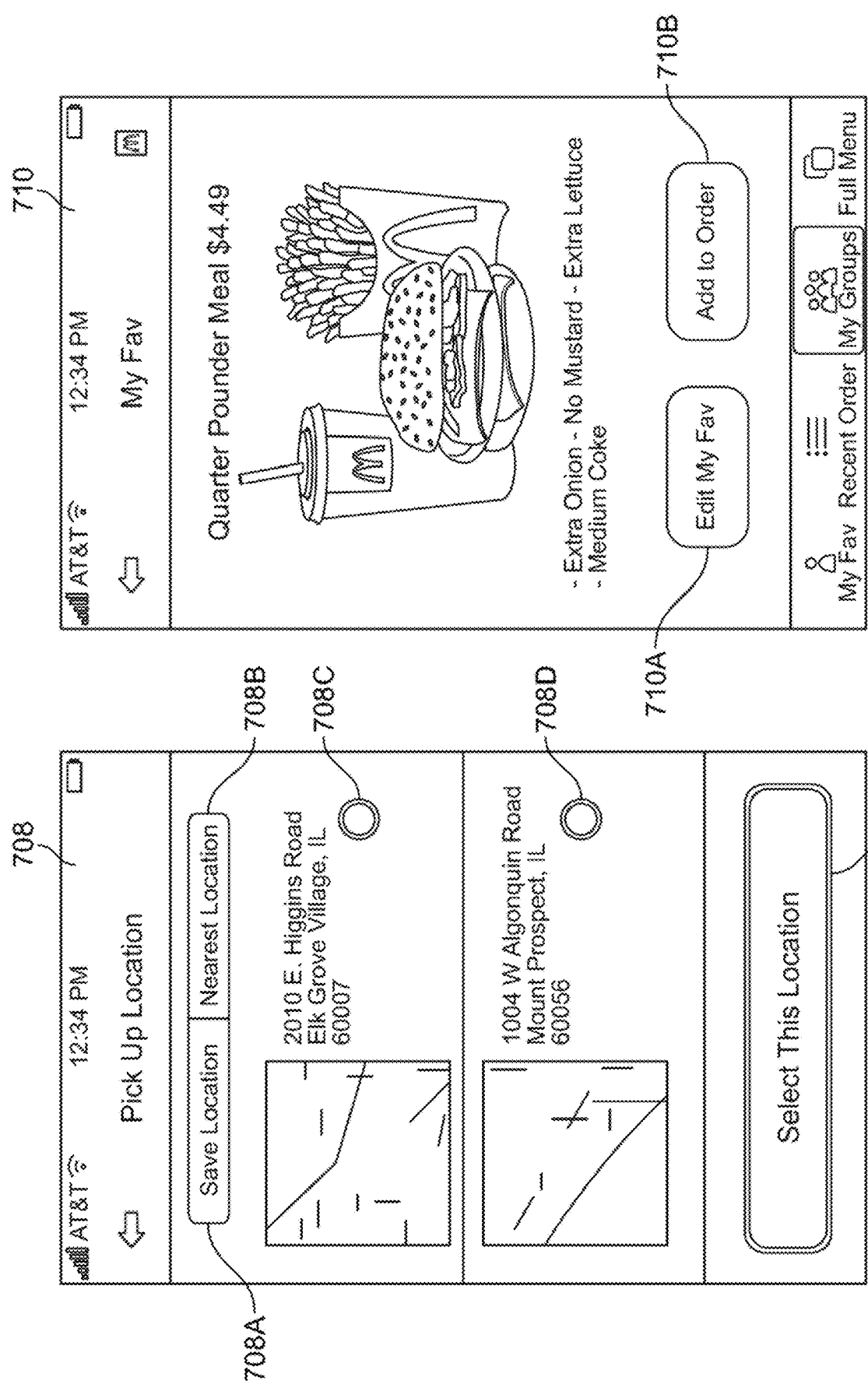

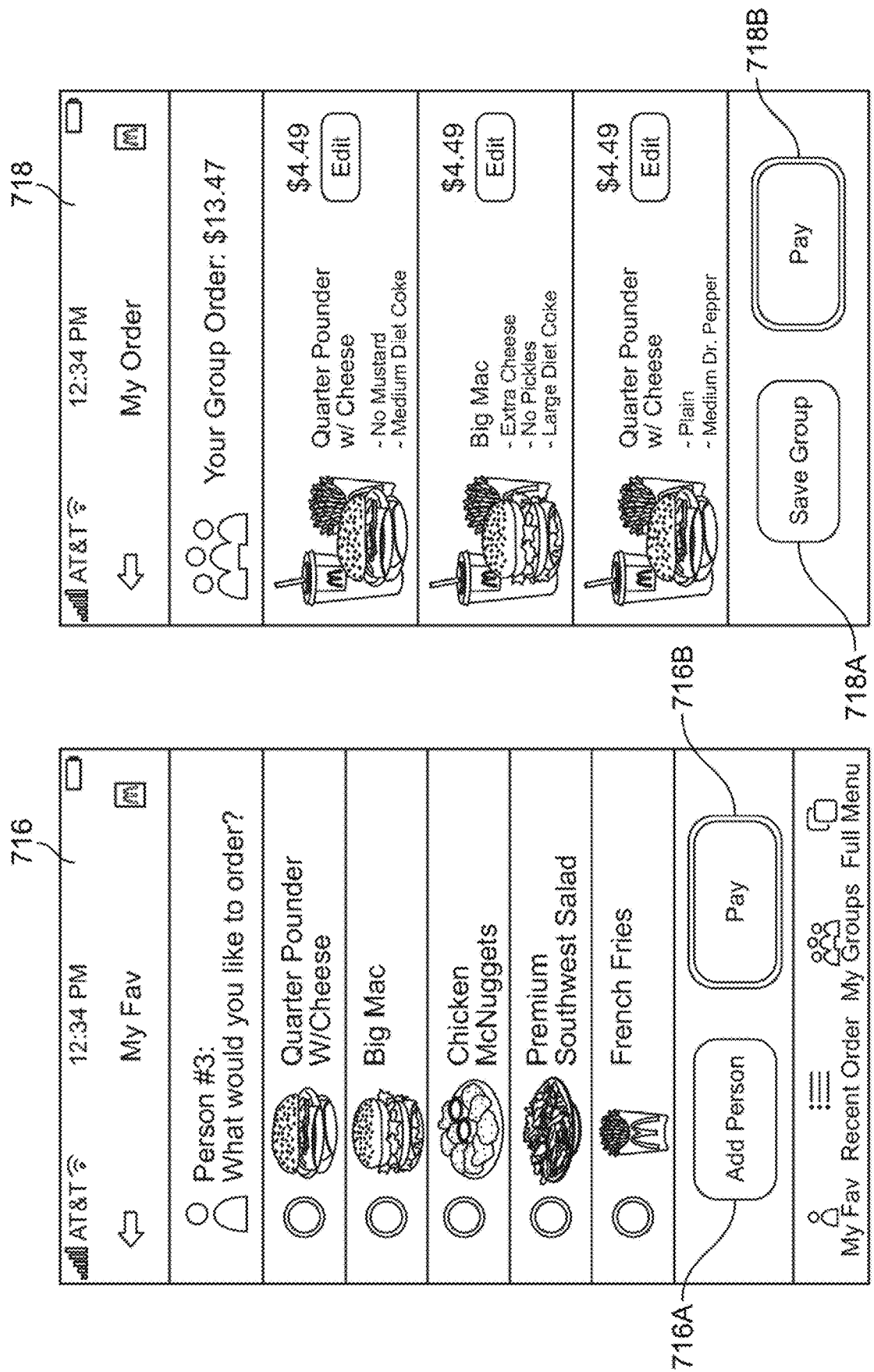

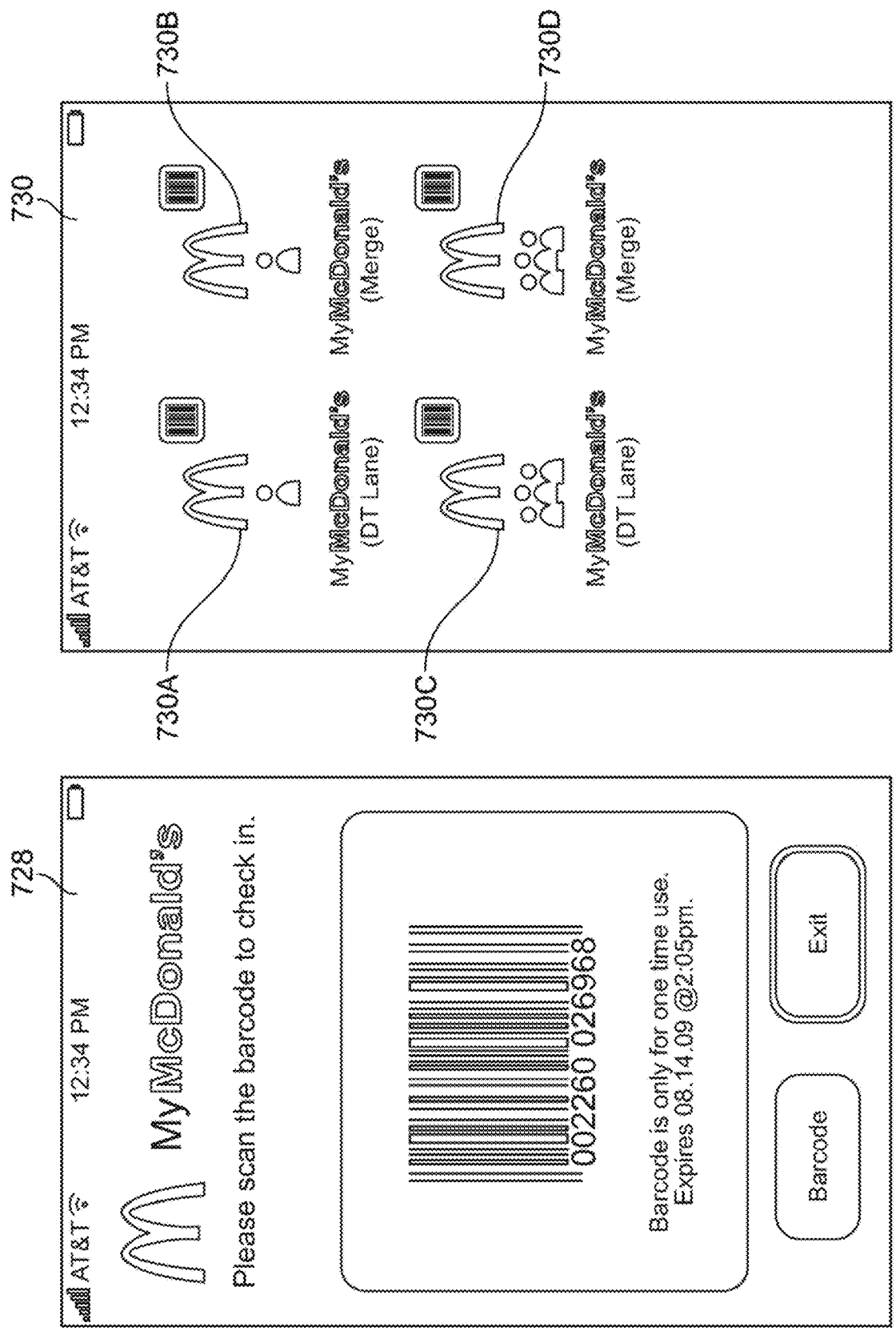

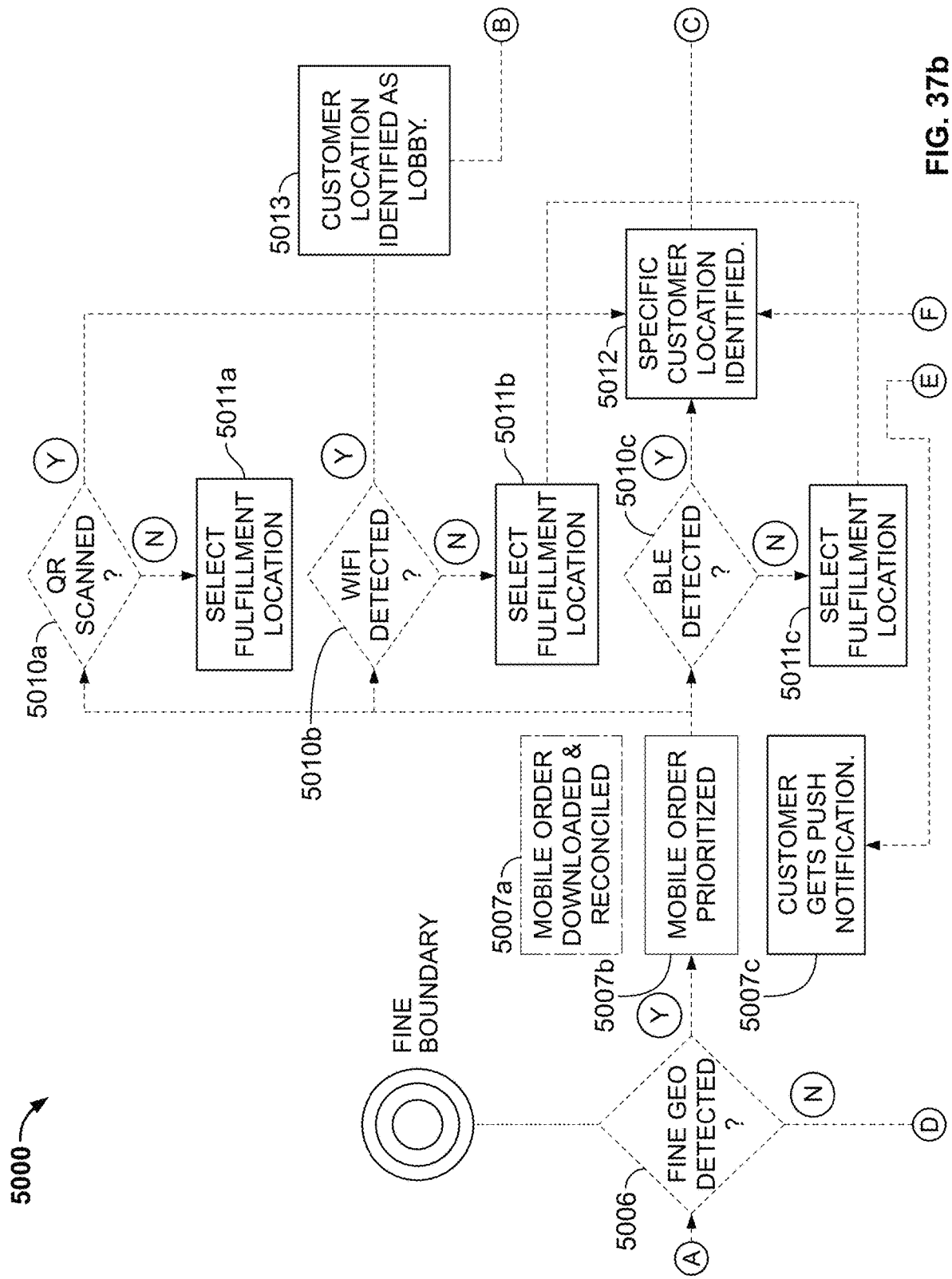

STRUCTURAL FOOD PREPARATION SYSTEMS AND METHODS

PRIORITY

This application is a continuation application of U.S. Non-Provisional patent application Ser. No. 15/095,133 filed on Apr. 10, 2016 and will issue as U.S. Pat. No. 10,640,357 on May 5, 2020. U.S. Non-Provisional application Ser. No. 15/095,133 filed on Apr. 10, 2016 is a continuation-in-part of U.S. Non-Provisional patent application Ser. No. 14/937,112, originally filed on Nov. 9, 2015 and published as U.S. 2016/0063585, which claims priority from U.S. Non-Provisional patent application Ser. No. 14/078,396, originally filed on Nov. 12, 2013 and published as U.S. 2014/0136366, which claims priority from U.S. Provisional Patent Application No. 61/725,379, originally filed on Nov. 12, 2012, all of which (including the originally filed applications and the published applications) are hereby incorporated by reference in their entirety.

This application is also a continuation-in-part of U.S. Non-Provisional patent application Ser. No. 12/760,534, which was originally filed on Apr. 13, 2010 and published as U.S. 2011/0258058, all of which (including the originally filed application and the published application) are hereby incorporated by reference in their entirety.

TECHNICAL FIELD

This invention relates generally to systems and methods for receiving and managing remotely placed orders, particularly orders for goods that must be prepared within a short time of being received. In the primary example, the present invention relates to a system (and its associated apparatuses and methods of use) that enables remote entry and processing of an order for time-sensitive goods (such as food from a quick service restaurant) at a particular venue (e.g., a restaurant) in a manner such that the order is verified and submitted for processing upon arrival at the venue.

BACKGROUND

This invention relates generally to restaurant order generating apparatuses. Prior order generating wireless devices systems have been attempted and implemented. One such system is disclosed within U.S. Pat. No. 6,366,220 B1, to Brig Barnum Elliott, issued on Apr. 2, 2002, is directed to a system and method for allowing a customer to order drive-through menu items using a customer vehicle equipped with the radio frequency (RF) tag. Prior to placing an order, the customer opens an account and creates a default menu using a food vendor's web site. To order items from the default menu, the customer approaches a drive-through order station at a fast food vendor location. As the customer vehicle passes the order station a first transponder queries the RF tag and processes a return signal. Identification information is extracted from return signal such that the customer's order, consisting of the default menu items, is prepared. The customer's vehicle then approaches pick-up station and a second transponder queries the RF tag and subsequently bills the customer's account for the ordered items. U.S. Pat. No. 6,366,220 B1 is incorporated herein by reference for at least the purpose of giving context to the present invention.

U.S. Patent Publication No. 2007/0291710 A1 to Anthony M. Fadell is directed to a wireless communication system. The wireless communication system includes a wireless communication interface that wirelessly communicates with one or more wireless client devices in the vicinity of an establishment. The wireless communication interface receives a remote order corresponding to an item selected by at least one of the wireless client devices. A local server computer located in proximity to the establishment generates instructions for processing the remote order received from the wireless communication interface. The local server computer then passes the processing instructions to an order processing queue in preparation for processing of the remote order. U.S. Patent Publication No. 2007/0291710 A1 is incorporated herein by reference for at least the purpose of giving context to the present invention.

However, the prior systems and methods are unable to communicate restaurant orders generated on wireless devices to vending establishments which are not capable, either temporarily or permanently, to handle wireless communications with the wireless devices. Despite the advances of the wireless communication technology, the quick service restaurant (QSR) industry is in need of less cost intensive and more efficient wireless order placements.

With the increased availability and functionality of handheld mobile devices in recent years, there has also been much development centered around applications and systems to enable remote ordering of goods and services. For example, several systems have been developed specifically to facilitate the remote entry of food orders from quick service restaurants through use of such handheld devices. Yet all of these inventions fail to account for the flexibility required by larger organizations that operate multiple venues having different available offerings.

For example, U.S. Pat. No. 6,435,406 to Pentel discloses a remote ordering device, which is essentially a cell phone equipped with a remote ordering capability. The device is used to enter "item codes" along with information to identify the user. This information is sent to a restaurant or venue where it is received by a special decoder and transmitted into an order for entry and preparation. Alternatively, Pentel envisions entry of the order upon arrival at the location by using the device to alert the venue of the user's proximity. However, Pentel makes no allowance for item availability, or whether that availability may have changed from the time of order creation to the time of arrival at the venue. It also is not equipped to handle an order submitted to an organization with multiple locations that may have different menus, or that have menus that change throughout the day. Finally, it requires that each venue purchase and install the special decoder hardware.

Similarly, U.S. Pat. No. 6,959,283 to White teaches a remote food ordering system where a user enters an order remotely through a personal digital assistant ("PDA"). White's system allows a person to enter a time when the order should be ready. But there is no way of accounting for changes in this schedule. What if the user is delayed and the food becomes cold? What if the items ordered are no longer available when it comes time to begin preparation of the order?

U.S. patent application Ser. No. 12/760,534 to Carroll, et. al., discloses a more advanced system that is adapted to overcome some of these deficiencies. Unlike Pentel and White, Carroll provides for use with a larger chain of venues where a particular venue is selected. It also provides for an order check-in process once the user has arrived at the location. However, this check-in process requires the installation of system-specific hardware that is expensive, takes up space, and requires maintenance. In addition, there is no specific method for correcting or updating menus as they change from store to store and throughout the day. Carroll shares common ownership with, and is a predecessor of, the present invention, and its contents and teachings are fully incorporated herein by reference.

SUMMARY

An embodiment of the present invention is directed to a wireless mobile personal computer for enabling a customer to generate a restaurant order on the wireless mobile personal computer, comprising a restaurant order generating application configured to generate restaurant item selecting interface screens for generating the restaurant order comprising at least one restaurant item, to generate a machine-readable or radio transmittable representation of the generated restaurant order, a processor for executing the restaurant order generating application, a memory for storing the restaurant order generating application and selectable restaurant items, and a display for displaying the restaurant item selecting interface screens, the at least one restaurant items. The machine-readable representation of the generated order is an optical machine-readable representation. The machine-readable representation of the generated order is radio transmittable representation.

Another embodiment of the present invention is directed to a computer readable medium encoded with a restaurant order generating computer program application configured to generate a restaurant order on a wireless mobile personal computer, the wireless mobile personal computer having a processor for executing the restaurant order generating application, a memory for storing the restaurant order generating application and selectable restaurant items, and a display. The restaurant order generating computer program application comprises a first code segment for generating restaurant item selecting interface screens, a second code segment for receiving a selection of at least one restaurant item, a third code segment for generating a restaurant order from the selection of the at least one restaurant item, a fourth code segment for generating a machine-readable representation of the generated restaurant order.

Another embodiment of the present invention is directed to a system for enabling a customer to generate an order, which comprises a wireless mobile personal computer, a customer kiosk, and a vendor system. The wireless mobile personal computer, which enables the customer to generate a restaurant order on the wireless mobile personal computer, comprises a restaurant order generating application configured to generate restaurant item selecting interface screens for generating the restaurant order comprising at least one restaurant item and to generate a machine-readable representation of the generated restaurant order, a processor for executing the restaurant order generating application, a memory for storing the restaurant order generating application and selectable restaurant items, and a display for displaying the restaurant item selecting interface screens, the at least one restaurant items, and the optical machine-readable representation. The customer kiosk comprises a display, and a scanner and/or an RFID receiver. The scanner comprises a scanning application configured to scan and capture the optical machine-readable representation, a processor for executing the scanning application, and a memory for storing the scanning application. The RFID receiver comprises an RFID detecting application, a processor for executing the detecting application, and a memory for storing the detecting application. The vendor system, which is in communication with the customer kiosk, comprises an account establishing application configured to establish a customer account, a processor for executing the account establishing application, a memory for storing the account establishing application, and a database for storing customer accounts.

Other systems, methods, articles of manufacture, features, and advantages of the present invention will be, or will become, apparent to one having ordinary skill in the art upon examination of the following drawings and detailed description. It is intended that all such additional systems, methods, articles of manufacture, features, and advantages included within this description, be within the scope of the present invention, and be protected by the accompanying claims.

The present invention provides valuable improvements over the prior art, which are particularly useful to an organization operating a multi-venue chain of stores that may have revolving or disparate inventory and menu item availability. The invention provides an order management system, or OMS, that features a two phase process through which orders are first generated and submitted, and then subsequently checked in (released) and received. The system accounts for issues such as revolving or changing menus, price disparity between venues, user edits to orders after submission and other complexities common in real-world, large scale operations that were not foreseen or discussed (let alone accounted for) by the prior art.

In a particular embodiment, the present invention provides a system for managing dynamic menus across a multi-venue organization comprising a menu management server for generating a main menu comprising a description of products available across a plurality of venues within the organization. In this embodiment, the system also comprises a plurality of venue servers, each associated with a separate one of the plurality of venues, and each in communication with the menu management server, wherein each venue server generates a venue specific menu comprising a description of products and product pricing specific to the venue where the venue server that generated the venue specific menu is located. It further comprises an order management system server in communication with each of the plurality of venue servers and with at least one mobile device wherein, upon receiving from the at least one mobile device a request to order products from a first venue from among the plurality of venues, the order management system server provides to the at least one mobile device the venue specific menu associated with the first venue. In this embodiment, the order management server receives an order for products from the venue specific menu from the at least one mobile device and, upon subsequently receiving a request to receive the order, contacts the venue server associated with the first venue to verify the continued availability and pricing of the products ordered.

In another embodiment, the present invention provides a system for managing dynamic menus across a multi-venue organization comprising a menu management server for generating a main menu comprising a description of products available across a plurality of venues within the organization. It also comprises a plurality of venue servers, each associated with a separate one of the plurality of venues, and each in communication with the menu management server, wherein each venue server generates a venue specific menu comprising a description of products and product pricing specific to the venue where the venue server that generated the venue specific menu is located. It further comprises an order management system server in communication with each of the plurality of venue servers and with at least one mobile device wherein, upon receiving from the at least one mobile device a request to order products from a first venue from among the plurality of venues, the order management system server provides to the at least one mobile device the venue specific menu associated with the first venue. In this embodiment, the order management server receives an order for products from the venue specific menu from the at least one mobile device and, upon subsequently receiving a request to receive the order, contacts the venue server associated with the first venue to verify the continued availability and pricing of the products ordered.

In yet another embodiment, the invention teaches a method for processing a remotely-placed order for time-sensitive goods received from a first location at a first time, the goods to be received at a second location at a second time, the steps of the method comprising receiving to an order management system server order data from a mobile device located at a first location, wherein the order data represents a request that at least one time-sensitive good be produced by a first venue remote from the first location. The method further comprises the steps of associating the order data with a user account at the order management system server and subsequently receiving to the order management system server location verification data from the mobile device, wherein the location verification data corresponds to the first venue and identifies that the mobile device is located at the first venue. The method further comprises the step of, after receiving location verification data corresponding to the first venue, directing staff at the first venue to produce the at least one time-sensitive good.

In still another embodiment, the invention teaches a method for managing remotely placed orders comprising the steps of receiving to an order management server a venue selection from a mobile device at a first location, the venue selection identifying a first venue from among a plurality of venues, the first venue located at a second location. The method further comprises the steps of requesting venue specific menu data from a venue server at the second location, wherein the venue specific menu data identifies a plurality of goods then available for production by the first venue and receiving to the order management server order data from the mobile device, the order data indicative of a current order for one or more goods from the plurality of goods then available from the first venue. The method still further comprises the steps of storing the order data at the order management server and, at a later time, receiving to the order management server location verification data from the mobile device, the location verification data identifying that the mobile device is now at the second location. Finally, the method further comprises the steps of in response to receipt of the location verification data, transmitting the order data from the order management server to the venue server to verify that the one or more goods identified in the order data are still available, and releasing the order data to the first venue for production.

While certain embodiments are mentioned above, numerous other embodiments, systems, methods, features, and advantages of the present invention will be, or will become, apparent to one having ordinary skill in the art upon examination of the following drawings and detailed description. All such additional systems, methods, features, and advantages included within this description, are within the scope of the present invention, and may be included in one or more of the accompanying claims. Though a quick service restaurant is used as the primary example throughout much of the figures and written description below, one of skill in the art will recognize that the order management system described herein could be adapted by those of ordinary skill in the art for use with various other types of venues without undue experimentation, and that the invention described herein is not limited in any way to use with one particular venue type. In addition, though the screen samples are arranged and shaped for display on presently-available handheld smart phones such as an Apple iPhone, one of skill in the art will recognize that the user device could also be a tablet or other mobile device capable of generating a screen for viewing and remotely interacting with the order management server, and that the screens could be modified to accommodate such devices by one of ordinary skill without undue experimentation.

The appended claims define this application. The specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, the detailed description references embodiments shown in the following drawings. The components in the drawings are not necessarily to scale and related elements may be omitted to emphasize and clearly illustrate the novel features described herein. In addition, system components can be variously arranged, as known in the art. In the drawings, like referenced numerals may refer to like parts throughout the different drawings unless otherwise specified.

FIGS. 37a to 37c show another embodiment of a process leading up to check-in.

FIGS. 38a to 38b show a continuation of the process where a customer performs lobby service check-in.

FIGS. 39a to 39c show a continuation of the process where a customer performs table service check-in.

FIGS. 40a to 40c show a continuation of the process where a customer performs curb-side check-in.

FIGS. 41a to 41b show a continuation of the process where a customer performs drive-thru check-in.

DETAILED DESCRIPTION OF EXAMPLE EMBODIMENTS

While the systems and methods of the present disclosure may be embodied in various forms, the drawings show and this specification describes some exemplary and non-limiting embodiments. The present disclosure is an exemplification of the systems and methods and does not limit them to the specific illustrated and described embodiments. Not all of the depicted or described components may be required, and some embodiments may include additional, different, or fewer components. The arrangement and type of components may vary without departing from the spirit or scope of the claims set forth herein.

The present invention is defined by the appended claims. This description summarizes some aspects of the present embodiments and should not be used to limit the claims.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
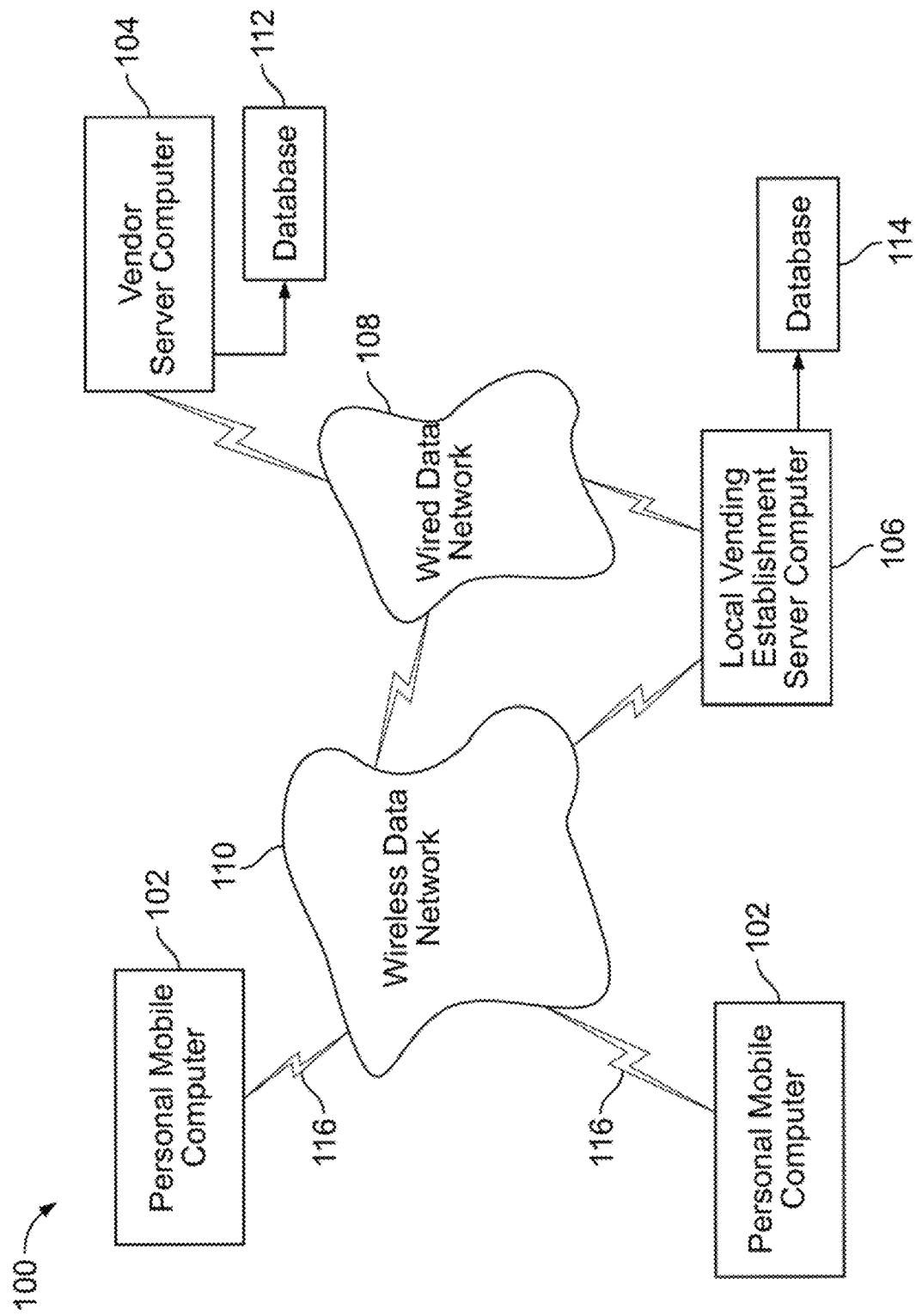
FIG. 1 is a system diagram illustrating an embodiment of a computer networked system in accordance with the invention.

Referring to FIG. 1, a system diagram illustrates an embodiment of a computer networked system 100 for generating a restaurant order on a wireless mobile personal computer.

The computer networked system 100 includes a plurality of wireless mobile personal computers 102, a vendor server computer 104, a local vending establishment server computer 106, a local database 114, a wired data network 108 and a wireless data network 110. The wired data network 108 can be a global network, a wide area network or a local area network. The wireless data network 110, which can couple to the wired data network 108, can include one of more wireless data networks, such as cellular networks, WiFi networks, Bluetooth networks, etc. . . . . The vendor server computer 104 can couple to the wired data network 108, and the local vending establishment server computer 106 can couple to both the wired data network 108 and the wireless data network 110. The wireless mobile personal computers 102 can couple to the wireless data network 110 over wireless links 116. In this regard, the wireless mobile personal computers 102 can access the vendor server computer 104 and/or the local vending establishment server computer 104 through the wireless data network 110. The wired data network 108 and the wireless data network 110 pertain to some portions of the World Wide Web (WWW, hereafter referred to as Web) and the Internet.

Figure 2:
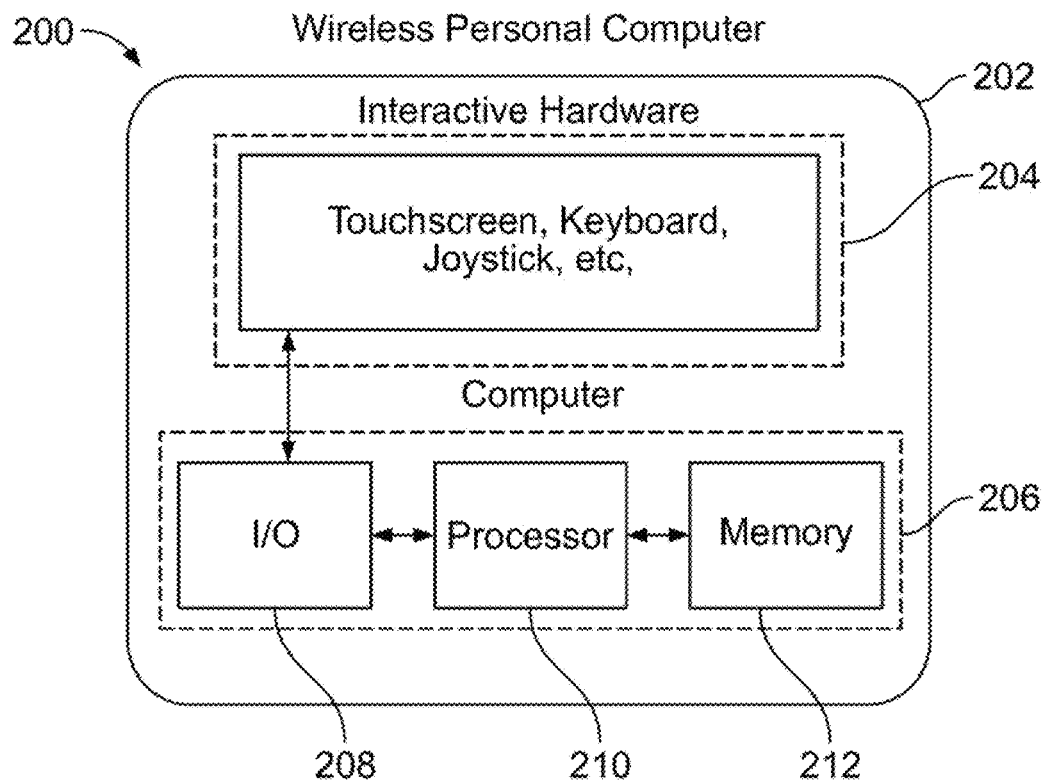
FIG. 2 is a schematic diagram of a handheld electronic device.

Now referring to FIG. 2, a diagram 200 illustrates schematically one of the wireless mobile personal computers 102 of FIG. 1. The illustrated wireless mobile personal computer 202 is preferably a handheld digital device of palm size or smaller, and can be a personal digital assistant (PDA), a cellular phone, a hybrid between a cellular phone and a PDA, a smart phone such as an IPHONE (3G, 3GS or other versions), or any other handheld electronic device having a display screen. The wireless mobile personal computer 202 includes an interactive hardware portion 204 and a computer portion 206. The interactive hardware portion 204 can include one or more of a touch screen, a keyboard, a stylus, a joystick, and the like, which can be arranged in various manners and have different shapes without changing the spirit of the interaction of the hardware portion 204 with the I/O portion 208. The touch screen can a liquid display crystal (LCD), display screen, a plasma screen, a light emitting diode (LED), or any other screen capable of displaying text and images. The computer portion 206 includes an input/output (I/O) portion 208, a central processing unit (CPU) portion 210, i.e., a microprocessor, and a memory 212. The CPU portion 210 can be any computer-processing unit from a singular microchip to extensive microchip configurations. The memory portion 212 can include, without limitation, any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory portion 212 may incorporate electronic, magnetic, optical, and/or other types of storage media, and can have a distributed architecture where various components are situated remote from one another, but are still accessed by microprocessor portion 210. The interactive hardware portion 204 is coupled to the I/O portion 208 such that a command entered by a user or customer through the interactive hardware portion 204 will be forwarded to the I/O portion 208, to the processor portion 210 and then to memory portion 212.

Figure 3:
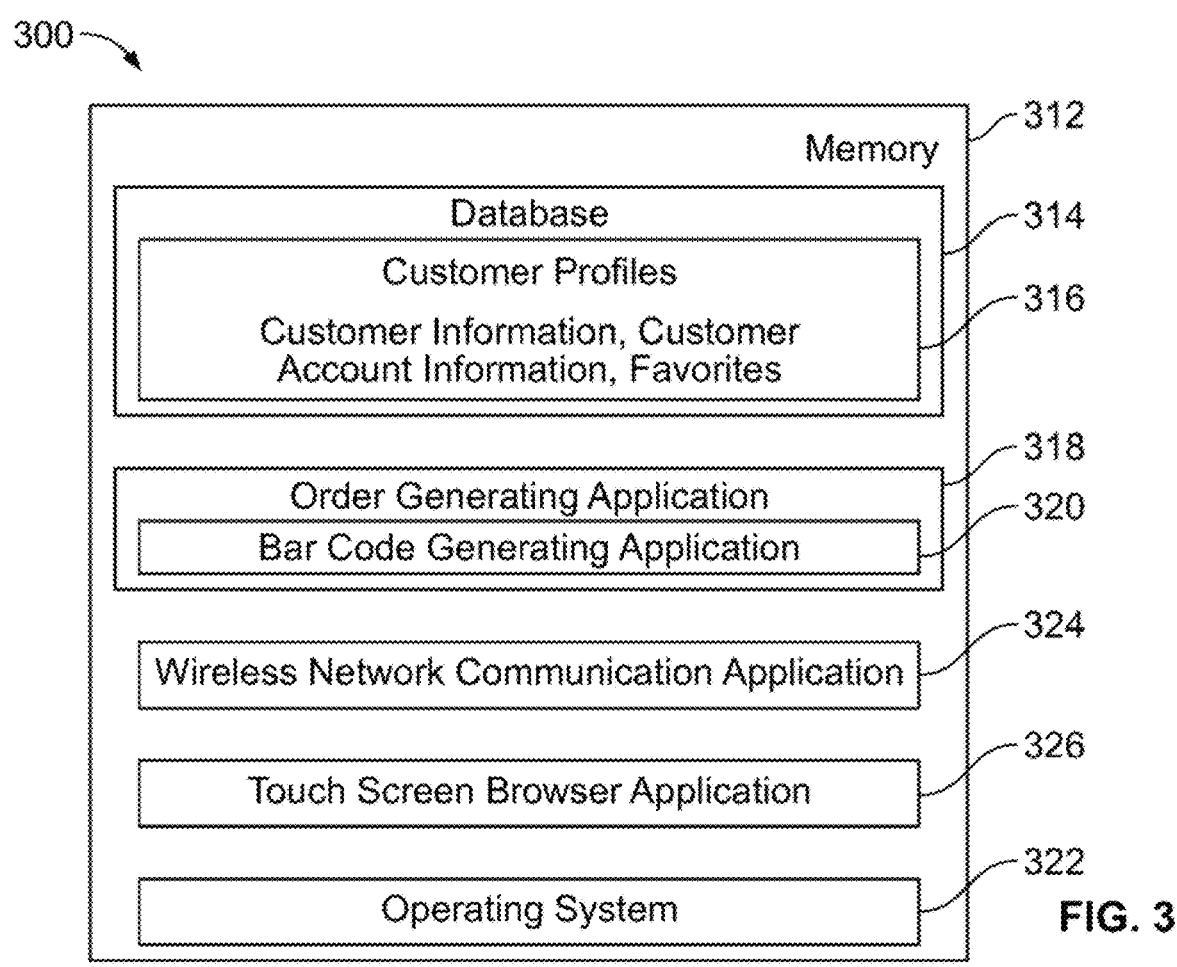
FIG. 3 is a schematic diagram of a memory portion of the handheld electronic device of FIG. 2.

As illustrated in FIG. 3, a schematic diagram 300 of the memory portion 212 of FIG. 2 is shown. The memory portion 312 can include or store a database 314, executable programs 318, 324 and 326 and an operating system 322. The database 314 can store data related to customer profiles 316, which can include customer information, customer account information, and restaurant favorites. The executable programs 318 can include a restaurant order generating code segment or application 318, a barcode generating application 320, an radio frequency identification (RFID) signal generating application 321, a wireless network communication software application 324, and a touch screen browser software application 326, each stored within the memory portion 312 or other computer hardware device, for operating in connection with the microprocessor portion 210 or other hardware device. For the sake of simplicity, the barcode generating application 320 and the RFID signal generating application 321 are considered to be sub code segments or parts of the restaurant order generating application 318. The executable programs 318 can be implemented in software, firmware, hardware, or a combination thereof. An example of a suitable commercially available operating system 322 is an appliance-based operating system, such as that implemented in handheld computers or personal digital assistants (PDAs) (e.g., PalmOS available from Palm Computing, Inc., IPHONE/IPOD OS available from Apple, and Windows CE available from Microsoft Corporation). The operating system 322 essentially controls the execution of other computer programs, such as the restaurant order generating application 318, and provides scheduling, input-output control, file and data management, memory management, and communication control and related services.

When the wireless mobile personal computer 102 is in operation, the CPU portion 210 is configured to execute software stored within the memory 212, 312, to communicate data to and from memory 212, 312, and to generally control operations of wireless mobile personal computer 102 pursuant to the software. The customer order generating application 318, and the operating system 322, in whole or in part, but typically the latter, are read by the CPU portion 210, perhaps buffered within the CPU portion 210, and then executed. When the customer order generating application 318 is implemented in software, it can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The customer order generating application 318 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. In another embodiment, where the customer order generating application 318 is implemented in hardware, it can be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
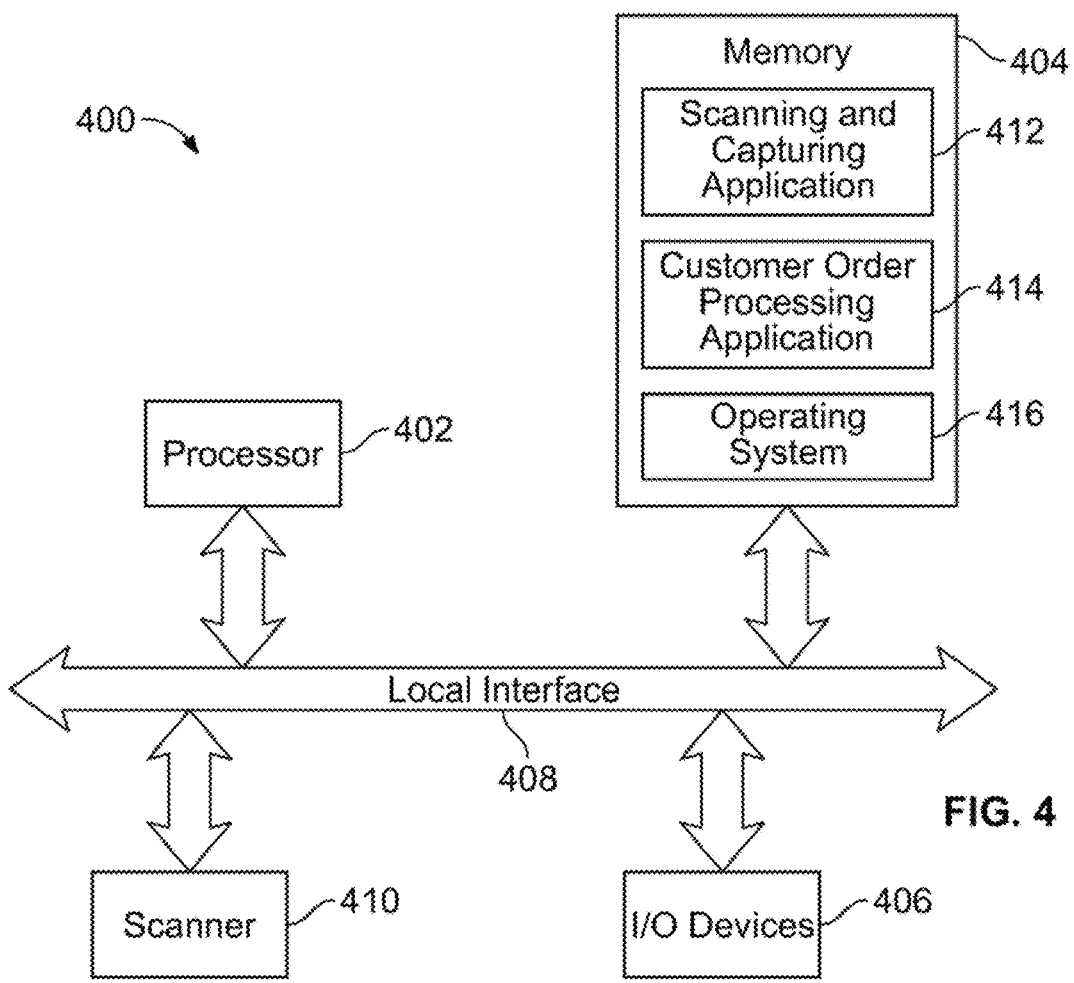
FIG. 4 is a block diagram illustrating a customer kiosk computer system.

Now referring to FIG. 4, a block diagram illustrates a customer kiosk computer system 400. Generally, in terms of hardware architecture, the customer kiosk computer system 400 includes a processor 402, a memory 404, one or more input and/or output (I/O) devices 406 (or peripherals) that are communicatively coupled via a local interface 408, a scanner 410, and an RFID signal receiver or reader 411. The local interface 408 can be, for example, but not limited to, one or more buses or other wired or wireless connections, as is known in the art. The local interface 408 may have additional elements, which are omitted for simplicity, such as controllers, buffers (caches), drivers, repeaters, and receivers, to enable communications. Further, the local interface 408 may include address, control, and/or data connections to enable appropriate communications among the other computer components.

The processor 402 is a hardware device for executing software, particularly software stored in memory 404. The processor 402 can be any custom made or commercially available processor, a central processing unit (CPU), an auxiliary processor among several processors associated with the customer kiosk computer system 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor 402 may also represent a distributed processing architecture such as, but not limited to, SQL, Smalltalk, APL, KLisp, Snobol, Developer 200, MUMPS/Magic.

The memory 404 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 404 may incorporate electronic, magnetic, optical, and/or other types of storage media. Memory 404 can have a distributed architecture where various components are situated remote from one another, but are still accessed by the processor 402.

The software in memory 404 may include one or more separate programs. The separate programs comprise ordered listings of executable instructions for implementing logical functions. In the example of FIG. 4, the software in memory 404 includes a scanning and capturing application 412, a detecting and capturing application 413, an order processing application 414, and a suitable operating system (O/S) 416. A non-exhaustive list of examples of suitable commercially available operating systems 416 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 416 essentially controls the execution of other computer programs, such as the scanning and capturing application 412, the detecting and capturing application 413, the order processing application 414, and provides scheduling, input-output control, file and data management, memory management, and communication control and related services.

Each of the scanning and capturing application 412, the detecting and capturing application 413, and the order processing application 414 may be a source program, executable program (object code), script, or any other entity comprising a set of instructions to be performed. When a source program, the program needs to be translated via a compiler, assembler, interpreter, or the like, which may or may not be included within the memory 404, so as to operate properly in connection with the O/S 416. Furthermore, each of the scanning and capturing application 412, the detecting and capturing application 413, and the order processing application 414 can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada. In one embodiment, when installed within the memory 404 of the customer kiosk computer system 400, each of the scanning and capturing applications 412, the detecting and capturing application 413, and the order processing application 414 is written in C/C+/C++ format, and no browser-based software is used. In other embodiments, browser software may be used.

Each of the scanning and capturing applications 412, the detecting and capturing application 413, and the order processing application 414 can be implemented in software, firmware, hardware, or a combination thereof. In one mode, each of the scanning and capturing application 412, the detecting and capturing application 413, and the order processing application 414 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Therefore, the customer kiosk computer system 400 may be representative of any computer in which the scanning and capturing applications 412, the detecting and capturing application 413, and the order processing application 414 reside or partially reside. The customer kiosk computer system 400 can have one or more physical customer kiosks, which can take several different forms. In one form, the customer kiosk can be a free standing or stand-alone apparatus. In another form, the customer kiosk can be mounted to a counter-top instead of being a stand-alone apparatus. In either form, the customer kiosk can further include additional not-shown elements, such as a touch screen display, a credit card reader, and a receipt dispenser. The customer kiosk computer system 400 can be connected to a corresponding local vending establishment server computer 106 and to other local customer kiosk computer systems via a local area Ethernet communications network, as well as including a CD-ROM drive for uploading software applications and other information.

The I/O devices 406 may include input devices, for example but not limited to, credit card readers, input modules for PLCs, a keyboard, mouse, microphone, touch screens, interfaces for various devices, barcode readers, stylus, laser readers, radio-frequency readers, etc. Furthermore, the I/O devices 406 may also include output devices, including, but not limited to, receipt dispensers, output modules for PLCs, a printer, barcode printers, displays such as touch screen displays, etc. Finally, the I/O devices 406 may further include devices that communicate both inputs and outputs, for instance but not limited to, a modulator/demodulator (modem; for accessing another device, system, or network), a radio frequency (RF) or other transceiver, a telephonic interface, a bridge, and a router.

The barcode scanner 410 can be any one of known conventional barcode readers or scanners, which include sequential barcode scanners and charge-coupled device ("CCD") barcode scanners. A sequential barcode scanner, for example, uses a scanning beam, typically narrow band light in the visible spectrum such as red laser, but potentially any bandwidth of light in the visible or infrared spectra, to pass over barcodes or optical machine-readable representations. The barcodes can be one-dimensional (1D) or two-dimensional (2D) barcodes. The 1D barcodes are typically represented by a sequence of dark bars or lines and spaces, and the 2D barcodes, also termed 2D matrix codes, are typically represented by patterns of squares, dots, hexagons and other geometric patterns. Another type of sequential scanner is a wand scanner, which is swept across the barcode by a user to create the scanning beam. As the scanning beam of light scans across the barcode, the beam is at least partially reflected back to the scanner by the spaces and is at least partially absorbed by the dark bars. A receiver, such as a photocell detector, in the scanner receives the reflected beam and converts the beam into an electrical signal. As the beam scans across the barcode, the scanner 410 typically creates a low electrical signal for the spaces, i.e., reflected beam, and a high electrical signal for the bars, i.e., where the beam is absorbed. The scanner may, however, create a low electrical signal for the bars and a high electrical signal for the spaces. The width of the bars and spaces determines the duration of the electrical signal. This signal is decoded by the scanner or by an external processor into characters that the barcode represents. In a CCD scanner, however, the scanner takes a digital image of the barcode and decodes the barcode using software that is well known in the art to convert the elements into the identification code. In either a sequential barcode scanner or a CCD scanner, the contrast between the bars and spaces is used to distinguish the elements and decode the barcode. A barcode displayed on an LCD screen such as on a PDA or cell phone, for example, has a contrast between the gray "off" state designating a space of the barcode and the black "on" state designating a bar than is available for a barcode printed on a black and white label. Recently, the airline transportation industry, namely the International Air Transport Association (AITA), in its aim to shift entirely to barcode boarding passes by 2010, has opted to standardize a mobile phone barcode system for customer check-ins at airports. The scanner 410 is configured to utilize this standard.

Alternatively, an RFID signal reader and an RFID transmitter can be utilized. Specifically, once generated by the signal generating application 321, the RFID signal can be transmitted for detection by the RFID signal reader 411 when the customer arrives at one of the vendor's establishments. The transmission of the generated RFID signal can be transmitted by an RFID transmitter or card, which can be built-in to the wireless mobile personal computer 102 or can be removably attached to it. The RFID signal is preferably a near field communication (NFC) signal. As known in the art, NFC is a short-range high frequency wireless communication technology which enables the exchange of data between devices over about a 10 centimeters (around 4 inches) distance. The technology is an extension of the ISO/IEC 14443 proximity-card standard (contactless card, RFID) that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment. NFC is primarily aimed at usage in mobile phones. An example of an NFC RFID mobile add-on card is the iCarte, which as a reader and writer can provide NFC two way communications. For contactless payment capabilities, the iCarte has an embedded smart-chip, which can be configured as debit, credit, pre-paid and loyalty cards, thereby turning the IPHONE into an electronic wallet. The iCarte works with IPHONE 3G and 3GS with IPHONE OS 3.0 or above.

As discussed above, each one of the wireless mobile personal computers 102 includes a touch screen browser software application. In one embodiment, the touch screen browser application is provided for displaying a plurality of customer ordering interface screens of the present invention and receiving customer selections in response thereto, as will be described in greater detail below. In the embodiment shown in FIG. 2, the CPU portion 210 at least in part generates, launches, communicates, and/or implements the customer order generating interface screens for allowing and causing the touch screen browser application to display the customer order generating interface screens on the interactive hardware portion 204, for simplicity hereafter referred to as a touch screen display. As shown in FIGS. 2 and 3, the CPU portion 210 can include in memory 312 a restaurant order generating software application 318 for launching, communicating, and/or implementing the customer order generating interface screens of the present invention.

The customer can view the customer order generating interface screens as displayed on the touch screen display 204 by launching the customer order generating application 318, and the customer can utilize these customer order generating interface screens to select restaurant items, select a payment option, and generate a barcode or other code representative of the selected restaurant items and payment option. In one embodiment, the wireless mobile personal presentation on the touch screen display 204 is created and controlled by software, such as the customer order generating application 318 and information received from the CPU portion 210. When new software is to be installed on the wireless mobile personal computer 102, the software can be downloaded or retrieved from the database 112.

Figure 5:
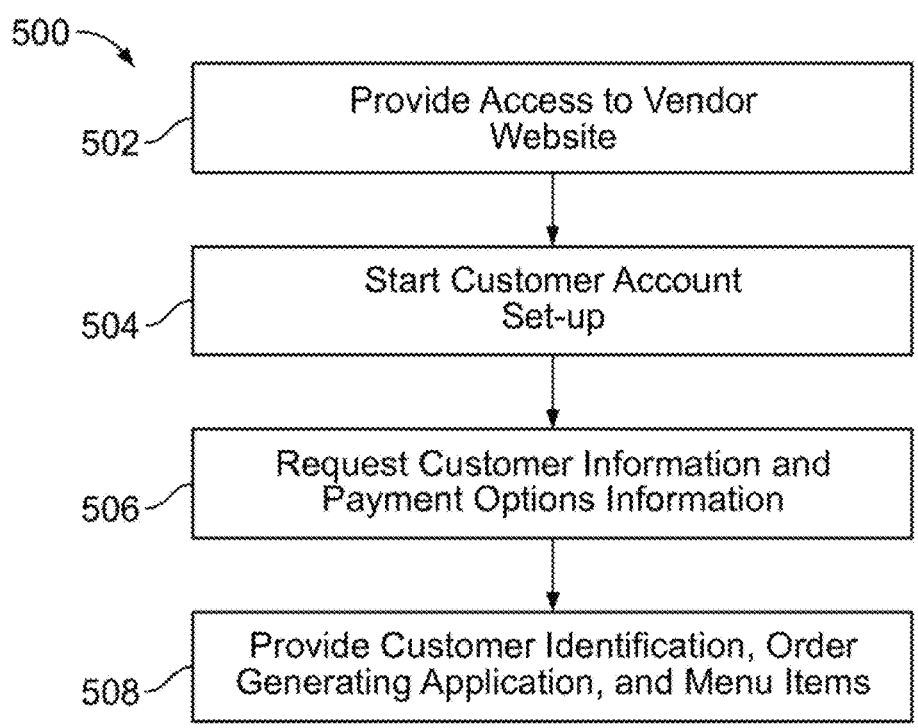
FIG. 5 is a flow chart illustrating an embodiment of a process for establishing a customer account with a vendor in accordance with the invention.

Now referring to FIG. 5, a flow chart 500 illustrates a process or method for establishing a customer account with the food vendor. In one embodiment, the customer must establish an account with the food vendor in order to receive and store the customer order generating application 318, the barcode generating application 320, the RFID signal generating application 321 and menu items including favorites and/or preferences. A barcode, created or generated by the barcode generating application 320, is configured to represent an order generated in the wireless mobile personal computer 102 and to include customer information needed to complete a purchase from the vendor at one of its vending establishments or restaurants. Alternatively, an RFID signal, created or generated by the RFID generating application 321, is configured to represent an order generated in the wireless mobile personal computer 102, and can be configured to include customer information needed to complete a purchase from the vendor at one of its vending establishments or restaurants.

The customer account is opened or set up as follows. The customer accesses a food vendor's website using the Internet and a computer running a web browser program, at step 502. The computer may be the wireless mobile personal computer 102 or any other computer with access to the Internet. After connecting to the food vendor's website, the customer begins the account set-up by following procedures provided on related web pages of the web site, at step 504. Typically, in setting up an account the customer is requested to choose a user name and password and then enter personally identifying information such as a name, a mailing address, an e-mail address, and/or a phone number, as generally shown in step 506. After choosing a user name, a password, and entering personally identifying information, the customer is further requested to enter payment options information, which can include cash and electronic payments (epayment). The epayment option can be at least one of a credit card number representing a chargeable credit card account associated with the customer, a debit card number representing a debitable bank account associated with the customer, a chargeable vendor's card account associated with the customer, such as the McDonald's Arch Card, or a payment service account number such as a "PayPal" account number representing a chargeable PayPal account associated with the customer. The vendor's card is typically only valid and accepted for use at the vendor's participating restaurants. Once the account is validated, the customer is provided for downloading or retrieving from the database 112 the restaurant order generating application 318, the barcode generating application 320, the RFID signal generating application 321, and selectable menu item preferences, such as menu favorites. As generally shown in step 508, based on the provided customer information, customer identification is generated by a corresponding customer application running on the vendor server computer 104 for storage in the vendor database 112 and in the wireless database 314. If the customer account is created using a computer other than the wireless mobile personal computer 102, the customer identification, the menu items including favorites and/or preferences, the restaurant order generating application 318, the barcode generating application 320, and the RFID signal generating application 321 can be first downloaded to and stored in this other computer and then to the wireless mobile personal computer 102. After the download, the customer can log off of the food vendor's website, and is ready to begin using the invention to generate restaurant orders on the wireless mobile personal computer 102 and purchase them at the vendor's participating establishments.

In a further embodiment, the customer does not need to establish a customer account in order to be able to download menu items, the restaurant order generating application 318, the barcode generating application 320, and the RFID signal generating application 321 to the wireless mobile personal computer 102. The customer can access the food vendor's website and select the information and the applications 318, 320 and 321 for download to the wireless mobile personal computer 102. Alternately, the customer can download any of these applications or "App" directly from a third party, such as Apple iTunes or Google App Store, or such as from an App developer site. A link could be provided form the food vendor's website in order to have the customer redirected to where the App is located for downloading.

The computer networked system 100 allows customers to create a food order before arriving at a quick service restaurant, such as a McDonald's restaurant. This is achieved by accessing or launching the restaurant order generating application 318 on the client mobile personal computer 102. The customer then selects items to generate an order through interface screens generated by the order generating application 318 through the client mobile personal computer 102. A barcode or other code is then generated by the barcode generating application 320 and presented on the screen to use to place the order when the customer arrives at one of the vendor's local restaurants or establishments. As such, upon arrival at the restaurant, the customer places the order by scanning the order barcode at the customer kiosk scanner 410 that submits the order and payment information to the restaurant. If the customer has an account with the vendor r has otherwise directly provided payment information to the applications 318, 320 and 321, the barcode generated will include a payment method chosen by the customer, via i.e., epayment or cash. Otherwise, the generated barcode will not include any payment information, and the customer will pay for his order as he/she chooses after scanning the generated barcode. The customer can check in at the drive-thru, inside, or at a designated curbside parking space depending on where the barcode scanner 410 is located. The food is then prepared and presented in a typical fashion, or walked to the customer's car at curbside.

Alternately, once the order is created an RFID signal is then generated by the RFID signal generating application 321 and transmitted to place the order when the customer arrives at one of the vendor's local restaurants or establishments. As such, upon arrival at the restaurant, the customer places the order by transmitting the order RFID signal for detection by the RFID signal reader 411, which submits the order and payment information to the restaurant. If the customer has an account with the vendor or has otherwise directly provided information to the applications 318, 320, and 321, the generated RFID signal will include a payment method chosen by the customer, via i.e., epayment or cash. If the customer does not have an account with the vendor, the generated RFID signal will not include any payment information, and the customer will pay for his order as he/she chooses after transmitting the generated RFID signal. The customer can check in at the drive-thru, inside, or at a designated curbside parking space depending on where the RFID reader 411 is located. The food is then prepared and presented in a typical fashion, or walked to the customer's car at curbside. In one embodiment, both the barcode and the RFID signal can be compressed by the barcode generating application 320 and the RFID signal generating application 321. Once captured by the scanning and capturing application 412 or the detecting and capturing application 413, the compressed barcode or RFID signal is then decompressed by the order processing application 414 before being processed.

Figure 6B:
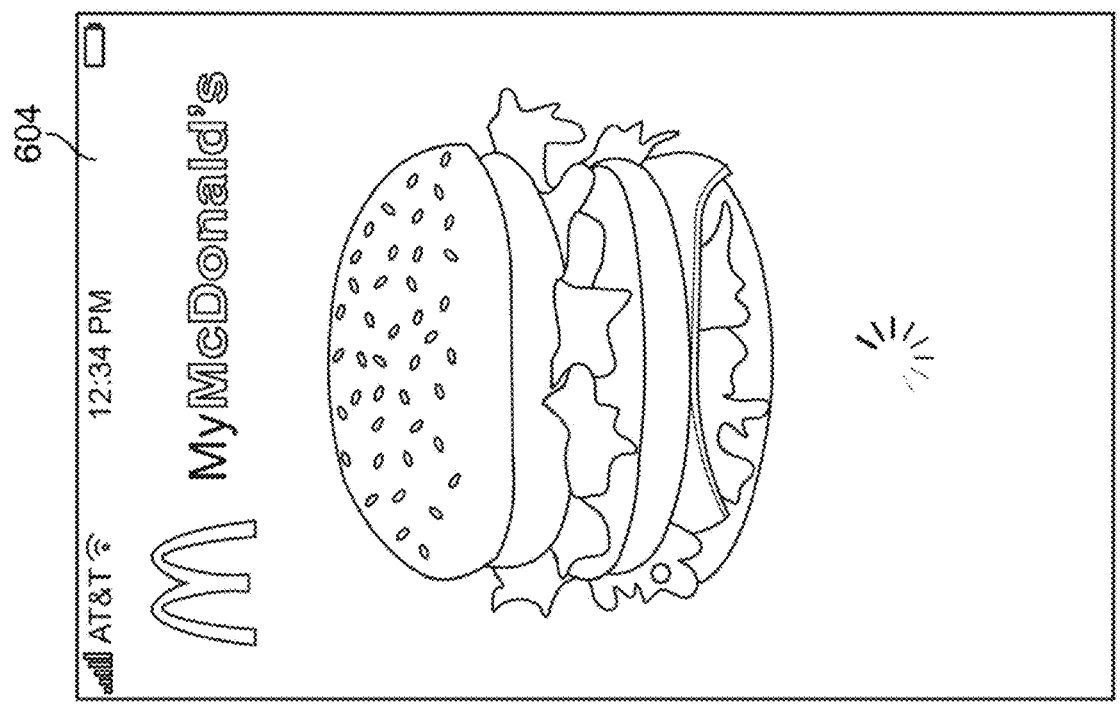
FIGS. 6A-6O illustrates customer ordering interface screens displayed on the display of the wireless mobile personal computer and representing a single order option in accordance with the invention.
Figure 6A:
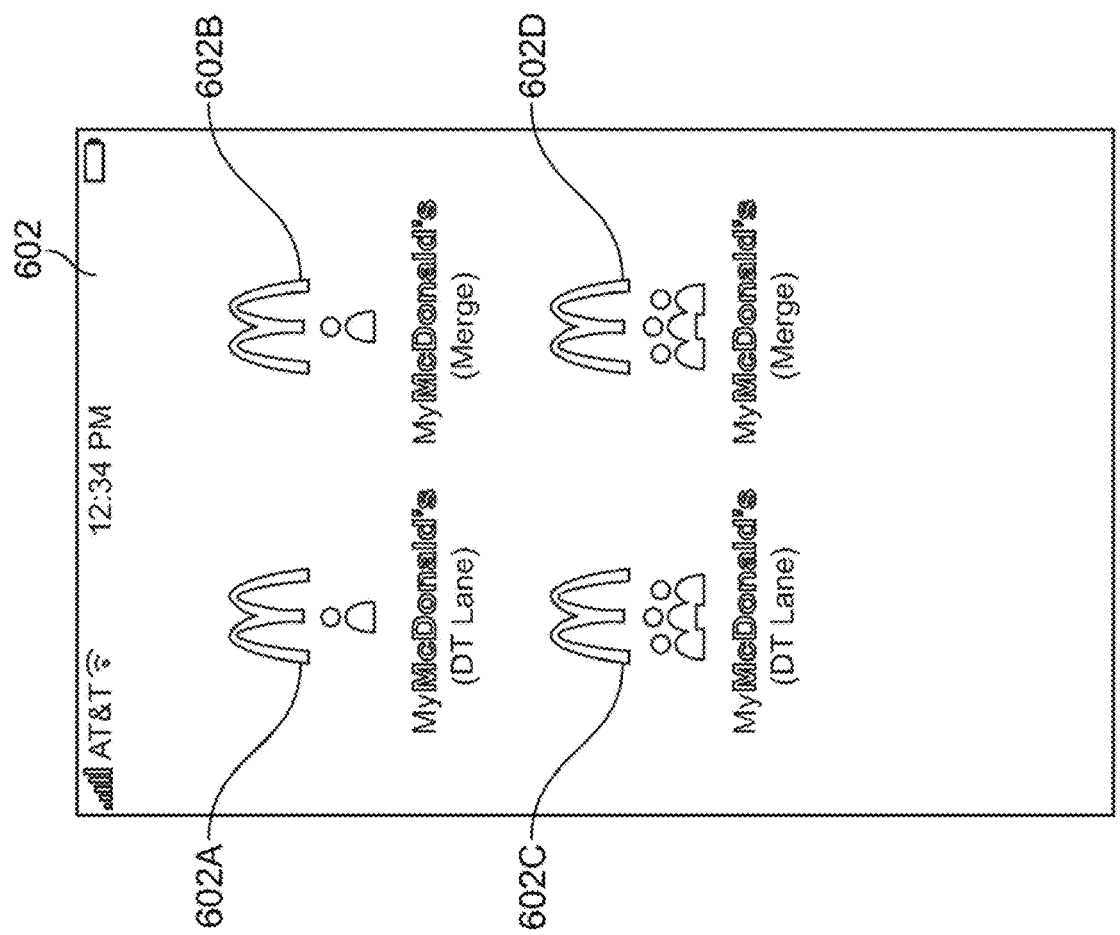
Figure 6F:
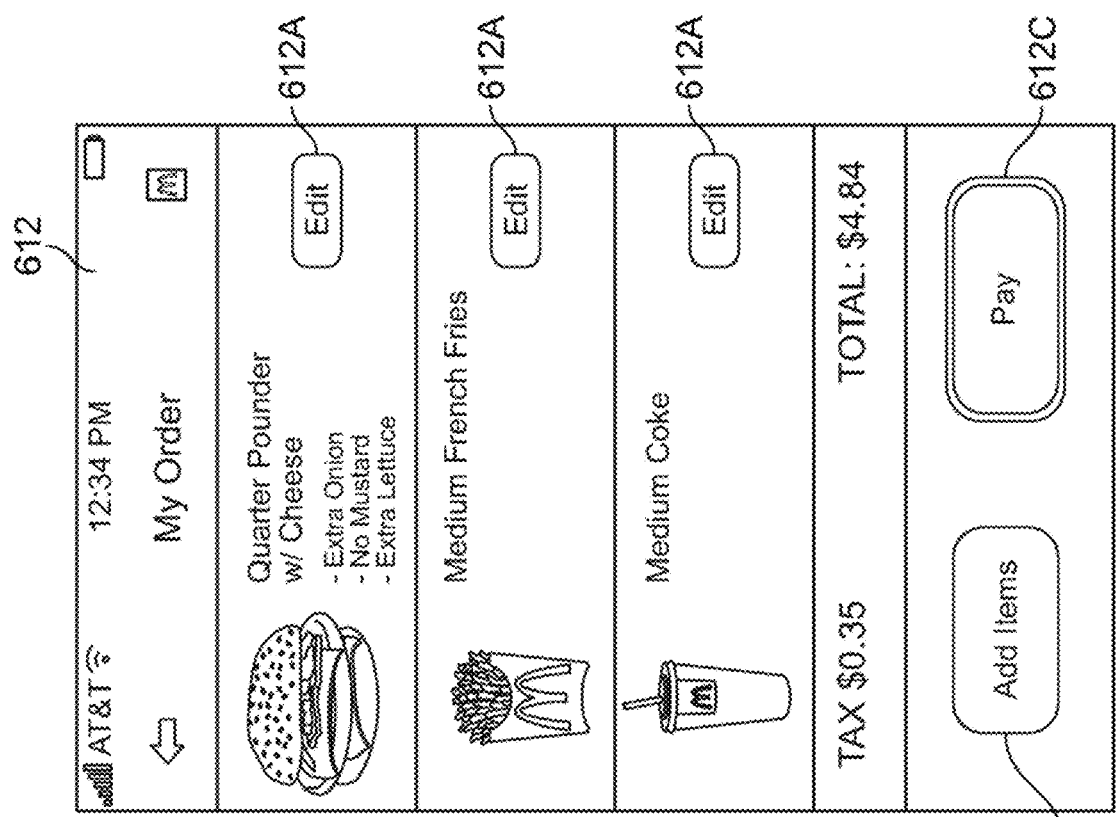
Figure 6E:
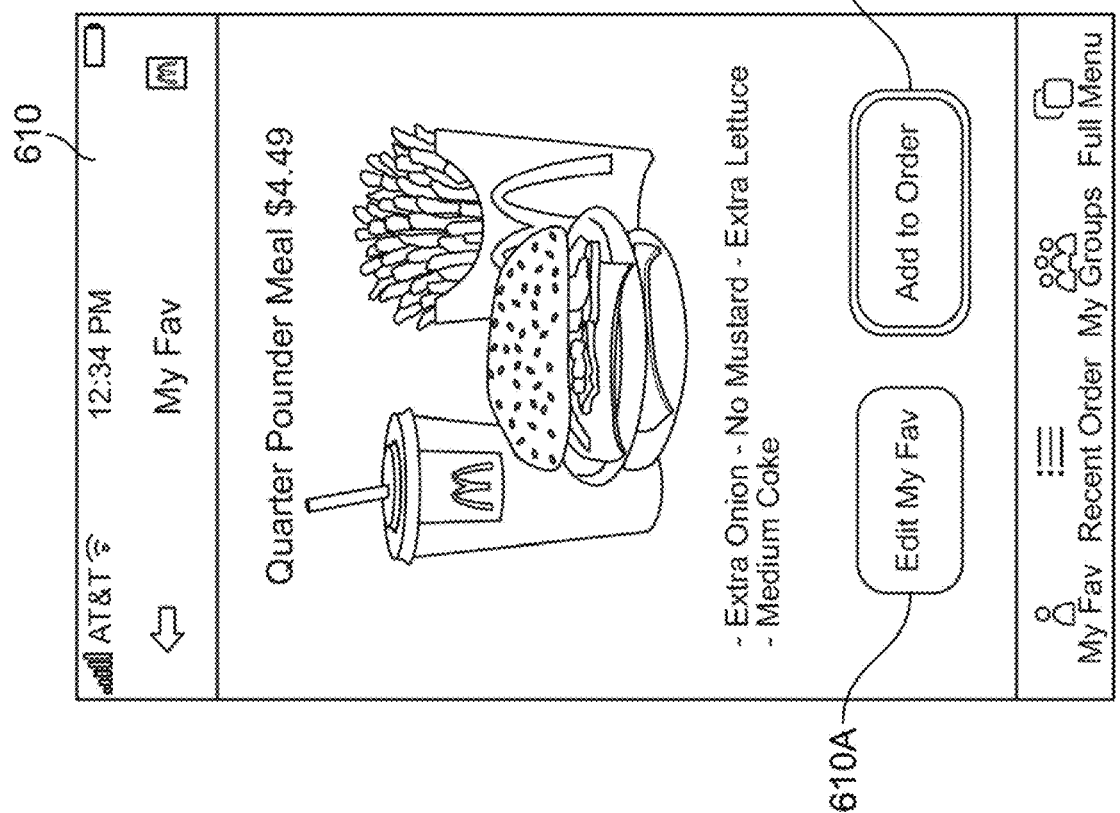

Specifically, with reference to FIGS. 6A-6O and FIGS. 7A-7S, to be discussed in detail below, the order generating interface screens provide four main options for order creation: 1) single order for pickup at Drive-Through (DT); 2) single order for pickup in-store; 3) group order for pickup at Drive-Through (DT); and 4) group order for pickup in-store. Referring to FIGS. 6A-6O and FIG. 8, customer ordering interface screens 600 are displayed on the display 204 of the wireless mobile personal computer 102 and representing a single order option in accordance with the invention. It should be understood that when the term "barcode" is referenced, the term "RFID" can be utilized as well, including at least the barcode itself and the barcode scanner. In one embodiment, the customer order generating application 318 can be configured to carry out the method 800 shown in FIG. 8. Specifically the method 800 can generate and display an opening customer ordering interface screen 602, at Step 802, which allows the customer to begin the generation of the order. Referring to FIG. 6A, the opening customer ordering interface screen 602 can be configured to display four selectors 602 A-D, one for each the above discussed four options for order creation, namely single or group order for Drive-Through or pickup in-store. If the customer selects the single order for pickup at Drive-Through selector 602A or the single order for pickup in-store selector 602B, which selection is then received by the order generating application 318, the customer ordering interface screen 604 followed by the customer ordering interface screen 606 will be transmitted to and displayed on the display 204, at Steps 804 and 806. Referring to FIG. 6C, the restaurant order generating application 318 is configured to display a My Menu selector 606A, a My Barcodes selector 606B and a My Settings selector 606C on the interface screen 606 for selection by the customer. After the My Menu selector 606A is selected, the customer order generating application 318 can be configured to generate and display the interface screen 608, shown in FIG. 6D, which allows the customer to select a specific restaurant location at which the customer would like to place and pickup the order. The interface screen 608 provides a choice between a "Saved Location" selector 608A and a "Nearest Location" selector 608B. When the "Saved Location" selector 608A has been selected and the selection is received by the order generating application 318, the order generating application 318 is configured to transmit and display, one or more maps showing restaurant locations, previously saved in the memory 212, along with their respective addresses on the display 204. When the "Nearest Location" selector 608B has been selected, similarly the order generating application 318 transmits and displays one or more maps showing restaurant locations are displayed based on a zip code entered by the customer or on a global positioning system (GPS) application that determines the closest restaurant locations relatively to the location of the wireless mobile personal computer 102. Once a desired or specific location is chosen by selecting one of the "button" selector 608C or 608D associated with one of the displayed maps, and selecting the "Select This Location" selector 608E, the customer order generating application 318 can be configured to receive the selection and generate and display the interface screen 610 shown in FIG. 6E, or other order entry interface screens that allows the customer to select restaurant items as part of the order being generated. Interface screens similar to those disclosed in US Patent Application Publication No. 2009/0265247, the contents of which are herein incorporated by reference, can be generated and provided to allow for selecting and customizing restaurant items. In addition, as generally shown in interface screen 610 and discussed above, the customer can be provided with options by the order generation application 318 to select and store his/her favorite menu items and favorite orders, which can then be used to select in an expedited manner for future ordering. As shown, the interface screen 610 allows the customer to select and edit their favorite orders by selecting the "Edit My Fav" selector 610A, and add it to the order by selecting the "Add to Order" selector 610B, at Step 808. FIG. 6F shows a further customer ordering interface screen 612 generated and transmitted for display by the order generating application 318 after receiving the customer selection of the "Add to Order" selector 610B. This interface screen 612 provides input options to edit the selected menu items by selecting the "Edit" selector 612A, to add order items via the "Add item" selector 612B, and a pay option via the "Pay" selector 612C, at Step 810. Once the customer selects to pay, the customer order generating application 318 receives the items and the payment selection and generates and displays the interface screen 614 shown in FIG. 6G. The selection of items received by the order generating application 318 includes a "Quarter Pounder w/ Cheese" selection, a "Medium French Fries" selection and a "Medium Coke" selection. After receiving the item and payment selection, the order generating application 318 is configured to generate and transmit for display the interface screen 614 shown in FIG. 6G. The interface screen 614 provides payment options, such as via a Visa Card, an Arch Card for McDonald's, and pay on site at the restaurant selected. Additionally, the customer order generating application 318 can be configured to offer the customer to add another payment option by selecting the "Add Payment Method" button on interface 614. Once the payment option has been selected, at Step 812, the customer can select the "Create BarCode" selector 614A to be received by the barcode generating application 320 which then generates a barcode representative of the generated order, which includes the menu items and the payment option selected, at Step 814.

Figure 6H:
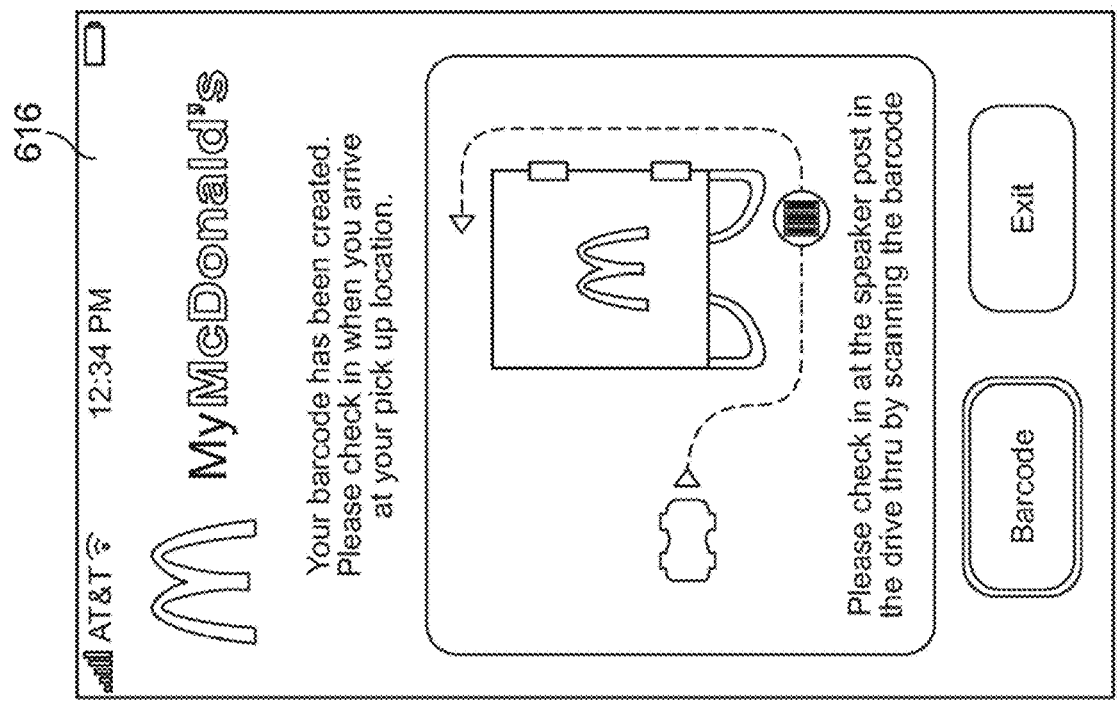
Figure 6G:
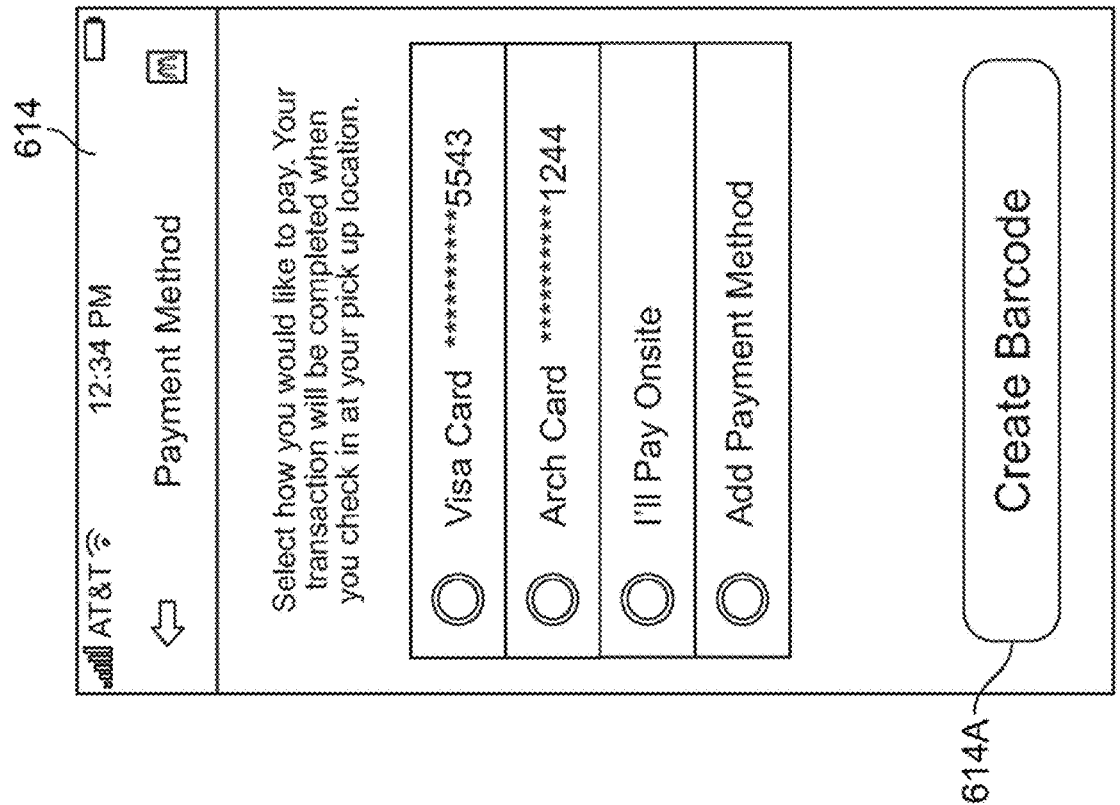
Figure 6J:
Figure 6I:
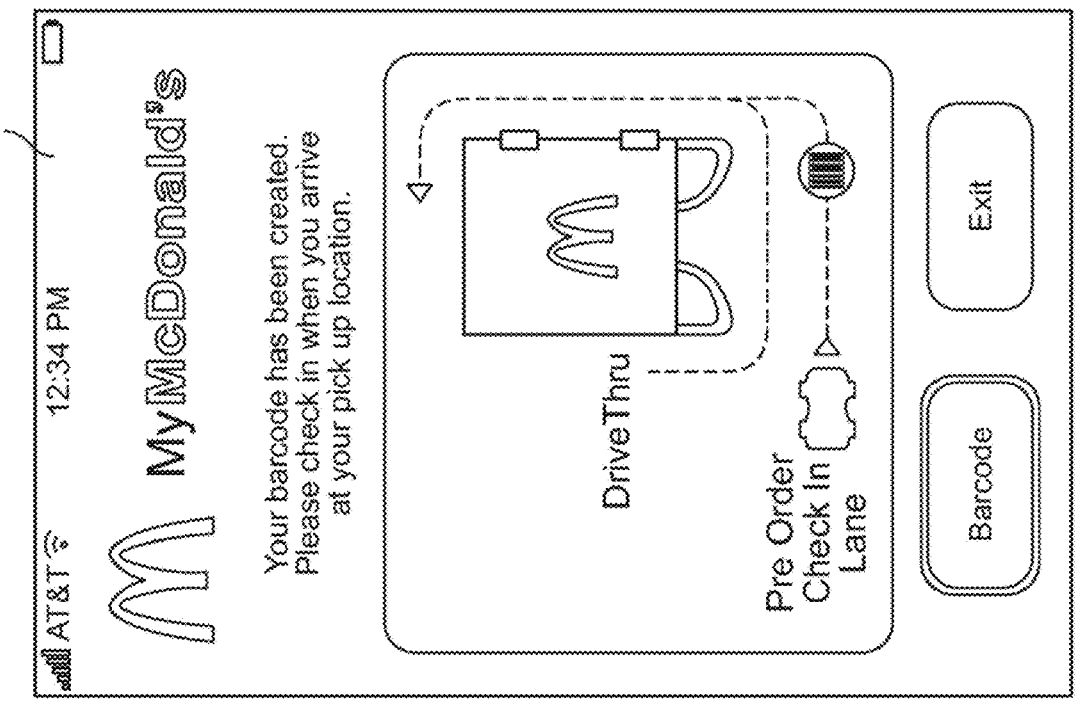
Figure 6L:
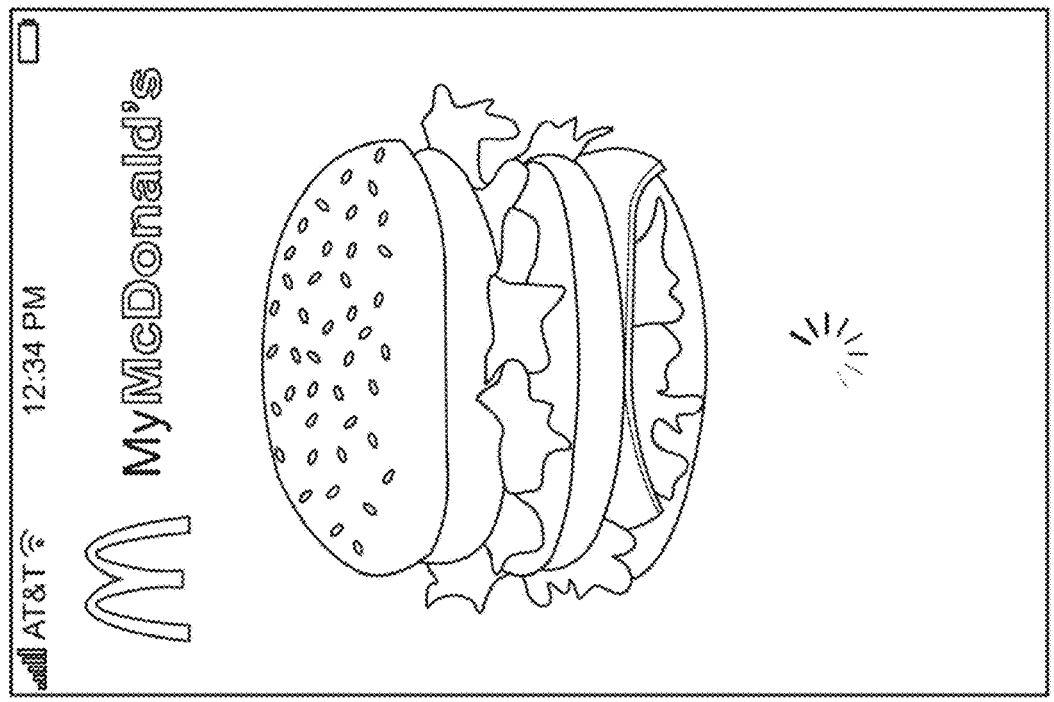
Figure 6K:
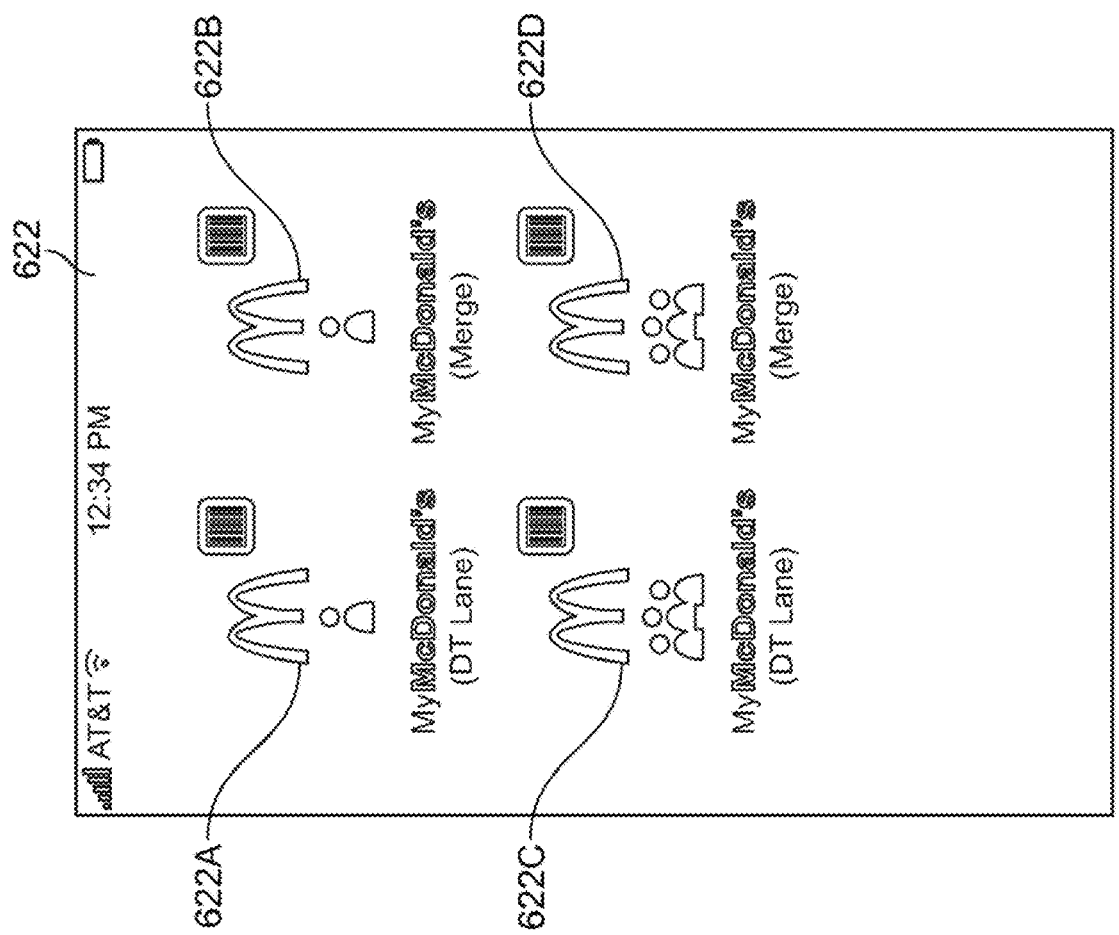
Figure 6O:
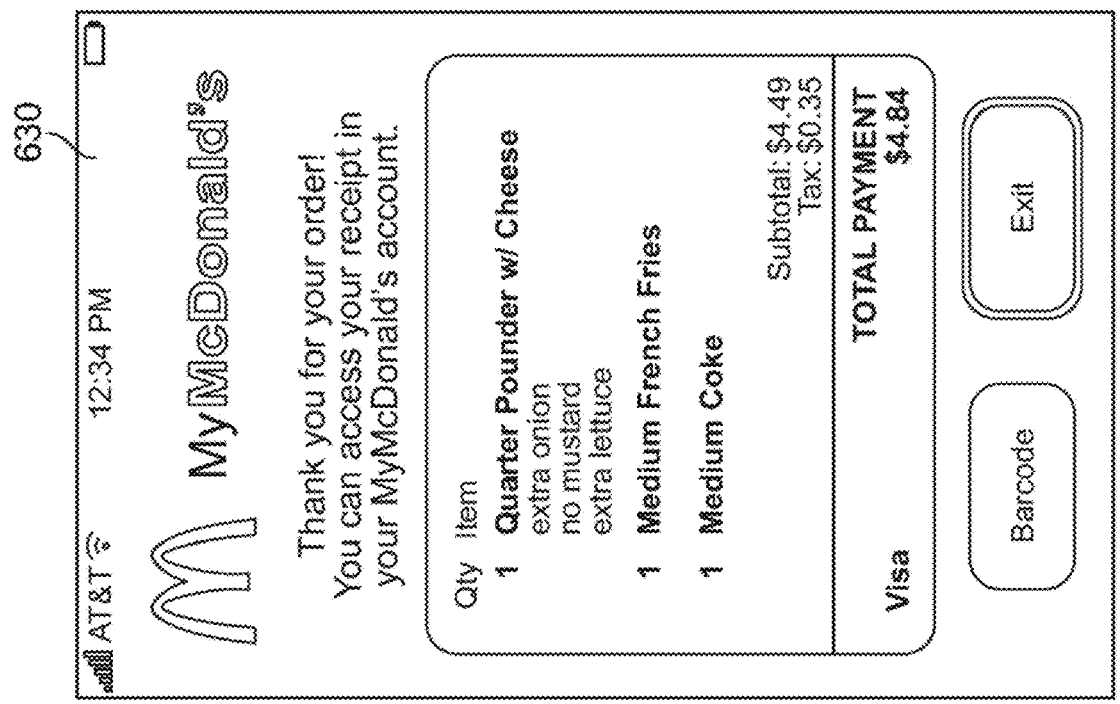

Referring to FIGS. 6H and 6I, once the barcode is generated, the customer order generating application 318 is configured to generate, transmit and display for the customer interface screens 616 and 618 which include directions on where to place the order by presenting the created barcode, pay for the order and pick up the generated order. Each of interface screens 616 and 618 include a map on how to move through a "speaker-post" kiosk (in-store pickup or hand delivery to the customer's car) and on how to check-in using the drive-through, as shown on FIGS. 6H and 6I, respectively. The interface screens 616 and 618 can also provide a selectable option to display the created barcode to use when the customer arrives at the restaurant location, specifically at a customer kiosk of the restaurant location. Once the barcode option selection has been received, the customer order generating application 318 can be configured to generate, transmit and display the created bar code on interface screen 620 shown in FIG. 6J. When the customer arrives at the restaurant, the barcode scanner 410, which can be within the customer kiosk, hand-held and used by a food runner/presenter, or within some other device, such as a "speaker post," is provided for scanning and capturing the barcode displayed on the interface screen 620, at Step 816. Once at or presented with the scanner 410, the customer can position the barcode displayed on the display of the wireless mobile personal computer 102 to be read and captured by the scanner 410. After capturing the displayed barcode, the scanning and capturing application 412 is configured to decode the barcode to figure out what items have selected by the customer and coded by the barcode generating application 320, as well as the payment information if one was selected and included in the barcode. The decoded barcode is then communicated to the customer order processing application 414 which processes the order, communicates the items ordered to the local kitchen for preparation, and processes the payment method selected by the customer. If an epayment has been selected, the customer order processing application 414 is configured to process electronically the payment and inform the cashier or runner that the payment has been provided. The prepared order is then provided to the customer through the drive-through window, the walk-up counter, or delivered to the customer waiting in the parking lot. If the "I'll Pay Onsite" option is selected from within the payment interface screen 614 during the order generating process, the customer must also provide payment on-site (drive-through, walk-up, or with a food runner having a payment receiving device, such as a hand-held credit card scanner) prior to receiving the prepared order.

Referring to FIGS. 6K-6O, the customer order generating application 318 is configured to further generate, transmit and display interface screens 622-630 which enable the customer to recall barcodes which have been placed, so that the wireless mobile personal computer 102 can be used for other functions prior to arrival at the restaurant location. As shown in FIG. 6M, the displayed interface screen 626 allows the customer to select "My Barcodes" selector 626B in order to show orders that have been placed for the respective ordering methods shown in FIG. 6K, namely single order for pickup at Drive-Through (DT) 622A, single order for pickup in-store 622B, group order for pickup at Drive-Through (DT) 622C, and group order for pickup in-store 622D. The barcode for the selected ordering method will then be displayed by interface screen 628 shown in FIG. 6N. The interface screen 628 also provides the customer with the option of re-displaying the items ordered within a receipt by selecting the "Receipt" selector 628A, at Step 818. Following receipt of the selection of the "Receipt" selector 628A, the customer order generating application 318 is configured to generate and display the interface screen 630 shown in FIG. 6O, which also provides the total amount paid for the generated order, the payment option used to pay for the order, as well as a statement that the receipt can be accessed in the customer account.

Figure 7A:
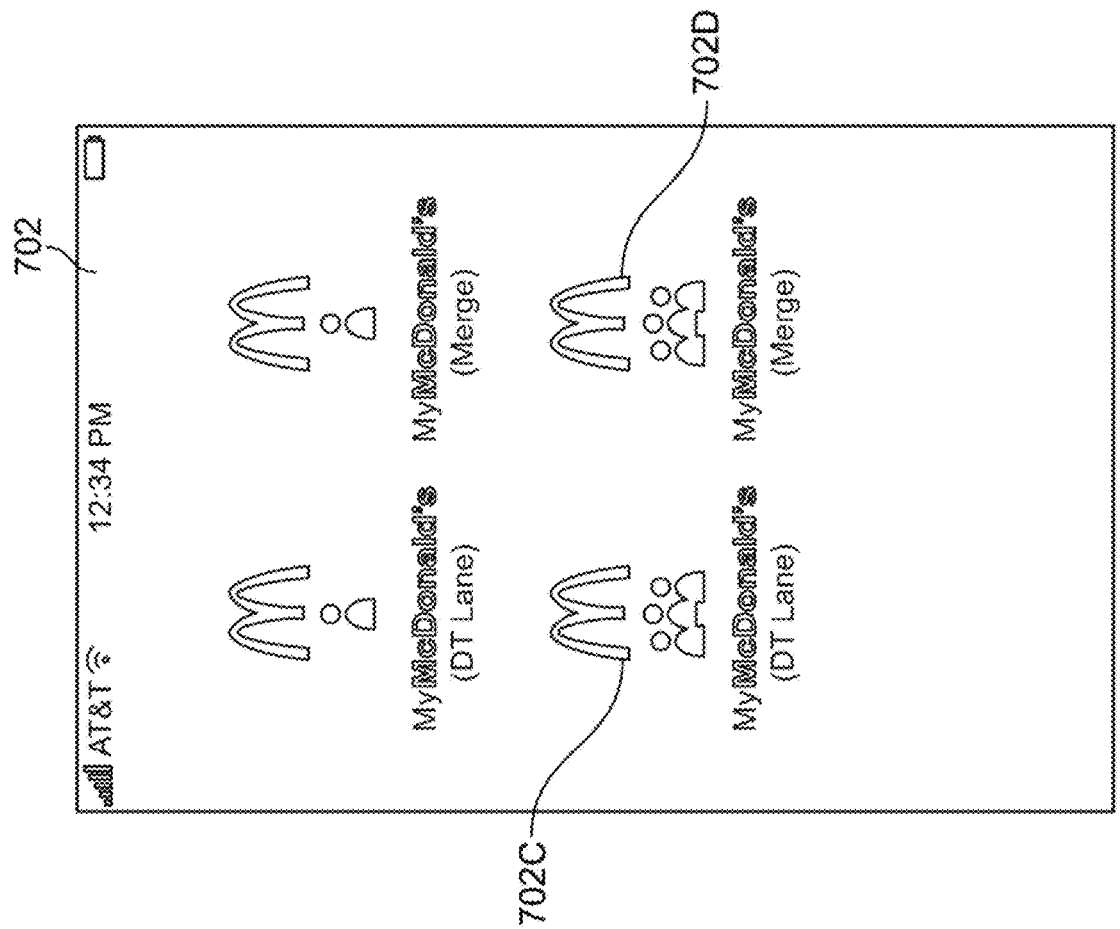
FIGS. 7A-7S illustrates customer ordering interface screens for a group order option in accordance with the invention.
Figure 7C:
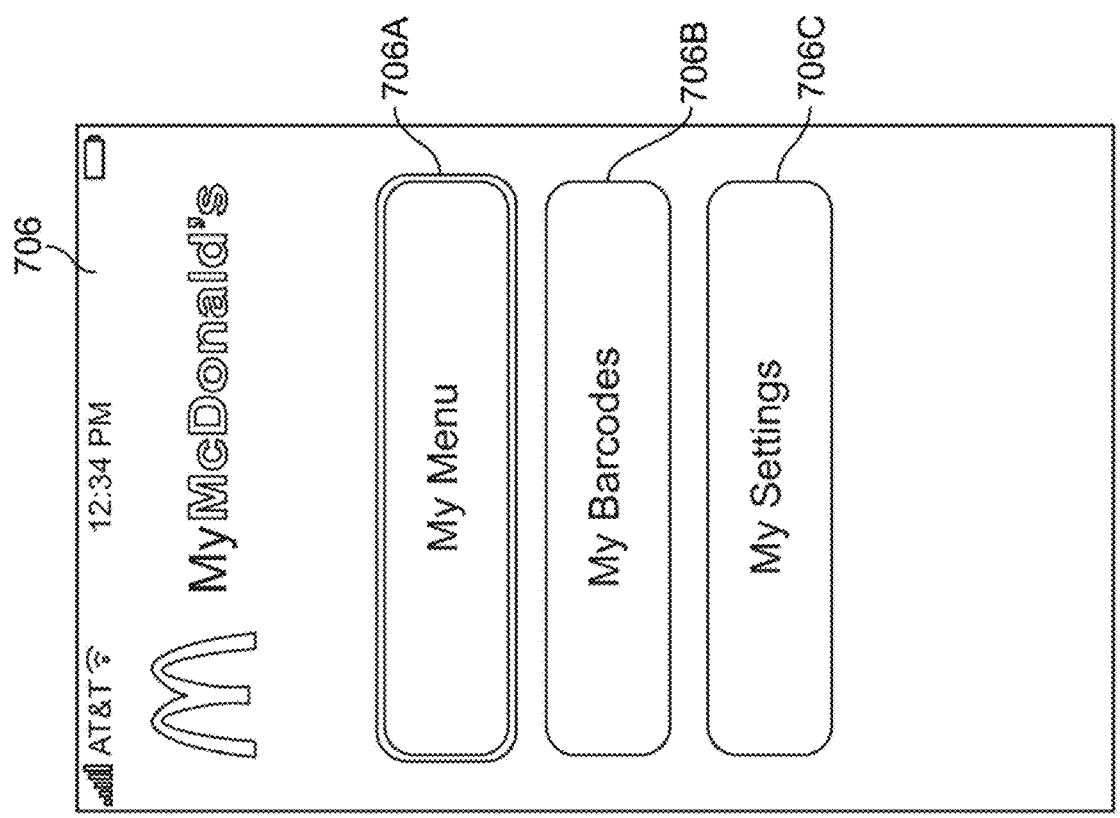
Figure 7B:
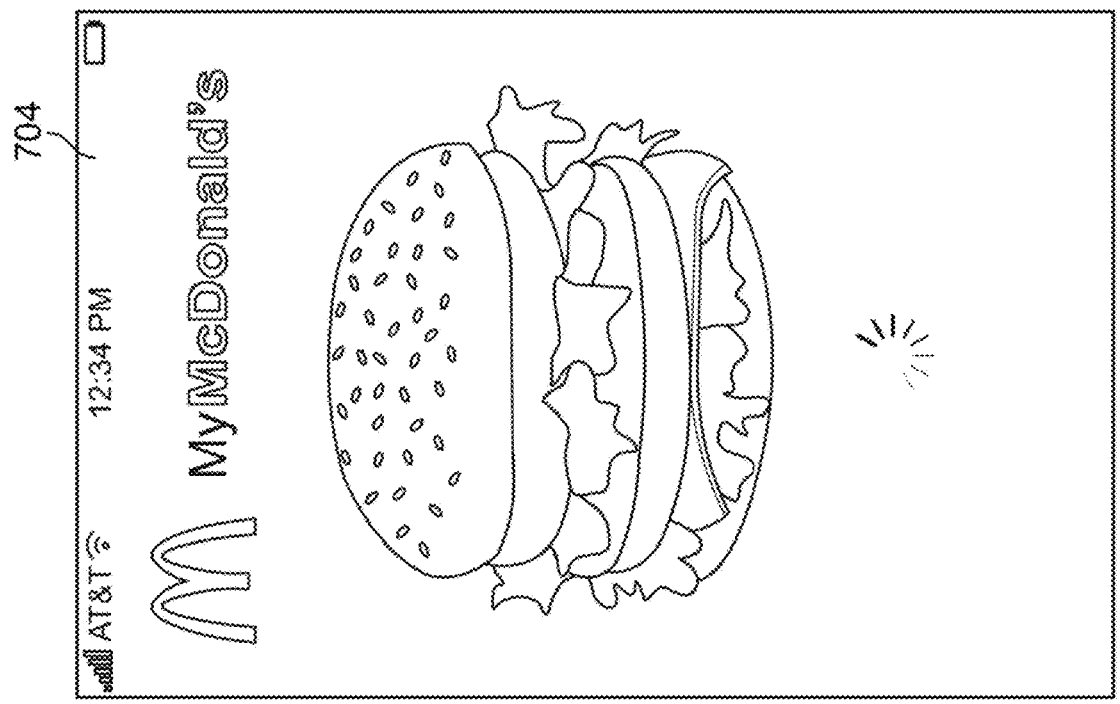
Figure 8:
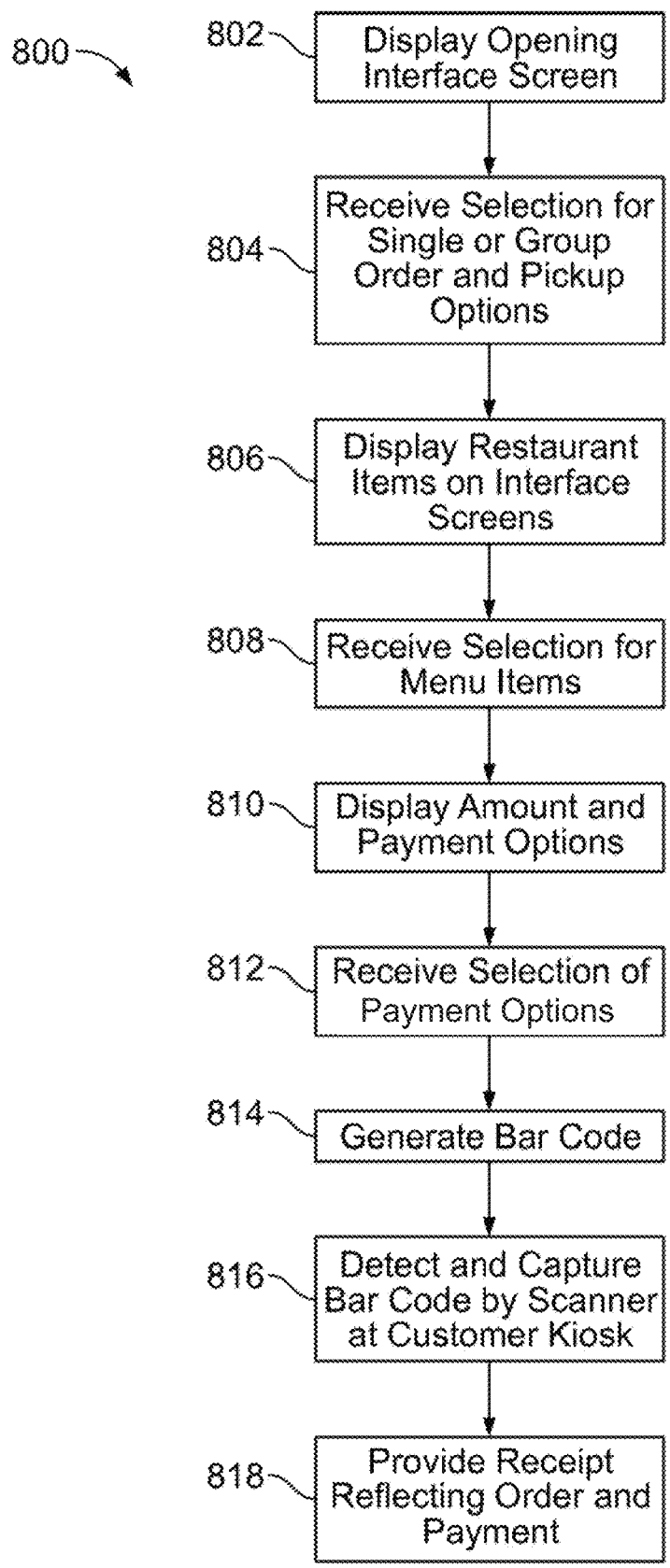
FIG. 8 is a flowchart illustrating an embodiment for generating a restaurant order and on a wireless mobile personal computer in accordance with the invention.

Now referring to FIGS. 7A-7C, upon receipt of the customer selection of either the group order for pickup at Drive-Through selector 702C or the group order for pickup in-store selector 702D of interface screen 702, the customer order generating application 318 is configured to generate and display the interface screen 704 followed by the interface screen 706 shown in FIGS. 7B and 7C, respectively. The interface screen 706 allows for a customer to select a My Menu selector 706A, a My Barcodes selector 706B or a My Settings selector 706C. Upon receipt of the My Menu selector 706A selection, the customer order generating application 318 can be configured to generate and display the interface screen 708 shown in FIG. 7D, which allows the customer to select a specific restaurant location at which the customer would like to place and pickup the order. The interface 708 provides a choice between a "Saved Location" selector 708A and a "Nearest Location" selector 708B. When the "Saved Location" selector 708A has been selected, one or more maps showing restaurant locations, previously saved in the memory 212, are displayed along with their respective addresses. When the "Nearest Location" selector 708B has been selected, which selection is then received by the order generating application 318, similarly one or more maps showing restaurant locations will be generated and transmitted for display based on a zip code entered by the customer or on a global positioning system (GPS) application that determines the closest restaurant locations relatively to the location of the wireless mobile personal computer 102. Once a desired or specific location is chosen by selecting one of the "button" selector 708C or 708D associated with one of the displayed maps, and selecting the "Select This Location" selector 708E, the customer order generating application 318 can be configured, upon receipt of the selection, to generate and display the interface screen 710 shown in FIG. 7E, or other order entry interface screens, that allows the customer to select restaurant items as parts of the order being generated. In addition, as generally shown in interface screen 710 and discussed above, the customer can be provided with options to select and store his/her favorite menu items and favorite orders, which can then be used to select in an expedited manner for future ordering. As shown, the interface screen 710 allows the customer to select and edit their favorite orders by selecting the "Edit My Fav" selector 710A, and add it to the order by selecting the "Add to Order" selector 710B.

Figure 7F:
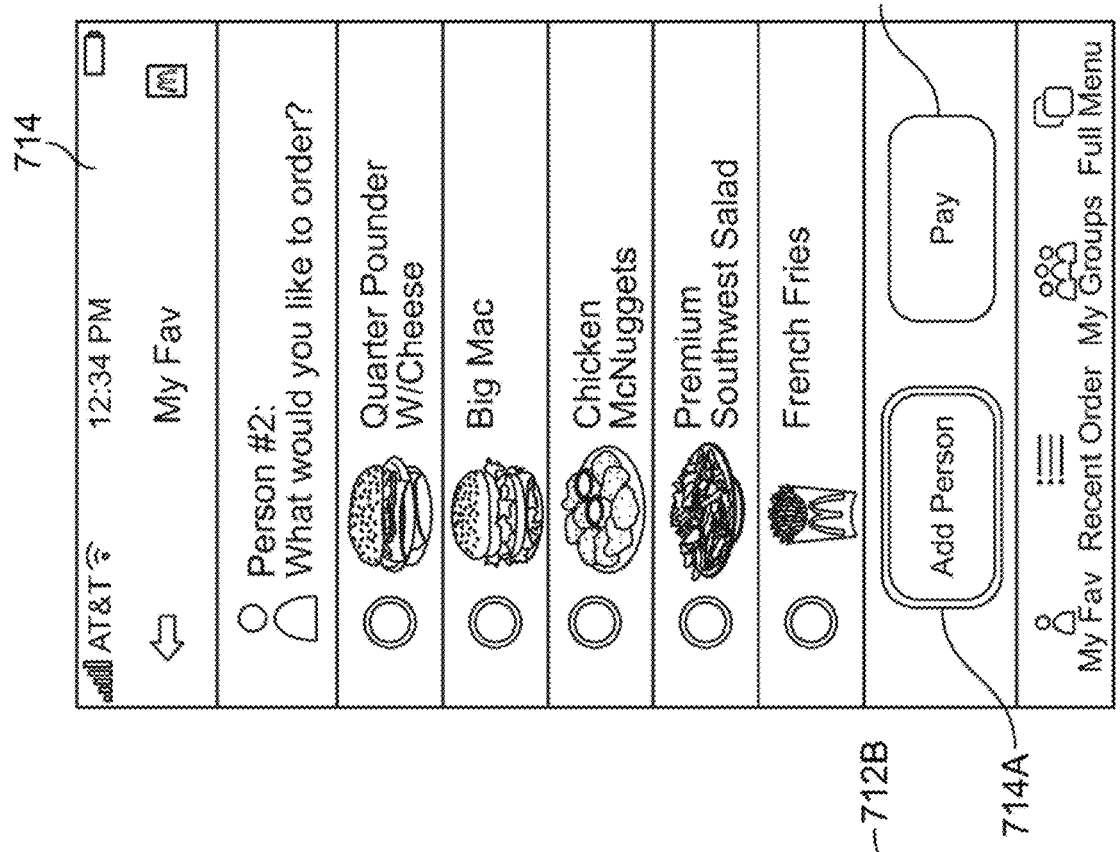
Figure 7G:
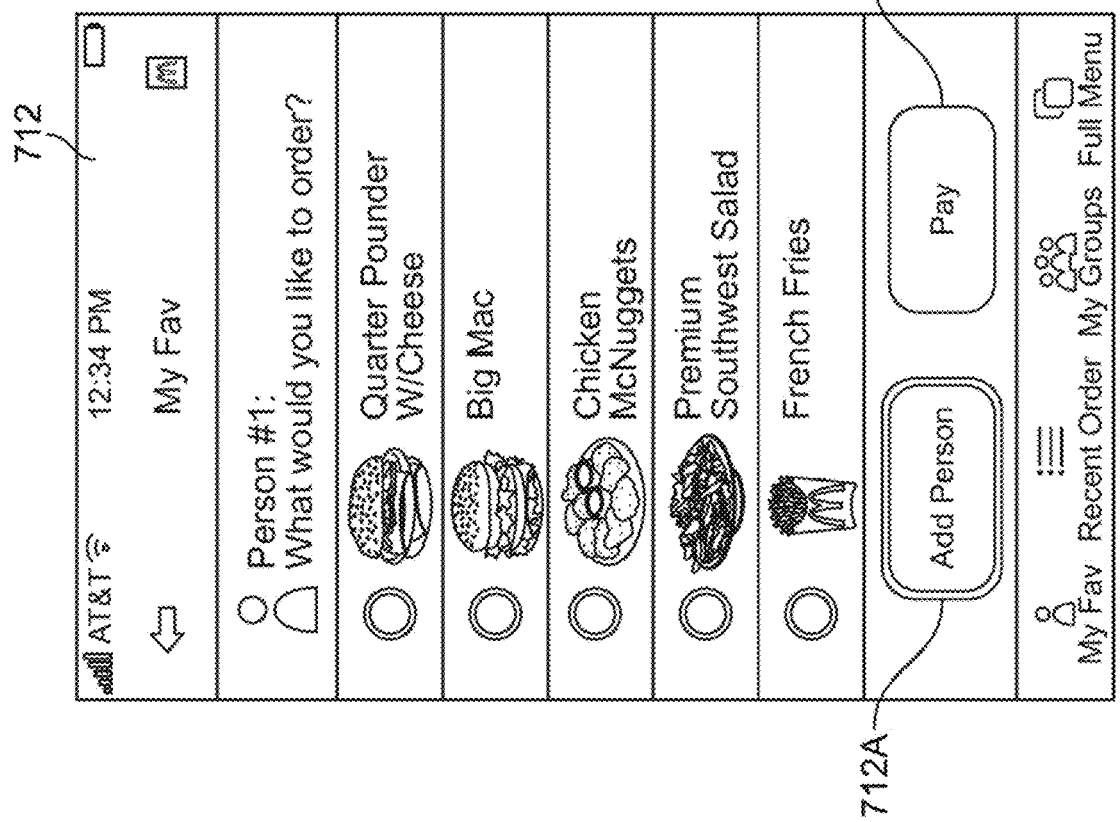

FIG. 7F shows a further customer ordering interface screen 712, generated and transmitted by the order generating application 318 for display after receiving the customer selection of the "Add to Order" selector 710B. The interface screen 712 is provided to allow the customer to select restaurant items for a first person of the group. The interface screen 712 also provides the customer an option to add another person to the order by selecting the "Add Person" selector 712A, or an option to pay by selecting the "Pay" selector 712B. Once the "Add Person" selection in made within the interface screen 712 of FIG. 7F and received by the order generating application 318, an interface screen 714 as shown in FIG. 7G, is generated and transmitted for display to enable the customer to select menu items for a second person of the group. The interface screen 714 also provides the customer an option to add another person to the order by selecting the "Add Person" selector 714A, or an option to pay by selecting the "Pay" selector 714B. Upon receipt of the "Add Person" selection within the interface screen 714 of FIG. 7G, the order generating application 318 is configured to generate, transmit and display interface screen 716 shown in FIG. 7H, which allows the customer to select menu items for a third person of the group. The interface screen 716 also provides the customer an option to add another person to the order by selecting the "Add Person" selector 716A, or an option to pay by selecting the "Pay" selector 716B.

Figure 7K:
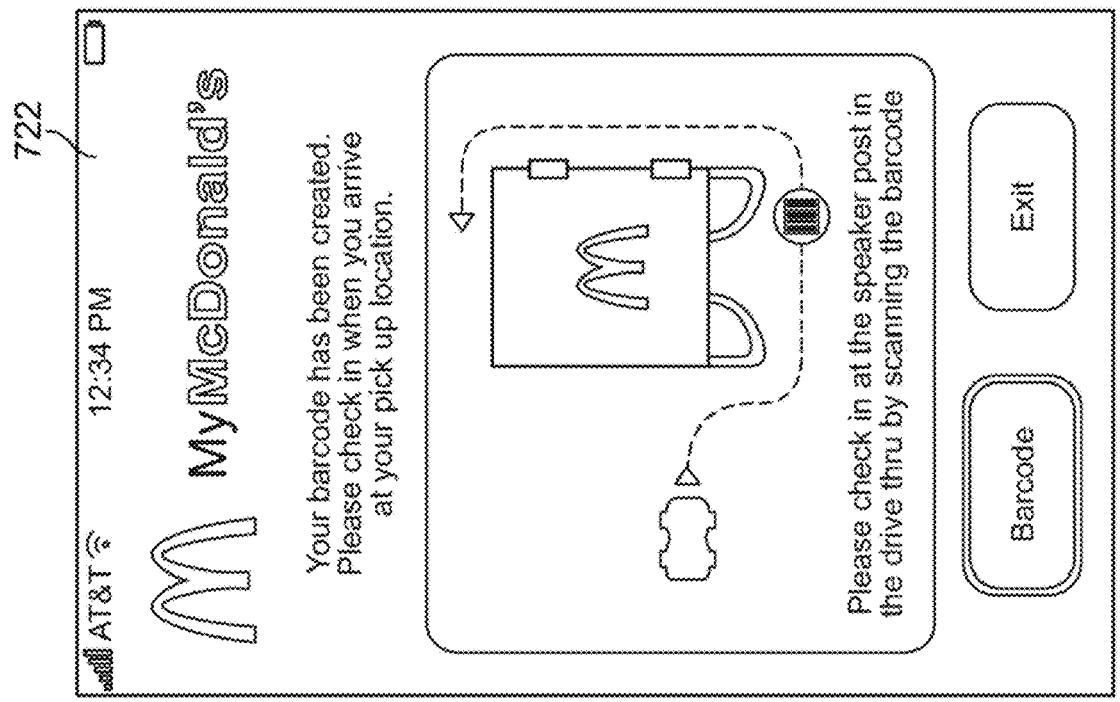
Figure 7J:
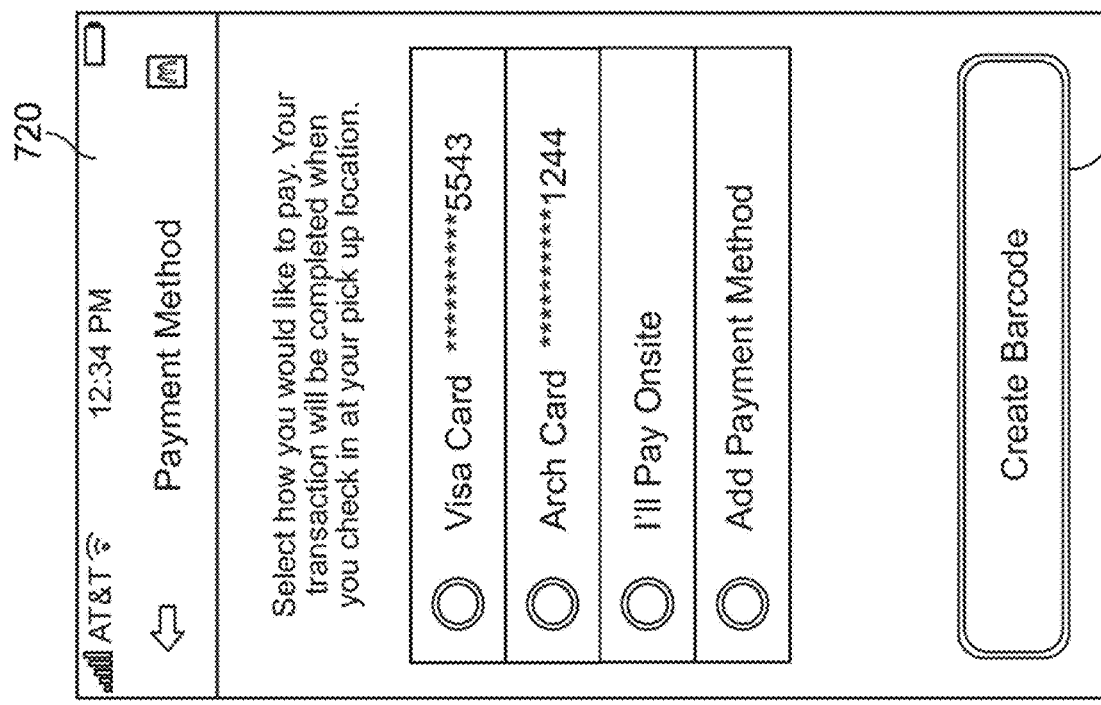
Figure 7M:
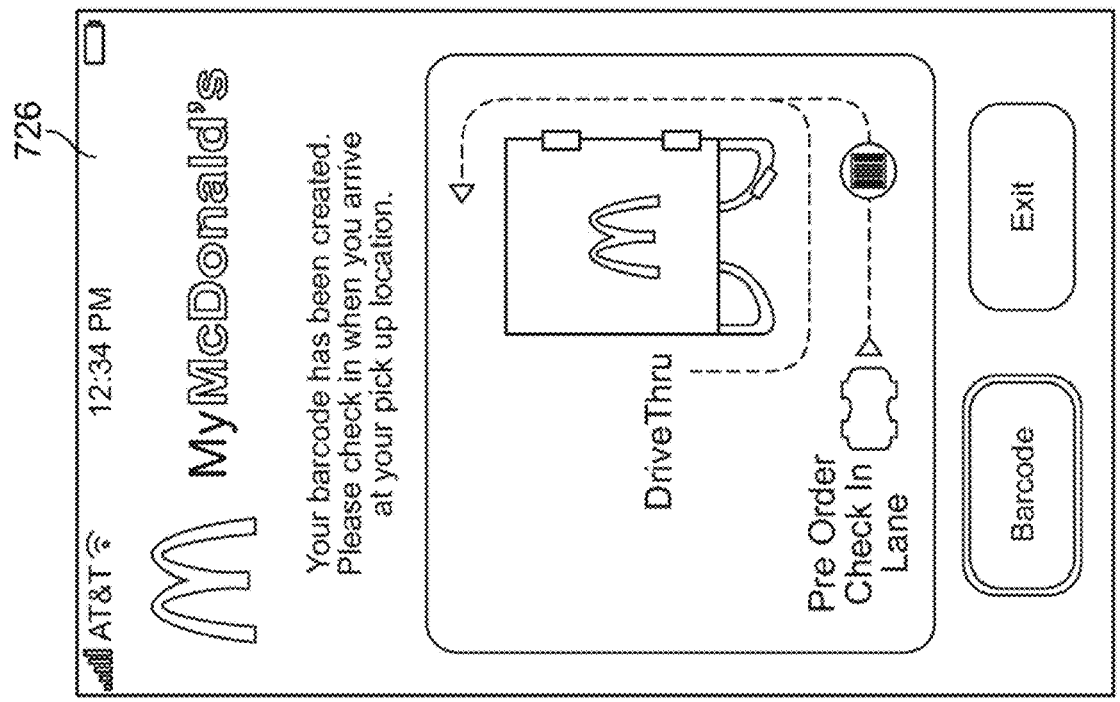

Referring to FIG. 7I, in response to the customer selection of the "Pay" option from any one of the interface screens of FIG. 7F, 7G or 7H, a further interface screen 718, shown in FIG. 7J, is generated, transmitted and displayed by the order generating application 318 to provide a summary of the group order and total price for the order, and also allows the customer to select the "Save Group" selector 718A and store the group order, and to select the "Pay" selector 718B to pay for the group order. If the "Pay" selector 718B has been selected, in response to the selection the customer order generating application 318 can be configured to generate and display interface screen 720 shown in FIG. 7J, which provides various options for payment, such as by credit card, by a vendor or loyalty payment card, such as an Arch Card for McDonald's, and pay on site at the restaurant selected in interface screen 708. Additionally, the customer order generating application 318 can be configured to offer the customer to add another payment option by selecting the "Add Payment Method" button. Once the payment option has been selected, the customer can select the "Create BarCode" selector 720A. The barcode selection is then received by the barcode generating application 320, which is configured to generate a barcode representative of the generated order, which includes the group menu items and a payment option selected.

Figure 7L:
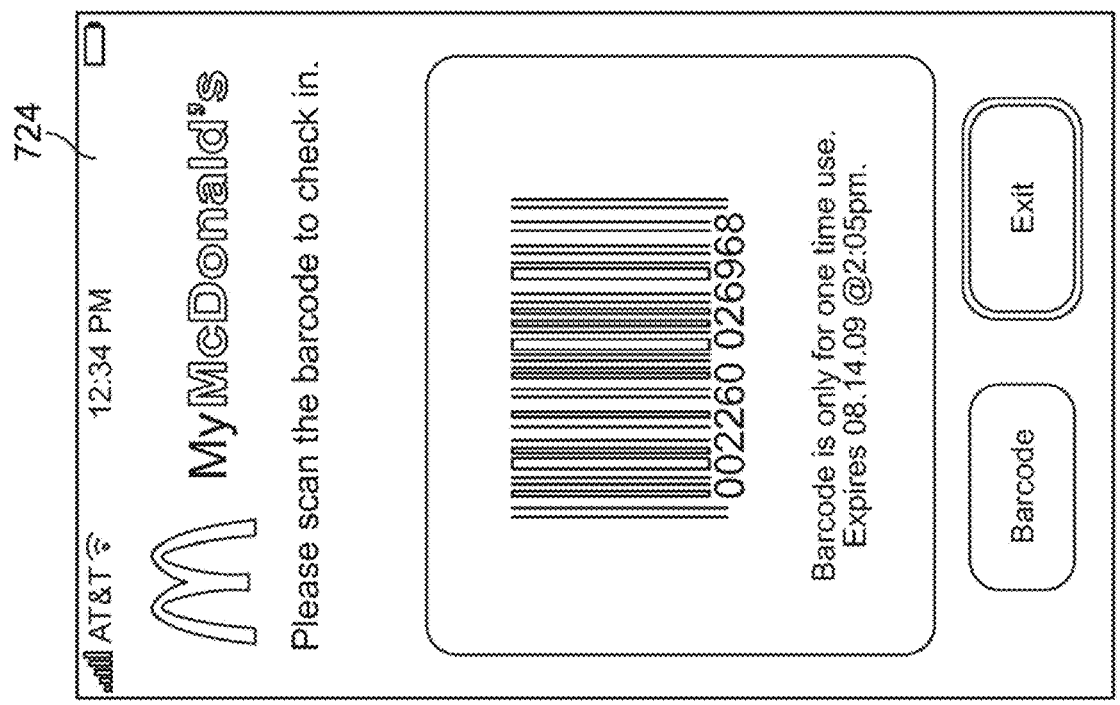

Referring to FIGS. 7K and 7L, in response to the creation of the barcode, the customer order generating application 318 is configured to generate, transmit and display interface screens 722 and 726 which include directions on where to present the created barcode and pick up the generated order. Each of interface screens 722 and 726 includes a map on how to move through a "speaker-post" kiosk (in-store pickup or hand delivery to the customer's car) and on how to check-in using the drive-through, as shown on FIGS. 6H and 6I, respectively. The interface screens 722 and 726 can also provide a selectable option to display the created barcode to use when the customer arrives at the restaurant location, specifically at a customer kiosk of the restaurant location. Upon receipt of the barcode option selection, the customer order generating application 318 can be configured to generate, transmit and display the interface screens 724 and 728 shown in FIGS. 7L and 7N, respectively, which display the created barcode. When the customer arrives at the restaurant, the barcode scanner 410, which can be within the customer kiosk, hand-held and used by a food runner/presenter, or within some other device, such as a "speaker post," is provided for scanning and capturing the barcode displayed on the interface screens 724 and 728. Once at or presented with the scanner 410, the customer can position the barcode displayed on the display of the wireless mobile personal computer 102 to be read and captured by the scanner 410. After capturing the displayed barcode, the scanning and capturing application 412 is configured to decode the barcode to figure out what items have selected by the customer and encoded by the barcode generating application 320, as well as the payment information if one was selected and included in the barcode. The decoded barcode is then communicated to the customer order processing application 414 which processes the order, communicates the items ordered to the local kitchen for preparation, and processes the payment method selected by the customer. If an epayment has been selected, the customer order processing application 414 is configured to process electronically the payment and inform the cashier or runner that the payment has been provided. The prepared order is then provided to the customer through the drive-through window, the walk-up counter, or delivered to the customer waiting in the parking lot. If the "I'll Pay Onsite" option is selected from within the payment interface screen 720 during the order generating process, the customer must also provide payment on-site (drive-through, walk-up, or with a food runner having a payment receiving device, such as a hand-held credit card scanner) prior to receiving the prepared order.

Figure 7Q:
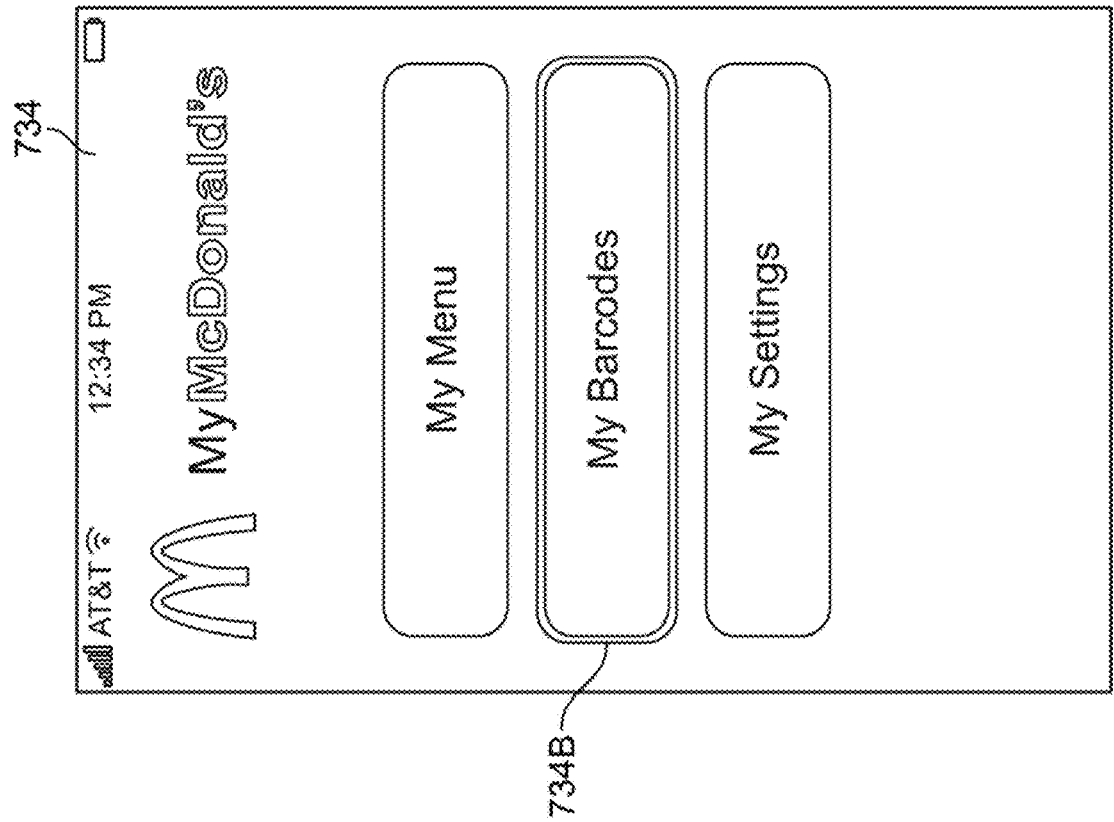
Figure 7P:
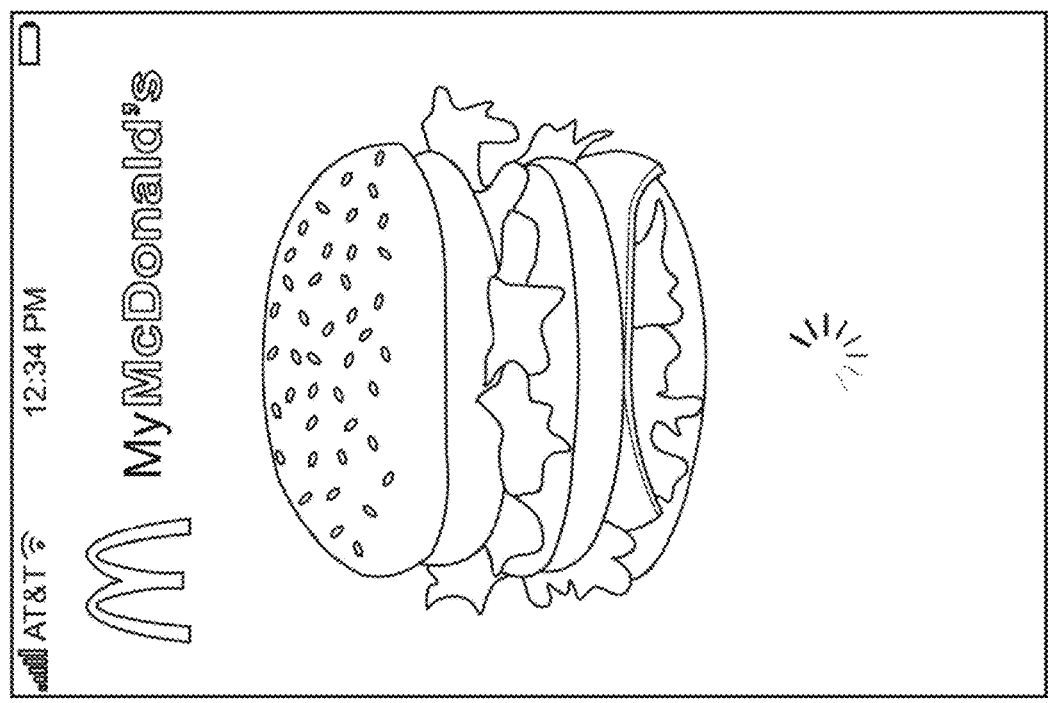
Figure 7S:
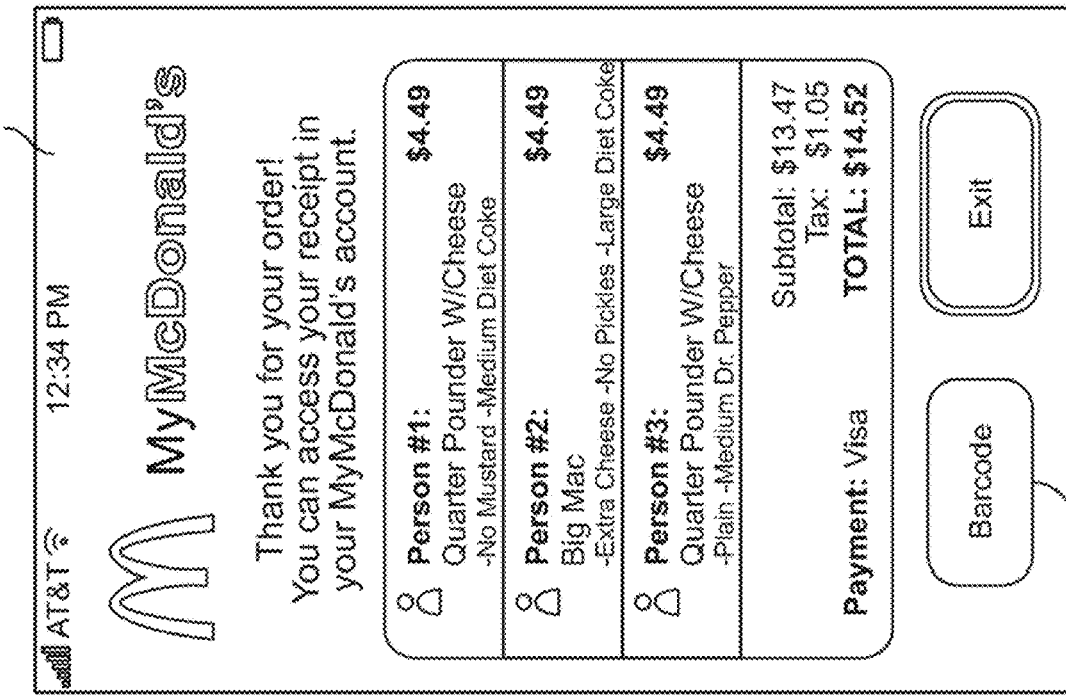
Figure 7R:

Similarly to FIGS. 6K-6O, referring to FIGS. 7O to 7S, the customer order generating application 318 generates and transmits for display interface screens 622-630 which allow for the customer to recall barcodes which have been placed, so that the wireless mobile personal computer 102 can be used for other functions prior to arrival at the restaurant location. As shown in FIG. 7Q, the provided interface screen 734 allows the customer to select "My Barcodes" selector 734B in order to show orders that have been placed for the respective ordering methods shown in interface screen 730 of FIG. 7O, namely single order for pickup at Drive-Through (DT) 730A, single order for pickup in-store 730B, group order for pickup at Drive-Through (DT) 730C, and group order for pickup in-store 730D. After receipt of ordering method selection, the interface 736, generated and transmitted for display by the order generating application 318, will include the corresponding barcode, as shown in FIG. 7R. The interface screen 736 also provides the customer with the option of re-displaying the items ordered within a receipt 738A in interface screen 738 by selecting the "Receipt" selector 736A. Following the selection of the "Receipt" selector 736A, the customer order generating application 318 is configured to generate and display the interface screen 738, shown in FIG. 7S, which also provides the total amount paid for the generated group order, the payment option used to pay for the group order, as well as a statement that the receipt can be accessed in the customer account.

As suggested above, as additional alternatives, both single and group orders could also be placed for pickup at a curbside kiosk which is equipped with scanner 410 which scans the barcode and include information about the selected payment method, such as epayment or pay onsite. A food runner would then provide the order to the customer at curbside when the order is ready. The Drive-Thru Check-In is configured to fit into existing drive-thru flows without interrupting the existing customer experience or store operations. Check-In can occur at existing order "speaker posts." A second, dedicated Scanning Station kiosk can also be provided, when needed for any particular restaurant. All payment types (cash, cards, and epayments) could be accepted at each location. As mentioned above, "EPayment" is defined as either a credit card, debit card, or Arch Card number stored using the pre-established the user's McDonald's account. EPayment through the wireless mobile personal computer 102 allows the customer to skip the pay window/station.

When a customer does Inside Check-In, there are two options available. The first inside Check-In option is going to a Scanning Station kiosk, which includes a scanner 410, next to a register (not shown). As discussed above, after the barcode is scanned, the order proceeds as a regular order does, with the crewmember (cashier/runner/presenter) confirming the order, processing payment, and directing the customer to pick up their order at the presentment counter. Cash, cards and ePayment can all be accepted. Alternatively, the wireless mobile personal computer 102 can display this information and act as a pager to notify the customer when their order is ready. The customer then proceeds to pick up his or her order from the presentment counter. The second Inside Check-In opinion is a Scanning Station kiosk, which also includes a scanner 410, located on the customer's path from the entrance to the presentment counter (i.e., near the entrance or at the presentment counter) (i.e., near the entrance or at the present counter). ePayment is required to use this station. When the customer scans the generated barcode at this station, audible or visual confirmation is given that Check-In was received. The Station prints a receipt that includes the customer's order, payment confirmation, and order number. Again, as an alternative, the wireless mobile personal computer 102 can display this information and act as a pager to notify the customer when the order is ready. The customer then proceeds to pick-up the order from the presentment counter.

It should be noted that one form that one form of the barcode scanner 410 and/or barcode generating application 320 can be "2D code generators for i-mode" provided by NTT DOCOMO, Inc., a subsidiary of NTT Japan. In an RFID embodiment, it should be understood that scanning may take place as soon as the RFID tag is within a predetermined distance from the RFID scanner. When a scan occurs, the scanning station can be configured to automatically place an order or place the order after payment information is received and/or the customer confirms the order.

Any process descriptions or blocks in figures, such as FIGS. 5, 6A-6O, 7A-7S and 8, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 9:
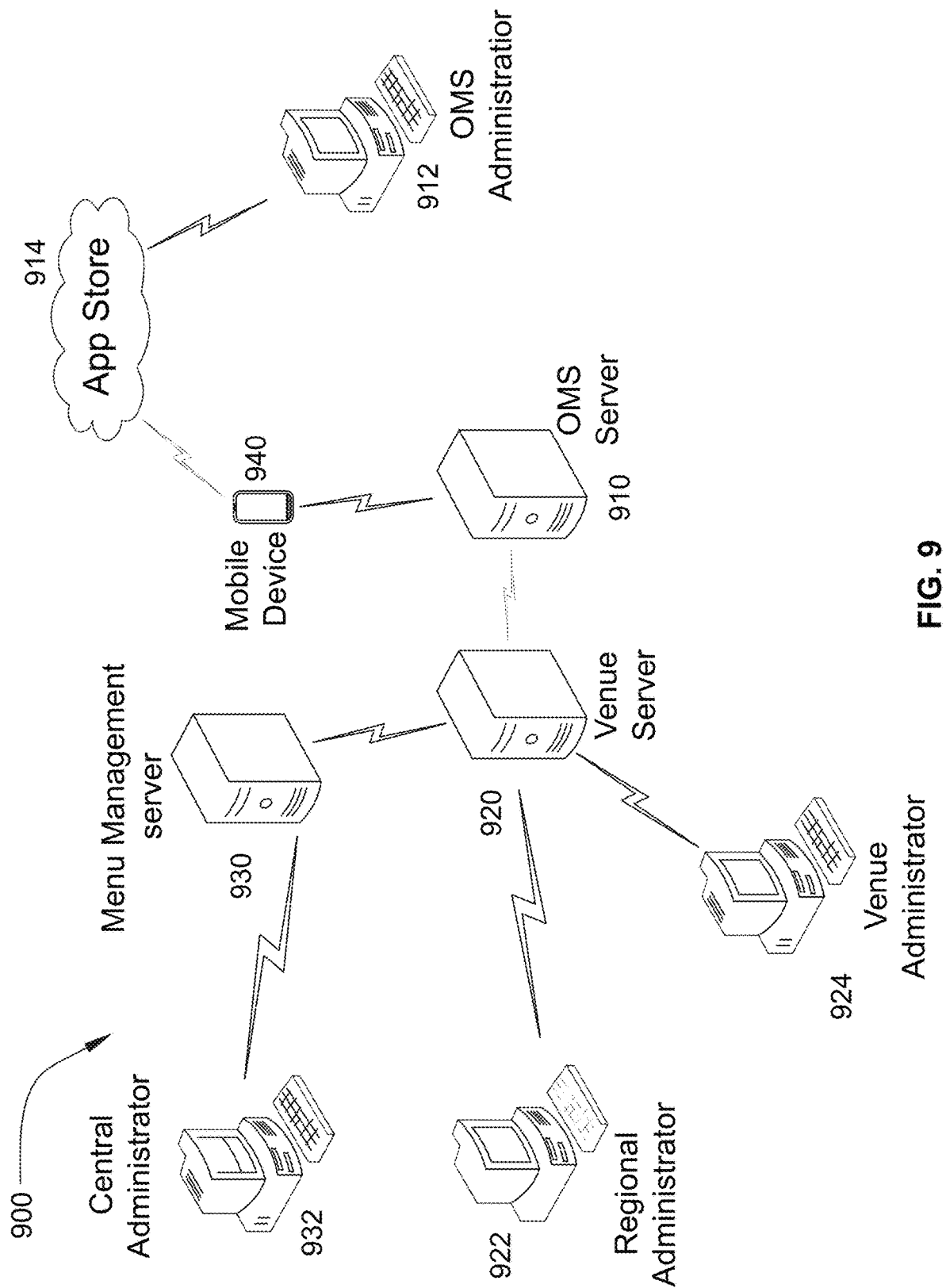
FIG. 9 is a system diagram illustrating an embodiment of a computer-networked order management system in accordance with the invention.

Referring to FIG. 9, a system diagram illustrates an embodiment of a computer networked order management system 900 in accordance with an illustrated embodiment of the present invention. The term "order management system"

may be abbreviated as "OMS" in this description. As depicted, the OMS 900 comprises a variety of networked servers, including OMS server 910, venue server 920, and menu management server 930. These servers may be of various known constructions, such as, for example, an IBM System x3650 M3 rack server. The actual server size and capability will vary depending on the size of the implemented embodiment of the OMS. Typically, there will be only one OMS server 910 and one menu management server 930 within the OMS. In some embodiments, these servers may be combined into one. Alternatively, there will typically be a venue server 920 associated with each venue location (facility) that accepts orders via the OMS. These individual venue servers 920 see much less traffic than the centralized OMS server 910 and menu management server 930, and, accordingly, may be scaled down in size and functionality as appropriate. Though FIG. 9 illustrates a single venue server 920, it will be understood that a large number (even many thousands) of such venue servers 920, each at different venues, may be associated with a single OMS.

Also illustrated in FIG. 9 are a number of administrator computers for use in accessing back-end programming on the respective servers, such as central administrator computer 932, regional administrator computer 922, venue administrator computer 924, and OMS administrator computer 912. As will be seen, these desktop computers are used by system operators to update information on the various system servers. Each administrator computer is capable of accessing its respective server through known means such as the Internet, or a dedicated connection. Administrator computers may be desktops, laptops, or other personal computers of standard size and variety, such as a Dell Inspiron 660.

FIG. 9 also depicts a mobile user device 940, which may be any standard available smart phone, such as an Apple iPhone 5, or other mobile transceiver devices as discussed below. As with the venue server 920, it will be understood that the OMS 900 can incorporate many mobile user devices 940 (even millions) despite only one being shown. Collectively, all of the servers, desktops, and smart phones are understood to be general purpose computers; however, each is equipped with special applications or software to perform its function as a component of the OMS 900, thus converting them to special purpose machines. For example, to operate within the system, a mobile user device 940 must obtain special OMS application software, such as from the internet application store 914 as shown in FIG. 9. Here, the OMS administrator computer 912 makes the OMS application software component 1118 available in the application store ("app store") 914, and updates the software available for download when changes are necessary. The OMS application software component 1118 could also be made available to a mobile user device 940 in other ways, such as by download from an internet website, by infrared scan from another computing device or memory, or by other known means.

The connectors of FIG. 9 illustrate how information flows between the various hardware devices that make up the OMS 900 according to the illustrated embodiment. For example, while in some embodiments a mobile user device 940 may exchange data directly with a venue server 920, it is preferred that traffic between any two such components be routed through the OMS server 910. This allows for a common user interface at the OMS server 910 for handling all OMS traffic from mobile user devices 940, prevents unnecessary traffic from encumbering venue servers 920, and enhances overall data security to backend systems such as menu management server 930. More will be explained as to the interaction between these various system components in association with FIG. 16 and other figures below.

For transmitting information and data, the OMS 900 utilizes both a wired data network 108 and a wireless data network 106. The wired data network 108 can be part of a global network, a wide area network or a local area network. The wireless data network 106, which can couple to the wired data network 108, can include one of more wireless data networks, such as cellular networks, WiFi networks, Bluetooth networks, etc. The OMS server 110, the venue servers 920, and the menu management server 930 are coupled to the wired data network 108. At least the OMS server 910 can also couple to the wireless data network 106. The mobile user devices 940 can couple to the wireless data network 106 through which they can access the OMS server 910. The wired data network 108 and the wireless data network 106 pertain to some portions of the World Wide Web (WWW, hereafter referred to as Web) and the Internet. Though not always specified in such terms herein, it will be understood that when one system element is said to "communicate," "transfer," "send" (or the like) something to another system element, it is, in fact, data indicative of that thing that is being transferred, such as, for example, menu data (indicative of elements of a menu) or order data (indicative of elements of an order).

Figure 10:
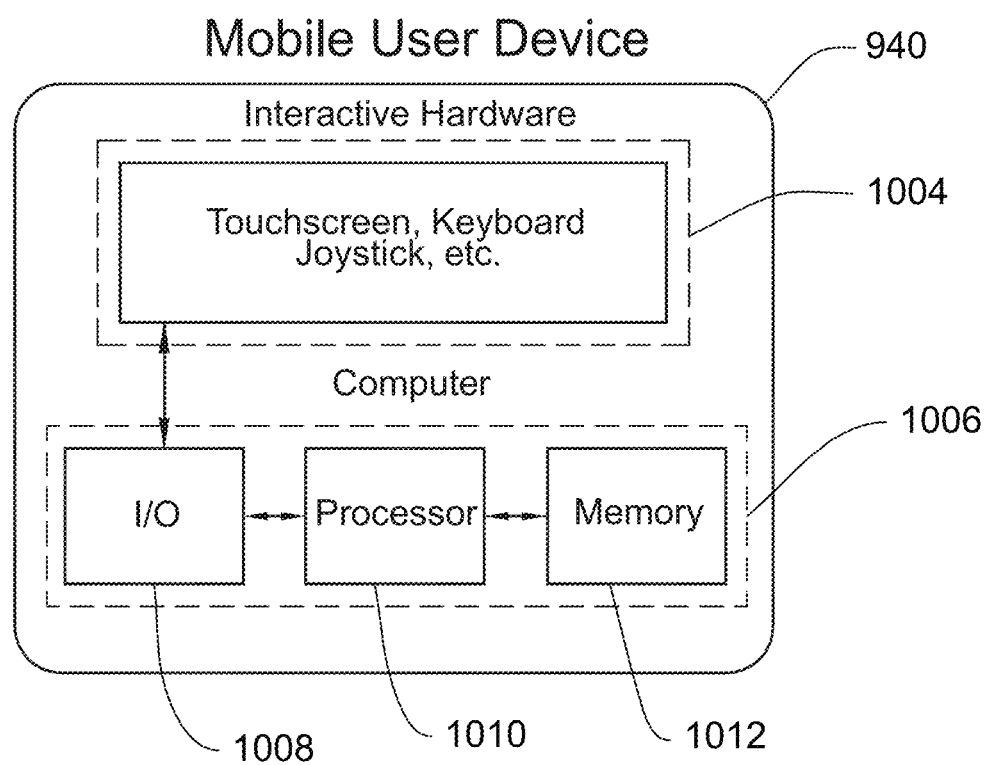
FIG. 10 is a schematic diagram of certain aspects of a mobile user device.

Now referring to FIG. 10, a schematic diagram of certain aspects of a mobile user device 940 is provided. The illustrated mobile user device 940 is, for example, a handheld digital device, such as a personal digital assistant (PDA), a cellular phone, a smart phone such as an iPhone or Android device, a tablet, or any other handheld electronic device having a display screen and two-way remote communication capability. The mobile user device 940 includes an interactive hardware portion 1004 and a computer portion 1006. The interactive hardware portion 1004 can include one or more of a touch screen, a keyboard, a stylus, a joystick, and the like, which can be arranged in various manners and have different shapes without changing the spirit of the interaction of the hardware portion 1004 with the computer portion 1006. The touch screen can be a liquid display crystal (LCD), display screen, a plasma screen, a light emitting diode (LED), or any other screen capable of displaying text and images. The computer portion 1006 includes an input/output (I/O) portion 1008, a central processing unit (CPU) portion 1010 (i.e., a microprocessor), and a memory 1012.

The CPU portion 1010 can be any computer-processing unit from a singular microchip to extensive microchip configurations. The memory portion 1012 can include, without limitation, any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory portion 1012 may incorporate electronic, magnetic, optical, and/or other types of storage media, and can have a distributed architecture where various components are situated remote from one another, but are still accessed by CPU portion 1010. The interactive hardware portion 1004 is coupled to the I/O portion 1008 such that a command entered by a user or customer through the interactive hardware portion 1004 will be forwarded to the I/O portion 1008, to the processor portion 1010 and then to memory portion 1012.

Figure 11:
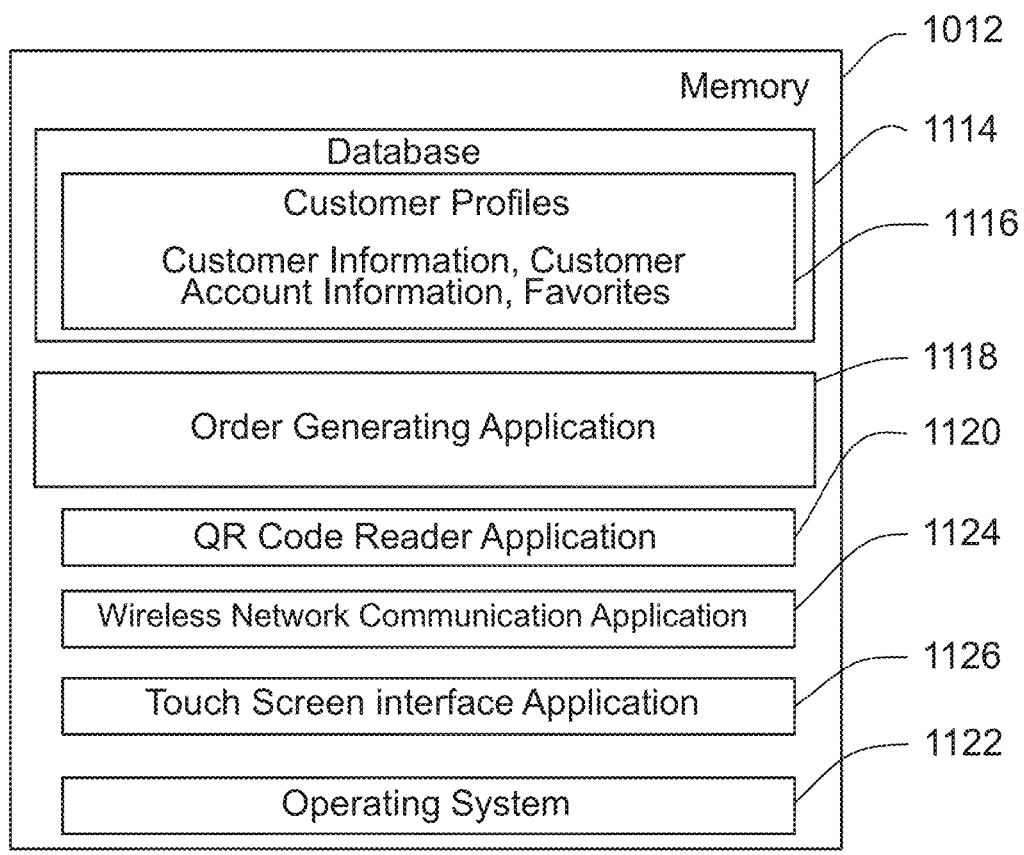
FIG. 11 is a schematic diagram of a memory portion of the mobile user device of FIG. 10.

As illustrated in FIG. 11, a schematic diagram of the memory portion 1012 of FIG. 10 is shown. The memory portion 1012 can include or store a database 1114, executable programs 1118, 1120, 1126, and 1124, and an operating system 1122. The database 1114 can store data related to prior use of the OMS system 900 by a user, such as, for example, the user's username, password, order history, favorite restaurant locations, or other data as discussed below. In other embodiments, this data may be stored at the OMS server or at a third server not associated specifically with the OMS 900 (e.g., in the cloud). The executable programs include an OMS application component 1118 for use in generating restaurant orders, a verification data reader application 1120, a touch screen interface application 1126, and a wireless network communication software application 1124 such as a common browser like Internet Explorer. Verification data reader application 1120 may be a sub-code segment or part of the OMS application component 1118, or may be a separate, callable application residing independently in memory 1012.

The executable programs 1118 can be implemented in software, firmware, hardware, or a combination thereof. An example of a suitable commercially available operating system 1122 is an appliance-based operating system, such as that implemented in handheld computers or personal digital assistants (PDAs) (e.g., PalmOS available from Palm Computing, Inc., iPhone/iPod OS available from Apple, and Windows CE available from Microsoft Corporation). The operating system 1122 essentially controls the execution of other computer programs, such as the OMS application component 1118, and provides scheduling, input-output control, file and data management, memory management, and communication control and related services.

When the mobile user device 940 is in operation, the CPU portion 1010 is configured to execute software stored within the memory 1012 to communicate data to and from memory 1012 and to generally control operations of mobile user device 940 pursuant to the software. The OMS application component 1118 and the operating system 1122, in whole or in part but typically the latter, are read by the CPU portion 1010, perhaps buffered within the CPU portion 1010, and then executed. When the OMS application component 1118 is implemented in software, it can be stored on any computer readable medium for use by or in connection with any computer related system or method. The OMS application component 1118 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). In another embodiment, where the OMS application component 1118 is implemented in hardware, it can be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the memory and CPU descriptions above were described in reference to the mobile user device 940, it will be understood that the other hardware elements depicted in FIG. 9 will also have similar processors and memories that operate along similar parameters and in similar or identical ways. Each hardware memory will have some component of OMS application 1118 stored therein, though the components may not be (and typically will not be) identical, and may only be sufficient to allow interoperability with the other hardware elements in the OMS 900. Collectively, it will be understood that the OMS application 1118 is the software existing on the various hardware devices that is specially programmed and uniquely tailored to convert the general purpose computers 1200 to special purpose computers fit to operate within the OMS 900.

Figure 12:
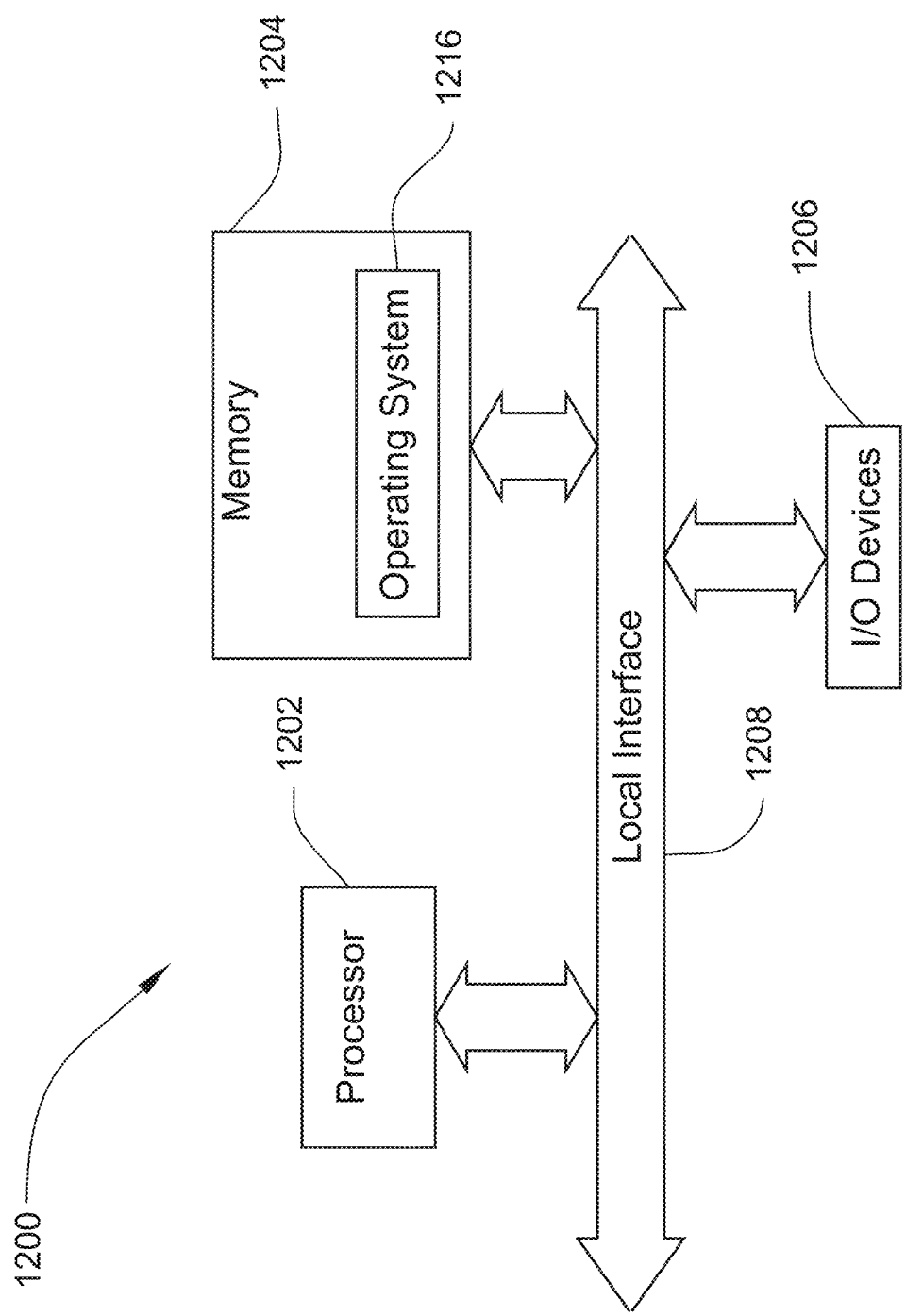
FIG. 12 is a block diagram of one form of a computing device, such as those of FIG. 9, having a memory element with a computer readable medium for implementing the activities proscribed by the order management system.

More specifically, each hardware element of FIG. 9 will have the basic elements set forth in FIG. 12. FIG. 12 is a block diagram that illustrates a general purpose computer 1200, which could be any of the hardware elements of FIG. 9. Generally, in terms of hardware architecture, the general purpose computer 1200 includes a processor 1202, a memory 1204, one or more input and/or output (I/O) devices 1206 (or peripherals) that are communicatively coupled via a local interface 1208. The local interface 1208 can be, for example, but not limited to, one or more buses or other wired or wireless connections, as is known in the art. The local interface 1208 may have additional elements, which are omitted for simplicity, such as controllers, buffers (caches), drivers, repeaters, and receivers, to enable communications. Further, the local interface 1208 may include address, control, and/or data connections to enable appropriate communications among the other computer components.

The processor 1202 is a hardware device for executing software, particularly software stored in memory 1204. The processor 1202 can be any custom made or commercially available processor, a central processing unit (CPU), an auxiliary processor among several processors associated with the general purpose computer 1200, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor 1202 may also represent a distributed processing architecture such as, but not limited to, SQL, Smalltalk, APL, KLisp, Snobol, Developer 200, MUMPS/Magic.

The memory 1204 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 1204 may incorporate electronic, magnetic, optical, and/or other types of storage media. Memory 1204 can have a distributed architecture where various components are situated remote from one another, but are still accessed by the processor 1202.

The software in memory 1204 may include one or more separate programs. The separate programs comprise ordered listings of executable instructions for implementing logical functions. In the example of FIG. 12, the software in memory 1204 includes a suitable operating system (O/S) 1216. A non-exhaustive list of examples of suitable commercially available operating systems 1216 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 416 essentially controls the execution of other computer programs stored in memory 404 and provides scheduling, input-output control, file and data management, memory management, and communication control and related services.

Applications stored in memory 1204 may be a source program, executable program (object code), script, or any other entity comprising a set of instructions to be performed. When a source program, the program needs to be translated via a compiler, assembler, interpreter, or the like, which may or may not be included within the memory 1204, so as to operate properly in connection with the O/S 1216. Furthermore, each application can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices 1206 may include input devices, for example but not limited to, credit card readers, input modules for PLCs, a keyboard, mouse, microphone, touch screens, interfaces for various devices, barcode readers, stylus, laser readers, radio-frequency readers, etc. Furthermore, the I/O devices 1206 may also include output devices, including, but not limited to, receipt dispensers, output modules for PLCs, a printer, barcode printers, displays such as touch screen displays, etc. Finally, the I/O devices 1206 may further include devices that communicate both inputs and outputs, for instance but not limited to, a modulator/demodulator (modem; for accessing another device, system, or network), a radio frequency (RF) or other transceiver, a telephonic interface, a bridge, and a router.

As discussed above, each mobile user device 940 may include a touch screen interface application 1126. In one embodiment, the touch screen interface application 1126 is provided for displaying a plurality of customer ordering interface screens of the present invention and receiving customer selections in response thereto, as will be described in greater detail below. In the embodiment shown in FIG. 10, the CPU portion 1010 of the mobile user device 940, at least in part, generates, launches, communicates, and/or implements the customer order generating interface screens for allowing and causing the touch screen interface application 1126 to display the customer order generating interface screens on the interactive hardware portion 1004 (for simplicity hereafter referred to as a touch screen display). As shown in FIGS. 10 and 11, the CPU portion 1010 can include in memory 1012 an OMS application component 1118 for launching, communicating, and/or implementing the customer order generating interface screens of the present invention.

The customer can view the customer order generating interface screens as displayed on the touch screen display 1004 by launching the OMS application component 1118, and the customer can utilize these customer order generating interface screens to select menu items, select a payment option, select a venue location, and other various actions in association with utilization of the OMS 900. In one embodiment, the presentation on the touch screen display 1004 is created and controlled by software, such as the OMS application component 1118 and information received from the CPU portion 1010.

Figure 13:
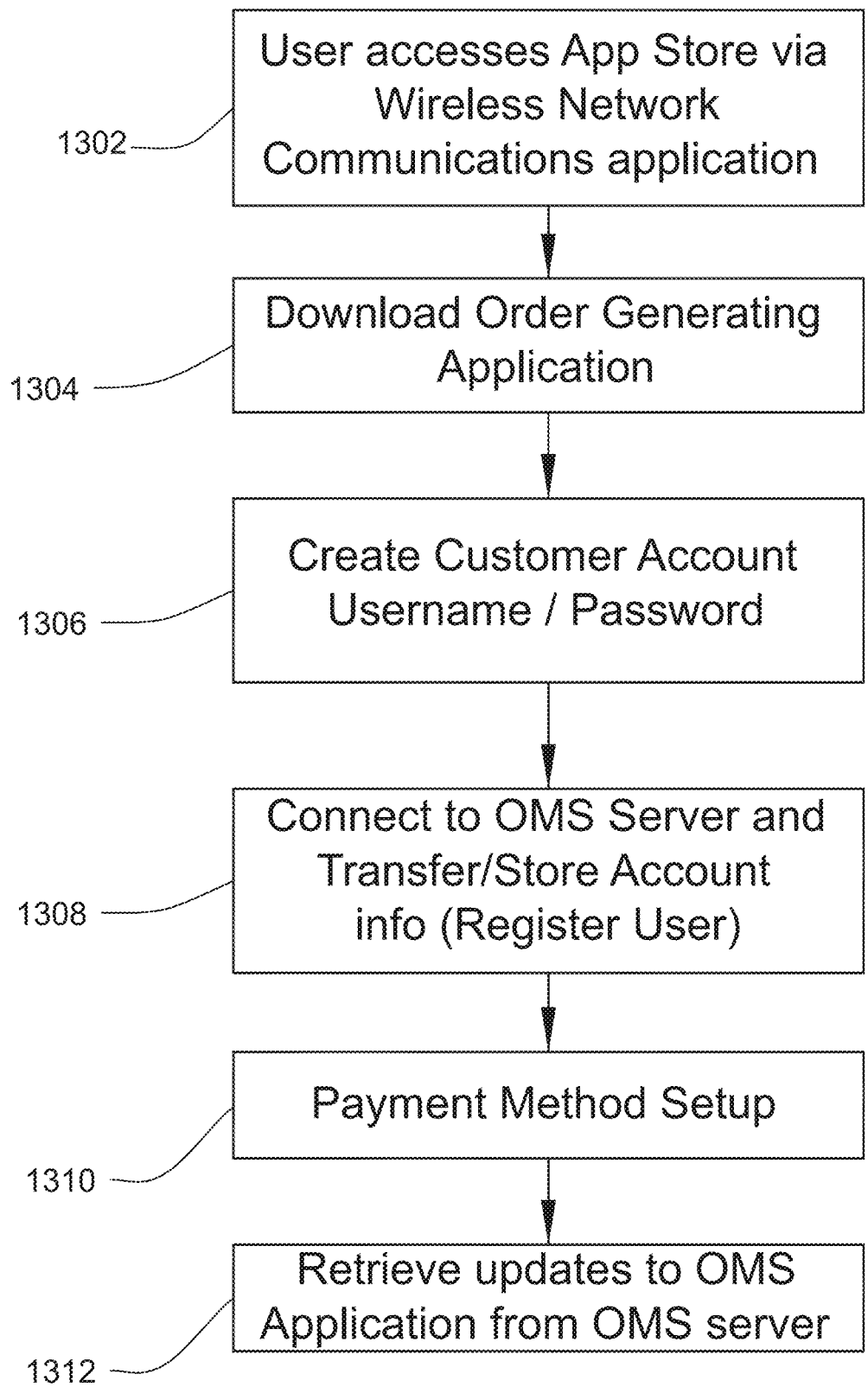
FIG. 13 is a flow chart illustrating an embodiment of a process for establishing a customer account in accordance with the invention.

Now referring to FIG. 13, a flow chart illustrating an embodiment of a process for establishing a customer account with a food vendor is provided. According to the illustrated embodiment, the customer (or "user") must establish an account with the food vendor in order to receive and store the OMS application component 1118 necessary to interface with the OMS 900 on their mobile user device 940. Though an account is not required in all embodiments, it is necessary to enable the OMS 900 to recognize the user, and, thereby, to provide certain tailored services, improve security, and allow the system to function at its full scope and intent.

The customer account is opened or set up as follows. To initiate the process, at step 1302, a user connects their mobile user device 940 to an application repository such as the app store 914 of FIG. 9 (which could be provided by Apple, Google or other content providers), locates the OMS application component 1118 (also referred to herein as the Easy Thru Application), and downloads the application component. Alternatively, the user could connect mobile user device 940 to a website where the application component 1118 could be directly downloaded and installed. Once the application component 1118 is downloaded at step 1304, the user launches the OMS application component 1118 on the mobile device 940 and is prompted by the application to create a customer account, at step 1306. This involves establishing a username and password that will be used by the OMS 900 to recognize the user. Typically the username will be in the form of an email, such that the OMS 900 has a means to communicate messages to the user when the user is not using the OMS application component 1118. In some embodiments, an additional account verification step (not shown) involves sending an email to the email account provided by the user as a username and requiring a response to verify that the user has access to and control of the email account, and that the email account is legitimate.

Figure 14:
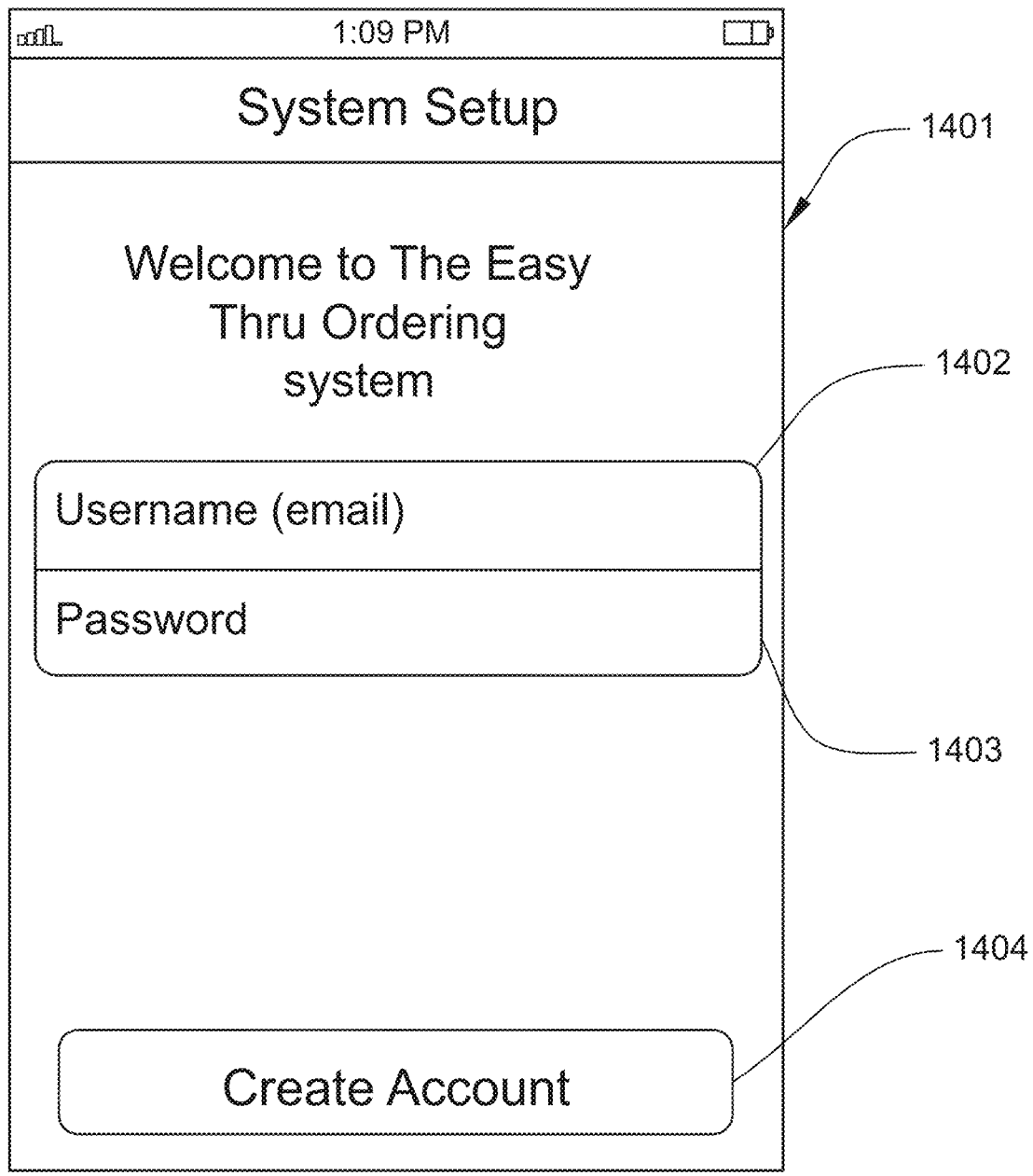
FIG. 14 illustrates an example of a system setup screen used by the order management system in accordance with a particular embodiment.

A system setup screen 1401 is illustrated, for example, in FIG. 14, and provides a first example of how the touch screen display 1004 of the user device 940 interacts with the user to obtain input and instructions. The user is prompted to enter a username (email) 1402 and password 1403, which may be stored in the memory associated with the mobile user device 940, but will also typically be stored in a memory (or a database connected to a memory) component of OMS Server 910, thus allowing the OMS Server 910 to recognize the user. In the preferred embodiment, the username and password are associated with the user, not necessarily with the user's mobile device 940. In the latter case, where the username and password are "remembered" by the mobile user device 940, the OMS server 910 would not necessarily be able to discern one user using the device 940 from another user using the same device. Thus, in the illustrated embodiment, the username and password is submitted to the OMS server 910 and stored on a remote database associated with the OMS server 910.

Once a username and password are entered, the user proceeds to select "create account" 1404 on the screen of FIG. 14. This action launches step 1308 of FIG. 13, which is to connect the mobile device 940 to the OMS server 910 for the first time. This connection is managed by the OMS application component 1118, but may harness separate connectivity software such as, for example, wireless network communication application 1124. Once connected, the application component 1118 transfers the newly generated username and password to the OMS server 910. It is as this time that the OMS server 910 would conduct a verification step, such as by sending a test email to the email address identified in the username 1402. The OMS server 910 executes a component of the OMS application 1118 to register the user in the OMS 900 and create an account for the user on the OMS server 910 (or its associated database).

This process may include asking a variety of user questions to populate the database. For example, as shown in step 1310 of FIG. 13 and illustrated in the link card screen 1411 of FIG. 15, the user might be prompted to provide method of payment. Linking a payment means (such as a credit card, debit card, stored value card, PayPal account, or other such account) to the OMS 900 allows for easy and quick order payment. If no method of payment is linked, the user will have to enter a means of payment each time an order is submitted or checked in. In some embodiments, orders may be submitted with a commitment to pay upon receipt. However, it is preferable that an order not be prepared prior to payment being received. It should also be noted that it is not necessary for a user's sensitive financial information to be stored on the OMS server 910, or any other component of OMS 900. Rather, the verification of a method of payment may be performed by a financial intermediary system (not shown) to authenticate the method of payment. Once that is complete, the OMS server 910 need only have enough information to identify the method of payment of choice and submit a request for payment. For example, the payment specifics could be maintained in encrypted form on the memory of the mobile device, and only a decryption key stored at the financial intermediary.

Figure 15:
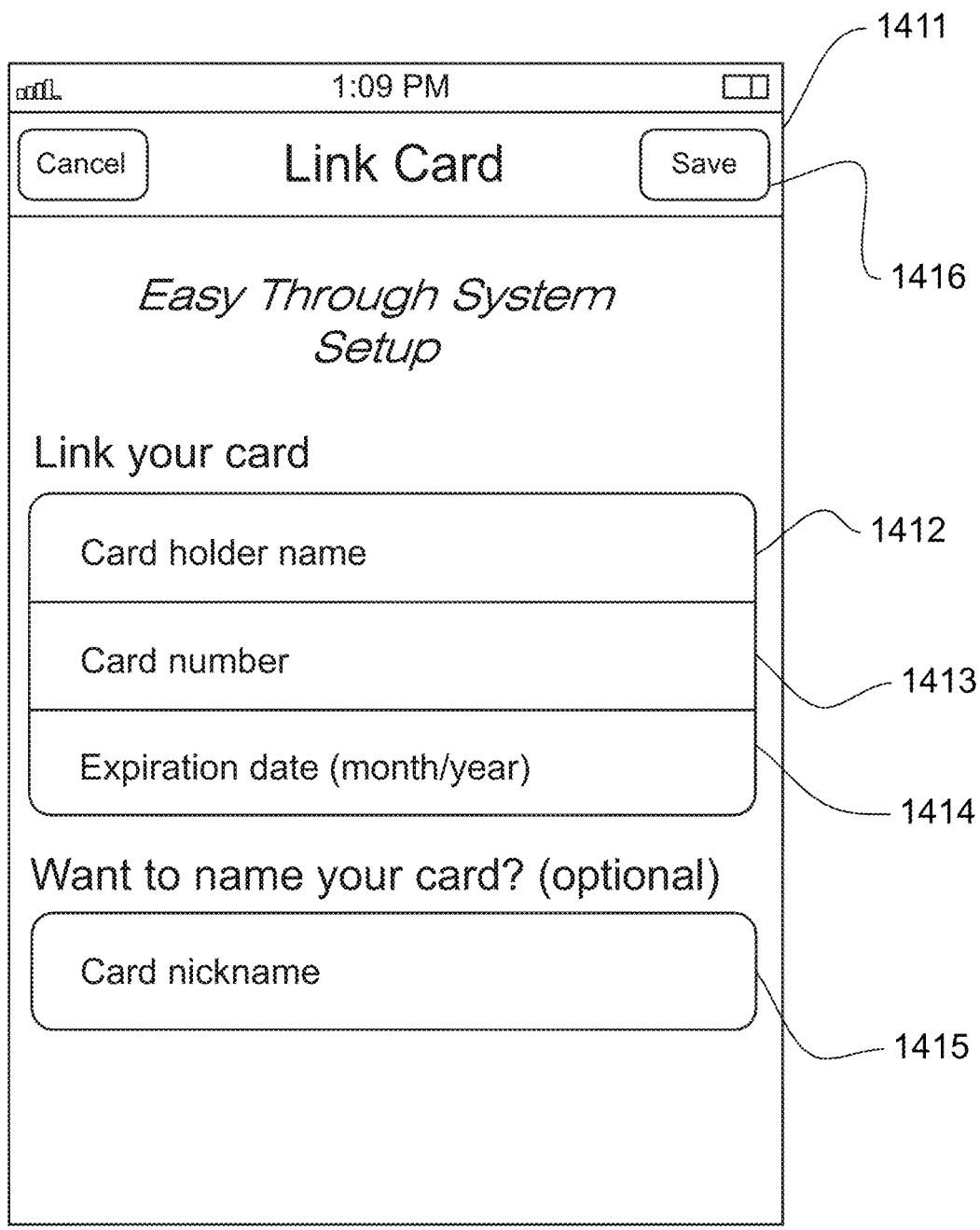
FIG. 15 illustrates an example of a payment setup screen used by the order management system in accordance with a particular embodiment.

As shown in FIG. 15, to create a method of payment, a user simply enters information about a payment source, such as the card holder name 1412, the card number 1413 and the expiration date 1414. For convenience, the user may also enter a card nickname 1415, such as "Corporate Card." Finally, the user selects save 1416 to store the information in the OMS Server 910 or associated database. Alternatively, this information could be stored locally on the mobile user device 940. Though part of the setup is illustrated here, it will be understood that new cards or payment sources could be linked at any time after setup is complete.

Once the user is registered and all of the information needed for account setup has been entered, the OMS Server 910 transmits any updates to the OMS application component 1118 that is to reside on the mobile user device 940. Though shown as step 1312, and following the other account setup steps, this step may take place at any point after connection to the OMS server 910 are established. This step is helpful to ensure that the mobile user device 940 has the latest version of the OMS application component 1118, including any patches or additional data that may not be in the version stored in the app store 914. As will be seen, the OMS server 910 is updated with new OMS data all the time, while the version on the app store may be more static and updated less frequently. OMS data may include application data used to modify or enhance the operability and functionality of the OMS application component 1118 on the mobile user device 940, menu data used to generate menus within the application, order data used to convey information about orders, promotional data relating to use of the OMS 900, system availability data, such as information conveying the available venue locations and the facilities offered at those venues, or other any data for use by the OMS application 1118.

Menu data, as referred to herein, may be any data used by the OMS application 1118 to generate one or more menu screens on a mobile user device 940, or to communicate and define menu options or selections to the various other OMS 900 elements shown in FIG. 9. This data may include, but is not limited to, product item names, item codes, images associated with product items, item pricing, descriptive information about items, menu commands, menu hierarchy information, and item availability. Regarding menus, it will be understood that a menu is simply a list of products or services that is available from a vendor. While this invention is primarily described herein in the context of a menu for a quick service restaurant, it is equally applicable to the ordering of goods or services other than food and beverages from other types of vendors—particularly where the vendors offer their goods and services at several different locations, and where the availability and pricing of those goods and services vary to some degree from one location to another, or where the goods or services are time sensitive, such that it is optimal for an order not to be released for preparation until near to the time when the goods or services are to be received. Accordingly, where the claims are not specifically limited to food or beverage menus for use in ordering from quick service restaurants, such limitations should not be read into the claims.

For explanation purposes, menu data may be classified herein as main menu data and venue specific menu data. In a multiple venue system where a user may place an order for goods or services from a variety of like venues, such as restaurants within the same restaurant chain, the menus or availability from one venue to the next may vary. Thus, each venue may have a unique venue specific menu, with a unique set of venue specific menu data. Pricing for like items may also vary among venues, based on, for example, the cost of living in the area where the venue is located, the supply and demand factors for particular items in that area, etc. However, there is in the illustrated embodiment at least some commonality across the item offerings at all of the venues within the chain such that there is also a main (or base) menu of these common offerings that is comprised of main menu data. The more common the menus are between the various venues in the system, the more detail and information may be consolidated within the main menu data and the less detailed the information needs to be in the venue specific menu data. Preferably, the menus within the OMS 900 will have a common structure, background colors, command structure, etc., such that the "shell" of the menu is contained within the main menu data, as well as the various stable and common menu offerings. Only those items that are unique to a venue, such as unavailability of basic menu items or availability of unique items, item pricing, etc., will typically be contained within the venue specific menu data.

Returning again to FIG. 13, one important update that occurs at step 1312 is to load the latest main menu data into storage on the mobile user device 940. While menu data is always available through the OMS server 910, having certain data available on the mobile user device 940 increases processing speed and allows some steps of the ordering process to be made without connection to the OMS server 910. For example, if wireless service were unavailable, in some embodiments a user could still browse the main menu (or the latest venue specific menu resident on the mobile user device 940) and set up an order to be submitted once connectivity is established. To the extent that the menu on the device is no longer current, as will be seen, the OMS 900 has features to handle this problem, while still allowing an order to be set up.

Figure 16:
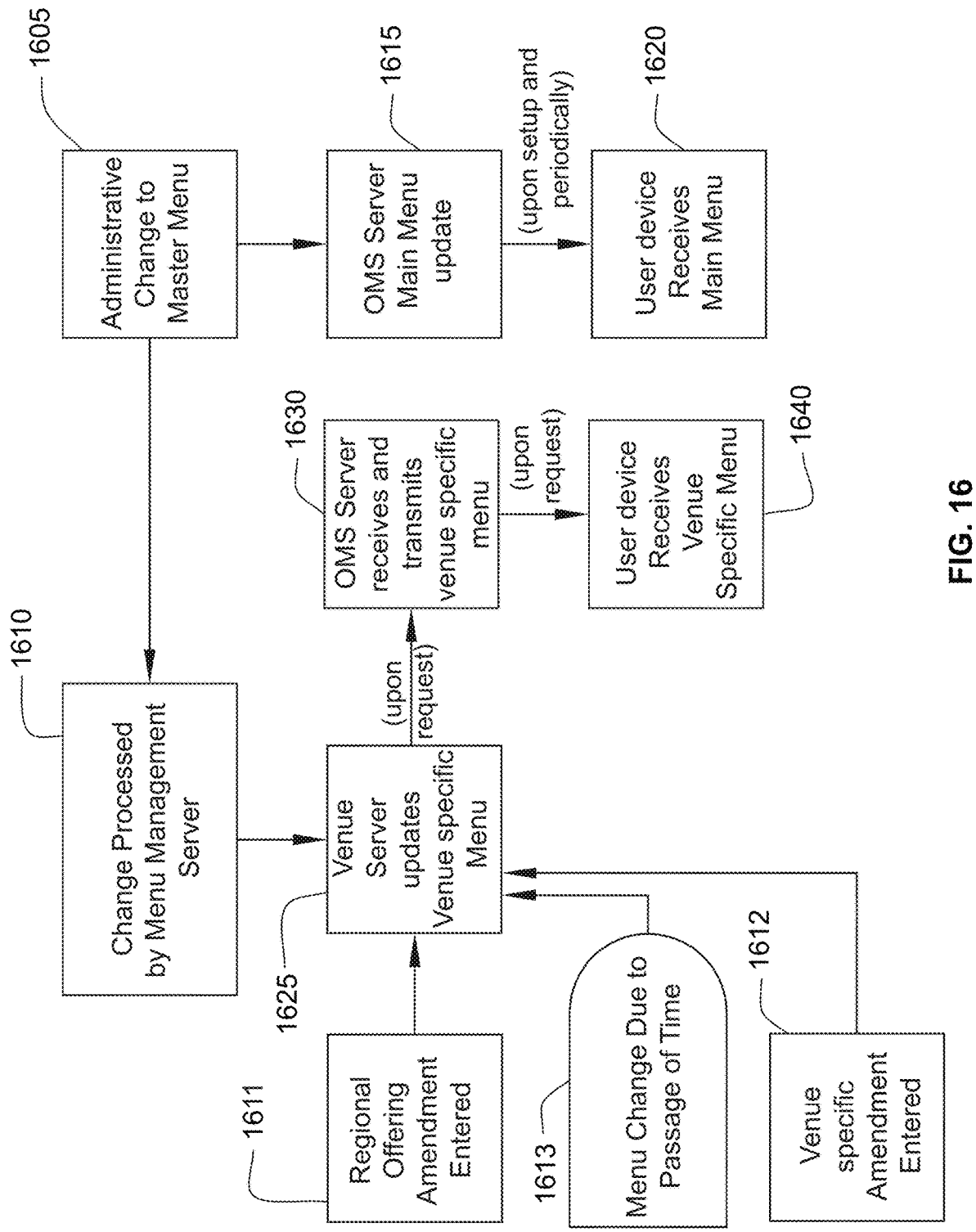
FIG. 16 is a block diagram showing the flow of menu changes through various system components according to certain embodiments.

As mentioned previously, and unlike in the case of Pentel, White and the other prior art references, the present invention is well equipped to manage dynamic, ever-changing menus. FIG. 16 provides a block diagram showing the flow of menu changes through various OMS 900 components according to certain embodiments. It may be helpful to review FIG. 16 in association with FIG. 9. The process of menu creation/change begins at step 1605 with an administrative change to the main menu. This change would be made by a system administrator, such as on central administrator computer 932, using a backend application interface of the OMS 900, or a related menu management system. Such a change might include, for example, the addition of a newly created, system wide menu item, which would require supplemental menu data relative to that item. The supplemental menu data would be sent from the central administrator computer 932 to the menu management server 930 where, at step 1610, the new data would be incorporated to update the main menu at the system level. In accordance with the illustrated embodiment, changes to the main menu are also communicated to the OMS server 910 so that its resident copy of the main menu is also updated at step 1615.

As shown in FIG. 9, updates to the main menu would be passed to the OMS server 910 from the menu management server 930. As mentioned above, in some embodiments, the OMS server 910 and the menu management server 930 may be the same machine. However, keeping them separate is preferred as a means to further specialize the devices and enhance security. For example, the OMS server 910 focuses on providing a portal for outside user interaction while the menu management server is a back end device that may provide other functions not related to customer interaction. It is not necessary that every change to the main menu on menu management server 930 be communicated to the OMS server 910. However, the more current the main menu is on OMS server 910, the more efficient the system will operate because the less likely it will be that significant changes will be needed at check-in time, as explained below. Also, there will be less venue specific menu data that must be passed to the mobile user devices 940 when setting up an order.

As explained above in association with FIG. 13 (step 1312), at the time a mobile user device 940 is used to initially establish an account, the main menu data resident on the OMS server 910 is transferred to that mobile user device 940 for local use on the device. This is shown at step 1620 of FIG. 16. Thus, not every change to the master menu initiating at step 1605 is broadcast to every registered user device 940 in the illustrated embodiment. However, as indicated on FIG. 16, the OMS server 910 can be set to periodically send the latest main menu data patches to devices. For example, cookies could be used to identify the age of the last main menu data update that the mobile user device 940 received. In such a case, once the age of the cookie corresponding to the last main menu data update on a user device 940 reaches a pre-determined amount, the OMS server 910 sends main menu data to the mobile user device 940 the next time it connects to the server 910. A system administrator will have to determine the appropriate cookie age at which to refresh the main menu on a mobile user device 940 in order to achieve the most efficient system operation. This will depend on server capabilities, usage rates, menu data density, etc.

Finally, changes to the main menu data are transmitted to the venue server 920 from the menu management server 930 at step 1625, where the venue server 920 incorporates them into the venue specific menu that resides locally at the venue. This may be set up as a "pull" or "upon request" data feed such that the venue server 920 must ask for the update, but, as disclosed, it is a "push" data feed where the update is broadcast automatically to all venue servers 920. This latter method helps to keep the menus at the various venue servers 920 similar in appearance and content. For example, though two restaurants might offer Item A at different prices, by "pushing" the main menu change to all venue servers 920 simultaneously, the image icon associated with Item A broadcast as part of the main menu will be common in the venue specific menus for those restaurants.

Step 1625 is an iterative process occurring on the venue server 920 at a given restaurant (venue) in which the venue specific menu for that restaurant (venue) is revised. As indicated in FIG. 9 and FIG. 16, a given venue server 920 may receive menu updates (in the form of menu data) from various sources. In the illustrated embodiment, the venue server 190 not only receives main menu updates from the menu management server 930, it may also receive updates from a regional administrator computer 922 and from the venue administrator computer 924. In large systems, such as a national restaurant chain, there may be regional offices that cover a certain geographic area in which restaurants belonging to the chain are located. Because consumer tastes vary between geographic regions of the country (or the world), there may be a desire to provide different menu offerings from one region to another. For example, it may be desirable in the southwestern United States to add certain spicier menu items, while it might be desirable to offer a sweet tea beverage in the southeastern United States and a variety of warm soups in the northeastern United States. These regional offerings might be incremental to the main menu sent from the centralized menu management server 930. Alternatively, an administrator at the regional level may want to disable a particular menu item that is not desirable within a given region. In this manner, menu data could be sent from the regional administrator computer 922 to the venue servers 920 within that region (as shown in step 1611 of FIG. 16) to affect that change.

Similarly, at the restaurant (venue) level, the restaurant manager may desire to alter the menu based on inventory or other factors. In many cases, pricing for individual items will be controlled at the individual restaurant (venue) level, so this would be a venue specific menu data input as well. Manager inputs would be entered into a user interface on the venue administrator computer 924 at step 1612 of FIG. 16 and transmitted to the venue server 920 for that restaurant (venue). Though shown separately, the venue server 920 and venue administrator computer 924 may be a single machine depending on the computer requirements of the restaurant (venue). The user interface used by the restaurant manager (and, separately, by the regional manager using regional administrator computer 922) may be a component of the OMS application 1118 or a component of a separate menu management system application.

Finally, there are time-based, or revolving changes to the venue specific menu. An example of this would be a breakfast menu, a lunch menu, a dinner menu, and a late night menu for a quick service restaurant. While these four menus may have common items at common prices, other items may be unique to one menu or another such that some items may only be offered at certain times of the day. In the case of a restaurant with revolving menus based on the periods of the day, it is desirable for any mobile ordering option to reflect the menu items currently being offered. The present invention not only provides for this, but, as will be seen, it also accounts for scenarios where the menu changes from the time an order is remotely submitted to the time the user (customer) arrives at the restaurant. Thus, at step 1613, a menu change is triggered by the mere passage of time. Time-based menu changes could be controlled at the venue server 920 level, the regional level or the main menu management level, but, in any of these events, the update will be made automatically on the venue server 920 to change the venue specific menu for the restaurant at step 1625. In another alternative, a user may enter a time at which they expect to receive the order and, based on the system 900 will use menu data associated with the venue specific menu expected to be available at that time. If the user shows up at a different time, the system 900 can make changes upon check in as described below.

Returning to FIG. 16, step 1625 occurs at least periodically due to the passage of time. Changes from the regional administrator computer 932 or the menu management server 930 may be rolled in immediately upon arrival at the venue server 920, may be adopted at the time of a "passage of time" amendment, or may be adopted based on receipt of a command from the venue administrator computer 924. The purpose of this last option would be for the restaurant manager to have the opportunity to review the proposed changes. Depending on the structure of the organization utilizing the OMS 900, restaurant (venue) managers may have the authority to override some (or all) of the changes that come in from the regional or central offices. The level of authority of a restaurant (venue) manager may vary from organization to organization, or even within a particular organization. For example, in some cases, a restaurant manager may have the ability to offer completely unique menu items and add those menu items to the venue specific menu for that restaurant. In other cases, the authority may be more limited, but the manager may at least be able to remove items from the menu if the restaurant is no longer able to provide them, such as, for example, it is temporarily out of inventory. Any override instructions would be considered during step 1625 when the venue specific menu is being updated by the venue server 920.

While the venue specific menus for each of the various restaurants (venues) in the system are updated frequently, they are not broadcast out to mobile user devices 940 or even to the OMS server 910 in the illustrated embodiment. While it may be feasible (and even preferable) to house a current copy of each venue specific menu on the OMS server 910 in smaller organizations where there are only a handful of different venues, this is less feasible or preferable when there are a great number of venues. For example, in a nationwide restaurant chain with thousands of venues, each having unique venue specific menu data being updated at different times, it would be very inefficient to constantly be sending updates to the OMS server 910, which does not necessarily need to maintain all of that data. Rather, when the OMS server 910 has a need for venue specific menu data from a particular venue, it sends a query to request that data at step 1630, and passes it along to a mobile user device 940 as necessary. Thus, in the illustrated embodiment, the OMS server 910 serves as a gateway and conduit, but not a repository for venue specific menu data.

Each user device 940 that has installed the OMS application component 1118 and registered with the OMS server 910 will have received and stored main menu data. This is sufficient to enable certain aspects of the system, but, as will be seen, a user must identify a specific venue (restaurant) in order to submit an order. When this is done, venue specific menu data is required. If the user has not placed an order with the selected venue recently (or in some embodiments, regardless of this), a request for the venue specific menu data will need to be routed through the OMS server 910 to the appropriate venue server 920. The venue specific menu data is then routed back through the OMS server 910 (step 1630) to the requesting mobile user device 940 (step 1640).

While it is not preferable to store venue specific menu data for all venues (restaurants) at the OMS server 910 when the OMS 900 is utilized by larger organizations for the reasons explained above, it may be desirable to store a limited amount of venue specific menu data at the mobile user device level. This is because, while the OMS server 910 must route OMS traffic among all of the various venues, it is unlikely that a user will frequent more than a few of them. Thus, depending on the specific embodiment and system setup, the OMS application component 1118 on a mobile user device 940 may be set up to store the latest venue specific menu data that it has received for one or more venues (restaurants). Having this more detailed information available locally will allow a more accurate order setup to be prepared prior to any connection with the OMS server 910. This, in turn, improves system speed, efficiency, and overall user experience with the OMS 900. In one embodiment, the OMS application component 1118 may be programmed to retain the latest received version of the venue specific menu data for the most recent five venues ordered from, in a last in, first out data management scheme. Thus, when a user orders from a sixth venue, the venue specific menu data for the sixth venue will replace that of the first, and so forth. Alternatively, a user could instruct the application component 1118 to always retain the most recent venue specific menu data received for one or more particular "favorite" venues. Note that, in some embodiments, though a venue specific menu may be stored on a mobile user device 940 for a particular venue, the OMS server 910 still may check for updated venue specific menu data from that venue when the next order is placed by that device 140 from that venue.

Use of the OMS 900 by a user is best explained in terms of two separate, but related sub-processes. The first sub-process, which involves order setup and submission, typically occurs from a first location at a first time. The second, related sub-process, which involves order check-in and receipt, typically occurs from a second location at a second time. The first location may be literally anywhere, but is typically at a location remote from the restaurant (venue) where the order is to be prepared. The second location is at the restaurant (venue). The first time can be any time prior to the second time, where the second time is the time at which the order is checked-in at the restaurant (venue) and received. Because it is not desirable for orders to be submitted to the OMS Server 910 but never checked in, or not checked in within a reasonable time, an administrator may set limits such that the first location must be within a certain distance of the second location and/or orders submitted at a first time will expire within a certain period of time if they have not been checked in.

While these two separate sub-processes occur at different times and locations, it will be understood that they can also be considered components of a larger, single process, namely, use of the OMS to generate, submit, check-in and receive an order. Moreover, it will be understood that the order setup and submission sub-process could be performed at the venue just prior to checking in the order. In such a case, there would only be one location and essentially one time. However, for purposes of explanation below, we assume order setup and submission occur at a location different from the venue, and at least several minutes prior to check in.

Figure 17:
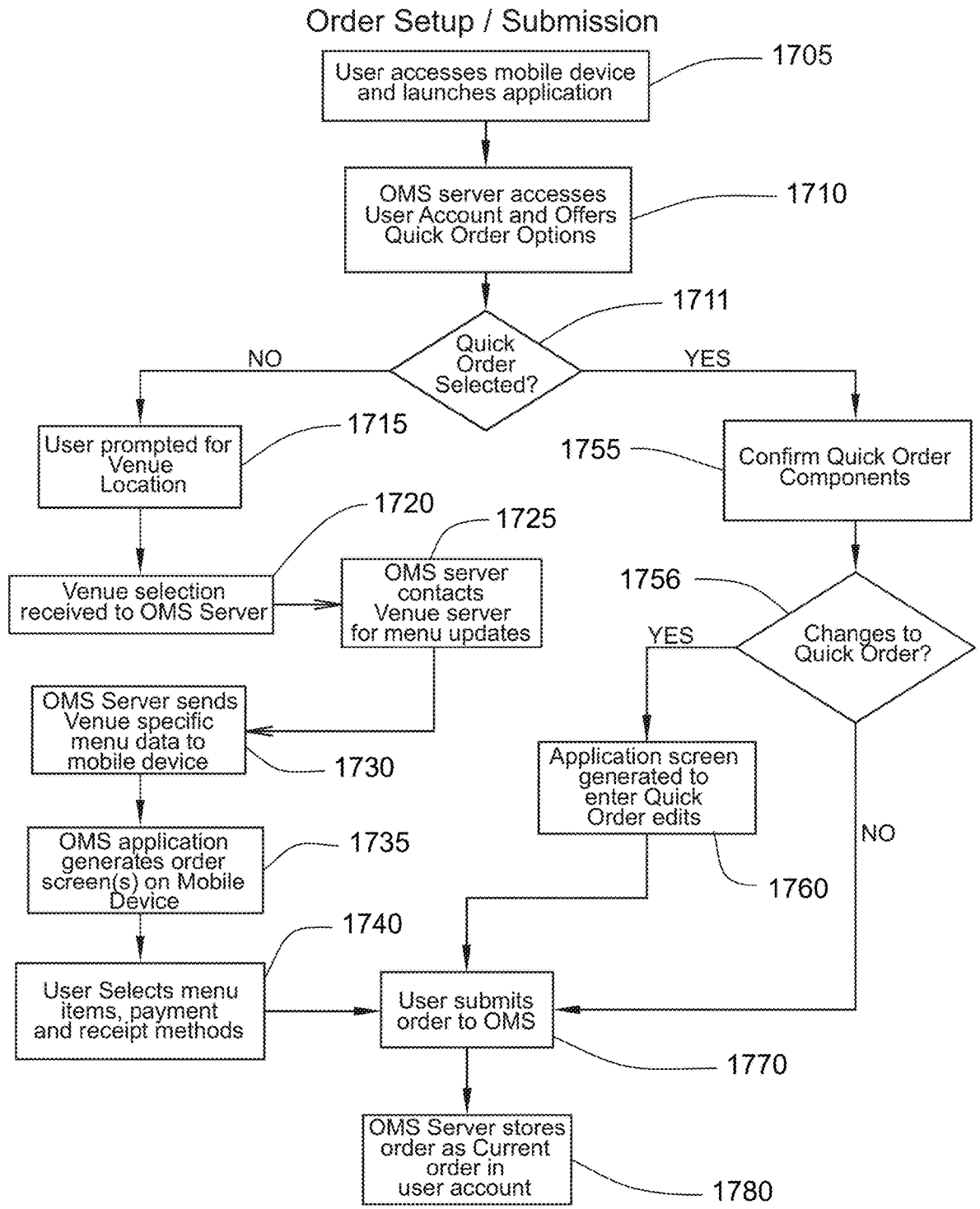
FIG. 17 is a flow chart illustrating an embodiment of a process for setting up and submitting an order in accordance with the invention.

Turning to FIG. 17, we will now walk through the steps of the first of these processes—order set up and submission. In the embodiment discussed here, user account information is stored at the OMS server 910. At step 1705, a user accesses their mobile user device 940 and launches the OMS application component 1118. In an embodiment where accounts are tied to users and not devices, the application 1118 will ask the user to sign in so that they may be recognized by the OMS server 910. Using this information, which is caused to be transmitted by application component 1118 from the mobile user device 940 to the OMS server 910, the OMS server 910 identifies the user and accesses the user's account at step 1710. Based on this data, the OMS server 910 transmits certain user account data and Quick Order options (if available) stored in the user account at the OMS server 910 (or associated database) to the mobile user device 940, which, via its resident OMS application component 1118, uses this information to construct a welcome screen 1421 such as that shown in FIG. 19.

As shown in the display on a mobile user device in FIG. 19, this welcome screen 1421 identifies the person's name associated with the account and offers options whether to (1) enter one of Quick Orders Q1, Q1, or Q3, (2) to create and submit an entirely new order, or (3) to check in a Current Order (discussed further below). If there is already items in the user's basket that have not been checked in and received, the system will perceive this as an existing order and prompt the user with the option to modify it. Other information may also be conveyed through the welcome screen, such as venue advertisements, special promotions, or offers to the user.

The term "quick order" is used herein to describe a pre-created order, ideally that has been submitted to the OMS server 910 by the user in the past and is stored in the user's account on the OMS server 910 (or associated database). Alternatively, a Quick Order could be set up on the user's mobile device 940 and retained there. A Quick Order may have all aspects necessary to submit an order, or may simply be a partial order such that other information is required before submission. For example, a user might always prefer to submit orders to a specific venue using a certain payment method, with receipt at the drive-thru window. However, the items the user selects to order may always vary. Thus, three of the four primary components could be set up as a partial Quick Order so that those components will not need to be re-entered each time. Any number of Quick Orders could be set up and retained by a user. Obviously if no Quick Orders are resident on the OMS server 910 for a given user, none will be sent to the user. From the welcome screen 1421 shown in FIG. 19, a user may either select one of the three Quick Order icons 1422, or may select to generate a new order via new order icon 1423 that does not correspond to any of the Quick Orders. This decision step is reflected on FIG. 17 at decision point 1711.

If a Quick Order icon 1422 is selected, a screen illustrating that Quick Order is generated by the OMS application component 1118 and displayed on the touch screen of the mobile user device 940. The purpose of displaying this information is for the user to confirm that they want to order the Quick Order (step 1755 on FIG. 17), or use it as a template to create a derivative order. For example, FIG. 20 is an image of a Quick Order screen 1431 that would result from selection of "Q2" in FIG. 19. As shown in FIG. 20, there are four primary order components in the illustrated embodiment: menu items selected 1432, venue location 1433, payment method 1434, and receipt method 1435. A complete Quick Order will have all of these components filled with data corresponding to a previously submitted order that was then designated as the Quick Order. An incomplete Quick Order (which still may be stored in the user account on OMS Server 910) will only have certain components filled. FIG. 20 depicts a complete Quick Order corresponding to a prior order of a large hamburger, fries and a chocolate milk from a restaurant at 801 N. Market Street to be paid for by the user's corporate card and picked up at the counter of the restaurant. Though the menu items here show an order that is most likely for a single individual, there need be no limit to the quantity or variety of items set forth in a Quick Order, and it could be displayed in scrolling fashion if necessary to fit on the screen.

From the Quick Order screen 1431 shown in FIG. 20, a user may either go back to the welcome screen 1421, choose to re-enter the Quick Order by selecting the submit icon 1436, or can edit the contents of one or more of the four components of the Quick Order by selecting one of the edit icons 1437. This choice is illustrated on FIG. 17 at decision point 1756. If the user does not want any changes, they select the submit icon 1436 and the order is submitted to the OMS server 910 (step 1770 on FIG. 17). Once received, the submitted order becomes the Current Order for that user. The Current Order is a term used herein to describe the order most recently submitted to the OMS Server 910 by a particular user that has not been checked in. The check in process will be described below, but once a Current Order is checked in, the Current Order associated with a particular user account is erased on the OMS server 910 to make way for the next order from that user.

If a user launches OMS application component 1118 and the OMS server 910 identifies a Current Order for the user upon sign-in, the system 900 will assume that the user is ready to check in the order. However, the user could also update and re-submit the Current Order in the same manner as described in accordance with updating or modifying a Quick Order. Note that, in some embodiments, even where a Quick Order is selected and no changes are requested, a call to the venue server 920 for the venue identified in the Quick Order may be made by the OMS server 910 (see step 1725 of FIG. 17) in order to determine if the Quick Order includes any menu items that are no longer (or that are not presently) available.

If a user selects one or more edit icons 1437 on a Quick Order screen 1431, a new OMS application screen is generated by the OMS application component 1118 to enter those edits at step 1760 of FIG. 17. The screens used to edit components of a Quick Order are the same as or similar to the screens used in creating those components in a new order, so they will be covered in association with reviewing creation of a new order.

Figure 19:
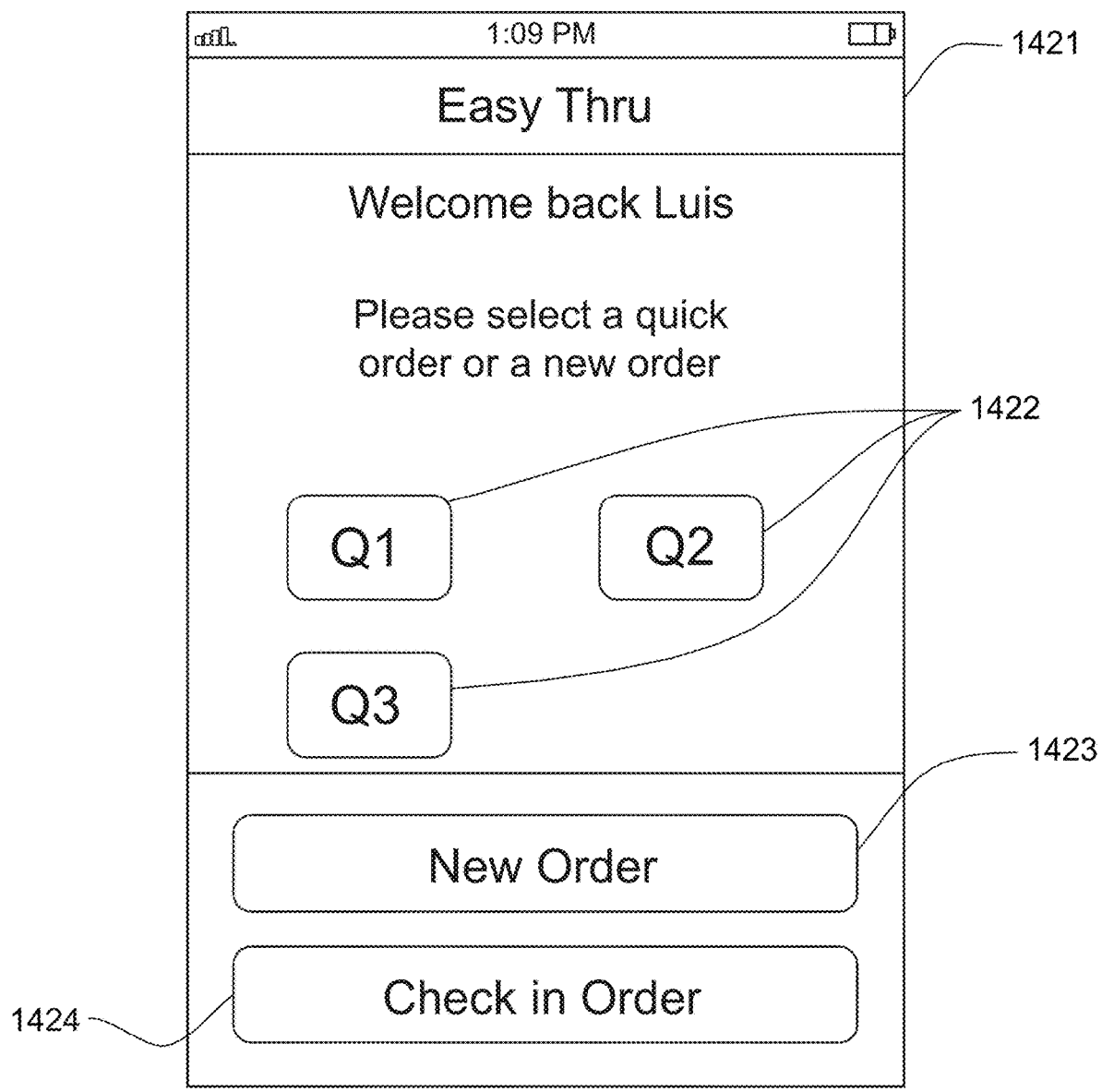
FIG. 19 illustrates an example of a welcome screen used by the order management system in accordance with a particular embodiment.
Figure 20:
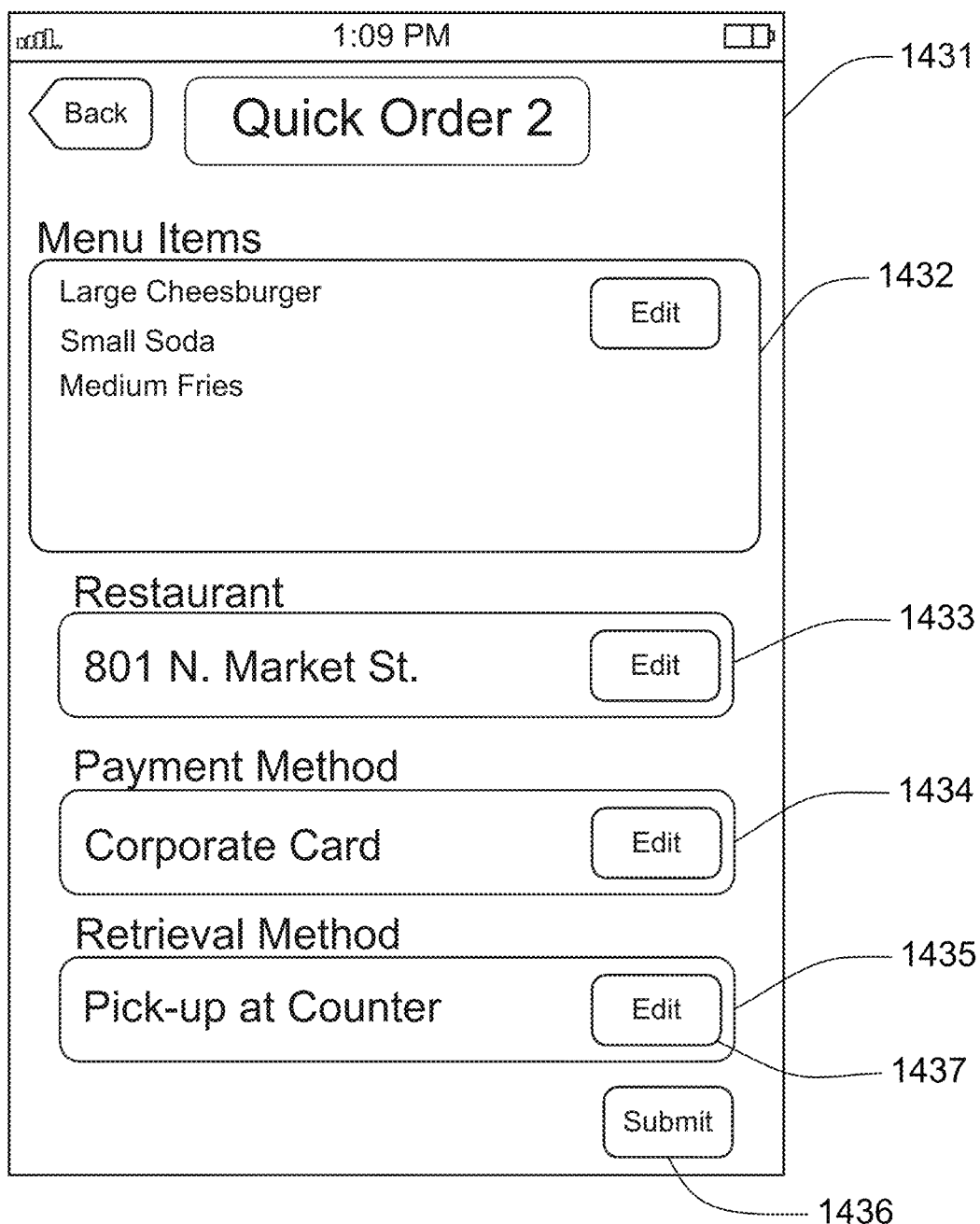
FIG. 20 illustrates an example of a Quick Order edit screen used by the order management system in accordance with a particular embodiment.
Figure 21:
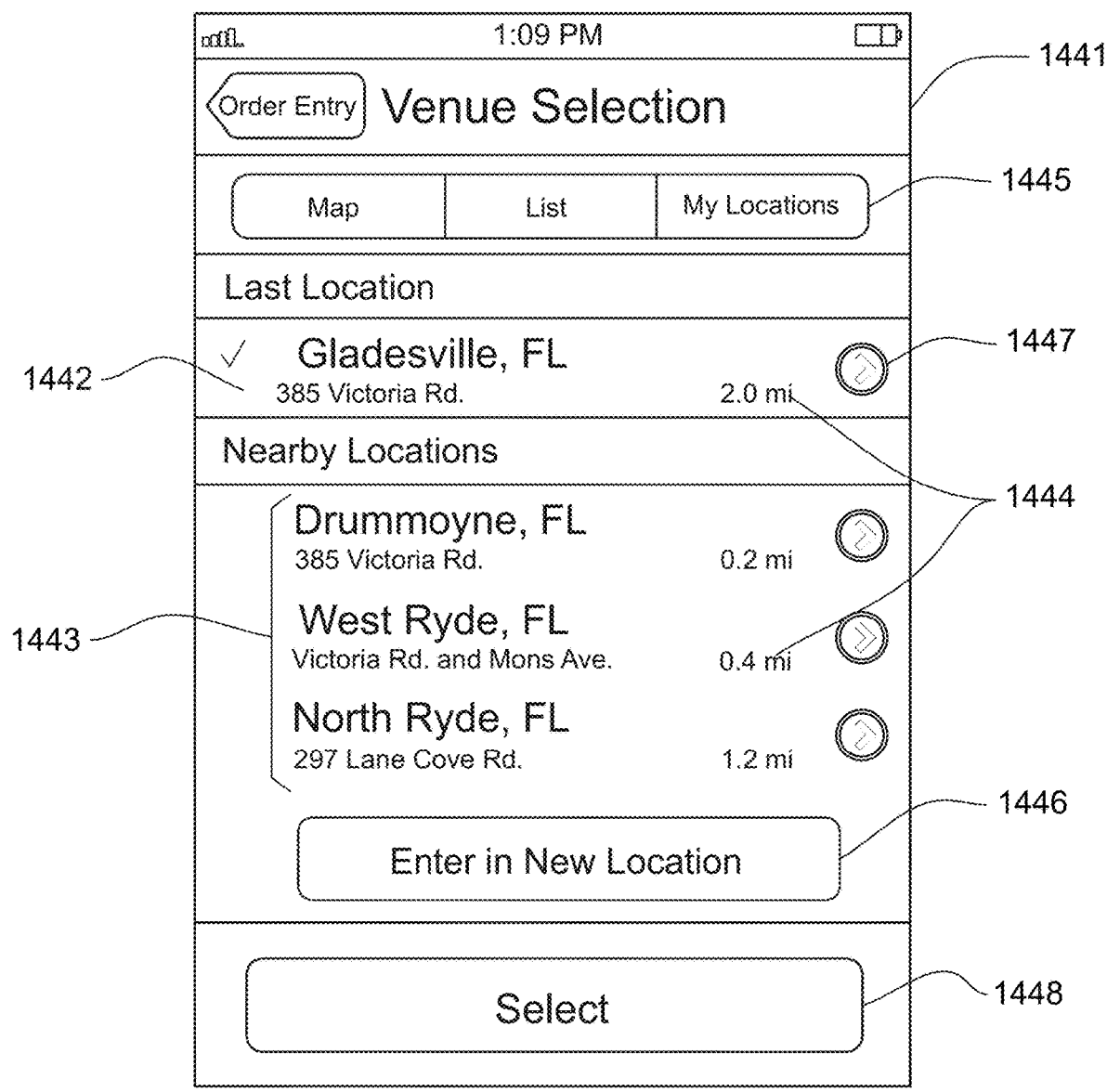
FIG. 21 illustrates an example of a venue selection screen used by the order management system in accordance with a particular embodiment.

When new order icon 1423 of welcome screen 1421 on FIG. 19 is selected, the user is prompted to select a restaurant (venue) location. This corresponds to step 1715 of FIG. 17. The venue selection screen 1441 of FIG. 21 provides an example of how a user may select a particular venue. In accordance with this embodiment, the user is provided with options including the last venue visited 1442 and several venues near to the user's present position 1443. The OMS application 1118 is able to populate the last venue at which the user placed an order through the OMS 900 because that information will be stored in the user's account on the OMS server 910, or may also be stored on the mobile user device 940. The nearby locations 1443 are based on the position of the mobile user device 940, and requires the device to have a GPS chip that is activated and enabled to transmit its position to the OMS Server 910. If GPS is not enabled, authorized, or available, the nearby locations feature will not operate. In addition, the OMS application 1118 will not be able to provide the distance indicators 1444 as shown on FIG. 21, which indicate the distance from the present location of the mobile user device 940 to the respective venues.

The user may also have stored favorite venues in the user profile on the OMS server 910. In this case, selection of the My Locations icon 1445 will cause the OMS application component 1118 to load a new screen listing those locations to select from. If a user is unsatisfied with any of these options, they may elect to enter a new location by selection of the new location icon 1446. Here, the OMS application component 1118 will load a screen enabling the user to type in a specific address or zip code (not shown). The address or zip code may correspond to a particular venue. If it does not, the OMS application will provide the available venues closest to the identified location.

Figure 22:
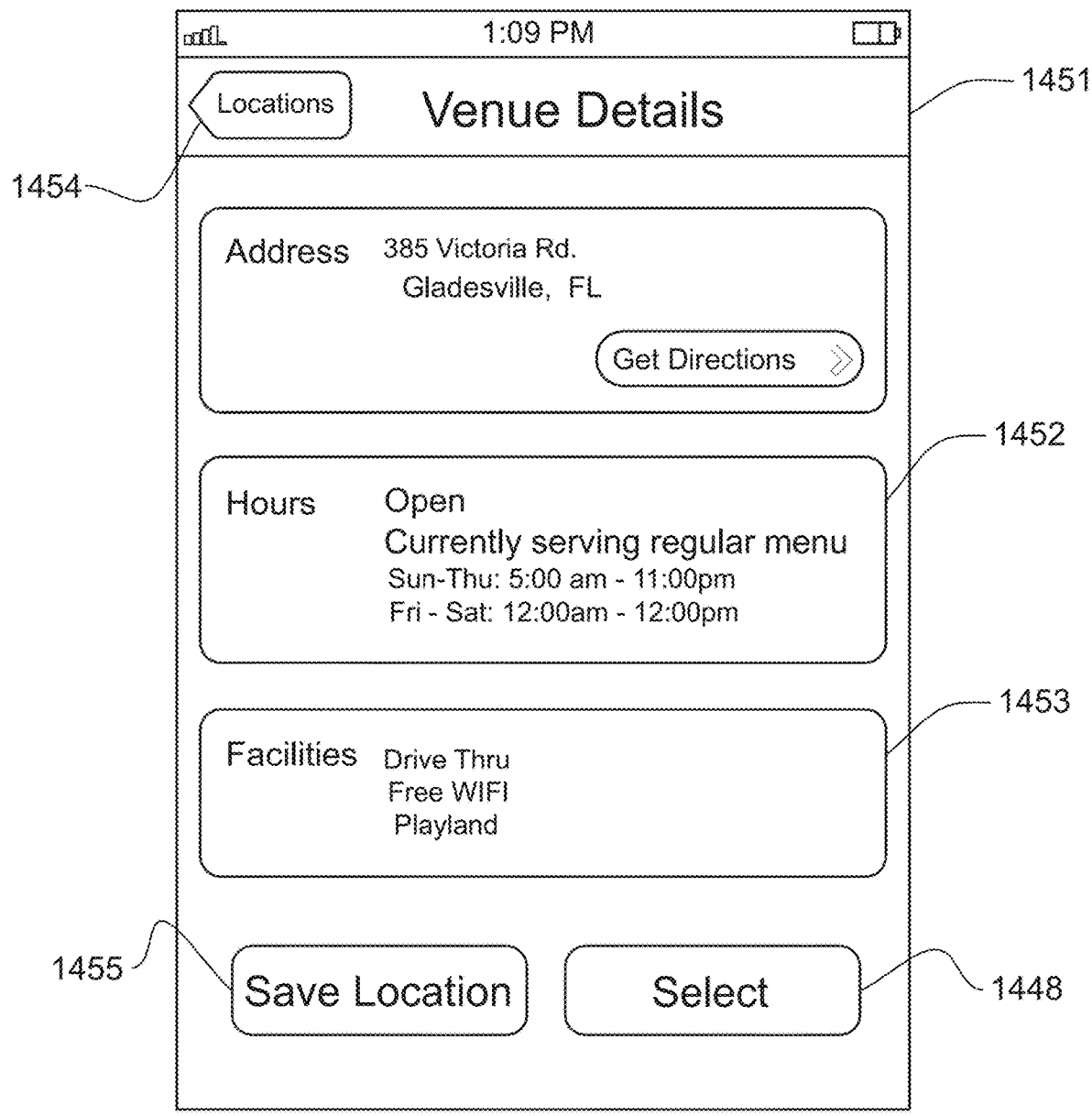
FIG. 22 illustrates an example of a venue details screen used by the order management system in accordance with a particular embodiment.

To the right of each identified location on venue selection screen 1441 is a "more info" button 1447. Selection of this button causes the OMS application component 1118 to display a "venue details" screen 1451, such as that shown in FIG. 22. This screen provides specific details about the particular venue selected, such as, for example, the hours of operation 1452 and the facilities available at that venue 1453. From here, the user may either return to the venue selection screen by selecting icon 1454, choose this venue to order from by selecting icon 1448, or choose to store this venue as a "favorite" venue in their user account on the OMS server 910 by selecting icon 1455. A user may alternatively select a venue presented on the original venue selection screen 1441 by pressing icon 1448 without going to store details screen 1451, if desired.

Returning to the order setup flowchart of FIG. 17, the OMS server 910 receives the venue selection at step 1720. At step 1725, depending on the system embodiment and administrative selections as described above, the OMS server 910 may contact the venue server 920 associated with the selected venue to receive the current venue specific menu data. At step 1730, the OMS server 910 then transmits the venue specific menu data to the mobile user device 940. In certain embodiments, the OMS server 910 may submit prior venue specific menu data it has on hand for that venue without making a call to the venue server 920 (skipping step 1725), or venue specific menu data on the mobile device 940 from a prior order from that venue may be used (skipping steps 1725 and 1730). Note that the latter case facilitates order setup using the application component 1118 without an internet connection available. In any event, the OMS application component 1118 on the mobile user device 940 will use the most current available menu data for the selected venue to generate various order screens at step 1735.

FIGS. 23-28 show examples of various order screens. Step 1740 of FIG. 17 involves a user making selections from these screens, namely, selecting menu items to be ordered, a payment method and a receipt method. It will be understood that the arrangement of the order screens depicted in FIGS. 23-28 is purely exemplary, and that they may be set up in a variety of ways without departing from the scope of the present invention. Furthermore, while the order screens are set up in an hierarchical fashion, that need not be the case. Order screens could be presented in an ordinal fashion, menu items could be listed all on a single screen simultaneously, and could be depicted textually or graphically, etc. For example, the order screens and arrangement used to arrive at an order could, in some regards, resemble those disclosed in U.S. Patent Publication Nos. 2009/0265247 and 2011/0258058, the contents of which are herein incorporated by reference. It will also be understood that all user interactions with the order screens described below result in inputs and outputs of the OMS application component 1118 on the mobile user device 940. Typically, these interactions do not require a call to, or any processing by, the OMS server 910. Rather, the component of the OMS application 1118 resident on the user device 940 is sufficient to interact with the user to develop the order.

Figure 23:
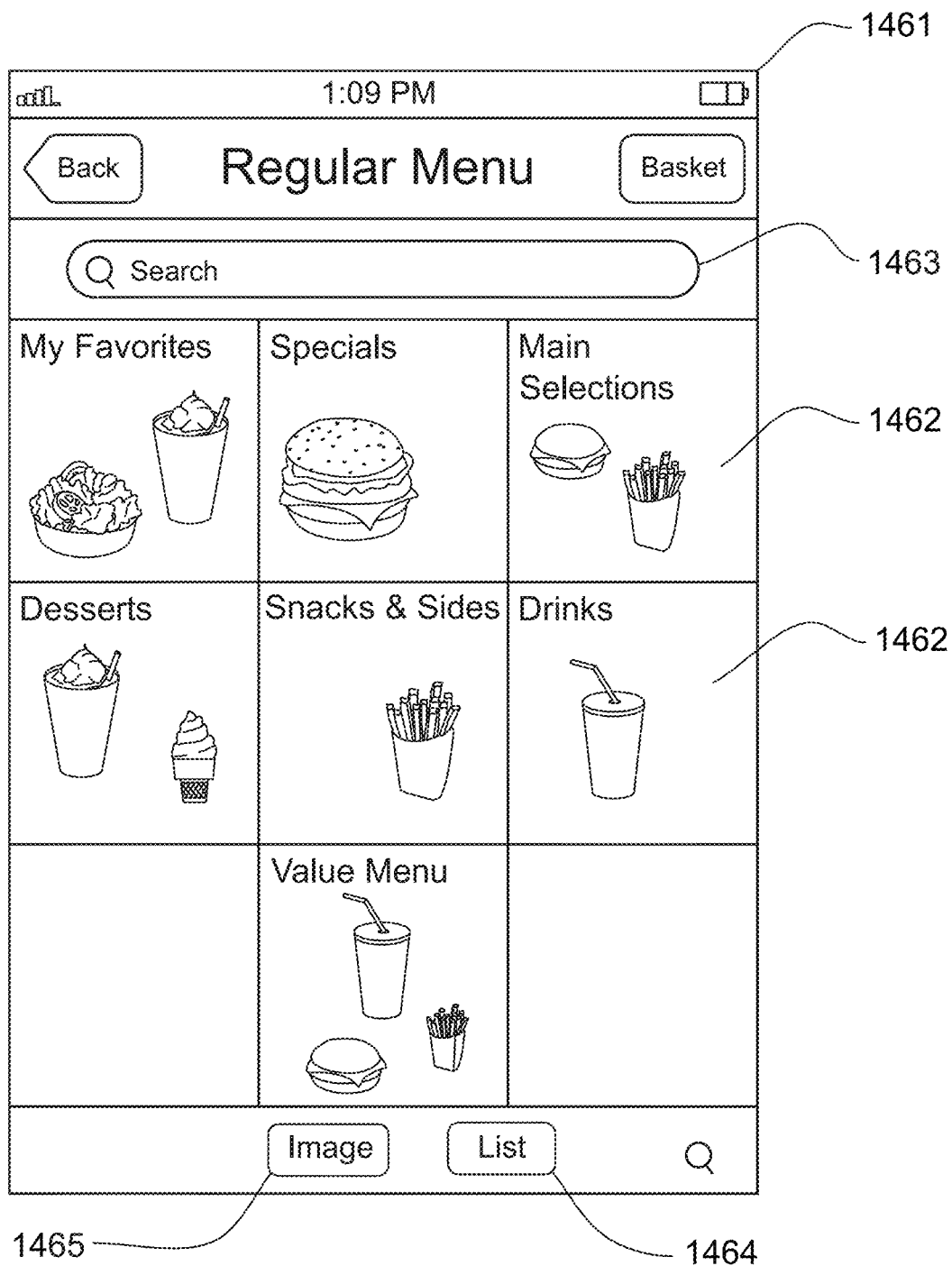
FIG. 23 illustrates an example of a main menu screen used by the order management system in accordance with a particular embodiment.

FIG. 23 shows a regular menu screen 1461 featuring a variety of different menu category icons 1462. Here, the user may either select a category icon 1462, or may type in the name of a desired product in the search field 1463. Conducting a search leads to a search results screen (not shown) that lists any products on the venue specific menu identified by the OMS application component 1118 as having the characteristics of the search. Notably, if the user is searching for a product that is not available on the venue specific menu from the particular venue they have selected, the product will not be provided as an option for selection. Selecting a product from the search results list causes the OMS application component 1118 to load a product detail screen 1481, such as that shown in FIG. 25. Alternatively, the user may opt to simply list all menu items available on the venue specific menu textually or graphically by selecting either list icon 1464 or image icon 1465, respectively.

Figure 24:
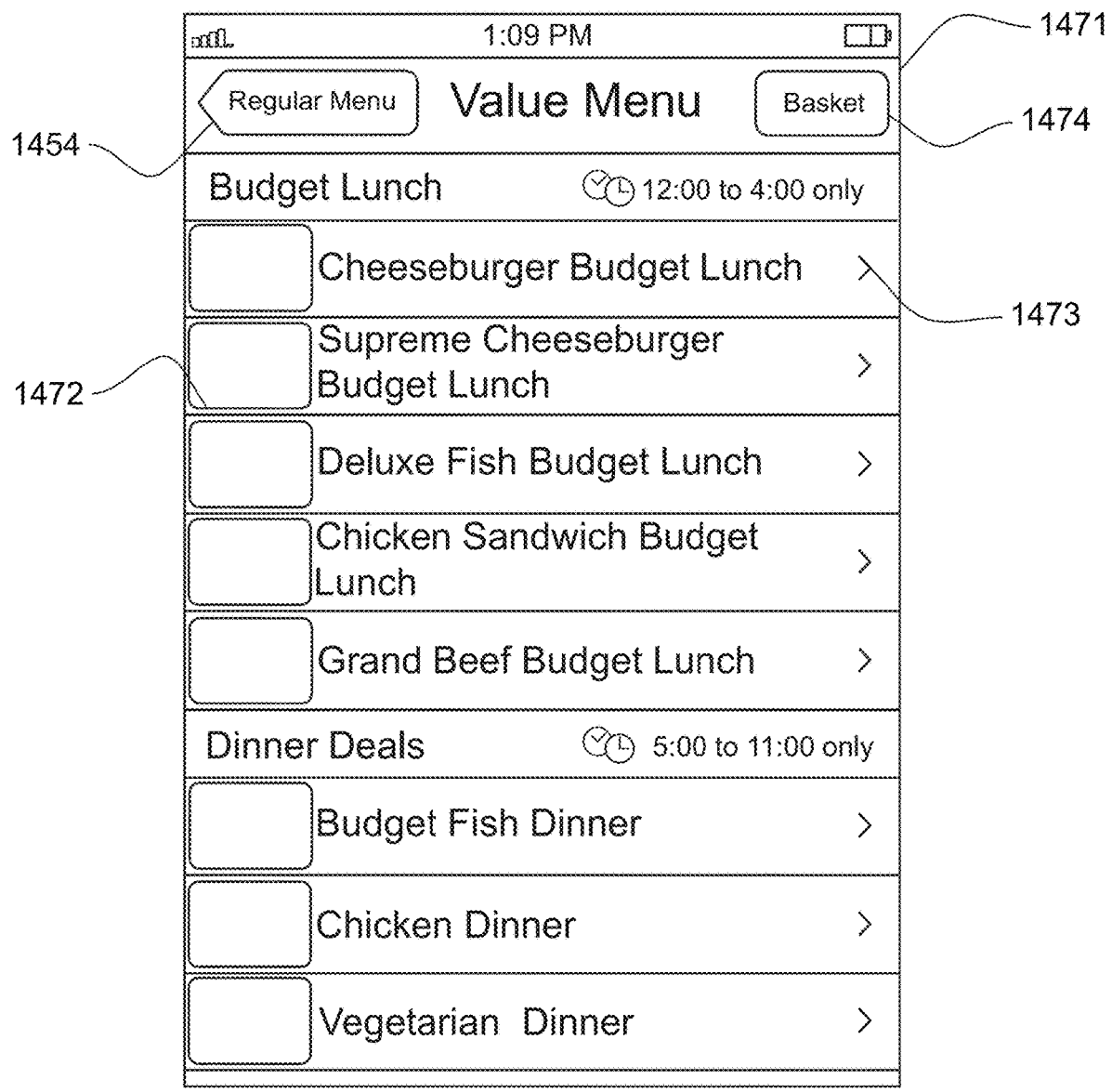
FIG. 24 illustrates an example of a sub-menu screen used by the order management system in accordance with a particular embodiment.

If the user selects a category icon 1462 from the regular menu screen 1461, the OMS application component will generate a category specific menu screen 1471, such as that shown in FIG. 24. In this case, the user has selected the "Value Menu" from FIG. 23, and is now viewing the category specific menu screen 1471 associated with the value menu. From here there are options to return to the regular menu using return icon 1454, to select one or more specific products using selection icons 1472, to learn more about a specific product by proceeding to that product's detail screen 1481 by selecting the arrow 1473, or to view the order basket by pressing the basket icon 1474. In this case, the value menu is divided into lunch items and dinner items, and it is noted that the items are only available during certain windows of time.

In some embodiments, though all of these menu items may be listed on the venue specific menu, the ones not presently being offered may be grayed out or ineligible for selection. However, it is more important that the items be available at the time of receipt, which is typically later than the time of order. Thus, if it is 4 PM and someone wants to order the Budget Fish Dinner, it is preferable to allow them to do so because they may intend to receive the order after 5 PM when that item becomes available. Note that in some embodiments, a user can specify the time at which they intend to receive the order. In that case, the OMS system 900 will cause to be displayed the menu that the selected venue will be offering at that time.

Figure 25:
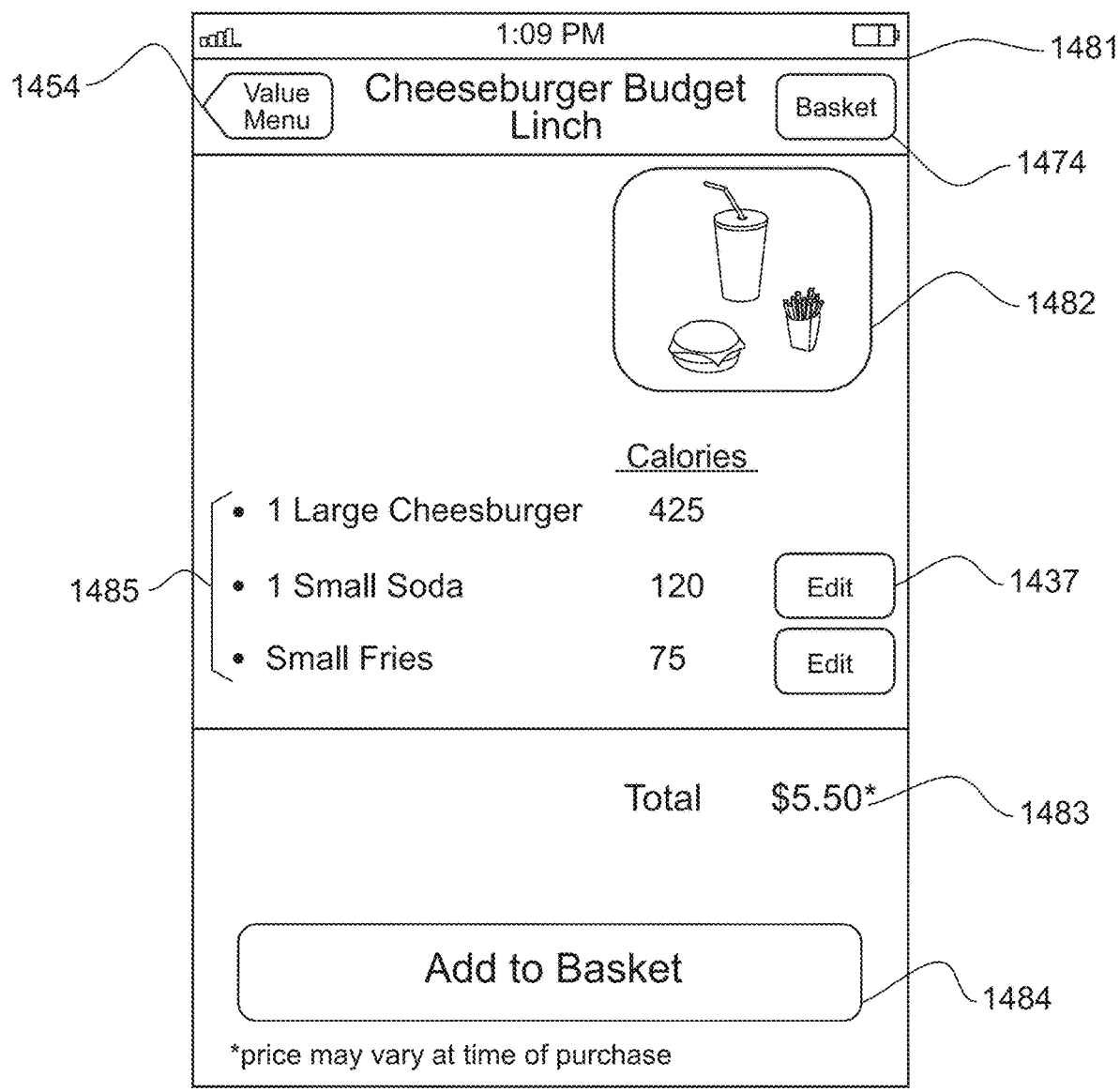
FIG. 25 illustrates an example of an item description screen used by the order management system in accordance with a particular embodiment.

FIG. 25 illustrates a product detail screen 1481 for the "cheeseburger budget lunch." Though there are other ways to arrive at this screen, one method would be by selecting the arrow 1473 to the right of this product item on FIG. 24. The product detail screen 1481 may include a product image 1482, a product description 1485, a price 1483, and an "add to basket" icon 1484. The product description may include various data about the product and, where applicable, may allow a user to edit certain variables relating to the product such as size, color, etc. In this example, where the product is actually a meal comprising several products, there is an opportunity to edit the size of the soda and fries that are associated with the cheeseburger budget lunch. Were a user to select edit icon 1437 and change the soda from a small to a large, there would likely be an associated change in the calories and total price of the product (meal).

From this screen, a user may return to the value meal by selecting return icon 1454, view a list of the items already selected for purchase by pressing basket icon 1474, or add the product shown on the screen 1481 to their basket by selecting the "add to basket" icon 1484. In some embodiments, there may be an option to see additional details, such as nutritional or preparation details about the product, by selecting an "additional details" icon that would load an incremental screen (not shown). In addition, a screen could be added that would allow a user to specify particular modifications or preparation instructions, such as, for example, particular condiments to be used on a sandwich, and how long it should be cooked or at what temperature, etc.

Figure 26:
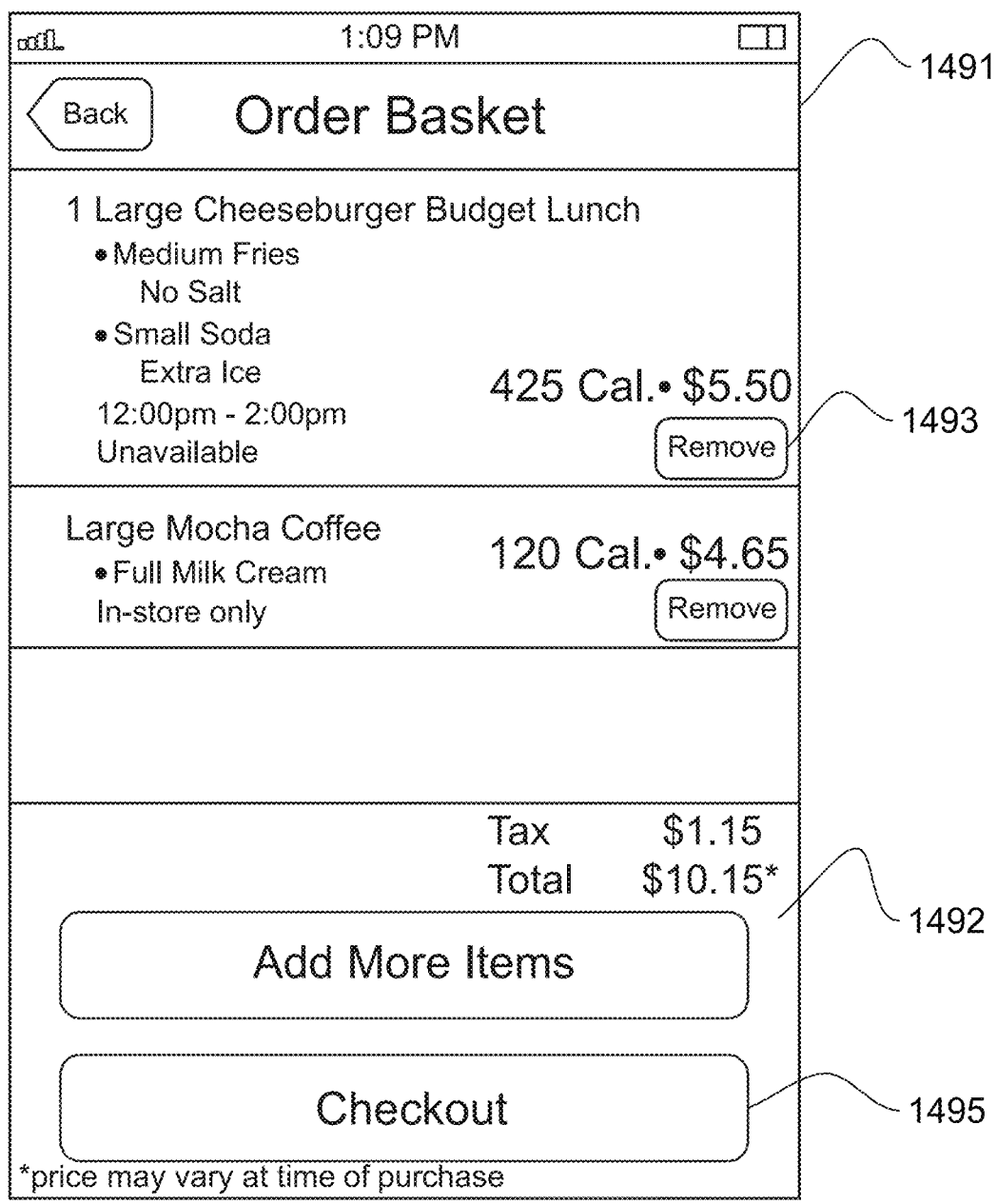
FIG. 26 illustrates an example of an order basket screen used by the order management system in accordance with a particular embodiment.

From nearly any screen displayed by the OMS application 1118 on the mobile user device 940, a user can proceed to their order basket screen 1491, such as that shown in FIG. 26. In the embodiment depicted, the order basket screen 1491 provides a listing of all items selected for the order, together with the quantities of those items selected, the calories in those items, and the price of those items. The prices are summed into a total price 1492. In this case, there is a warning indicating that the total price may vary at the time of purchase. In the illustrated embodiment, the "time of purchase" is the "second time" discussed above, namely, the time at which the user arrives at the venue and checks in their order. This warning is helpful because the pricing may change by the time the user finally checks the order in at the selected venue. In other cases, the OMS application 1118 may be operating off of a stored version of the venue specific menu that does not reflect the current pricing at the venue. This issue of changing prices is less likely in embodiments where a "pull" of menu data from the venue server 920 by the OMS server 910 is required at the time of order setup. This capability of obtaining the real-time pricing is an advantage of the system over the prior art. From the order basket screen 1491, a user may choose to remove an item from the basket by selecting a remove icon 1493, to add more items by choosing the "add more items" icon 1494, or to accept the selections by selecting checkout icon 1495.

Figure 27:
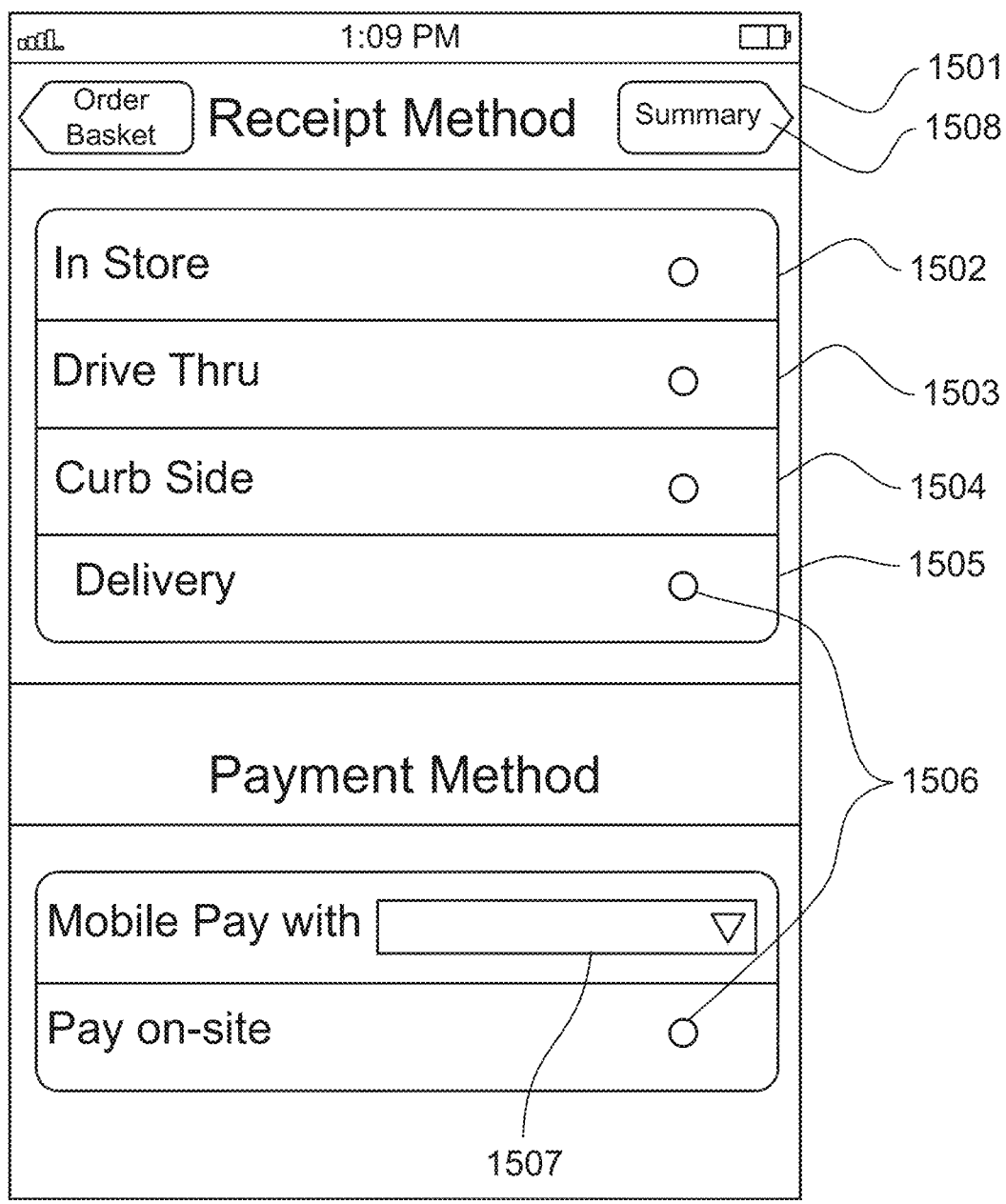
FIG. 27 illustrates an example of a receipt method screen used by the order management system in accordance with a particular embodiment.

Upon selecting checkout icon 1495, the user proceeds to a receipt and payment method setup screen 1501, such as that shown in FIG. 27. These screens may be separate in some embodiments, but are combined as shown here. Recall that payment method and receipt method, along with venue location and menu items, are the four primary order components required to submit an order to the OMS server 910. As used in this description, the term "receipt method" simply means the method of how the user will receive the products ordered. It does not suggest that, or reflect upon whether, the user will go to the products, or whether the products will come (e.g., such as via delivery) to the user. In the illustrated embodiment, the receipt methods offered are (1) in store, (2) drive thru, (3) curb side, and (4) delivery. Which options will actually be available may depend on various factors such as, but not limited to, the venue selection. This is one example of why it is preferred that the venue selection be made first among the four primary order components. In the quick service restaurant model used as an example in this description, "in store" would indicate a customer pick-up at the checkout counter, "drive-thru" would be handed out via a drive-thru lane, "curb side" would, as will be seen, allow for a user to park at the venue and receive their order without proceeding through a drive thru lane, and "delivery" would involve restaurant personnel or a third party vendor bringing the order to a designated location. In the event that a user selects delivery icon 1505, they would be prompted to designate such a location (not shown), which would then be validated by the system to ensure that delivery is available to that location. Selection of the "in store" icon 1502 would typically require the user to then designate whether they will be dining in or taking the order to go, though this option can be changed at the time of order check in.

While other payment methods might be available in other embodiments, here the options are to pay on site or to elect a mobile pay option using dropdown box 1507. In some embodiments, selecting a mobile pay option is required to use the OMS 900. The options in the dropdown box 1507 will depend on the payment methods the user has setup in the OMS 100 (see, e.g., FIG. 15 and the associated description above). Once a receipt method and payment method are selected, the associated selection buttons 1506 associated with those methods will be highlighted and the user will be able to proceed to the summary screen 1511 by pressing the summary icon 1508.

Figure 28:
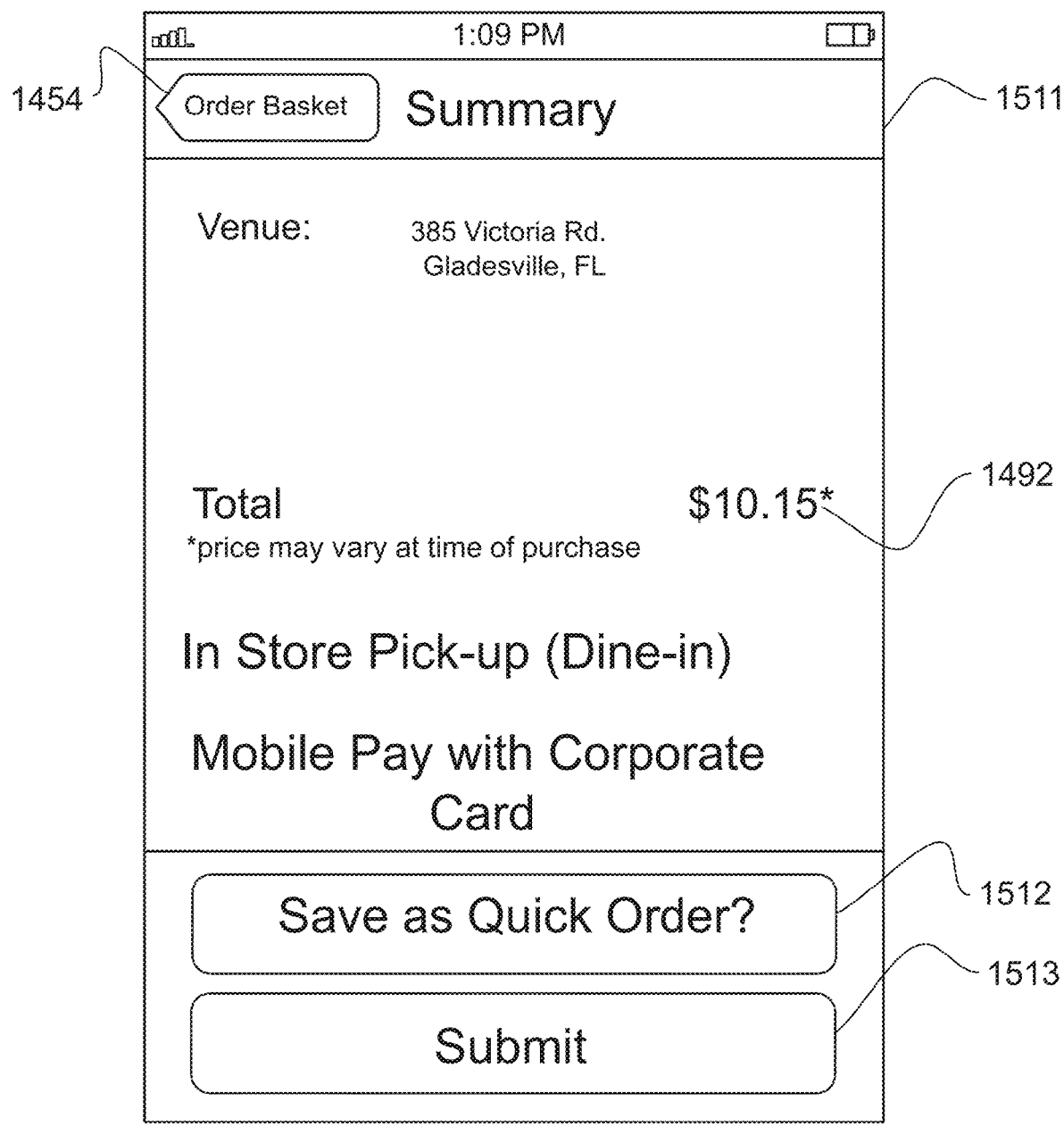
FIG. 28 illustrates an example of an order summary screen used by the order management system in accordance with a particular embodiment.

The summary screen 1511 is typically the final screen prior to submission of the order to the OMS server 910. An example summary screen 1511 is shown in FIG. 28. The summary screen 1511 will typically show the four primary components of the order, and what has been selected for each. However, due to spatial constraints, the only aspect of the menu items component is the total price 1492. In this case, the user has selected to place an order with a venue located in Gladesville, Fla. for an estimated price of $10.15 to be picked up at the counter for dine in, and paid for via a card designated by the user on the OMS 900 as "corporate card." Notably, while these are the order components to be submitted, the user is not locked in to any of them. Also, at least the receipt method selection is not required in order to submit an order in certain embodiments. The OMS 900 works most smoothly (both on the back-end for the organization and on the front end for the user/consumer) when no changes are made. However, as will be seen, changes may be made at the time of check-in. Changes to some order components are more disruptive than others. For example, if the user checks in at the drive thru of the designated venue instead of inside the store, a backend correction can quickly be made before the order is released for preparation. Alternatively, if the user shows up at a completely different venue, the OMS 900 is more likely to have to prompt the user for changes or updates to the order that eliminate some of the efficiencies behind use of the system.

Upon reviewing the order components of the summary screen 1511, a user may return to the order basket by selecting the return icon 1454, save the order as a new Quick Order by selecting icon 1512, or submit the order to the OMS 900 by selecting submit icon 1513. Returning to the flowchart of FIG. 17, selection of the submit icon 1513 equates to step 1770. The OMS then stores the order as the Current Order for the user in the user account at step 1980.

Again, in the illustrated embodiment, a user may have only one Current Order, defined as the order most recently submitted to the OMS Server 910 by a particular user that has not been checked in. Thus, if there is already a Current Order stored in the system for the user that has not been checked in, the order setup process begins with that Current Order (e.g., the items left in the basket, but not checked out). In some embodiments, the OMS component application 1118 will store an "in-process" order even if it was never submitted, such that the system will pick up where it left off in the order setup process. Note again that no charges are applied to the user's payment method at the time or order submission, and the venue is still not aware of the order. The order is "on hold" until the user arrives at the venue.

Figure 29:
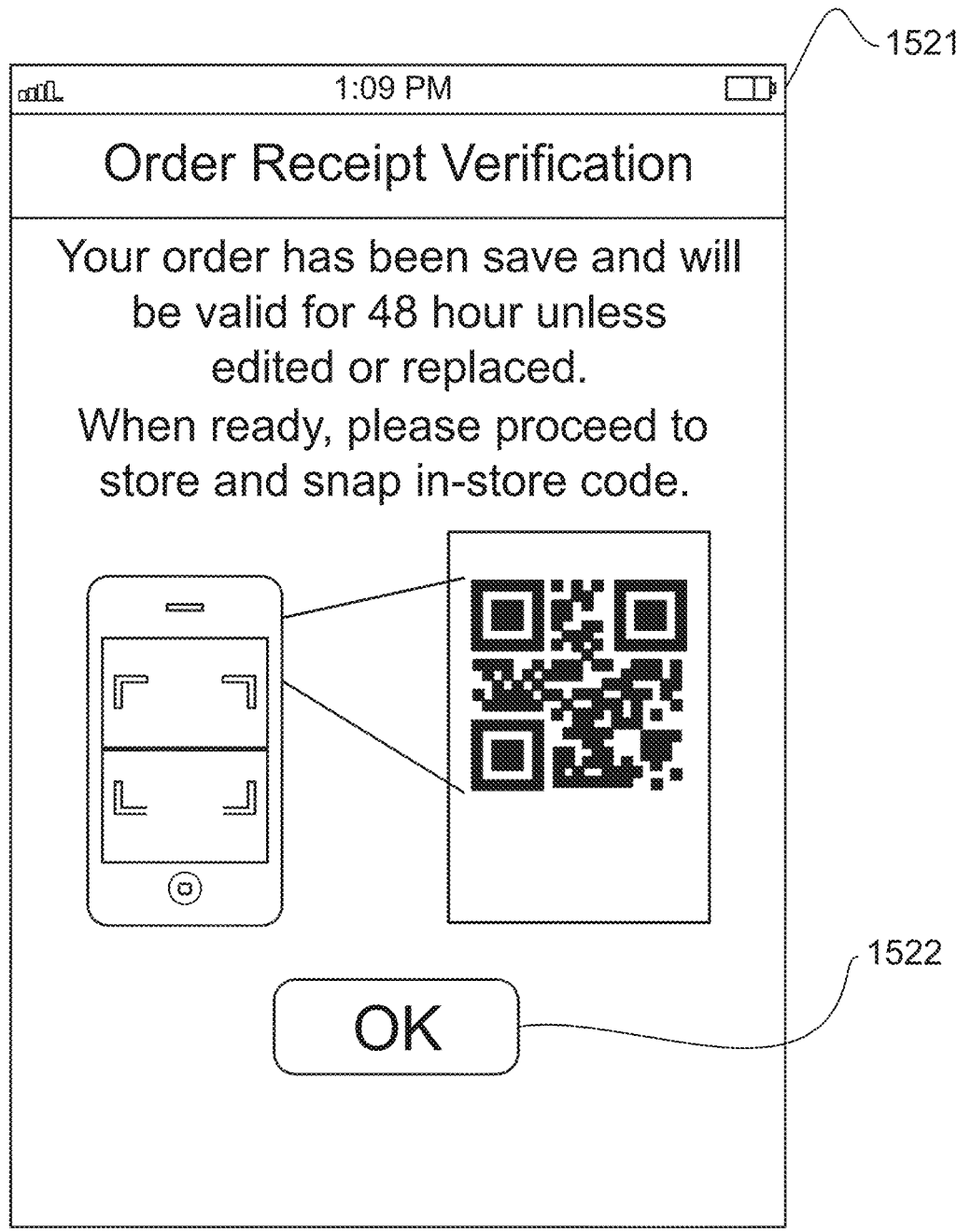
FIG. 29 illustrates an example of an order check-in screen used by the order management system in accordance with a particular embodiment.

Though not listed as a step in FIG. 17, in some embodiments, the OMS server 910 may send receipt verification data back to the mobile user device 940 acknowledging receipt of a new Current Order. This may be communicated to the user by the OMS application component 1118 through an order receipt verification screen 1521, such as that shown in FIG. 29. This screen provides the user with instructions on checking in the order, and (though not on the screen of FIG. 29) may also remind the user that they have not actually been charged yet. Rather, the user's order is "on hold," and will be so until it is checked in. In some embodiments, the receipt verification screen may also provide a timeline for which the current order will be valid. In the example shown in FIG. 29, current orders are only maintained for 48 hours. Thus, if the order is not checked in within that timeframe, it will be automatically deleted from the user's account on the OMS server 910. The receipt verification screen 1521 is asking the user to acknowledge this instruction by selecting the OK prompt 1522. Selection of this prompt would typically close the OMS application component 1118 until re-launched by the user upon arrival at the venue.

Figure 18A:
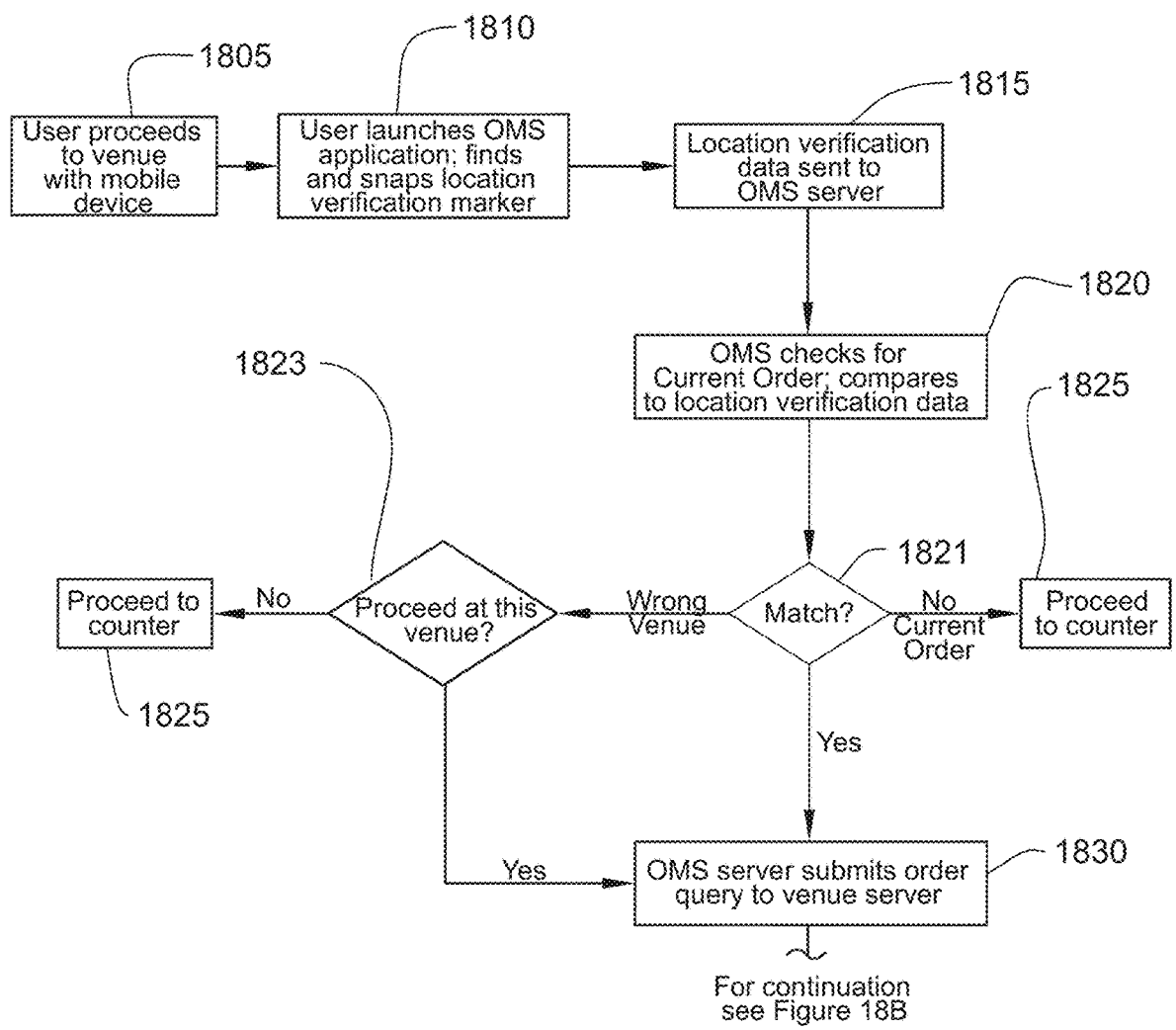
FIG. 18A is the first portion of a two-part flow chart illustrating an embodiment of a process for checking in and receiving an order in accordance with the invention.
Figure 18B:
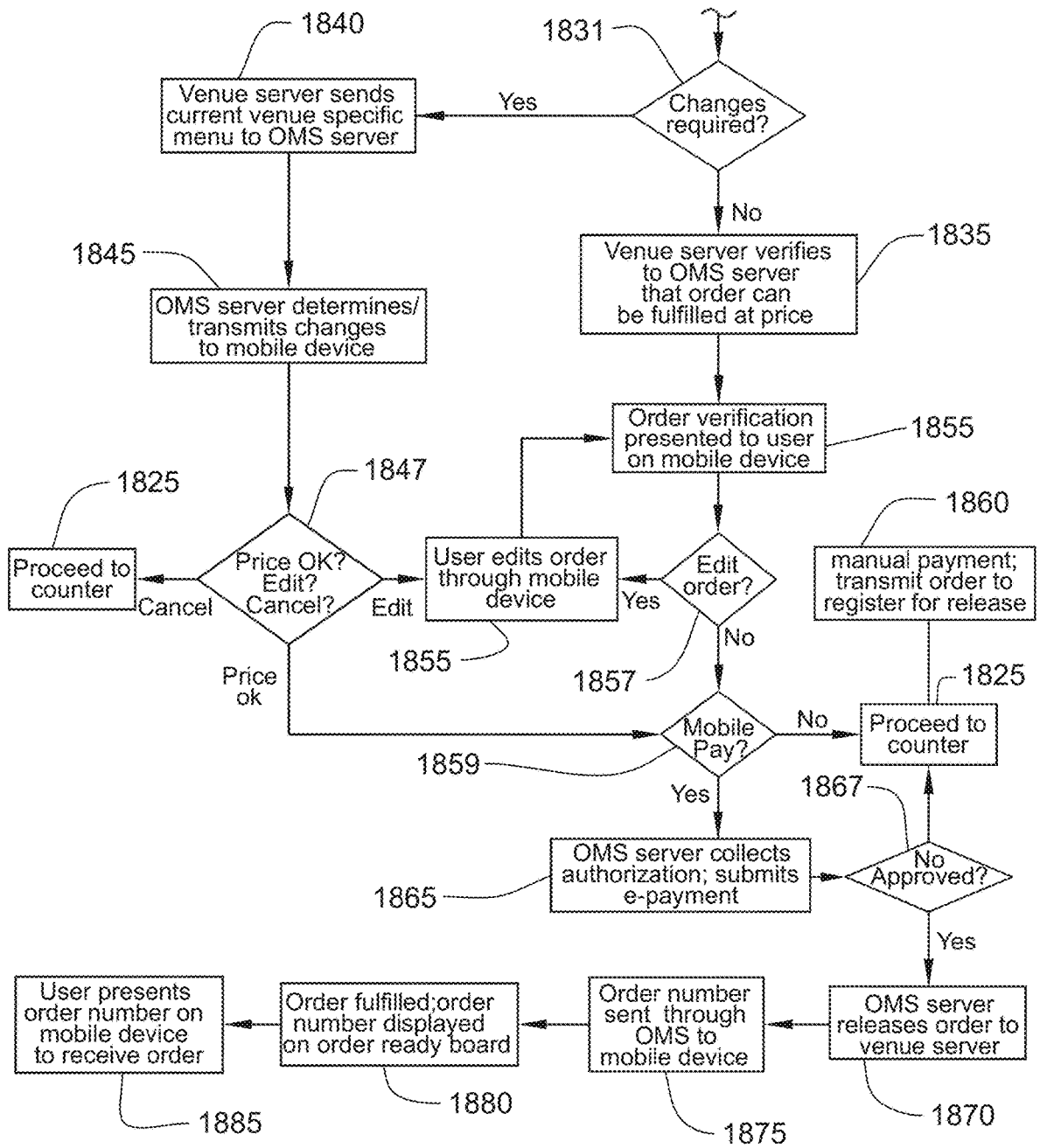
FIG. 18B is the second portion of a two-part flow chart illustrating an embodiment of a process for checking in and receiving an order in accordance with the invention.

FIGS. 18A and 18B provide a flow chart illustrating an embodiment of the process for checking in and receiving an order in accordance with the present invention. As discussed above, this is the second of the two "sub-processes" in the OMS order process. Once a user has completed the order generation and submission component of the process discussed in association with FIG. 17, the user begins the process flow of FIG. 18A at step 1805 by proceeding to the selected venue with their mobile user device 940 (unless the user is already there). While this may be nearly immediate (such as if a user generates and submits an OMS order while standing inside the venue), it need not be. In fact, the OMS 900 is designed under the assumption that the order and submission will take place at a first time, and that the steps in FIGS. 18A and 18B will take place at a later time, and in a different location.

Figure 30:
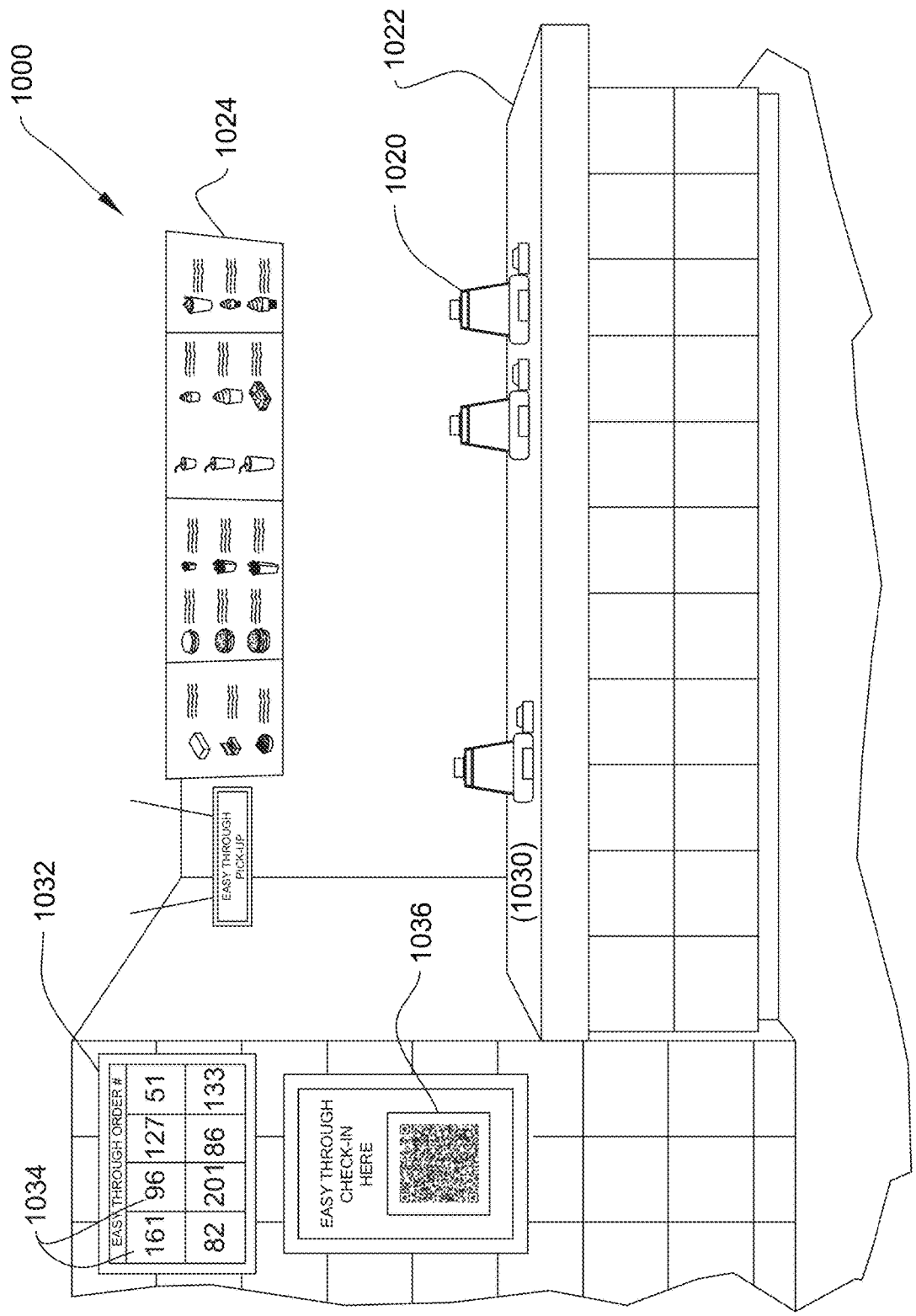
FIG. 30 depicts the layout of an order pick-up counter inside a restaurant venue according to a particular embodiment.

For explanation purposes, FIG. 30 is an illustration of the inside of a potential venue. Specifically, FIG. 30 illustrates a traditional pick-up counter 1022 at a quick service restaurant 1000. The counter features three point of sale (POS) registers 1020, and a traditional menu board 1024 behind the counter. There is also an order ready board 1032 showing order numbers that are ready for pickup. However, this restaurant is non-traditional in that it offers an OMS pickup location 1030 and a location verification marker 1036. In the illustrated embodiment, the location verification marker 1036 comprises a QR Code that uniquely identifies the venue at which it is located. The code may also uniquely identify a location at the venue, e.g., curb-side, drive-thru, or at the pickup counter, etc. This is preferably done passively, without any hardware or battery required.

For example, the location verification marker 1036 could simply be a poster hanging on the wall. In fact, because the location verification marker need only be a passive, lasting image, a venue might have several identical or nearly identical markers, such as, for example, one in a dive thru lane, one in the store, and even several at curbside locations in the parking lot. Thus, in such an embodiment, there is no requirement to place any unique hardware at the venue location. This provides advantages over prior systems that required things such as the device reader of Pentel, or the bar code scanner of the previously discussed Carroll application. Notably, the location verification marker 1036 is not limited to displaying a QR code, but rather could display any location-identifying indicia.

At step 1810 of FIG. 18A, the user has arrived at the venue and launches the OMS application component 1118 on the user's mobile device 940. The user then proceeds to the appropriate location verification marker 1036 which, as discussed above, could be in the drive thru lane, at a curbside location, or inside the store, depending on the embodiment. In the case of delivery, available in some embodiments, the location verification marker 1036 could be at an off-site location acceptable to the venue, at which the user will take receipt of the order via delivery from the venue. In alternative embodiments, as explained below, the check in process for delivery does not necessarily utilize a location verification marker.

Upon launching the OMS application component 1118, the user will be prompted to sign in with the OMS server 910, as previously discussed. Though, in some embodiments, certain functions such as menu review and setup can be performed after declining to sign in, sign is required to check-in a Current Order. Once signed in, the user will arrive at the welcome screen 1421, where they can select the check in order icon 1424 (see FIG. 19). This action will cause the OMS application component 1118 to display the snap store code screen 1531, such as that shown in FIG. 31.

Figure 31:
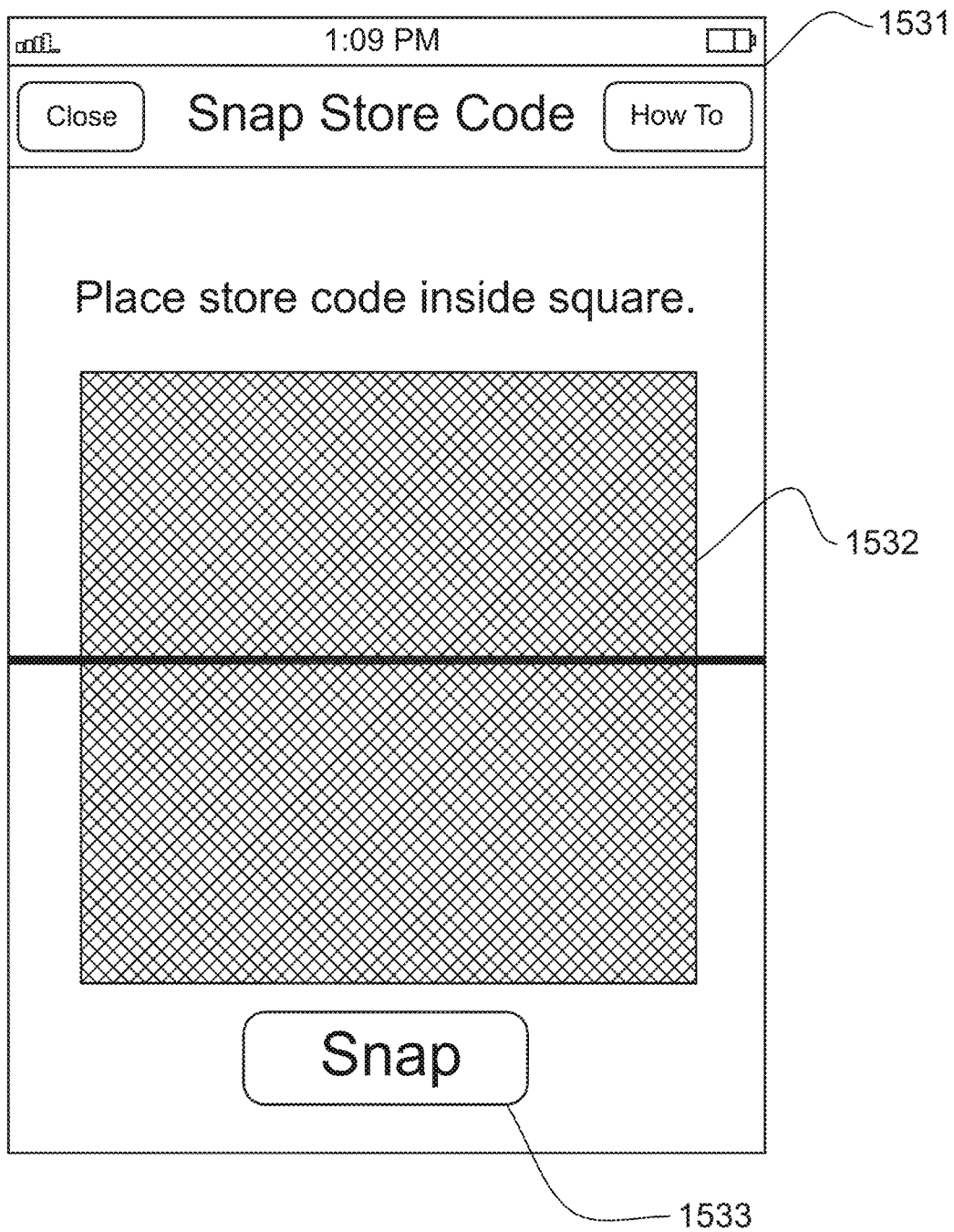
FIG. 31 illustrates an example of a screen for use in capturing a location verification marker used by the order management system in accordance with a particular embodiment.

FIG. 31 illustrates a screen having a central window or view field 1532. The user must aim the mobile user device 940 in a fashion such that the location verification marker 1036 appears in the view field, and then press the snap icon 1533. This causes the OMS application component 1118 to capture an image of the location verification marker 1036, which is then, at step 1815 of FIG. 18A, transmitted via wireless network communication application 1124 of the mobile device 940 to the remote OMS server 910.

Essentially, by taking this action, the mobile user device 940 is capturing location verification data from the location verification marker 1036 that can be used to identify to the OMS server 910 that the user is, in fact, at the venue and ready to receive the Current Order. While there are other ways to do this based on the particular capabilities of the mobile user device 940, it is becoming a common feature for personally owned mobile devices to come equipped with a camera or lens feature. Given that the device 940 will be capable of downloading and installing the OMS application component 1118, it should similarly be capable of downloading and installing a commonly available QR Code reader application, such as, for example, QR Droid from DroidLA. Thus, it is not significant whether the verification data reader application 1120 is a sub-component of the OMS application 1118, or if it is a stand-alone application that can be called and used in association with the OMS 900. What is important is that the mobile device 940 be capable of capturing location verification data and submitting it to the OMS server 910, as proscribed in step 1815 of FIG. 18A.

At step 1820, the OMS server 910 reviews the location verification data received from the mobile user device 940. Because the user has already signed in, the OMS server 910 can check for and access the user's Current Order from the user's account. If there is no Current Order stored in the user's account, the check-in process fails. A user must have created and submitted an order for that order to be checked in. Thus, decision step 1821 of FIG. 18A accounts for this. If there is no Current Order (or some other critical OMS data failure), the OMS server 910 returns an irreconcilable error to the mobile user device 940, causing the OMS application component 1118 to generate a message directing the user, at step 1825, to proceed to the counter and place their order in the traditional manner, or to set up and submit a new mobile order on the spot.

Provided that there is a Current Order for the user in the user's account on the OMS server 910 (or its associated database), the OMS server 910 reviews the Current Order to determine if the venue selected in that order matches the venue identified by the verification location data received from the mobile user device 940. If the venue is correct, the process proceeds to step 1830. What happens if the locations do not match depends largely on the settings of the OMS 900. In some cases, the process will proceed anyway, albeit with a higher likelihood that the order will need to be edited. In other cases, the user may be instructed of the error and asked for some type of security verification information to ensure they are authorized and wish to proceed. In the case of FIG. 18B, if the locations do not match, the OMS server 910 identifies the location mismatch to the user and, at decision point 1823, queries the user whether they want to have the order fulfilled at the current location. If the user declines, the system defaults to recommending, through the mobile user device 940, that the user proceed to the counter (step 1825) and place an order manually. What becomes of the Current Order in such a scenario would again be up to the specific programming of the embodiment. Because it has not been fulfilled, the Current Order would likely remain in place unless the user requests that it be deleted. Assuming the user agrees, at decision point 1823, to have the order fulfilled at this different venue, the process proceeds back on track to step 1830.

At step 1830, the OMS server 910 submits an order query to the venue server 920. This is the first time in the OMS process that the venue server 920 (or any venue-specific component) has seen the items being requested by the user. The venue server 920 reviews the order and verifies whether it can be fulfilled at the quoted price at the present time. If no changes are required, and the order is acceptable as submitted (including total price), the venue server 920 transmits an order acceptance communication to the OMS server 930 at step 1835. However, the venue server 920 does nothing further with the order at this point. The order has not been released for fulfillment. If the venue server 920 determines that changes are required to the order, it responds to the OMS server 930 in the illustrated embodiment by transmitting the latest venue specific menu data at step 1840. This response requires minimal computation and takes processing load off of the venue server 920, which may not be equipped to handle large external processing loads and likely has primary responsibilities for managing and controlling other computer-based systems within the venue. Instead, at step 1845, the OMS server 910 performs the heavier processing to determine what elements of the Current Order need to change to conform with the current venue specific menu data, and transmits this information to the mobile user device 940. The OMS application component 1118 then presents these required changes to the user and asks if the user would like to proceed.

Figure 32:
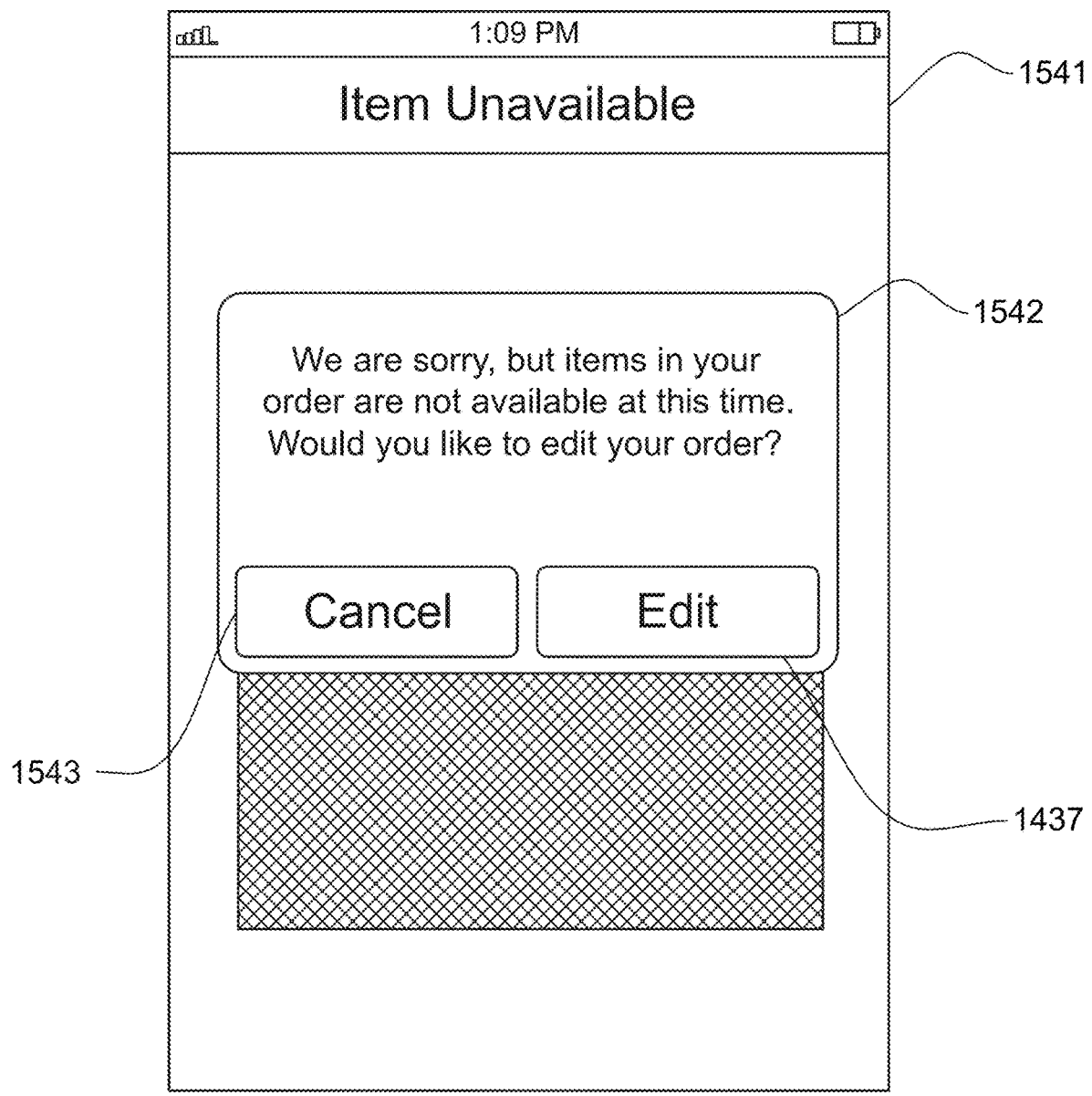
FIG. 32 illustrates an example of an item unavailable screen used by the order management system in accordance with a particular embodiment.

FIG. 32 provides an example of an "item unavailable" screen 1541 that might be used by the OMS 900 to alert a user of the need for a change. In other cases, more detailed information might be provided. For example, if a restaurant is no longer offering a beverage ordered by the user, but all other menu items are available, this fact will be communicated to the user, perhaps along with recommended replacement beverages. While simplified, the item unavailable screen 1541 presents essentially the same options to the user—they can edit the order or cancel. Message box 1542 provides the user with an option to select cancel icon 1543 to end the OMS process, or edit icon 1437 to enter changes to the current order.

Though FIG. 32 would be presented at decision box 1847 in the flowchart of FIG. 18B, decision box 1847 also addresses the situation where all of the items are available, but at a different total price. Thus, there are three options for departing from decision box 1847. The user can cancel the OMS order (such as by selecting icon 1543 of FIG. 32), edit the OMS order (such as by selecting icon 1437 of FIG. 32), or, in the case where only price has changed, can agree to the new price. If the user is not interested in editing the order (whether due to the new price, or the unavailability of desired item(s)), the OMS 900 defaults to step 1825 and displays the "proceed to counter" screen discussed above (not shown). In this case, because the Current Order has been rejected by the user at its current price, or includes unavailable items, the OMS server 910 deletes the Current Order from the user's account.

If the user decides to edit the current order, the user will be presented with the present venue specific menu from which to select replacement items. Though not shown, this process would involve the user working through the same series of screens as those used to initially set up the order, such as, for example, the screens shown in FIGS. 23-26. At step 1850, the user selects updated menu items from the current venue specific menu and submits order data identifying those items via the mobile user device 940 to the OMS server 910. Because these items are all from the current venue specific menu, there is no need to check with the venue server 920 as to availability, so the process loops back on track to an order verification screen 1551 at step 1855.

In cases where only the price has changed and the user is comfortable with the new price, the process may go to the order verification screen 1551, or may bypass it. For example, the OMS application component 1118 may present the user with the items being ordered when it presents the updated prices to query the user if the prices are acceptable at decision point 1847. This is essentially what the verification screen 1551 does, and there is no point in showing the user this data again if they just approved it. Accordingly, as shown in FIG. 18B, the process may proceed directly to decision point 1859.

Figure 33:
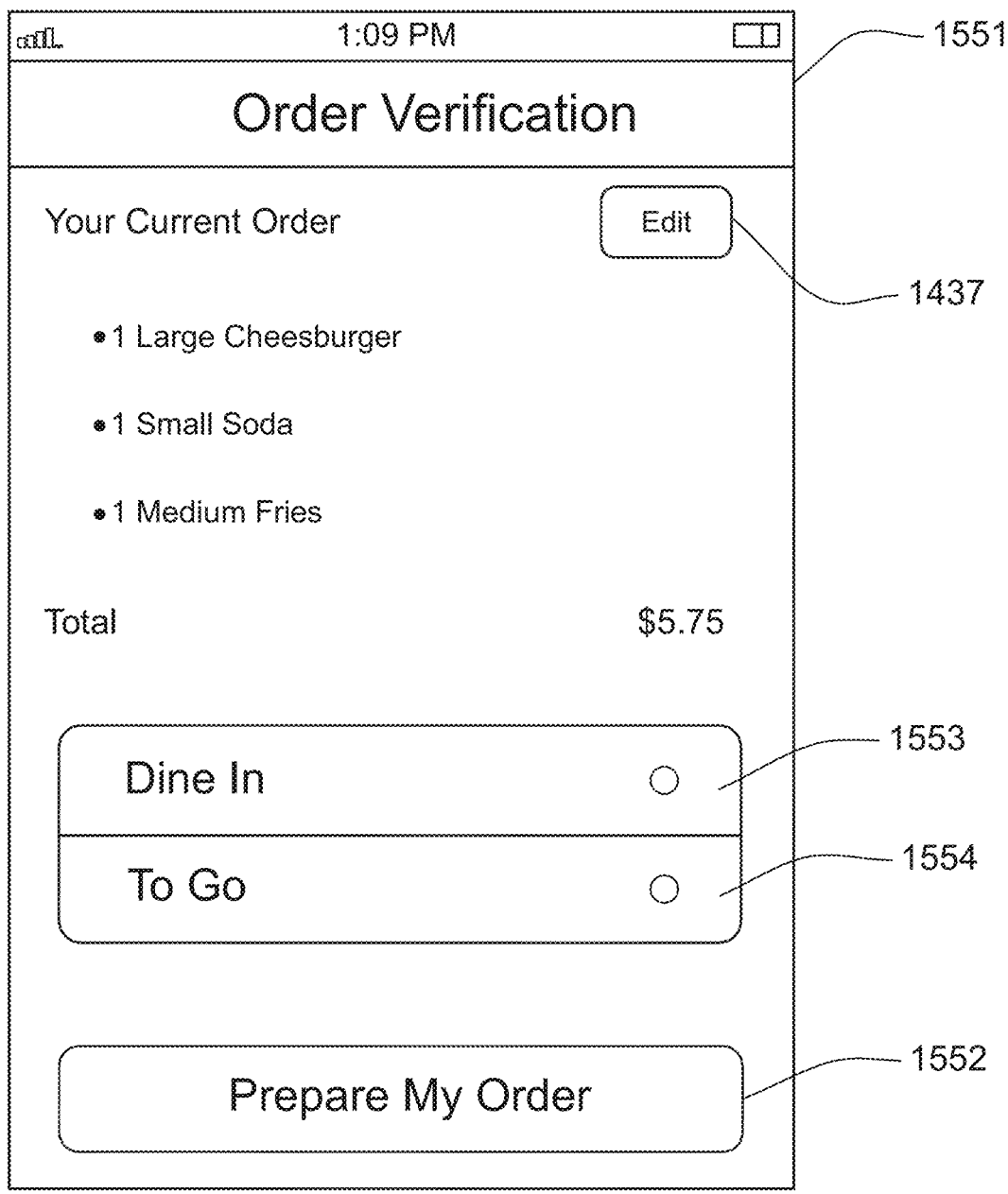
FIG. 33 illustrates an example of an order verification screen used by the order management system in accordance with a particular embodiment.

Reverting back to decision point 1831, if the venue server 920 approved the pricing and availability of the Current Order, this is communicated from the venue server 920 to the OMS server 910 at step 1835 and then, at step 1855, the OMS application component 1118 on the mobile user device 940 presents an order verification screen 1551 to the user. As discussed above, this screen may also be reached via a forced edit of the Current Order. The order verification screen 1551, as exemplified in FIG. 33, shows the user the items ordered along with their current prices. Where the receipt method selected is "pickup at counter," there is also a dine in icon 1553 and a to go icon 1554. A selection of one of these options was already made during order setup so there is a default in place if no selection in made. It is offered again here because this is a decision that is likely to have changed. In embodiments that utilize different location verification markers 1036 in different locations (e.g., curb-side, drive-thru, etc.) at the same venue, the system skips these options and schedules the order based on which marker 1036 was scanned in and received. Because the order has not yet been released to the venue, making a change from "to go" to "dine in" at this point does not affect the venue fulfillment process.

From the order verification screen, the user may either select edit icon 1437, or "prepare my order" icon 1552. This decision corresponds to decision box 1857 on FIG. 18B. Depending on how the process arrived at decision box 1857, the OMS server 910 may have to retrieve the latest venue specific menu data from the venue server 920 at this point (e.g., if the venue server 920 validated the Current Order without change). The process then joins the edit order path at step 1850 and will continue to loop until the user is satisfied with the order. Choosing the "prepare my order" icon 1552 on screen 1551 allows the process to proceed.

If authorization is given to proceed, the OMS server 910 attempts to collect payment. Though payment could be collected after the order is released to the venue, it is preferred that payment be received and verified first. From here, if the Current Order specifies a payment method that is electronic (such as use of a pre-authorized debit card, etc.), the OMS server 910 may submit for payment against the payment method automatically. However, it is preferred that, as shown with decision step 1859 in FIG. 18B, one last query is made to the user as to whether to proceed with payment submission. This step may also include retrieving some type of pin or code from the user wherein the pin is needed to enable the financial transaction. For security reasons, such a pin would not be stored in the user's account on the OMS server 910.

Once the OMS server 910 collects the proper authorization at step 1865, it then submits the authorization for payment. Preferably, the OMS 900 will connect to an outside, pre-existing system to actually effect the financial transaction. If payment is approved and the transaction goes through at decision point 1867, the process continues. If the transaction request is refused, the OMS server 910 may try again, or prompt the user for a different form of electronic payment through the mobile user device 940. However, ultimately failures to collect in this manner will result in the "proceed to counter" screen (step 1825). Where the authorization is successful, but for less than the total amount due, the user will be prompted for an alternative method to pay for the balance. For example, if a selected stored value card only has five dollars remaining, that value is reduced to zero and the remaining order balance must be satisfied through other means.

Figure 34:
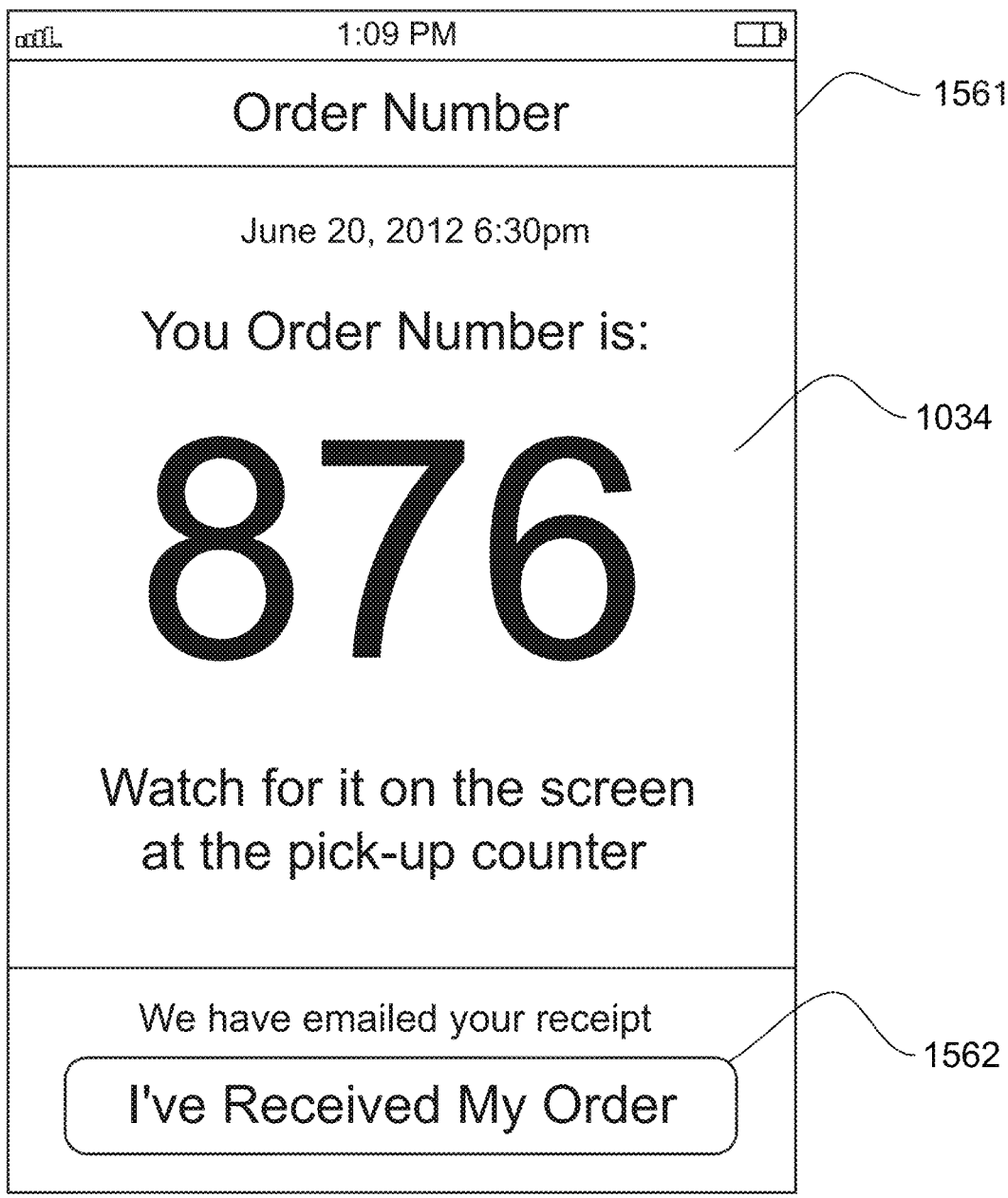
FIG. 34 illustrates an example of an order number delivery screen used by the order management system in accordance with a particular embodiment.

Once the proper amount is collected, the process continues to step 1870, where the OMS server 910 releases the order to the venue server 920 to fulfill the order. The order is now released into the processing queue along with all traditionally received orders, and an order number 1034 is generated. At step 1875, the restaurant server 920 sends the order number 1034 to the OMS server 910, which, in turn, forwards it to the mobile user device 940 where the OMS application component 1118 causes it to be displayed, along with receipt instructions on an order number screen 1561. An example of an order number screen 1561 is provided in FIG. 34. There is also shown an indication that a payment receipt has been emailed to the user's email address. This action can be performed by the OMS server 910, which would receive an electronic version of the receipt from the venue server 920, or, alternatively, the OMS server 910 could generate the electronic receipt from the information it has about the current order. Thus, there is no need to create a paper receipt, which adds yet further to the efficiency of the OMS 900.

At step 1880, for orders to be received inside the venue, the order number 1034 associated with that order is displayed on the order ready board 1032 once the order is prepared by the venue personnel. Though labeled with "easy through" in FIG. 30, the order ready board 1032 is not necessarily equipment that is unique to the OMS 900. Many venues may already have such a device to alert customers when orders placed through traditional means are ready for pickup. Thus, this is not necessarily incremental equipment that is required to implement the OMS 900. For that matter, the traditional method of venue personnel calling out an order number when ready could also be used. Finally, at step 1885, the user presents their mobile user device 940, with the order number screen 1561 displaying the proper order number, to venue personnel at the OMS pickup location 1030 to receive their order. If the order is to be received at curb-side or via the drive-thru, though no order ready board is used, the user still presents the order number screen 1561 on the device 940 to verify payment.

Reverting back, there are several ways that the user can wind up paying via traditional methods. If the Current Order called for mobile payment, but the user has now changed their mind and declines the query at step 1859, or if payment at counter was selected as the payment method for the Current Order in the first place, OMS application component 1118 will instruct the user to proceed to the counter at step 1825. This may also happen even if an electronic payment method was approved where the total dollar amount is above some amount at which a hand signature is required. However, this does not mean the process converts to a completely manual order entry. Though the user must pay the cashier by traditional means (or otherwise require venue personnel involvement to receive a signature, etc.), the order, which is fully setup in the mobile user device 940 and has already been verified as correct by the venue server 920, may then be received to the cash register/POS machine 1020 and immediately released for fulfillment.

This option, available in certain embodiments, requires coupling the mobile user device 940 to the POS machine 1020. Preferably, this is done wirelessly, such as by a local data transfer protocol (infrared, Bluetooth, etc.), so as to limit the need for physical hardware at the venues to accommodate the OMS 900. However, a hard-wired scanning device, reader, or docking station could also be used. This order transfer after manual payment is shown as step 1860 on FIG. 18B. Though not show, from this point the fulfillment and order receipt process would proceed much like as described above, except data would be transferred directly from mobile device 940 to POS 1020 instead of through the OMS server 910.

In an alternative embodiment where it is desired to prevent direct communication between mobile user devices and venue specific hardware, the POS 1020 could be enabled such that the cashier could initiate a signal from the POS that would travel through the venue server 920 to the OMS server 910 identifying that the user has paid, the order has been released for fulfillment, and that further communication between OMS server 910 and the mobile user device 940 may proceed (such as from step 1875 as discussed above). In this case, an order number 1034 would also be transmitted along with the communication from POS 1020 through the OMS server 910 to the mobile user device 940.

Figure 35:
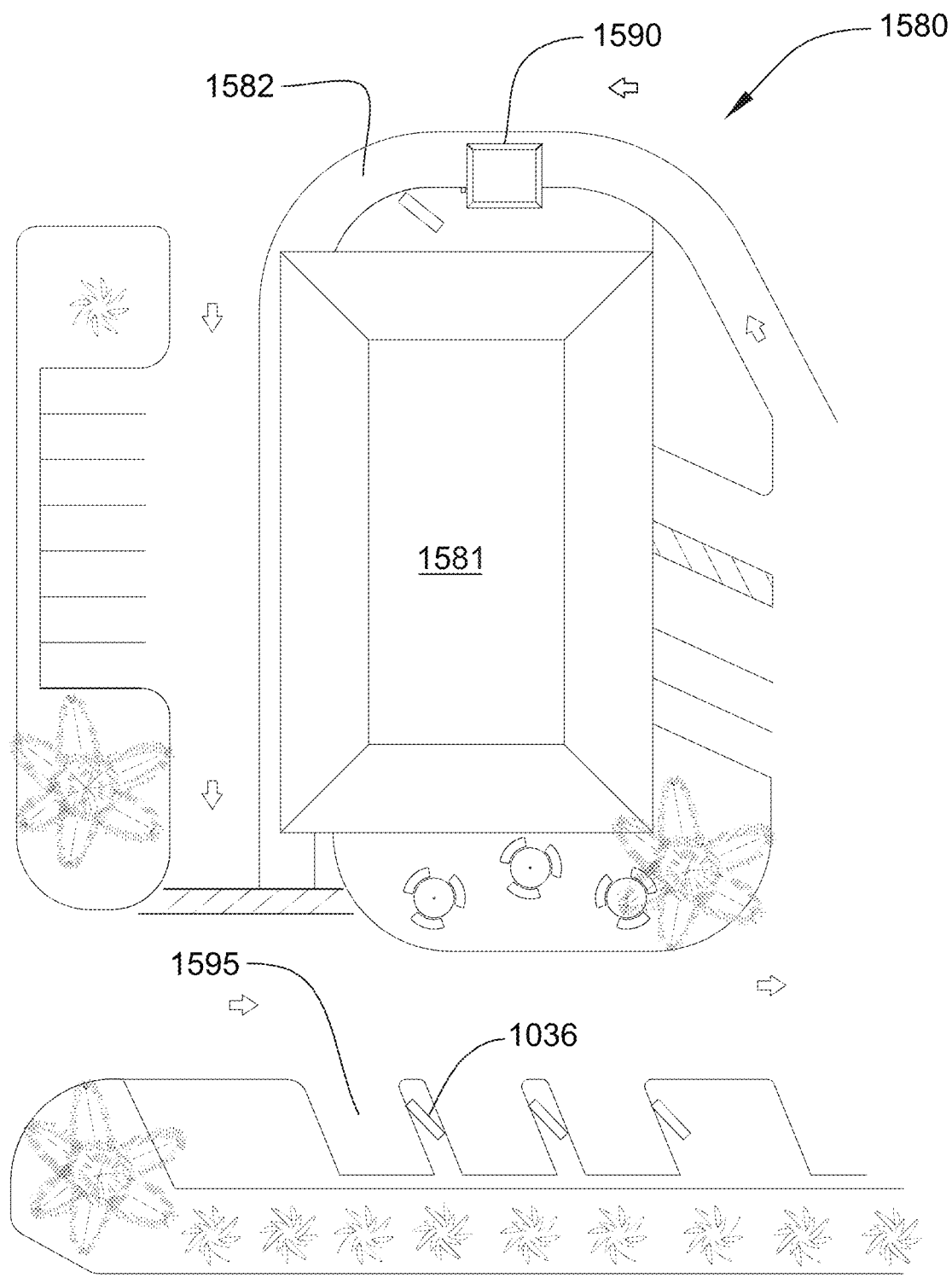
FIG. 35 depicts the layout of the exterior of a restaurant venue according to a particular embodiment.
Figure 36:
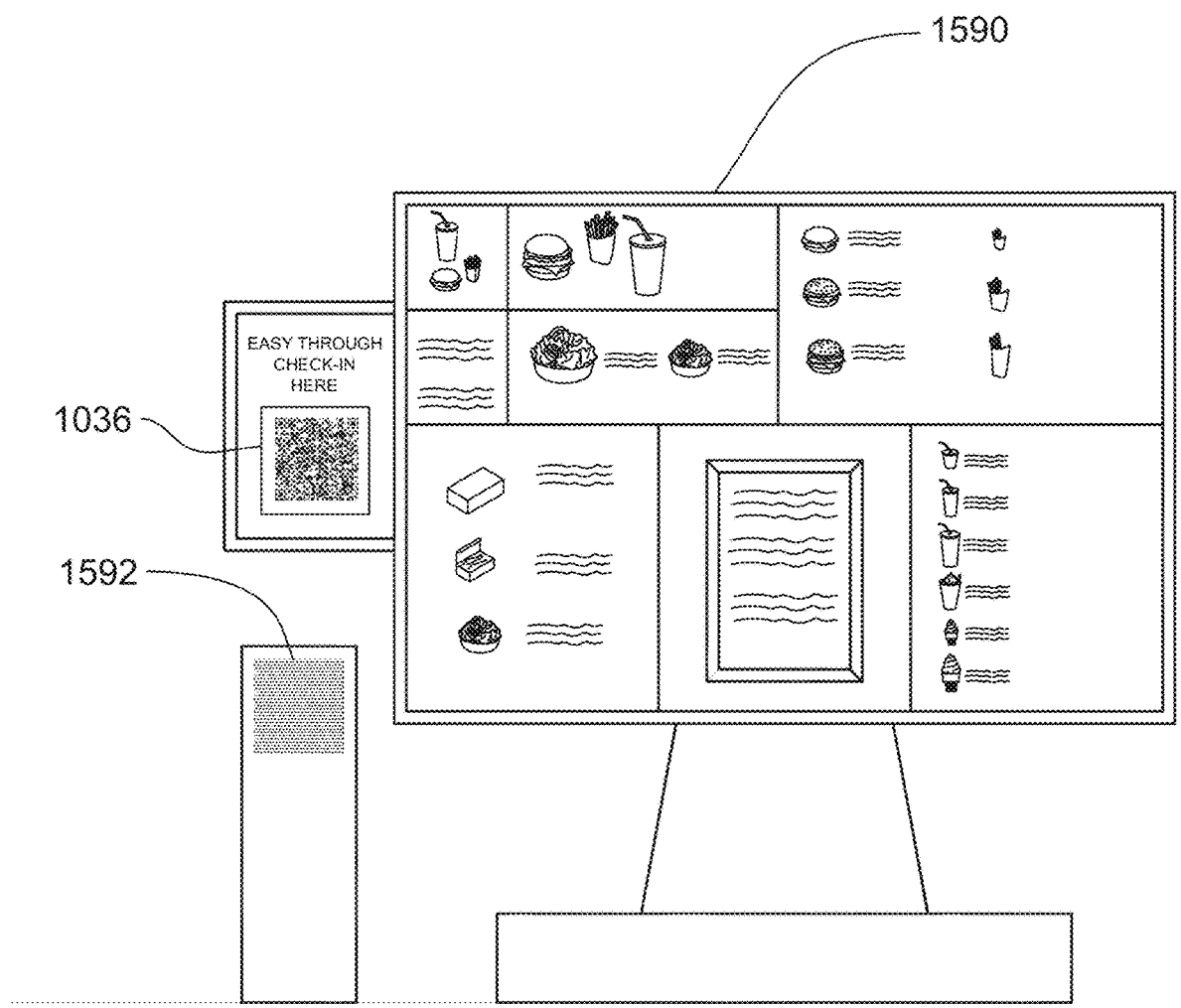
FIG. 36 depicts a location verification marker along a drive-thru lane of a restaurant venue according to a particular embodiment.
Figure 37A:
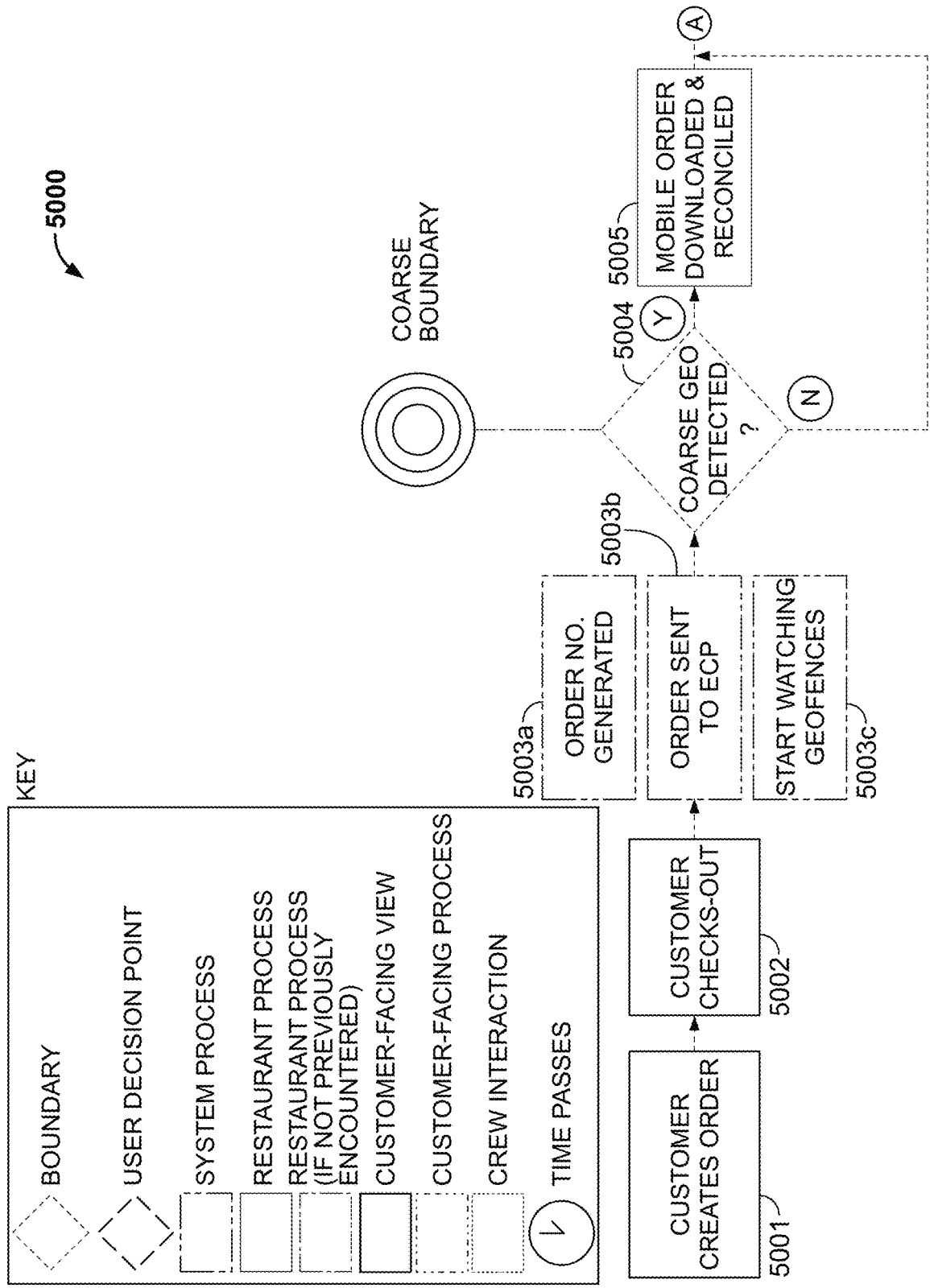
Figure 37C:
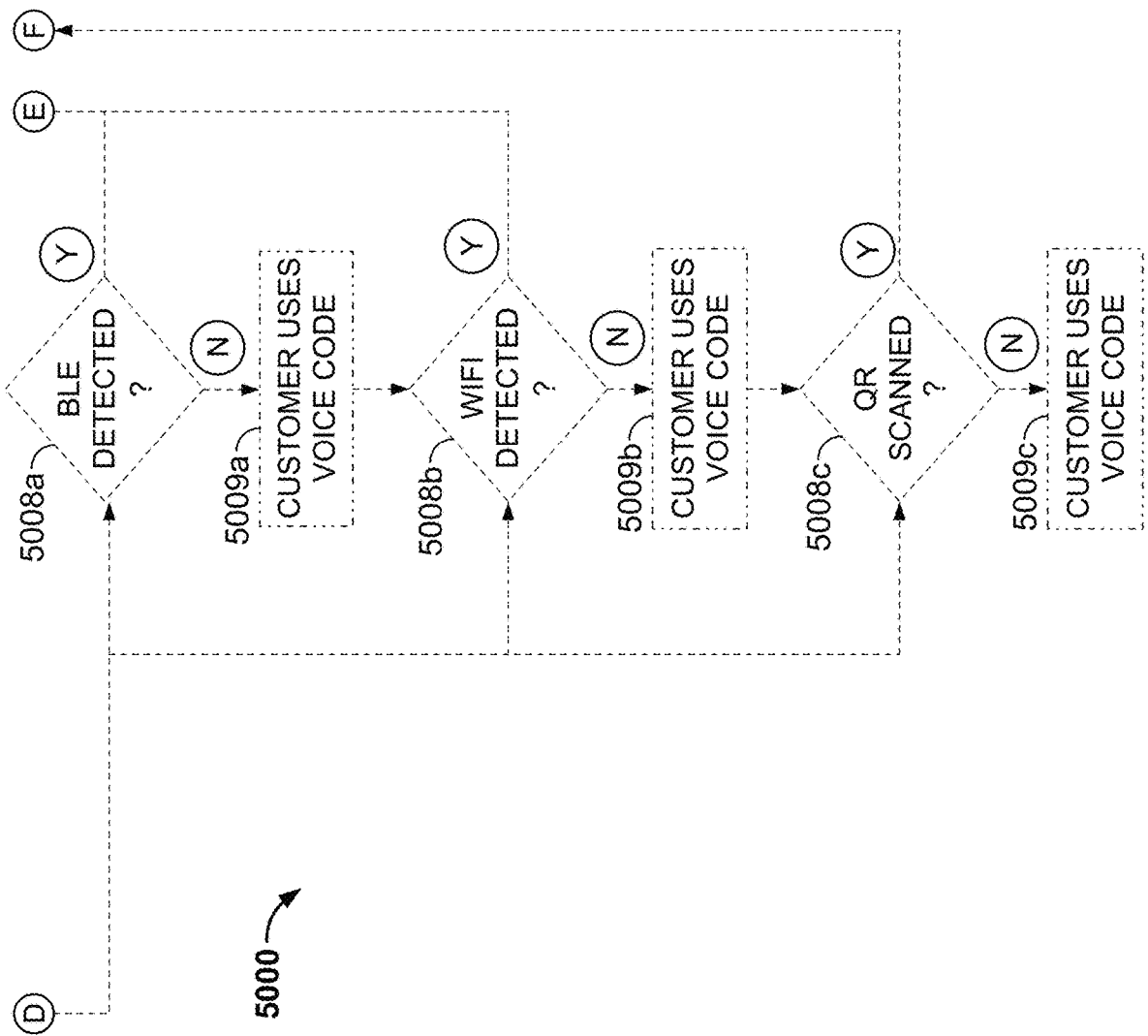

In the example discussed above in the process flow associated with FIGS. 18A and 18B, the Current Order designated pickup at counter as the method of order receipt. However, as discussed above, there are other options in some embodiments, such as pickup at a drive thru window, delivery to a curb-side location on the venue premises, or delivery to a location off the premises. The latter option will be discussed further below, but receipt via drive thru and curb-side delivery will be discussed in association with FIGS. 35 and 36. FIG. 35 shows an aerial view of a venue property 1580, such as a quick service restaurant. The restaurant building 1581 is surrounded by parking spaces and a drive thru lane 1582. Arrows are used to show the direction of traffic flow A conventional menu board 1590 is located along the drive-thru lane 1582, which is used to receive orders in the traditional manner. A closer, frontal view of the menu board 1590 is shown in FIG. 36. As can be seen in FIG. 36, the menu board 1590 has been modified to also include a location verification marker 1036. As discussed above, this need be nothing more than a large QR code that is used to check in an order with the OMS 900. Since this location verification marker 1036 is outside it will need to be protected from environmental factors, for example, by printing it on a metal sign, covering a traditional poster in laminate, and/or providing some shade to prevent sun-fade.

Checking in an OMS order in the drive-thru lane proceeds in basically the same way as shown in the process flow of FIGS. 18A and 18B, except that there would be no order ready board 1032 and no OMS pick-up point 1030. An order number 1034 would still be generated and could still be sent through to the user's mobile device 940 for use in showing a venue employee at the pickup window (not shown). Also, if there were problems with or changes desired to the Current Order (such as at decision points 1831 or 1857 of FIG. 18B), the OMS 900 may be set up to more quickly instruct the user to place the order using the traditional menu board 1590 and relay the order to the venue personnel through the speaker box 1592 instead of trying to fix the problem or make the change via the mobile user device 940 while sitting in the drive thru lane blocking traffic. The "proceed to counter" step 1825 of FIG. 18A or 18B would instead be an instruction to proceed with placement of the order through the speaker box 1592. In some cases, where space allows for a double drive thru lane, OMS traffic might be directed into an OMS designated lane to help keep things running smoothly for non-OMS traffic.

The curb-side locations 1595 of FIG. 35 have been designated as parking spots for OMS 900 users. These spots could be located anywhere convenient within the parking lot of the venue where a location verification marker can be situated. As shown in FIG. 35, each spot has its own location verification marker. The markers might be slightly unique, such that they can convey to the venue personnel (from the mobile user device 940, through the OMS server 910 and venue server 920 to a venue POS machine 1020 on the inside of the store) exactly which curbside spot the user is occupying. Alternatively, there may be a single location verification marker 1036 for curb-side check-in that users scan as they pass by, and then instructions are sent from the venue server 920, through OMS server 910 to the mobile user device 940 instructing the user where to park and await their order. Because there is no one waiting in line behind the user in the curb-side scenario, there is more allowance for a user to correct or change an order from their vehicle while at the venue property 1580. However, if an error occurs that does not allow the Current Order to release, the user will be instructed to proceed with a manual order by entering the venue building 1581 or using the drive thru lane 1582.

In some cases, some venues within an organization will not offer OMS use via drive-thru or curbside, while other venues within the organization will. This problem can be dealt with during order setup. For example, this information could be conveyed to a user during venue selection (step 1715 of FIG. 17, for example) using a venue details screen such as that shown in FIG. 22. Based on the venue selection made, the OMS server 910 would only allow selection of a receipt method (step 1740 of FIG. 17, using a screen such as that of FIG. 27) that is allowed at that venue.

The situation gets slightly more difficult when a venue only offers OMS via curbside or drive thru at certain times. For example, a venue might offer OMS curbside during peak hours (so as to handle more customers simultaneously and cut down on line length), and might not allow OMS via drive thru during those hours (because the drive thru traffic is likely to be heavy already). While this information may be conveyed to a user on a venue details screen such as that of FIG. 22, that does not prohibit the scenario where the user sets up an OMS order for curbside or drive thru and then tries to check in the Current Order outside of those windows at the wrong pickup point. In such a case, there will need to be an additional check done by the OMS server 910 at step 1820 of FIG. 18A, for example. If the OMS server 910 determines that the Current Order calls for a receipt method only allowed during a certain time window and the user is trying to check in the Current Order outside that time window, the OMS server will cause the OMS application component 1118 on the mobile user device 940 to provide an instruction that the user must pick up the order at the OMS pickup counter 1030 inside the store. However, the user could otherwise proceed with checking in the order in accordance with FIGS. 18A and 18B from their vehicle.

In the off-venue delivery scenario, use of a location verification marker 1036 is less important. This is because delivery will be to a pre-defined location. This may be one of several locations designated by the venue (which would be provided to the user for selection from a list during the order setup process), or could be to a location specified by the user. Just as with Quick Orders, the user could have pre-defined locations (favorite locations) stored in their user account on the OMS server 910 to chose from. In some cases, where available, the OMS 900 could select the venue that will produce the goods to be delivered based on the user specified delivery location. For example, the OMS server 910 could select the venue server 920 to communicate with based on its physical proximity to the user-designated location. This selection would need to take into account that some venues might not offer delivery, and others may not be staffed to make deliveries at a particular time. Thus, there may be a call from the OMS server 910 to the venue server 920 for the venue selected to check to see if (1) deliveries are presently being made and (2) if delivery to the user-designated location is acceptable. For example, the administrator for the venue may have set the venue server 920 to deny all requests for delivery to locations outside of a 10 mile radius. If the OMS server 910 cannot find a venue willing to make the delivery to the user-defined location, it will signal the OMS application component 1118 on the user's remote device 940 to instruct the user that delivery is unavailable.

Another difference with off-venue delivery is that the user should specify up front when they want to take delivery. In cases where the user is coming to the venue, it is not so important to know when that will be because the order can be prepared upon the user's arrival. In the case of delivery, it would not be ideal for the user to "check-in" and request delivery (especially to a user-defined location) at some random later time, because the venue may not be staffed to make the delivery at that time and the "proceed to counter" default option would not be feasible. Thus, where delivery is selected during the order setup phase, not only must the user select a delivery location, they will ideally be requested to specify a delivery time. The OMS server 910 can then verify that delivery will be available from the selected venue at that time.

Finally, unlike with at-venue receipt, it is preferable with delivery to require payment at the time of order entry and submission. This prevents the risk that a delivery order is placed, prepared, and delivered, but no one is there to receive it or pay for it. Though payment could be accepted via traditional means upon delivery to a user able to show an order number screen 1561 to a delivery person, ideally the user would be required to submit electronic payment prior to order submission. Because there will already be a designated delivery time and venue selected, the OMS server 910 will be able to coordinate with the venue server 910 to determine the final price and availability of items at the initial submission stage. Thus, the steps of FIG. 18 are mostly pulled forward to the setup and submission stage, such that the user receives an order number before ending the session with the OMS application 1118. Then, upon delivery, the user needs only to show the order number to the delivery person and take receipt of the goods. Notably, the OMS 900 may not accept orders for delivery where the total amount is less than some pre-designated amount.

Another option unique to delivery available in some embodiments is a tracking feature that allows a user to determine the status of their order through the OMS application component 1118 on their mobile user device 940 once the order has been placed. For example, at any time after the user has submitted the order, the user can log in to the OMS server 910 and view an order status screen (not shown) that shows the phase of the order preparation (e.g., awaiting preparation, being prepared, en route, etc.). This screen can also provide an estimated time of order arrival to help keep the user informed in the event of a delay. This capability could be enabled by communicating with the venue server 920, which, in turn, could be fed information from the fulfillment section of the venue as to when delivery orders are initiated, completed, and sent out for delivery. The delivery staff member could then carry a GPS-enabled device that is monitored by the OMS server 910, such that an accurate prediction of the delivery time may be updated based on the location of the delivery personnel. In some cases, this system may provide for 2-way communications between the OMS server 910 and the delivery person's device such that the delivery person can receive directions or other instructions from the OMS server 910.

While that completes the description of the principle components of the OMS 900, there are other features, options and differences that may be available in certain alternative embodiments. For example, in some embodiments a user may be able to specify a window during which they intend to check in the order at the order set up stage, such that the OMS server 910 can request a version of the venue specific menu that is expected to be offered at that time. Thus, if the user wants to set up a breakfast order from a quick service restaurant for pickup on his way to work the next morning, he can do so even though it is 10 PM and breakfast items are not a component of the current venue specific menu. Here, there would be an additional option to specify an anticipated check in time, such as between steps 1715 and 1720 on FIG. 17. The user would identify a time the next morning, and the OMS server 910 would then request and receive the breakfast menu from the selected venue. Assuming the user checks in during the proscribed window, everything should run smoothly. If he checks in several hours after the window and breakfast is no longer being served, the system will follow the order correction path starting at step 1840 of FIG. 18B.

In other embodiments, the OMS system 900 may be used to keep track of additional information for users beyond Quick Orders of favorite venues/delivery locations. For example, it could also keep track of order histories, such as what was purchased, on what date, and for what price. It could track when the order was picked up, and where. In the quick service restaurant example, it could also track nutritional information, such as calories in the orders, etc. It could also use the past order history to make product recommendations to the user during the order set up process for new or limited time goods that fit the user's buying habits and profile.

In still other embodiments, particularly for use by organizations that offer stored value cards, the OMS system 900 could be used as a stored-value system in association with, or separate from, that program. For example, a user could purchase "OMS bucks" by authorizing the OMS server 910 to charge some electronic payment card set up by the user and authenticated by the OMS. The amount charged would then be "credited" to the user's account on the OMS server 910. This amount could be displayed to the user through the OMS application component 1118 upon request, and could be used to pay for orders made through the OMS 900. In some cases, third parties could credit the OMS user's account without actually placing any of their own card payment information on the account. In this manner, the OMS 900 could be used as an equivalent to a gift card system that uses traditional plastic stored value cards. Instead of buying a card and having value put on it, the third party would just log in to a gift interface of the OMS 900, select the user they wish to provide the gift, submit payment, and the purchased amount of "OMS bucks" would be credited to the user's account.

It has thus been described how the OMS 900 can be implemented to facilitate the placement and processing of remote orders, even in situations with dynamic menus and conditions, and in a multiple venue environment. Any process descriptions or blocks in figures, such as FIGS. 13, 16, 17, 18A and 18B, should be understood as representing modules, segments, or portions of code which include one or more executable instructions for implementing specific logical functions or steps in the process. Certain process steps may be executed out of order from that shown or discussed, additional steps may be included, or some steps discussed may be bypassed or not used, without departing from the scope of the invention as disclosed, as would be understood by those having ordinary skill in the art.

Pre-Check-in

FIGS. 37 to 45 generally show and illustrate another embodiment of the process for checking in and receiving an order in accordance with the present invention. More specifically, FIGS. 37 to 41 generally show and illustrate an example method 5000 of checking-in a customer to a venue and therein associating the customer with one of a plurality of venue services including lobby service, table service, curbside service, and drive-through service. FIG. 45 illustrates an additional example method 8000 of checking-in a customer to a venue and therein associating the customer with one of a plurality of venue services. It should be appreciated that disclosure made with reference to the method 8000 applies to the method 5000.

As an overview, the method 5000 takes a customer's remotely generated order, associates the order with a particular venue, and then further associates the order with a particular service offered at the venue. It should be appreciated that consistent disclosure related to the above embodiments also applies to the systems and methods discussed below. Some repetitive or cumulative disclosure may be omitted for the reader's convenience. In other words, detailed description of any methods or systems related to FIGS. 1 to 36 applies, where it is consistent, to the methods and systems described below. It should be appreciated that the term "order" may include menu items in addition to other items associated with the order or the customer, such as an identifier of the customer's account, an identifier of the customer's mobile device, various time-stamps, etc.

With reference to FIGS. 9 to 16 and 19 to 29, programs running or executing one or more OMS servers 910, one or more venue servers 920, one or more management servers 930, and one or more mobile device 940 may cooperate to execute method 5000. The mobile device 940 may be operatively connected to a vehicle having one or more processors, memory, a display, one or more antennas, wheels, tires, a motor, a power source (e.g., battery, fuel tank), windows, doors, a windshield, an HVAC system including a refrigeration cycle, displays connected to the processors, and suspensions connected to the wheels. Any screen displayed on the mobile device 940 may be mirrored for display on the vehicle display.

At 5001, a customer creates a customized order at a remote location. The customer may create the order with any suitable method disclosed herein, such as some or all of the steps of FIG. 17. As an example, the customer may create the order via an app running on a mobile device 940. The app may be the OMS application software component 1118, as described in detail above. The OMS application software component 1118 is also referred to as the ordering app 1118, although, as described above, it offers functions above placing orders. The customer's virtual order in the ordering app 1118 includes items selected from a menu displayed in the app. The menu is described in detail above with reference to main menu data and venue specific menu data. The menu data may be populated or amended with any of the methods and systems described above. FIGS. 23 and 24 show some example menu screens. The order may include a price associated with the items, but this need not be the case. The order may include tax based on the associated price, but this need not be the case. In other words, the order may include a price and/or tax marked as blank, to be determined, or estimated.

At 5002, the customer checks-out by finalizing the customized order. In some embodiments, the check-out process confirms that the customer has a valid method of electronic payment on file (i.e., associated with the customer's app account), but does not charge the electronic payment method. As explained in detail above, if the customer lacks a valid method of payment, the method prompts the customer to enter a suitable method. The check-out process may offer the customer an option to pay in-store (i.e., in venue). The check-out process may include the user selecting an in-venue service preference.

As explained in detail above with reference to FIGS. 17 and 19 through 29, the ordering app 1118 running on the customer's mobile device 940 may display a list of stores or venues within a preset, user-selectable range from the customer's current location. As an extension of FIG. 26, the ordering app 1118 may display a total order price (in some embodiments, broken down into price and tax) for each of the venues. For example, venue A may offer a promotion discounting menu item X, whereas venue B does not offer the same promotion. In that case, the check-out process may display one price for venue A and another price for venue B. The same concept applies to tax. For example, venue A may be in a jurisdiction with an applicable 8% tax, whereas venue B may be in a jurisdiction with an applicable 2% tax.

In contrast to the method of FIG. 17, various embodiments of the method 5000 enable the customer to decline to select a specific venue in the ordering app 1118 at 5002. Other embodiments, consistent with FIG. 17, require the customer to select a specific venue in the ordering app 1118 at 5002. See FIG. 45. If the customer selects a specific venue, then the method may only consider geofences (discussed below) tied to the specific venue. Alternatively, the method may consider the selected store and a predetermined number of stores closest to the selected and a predetermined number of stores closest to the customer's location at the time of check-out. If the customer declines to select a specific venue, then the method may consider geofences (discussed below) of all relevant venues. In various embodiments, relevant venues only include venues located within a predetermined range of the customer. In other embodiments, relevant venues are a predetermined number of venues closest to the customer at the time of check-out. One or more of the above servers or computing devices may re-populate relevant venues at a set interval. The set interval may be based on the customer's current speed, as extracted from the customer's vehicle or as calculated with reference to the customer's position over time.

At 5003, the method generates an order number (which can be alphanumeric) for the finalized order (5003a), transmits the order from the customer's mobile device 940 to the OMS server 910 (labeled eCP in FIG. 37a) (5003b), and begins monitoring the customer's location with respect to geofences (5003c). It should be appreciated that 5001 through 5003b may be executed according to the methods described with reference to FIG. 17. The transmitted number includes the order number. As described above, the order number may be displayed and archived on the ordering app 1118. In various embodiments, if the user selected a specific venue, then the order is injected into an order staging module of the venue (discussed below with reference to method 8000).

With reference to 5003c, the OMS server 910 may receive the customer's location via a locator app running in the background on the customer's mobile device 940. The ordering app 1118 extracts the location data from the locator app and then transmits the location data from the mobile device 940 to the OMS server 910. The OMS server 910 stores the virtual data representing the geofences. The OMS server 910 compares the location of the customer to the virtual geofences. This approach enables the servers to obscure the exact boundaries of the geofences by performing the comparisons at the remote servers.

Alternatively, with reference to 5003c, the data representing the virtual geofences may be stored and/or generated on the OMS server 910, and then selectively transmitted to the customer's mobile device 940. The ordering app 1118 running on the customer's mobile device 940 compares the customer's current location to the virtual boundaries of the geofences. When the customer crosses a geofence, the ordering app 1118 transmits a crossing notification to the OMS server 910. This approach enables the customer to hide or obscure the customer's current location from the remote servers.

Figure 42:
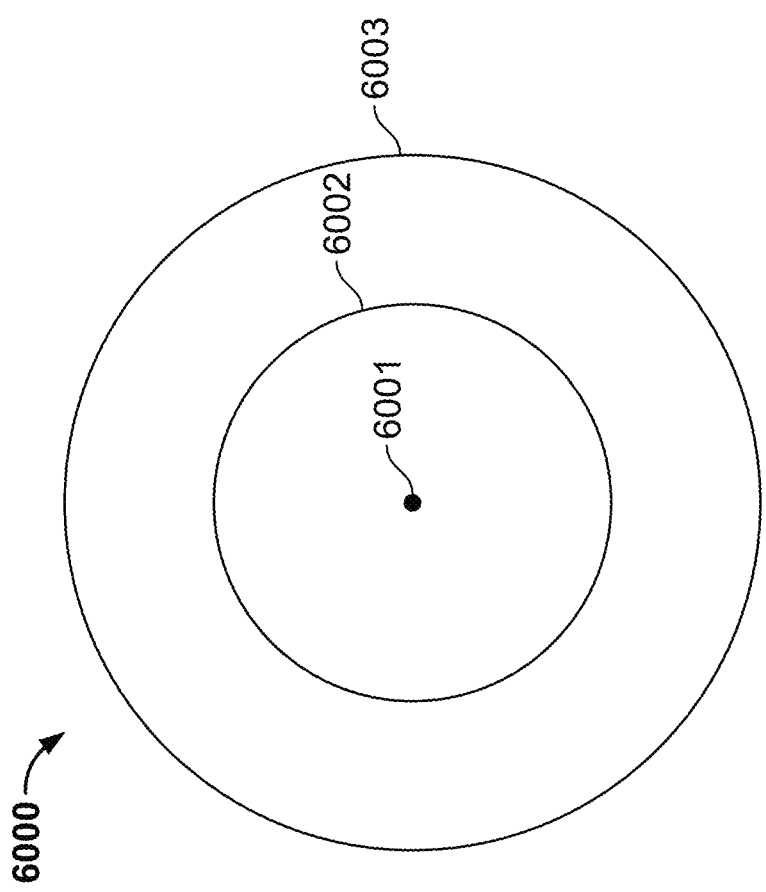
FIG. 42 illustrates example geofences.

FIG. 42 depicts example geofences 6002 and 6003 for a particular venue 6001. Each geofence 6002 and 6003 corresponds to a perimeter of an area surrounding the venue 6001. When a customer crosses a geofence, the method proceeds to a certain step, as described in detail below. Geofences may be coarse or fine. Coarse geofences, such as geofence 6003, generally encompass a greater area than fine geofences, such as geofence 6002. Fine geofences, such as geofence 6002, typically reside within coarse geofences, such as geofence 6003, so that a customer located outside of the geofences will pass through the coarse geofence before passing through the fine geofence on the way to the destination. Geofences are explained in greater detail below.

Returning to FIG. 37 and as explained above, the OMS server 910 detects when the customer (or more specifically, the mobile device 940 associated with the customer) crosses the coarse geofence at 5004. The OMS server 910 then retrieves the customer's order from and transmits the order to the venue or location associated with the coarse geofence at 5005. As explained below, this may include injecting the order, via a plug-in, into an order staging module of the venue server 920. In some embodiments, as described above, the order has already been injected.

As explained with reference to FIG. 9, each venue may include (or be linked to) a venue server 920 configured to receive data from the remote server or cloud. One difference between the OMS server 910 and the venue servers 920 is data access. The OMS server 910 may secure data at a higher security level than the venue servers 920. As a result, data stored on the OMS server 910 may be generally inaccessible to venue crew, whereas data stored on venue servers 920 may be generally accessible to venue crew. This approach enables the method to segregate confidential, consequential, or proprietary data such as customer's financial information, order histories, and location histories from the venue servers, thus improving outcomes in the event of a venue data breach.

Figure 43:
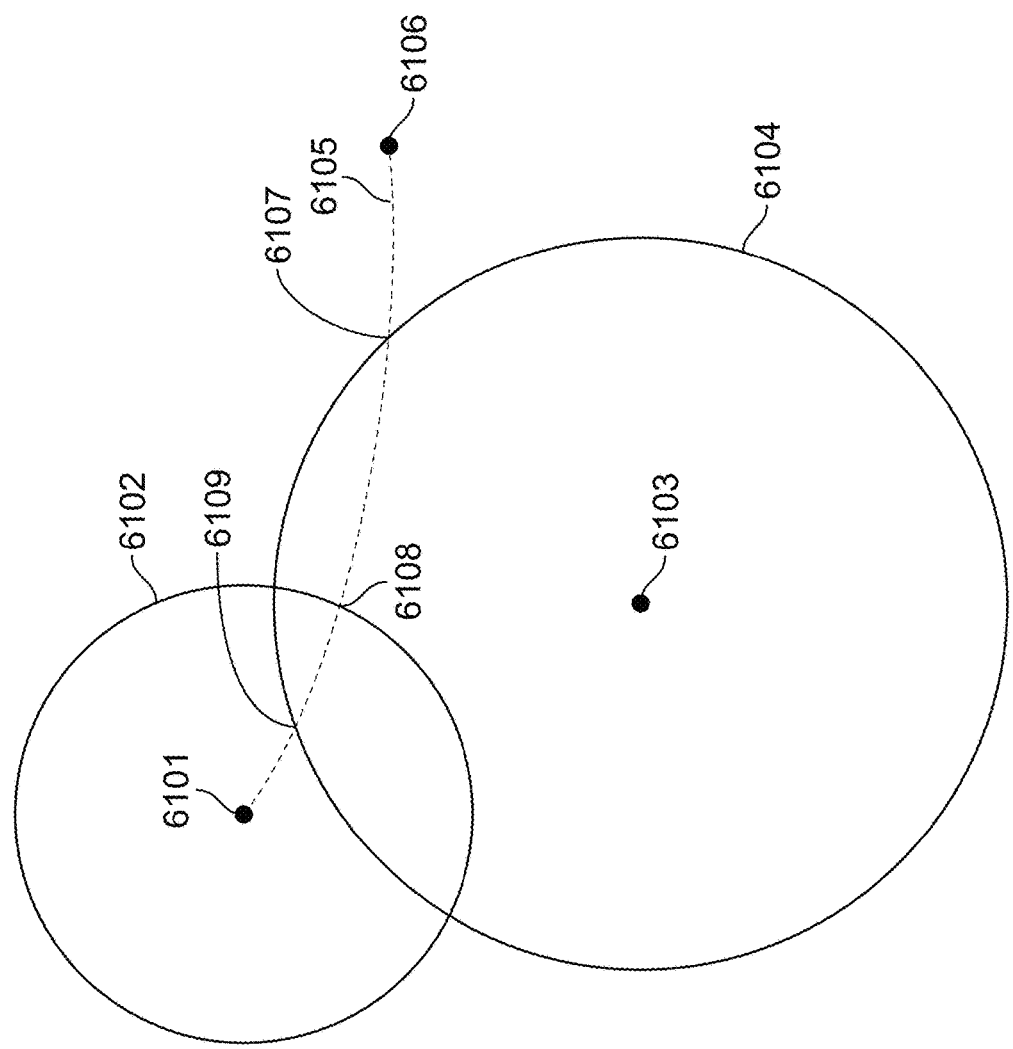
FIG. 43 illustrates two example coarse geofences.

It should be appreciated that the method may execute steps 5004 and 5005 for multiple venues. FIG. 43 illustrates a path 6105 from the customer's current location 6106 to venue A 6101, with coarse geofence 6102. Venue B 6103 has a coarse geofence 6104. On the way to venue 6101, the customer will first cross coarse geofence 6104 of venue B 6103 at point 6107. Second, the customer will cross coarse geofence 6102 of venue A 6101 at point 6108.

In the example of FIG. 43, if the customer selected venue A 6101 at 5002, then the method would ignore the customer crossing the coarse geofence 6104 of venue B. If, however, the customer had declined to select a specific venue at 5002, then the method would perform steps 5004 and 5005 of FIG. 37 at least twice: once for venue B 6103 when the customer reached point 6107; again for venue A 6101 when the customer reached point 6108. In some embodiments, the OMS server 910 withdraws or deletes the order in venue B 6103 when the user exits the course geofence 6104 of venue B 6103 at point 6109.

At 5006, the OMS server 910 detects that the customer (or more specifically, the customer's mobile device 940) has crossed a fine geofence. In response, the method proceeds to 5007 by prioritizing the customer's order in the venue server 920 and transmitting a wireless message or notification to the customer's mobile device 940. If the method previously failed to detect the customer crossing the coarse geofence at 5004, then the OMS server 910 retrieves and transmits the customer's order to the venue sever 920 at 5007*a* before prioritizing the order at 5007*b* and sending the customer the notification at 5007*c*.

In some embodiments, order prioritization includes displaying the order on or more computer displays within the venue. One or more of the displays may be customer-facing to give the customer confidence that the wireless ordering system is successfully processing the order. One or more of the displays may be employee or crew facing to alert crew about upcoming (albeit unconfirmed and/or unprocessed) orders. In some embodiments, order prioritization enables an order-associated interface on the crew-facing display. The interface includes details of the order, including the selected menu items, name of the customer, time the order was submitted, and time the customer crossed any of the geofences. In some embodiments, the crew-facing display includes non-prioritized orders (e.g., orders associated with customers who have crossed the coarse geofence), but the order-associated interface is disabled or absent for the non-prioritized orders. In various embodiments, order prioritization includes updating point of sale systems as discussed below with reference to the method 8000 and FIG. 45. In various embodiments, order prioritization includes causing the ordering app 1118 to confirm the customer's service preference selection, as discussed below.

The method alternatively proceeds to 5007 when the venue server 920 affirmatively detects the customer's (or more specifically the customer's mobile device 940) Bluetooth Low Energy (BLE) signal at 5008*a* or WiFi signal at 5008*b*. One or more beacons or transmitters stationed in or around the venue may detect the BLE and WiFi signals. These beacons or transmitters typically have a low range, thereby reducing the chances of affirmatively detecting a customer passing by, but not intending to enter, the venue associated with the beacons or transmitters. In various embodiments, BLE communication occurs at least partially (or in some cases, exclusively) in 2.4 GHz radio frequency bands. In various embodiments, WiFi communication occurs at least partially (or in some cases, exclusively) in one or more of the 2.4 GHz radio frequency bands and the 5 GHz radio frequency bands. The operation of the beacons or transmitters is described in detail below.

If the method fails to detect the customer crossing the fine geofence and one of BLE at 5008*a*, WiFi at 5008*b*, or QR at 5008*c*, then the method proceeds when the customer enters a code at 5009*a*, 5009*b*, or 5009*c*. More specifically, the customer enters a code at a kiosk (described in detail below). The code may be a voice code. The code may be a keyed in code. The code may be the order number. The venue server 920 is then searched or parsed for a corresponding order within the order staging module. When the correct order is located, the plug-in (described below) may advance the order from the order staging module to the production module.

Figure 44:
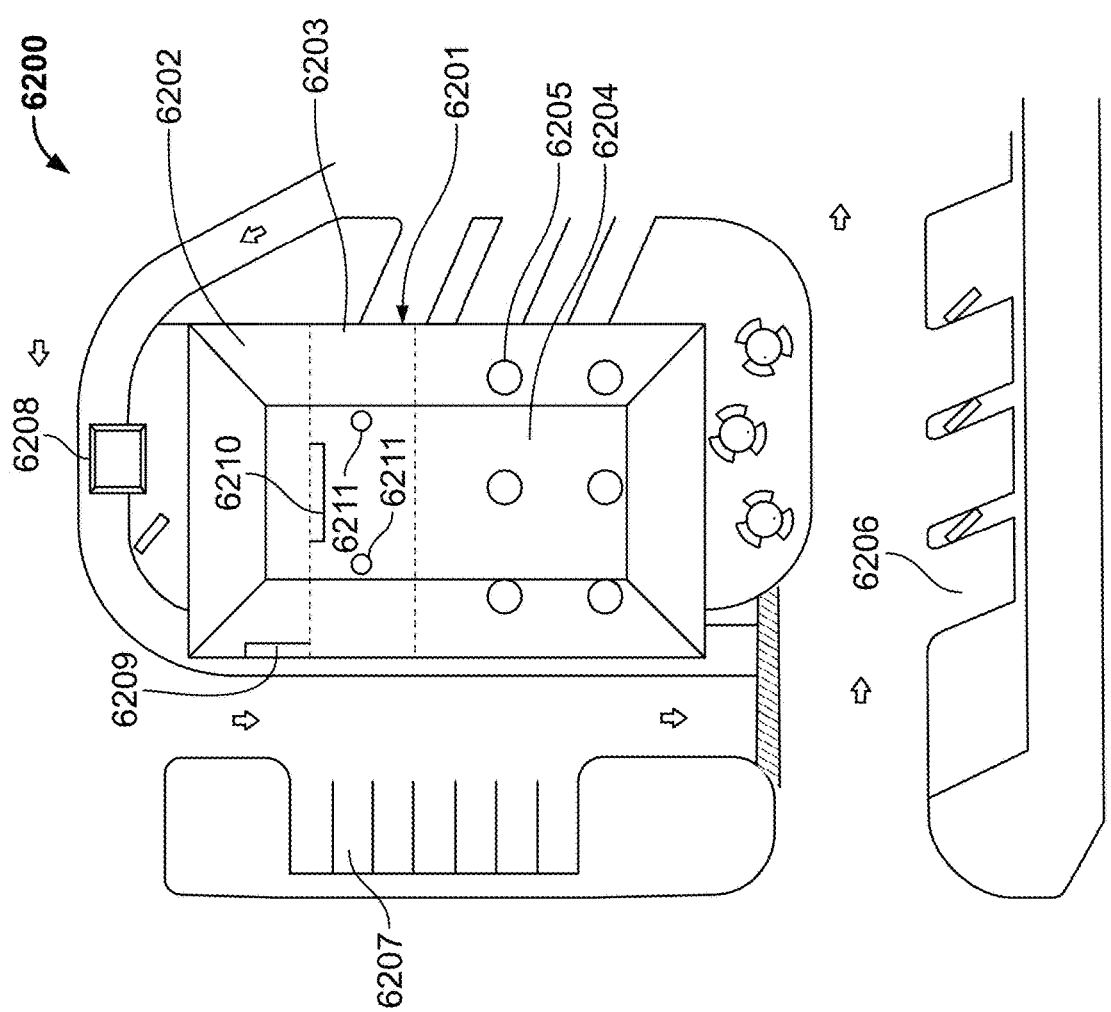
FIG. 44 illustrates an example venue.
Figure 45A:
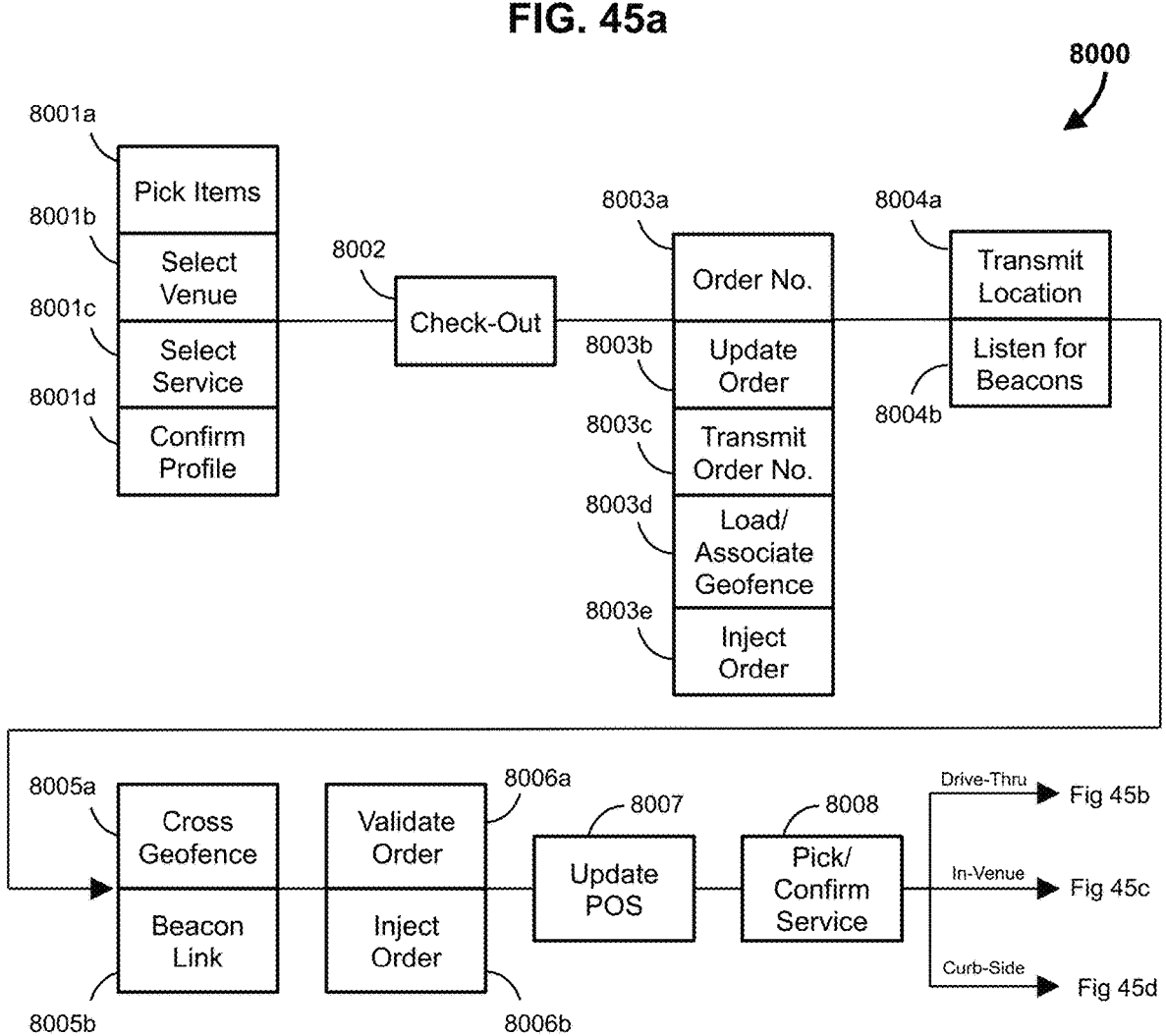
FIGS. 45a to 45d relate to additional embodiments of the disclosed methods and processes.
Figure 45B:
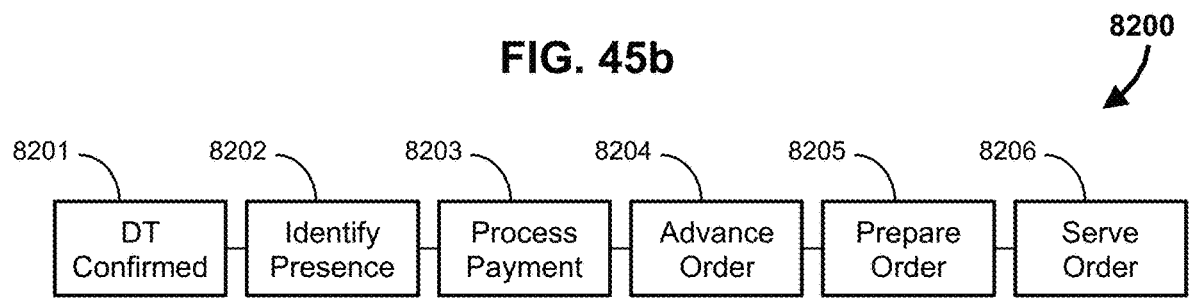
Figure 45C:
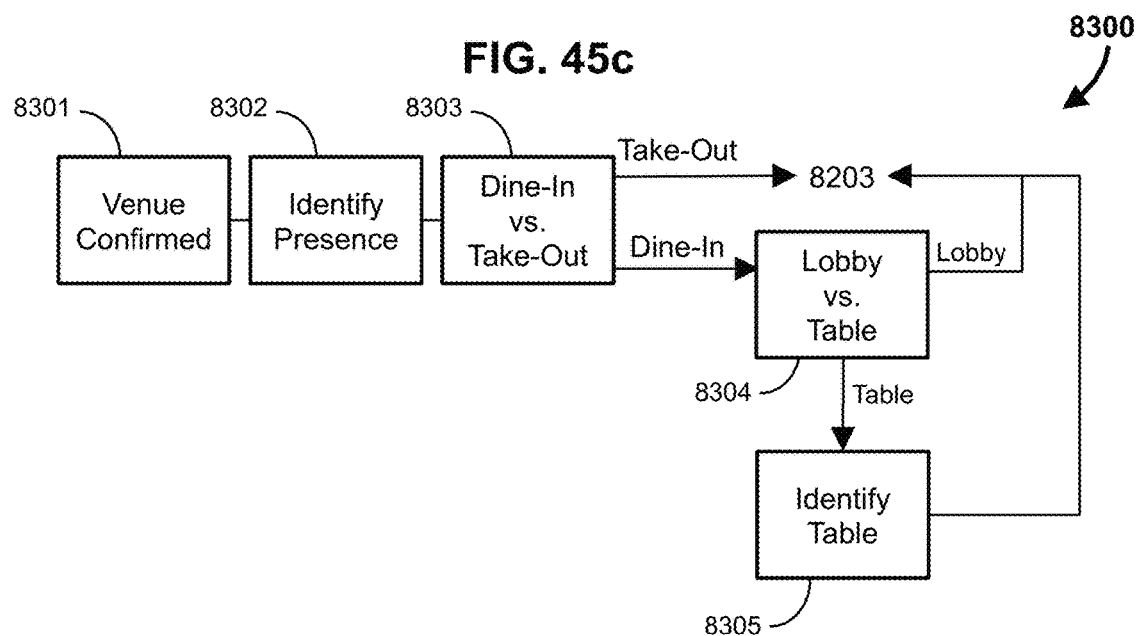
Figure 45D:
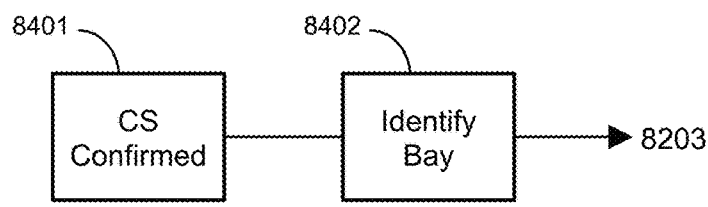

After prioritizing the order at 5007, the venue server 920 detects the customer's service preference via one of 5010*a*, 5010*b*, and 5010*c*. As discussed above, the service can be any one of lobby service, table service, curbside service, or drive-thru service. With reference to FIG. 44, these services generally correspond to different areas in and around the venue. For example, FIG. 44 shows a venue 6200 including a store 6201 having a kitchen 6202, a lobby 6203 with a customer service desk 6210 and kiosks 6211, a table area 6204 with tables 6205, and a drive-thru counter 6209. The venue 6200 further includes parking areas 6206 and 6207 for curb-side service, and a drive-thru board 6208. The kiosks

6211 may be located at any position in the venue, including the parking areas or the drive-thru area.

At 5010*a*, the customer scans a QR code with the mobile device 940 associated with one of the service preferences. At 5010*b*, the method detects a WiFi signal originating from the customer's mobile device 940. At 5010*c*, the method detects a BLE signal originating from the customer's mobile device 940. WiFi and BLE detection are explained in greater detail below.

Both of 5010*a* and 5010*c* enable the method to identify the customer's service preference as any one of lobby, table, curbside, and drive-thru at 5012. The process of locating a customer with 5010*c* is explained below with reference to beacons and transmitters. With reference to 5010*a*, the venue may include multiple different printed QR codes, each associated with one of lobby, table, curbside, and drive-thru. The printed QR codes cause the customer's mobile device 940 to send a message to the OMS server 910, which forwards the message to the venue server 920. The QR code process is explained in detail above with reference, for example, to FIG. 29. Alternatively or in addition, the ordering app 1118 may present user-selectable service preferences at 5011*a*, 5011*b*, and 5011*c*. FIG. 27 shows an illustrative screen. The customer chooses one of the service preferences. In response, the mobile device 940 transmits the customer selection to the OMS server 910, which forwards the selection to the venue server 920. In various embodiments, the ordering app 1118 generates a scannable code, such as a QR code, which the customer scans via a code reader located on the kiosks. The kiosks are further described below.

It should be appreciated that some detection methods, such as WiFi detection at 5010*b* may have insufficient resolution to pinpoint (or sufficiently approximate) the customer's venue location (i.e., location within the venue). In these cases, the method may proceed, to a predetermined default service preference at 5013, such as lobby service. The method may alert the customer accordingly, via a message delivered from the venue server 920, to the OMS server 910, and ultimately to the mobile device 940.

It should be appreciated that in various embodiments, geolocation of the customer's mobile device 940 may be used to identify the customer's location at 5012. More specifically, geolocation may be an alternative to 5010*a*, 5010*b*, and 5010*c*.

Lobby Service Check-in

Figure 38A:
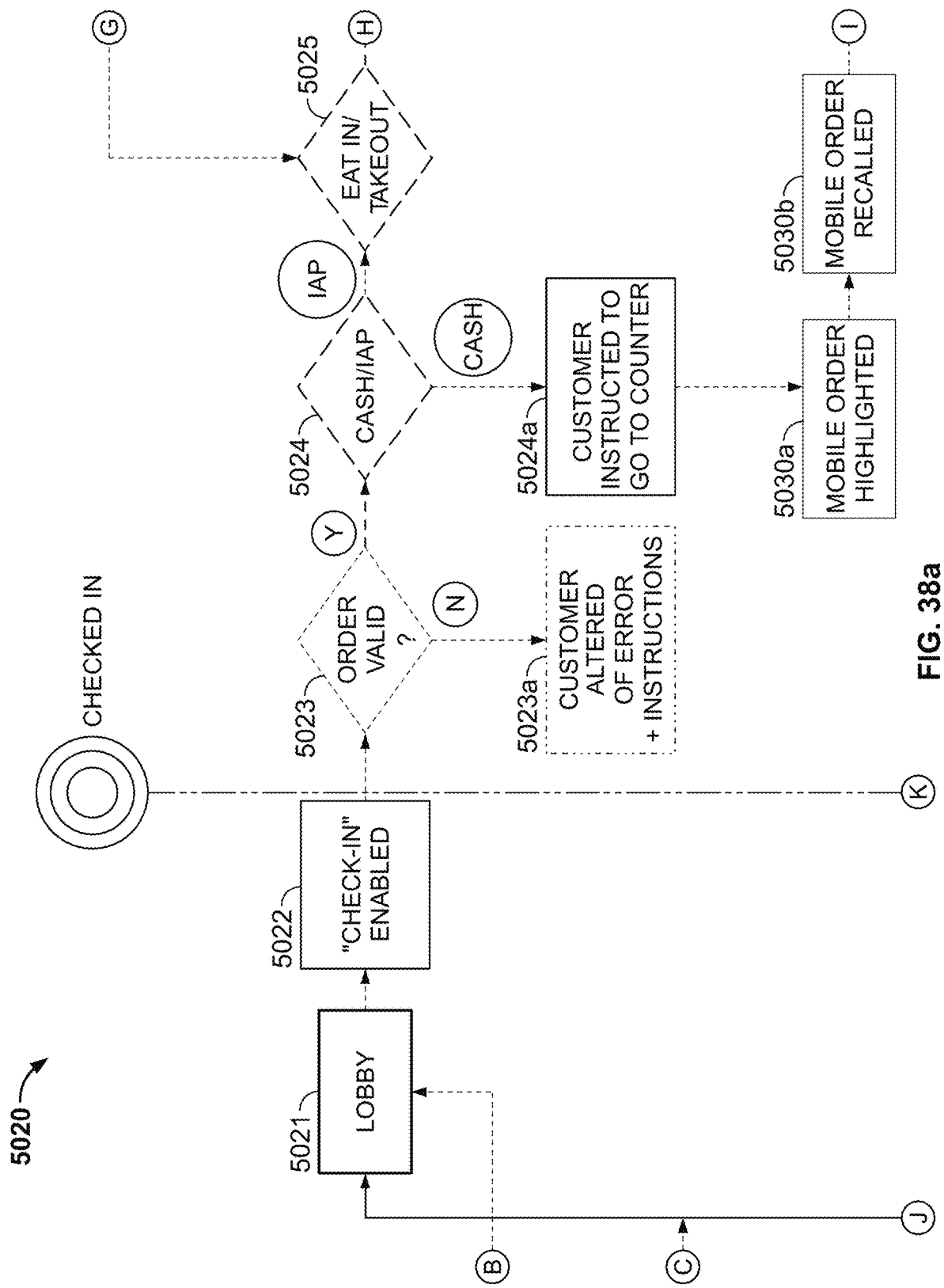
Figure 38B:
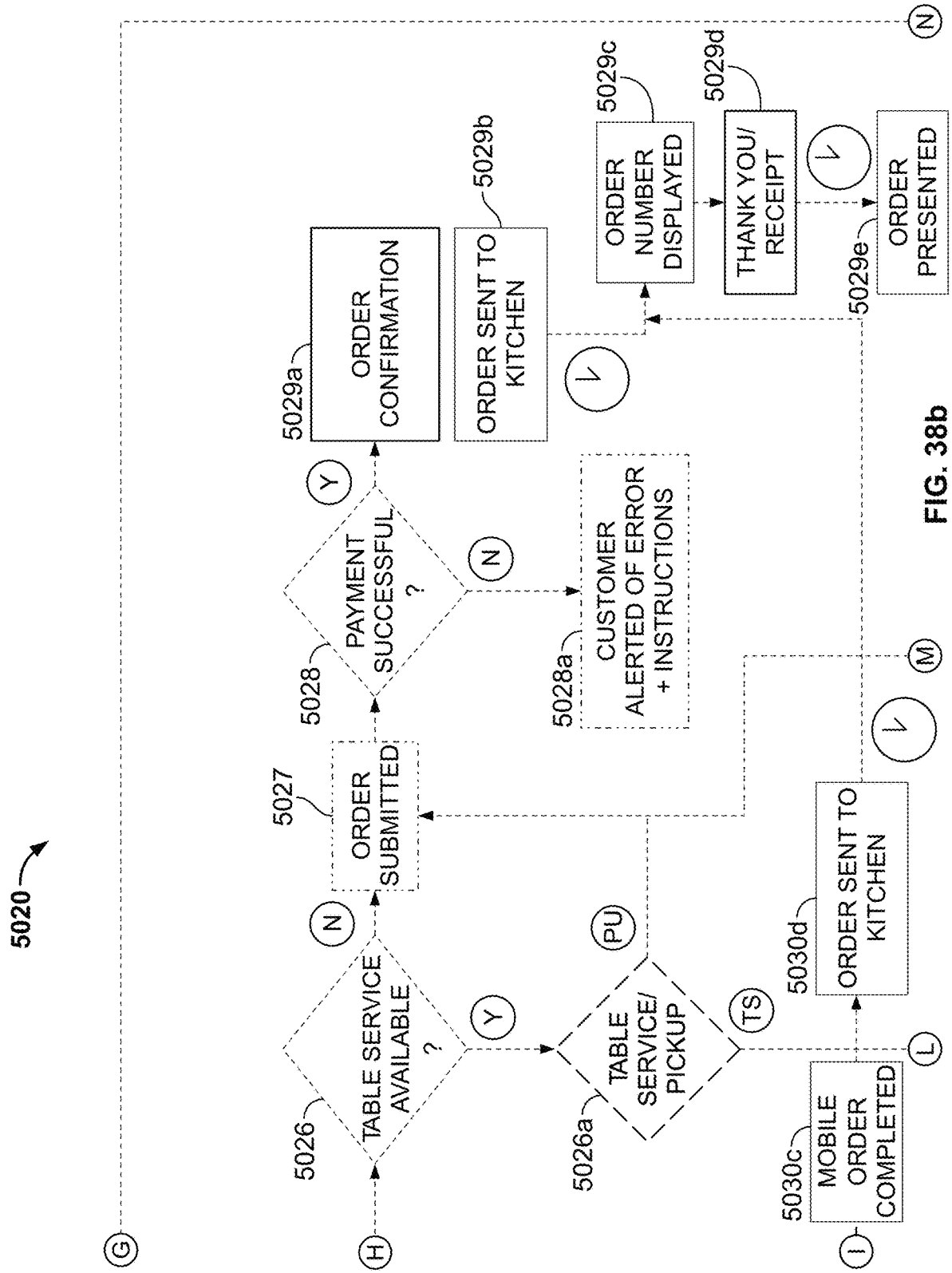

The method proceeds to lobby service at 5021 of FIG. 38. The portion of the method shown in FIG. 38 is generally configured to cause the venue to prepare the customer's order, and enable the customer to pick up the order in the lobby or to switch to another service, such as table service.

After 5021, the method proceeds to enable check-in at 5022. As explained below, check-in may cause the plug-in to advance the order from the order staging module to the production module. What else does check-in do?

Upon checking in, the method assesses the customer's order to determine whether the order is valid at 5023. In some embodiments, the method compares the order to properties hosted on one or more of the venue server and the remote server. One of these servers, for example, may include a dynamically updated list of supplies available at the venue. The order may be compared against this list of supplies to determine whether the specific venue has the proper supplies to prepare the customer's order. As another example, the order may compare a quoted or estimated order price displayed at step 5002 to an actual price, calculated at 5023. If the quoted price exceeds the actual price by a predetermined value or percentage (which may be zero, i.e., the actual price must not exceed the quoted price), then the order may be rendered invalid. In some embodiments, the method enables a venue to automatically honor a quoted or estimated price that falls within a predetermined percentage or absolute value of the actual price. In some embodiments, the method enables a venue to automatically honor a quoted or estimated price that was valid at the time of check-out in step 5002, but has expired in the interim (e.g., a promotion for two dollar coffee ended at 10 am; the customer checked out at 9:50 am, but checked-in at 10:05 am). One or more of the above described servers may be configured to accept administrator preferences, and then execute these automatic processes based on the administrator preferences.

If the order is invalid at 5023, then the ordering app 1118 alerts the customer of the error and optionally offers the customer a set of instructions to redeem the order at 5023*a*. The set of instructions may include the customer agreeing to enhance the price from the quoted or estimated price to the actual price. In some embodiments, the set of instructions includes the reason for the order being declared invalid (e.g., venue A exhausted its supply of lettuce at 8:05 am). In some embodiments, the set of instructions includes a coupon code for the customer to redeem at a participating venue. In some embodiments, the set of instructions includes a list of alternate venues, ranked according to distance from the customer, which can serve the customer's full order.

When the order is valid, the ordering app 1118 offers the customer payment options at 5024. The options may include cash or an in-app-purchase (IAP), executed with the financial information associated with the customer's profile on the ordering app 1118. In some embodiments, the cash option also includes other forms of physical payment accepted at the venue's counter such as payment via a plastic credit card.

Advantageously, when the customer selects TAP, at 5024, the method, via a screen on the ordering app 1118, offers the customer a choice between dining in-venue or taking-out the order (in one example embodiment the order is food) at 5025. If table service is available for the present venue (as determined at 5026 by accessing one or more of the OMS server 910 and the venue server 920), then the ordering app 1118 also enables the customer to choose between table service and pick-up at 5026*a*. When the customer chooses table service, then the method proceeds to 5046*d* in FIG. 38. When the customer chooses pick up, then the order is submitted at 5027. In some embodiments, an order submission causes the OMS server 910 to process the customer's payment (in some embodiments, via a distinct financial server).

After order submission at 5027, the method (and specifically, the OMS server 910) determines whether payment was successful at 5028. If payment was unsuccessful, then the OMS server 910 issues the customer a corresponding alert at 5028*a*. In some embodiments, the alert includes a link enabling the customer to automatically return to 5024 via the ordering app 1118. If payment was successful, then the OMS server 910 issues an order confirmation to the customer at 5029*a* and an order confirmation to the venue server 920 at 5029*b*. In some embodiments, the OMS server 910 sends the order confirmation to the venue server 920 by instructing the plug-in to advance the order from the production module to a cooking module. Staff and/or automatic appliances prepare (e.g., cook or assemble) orders included in the cooking module. In some embodiments (discussed below with reference to the method 8000), one of the OMS server 910 and the venue server 920 advance the order from the staging module to the production module at this point. In these embodiments, an order is only sent to the production module after the financial transaction is complete.

Returning to FIG. 38, if the customer selected cash payment at 5024, then the ordering app 1118 instructs the customer to proceed to a venue counter located in the lobby at 5024a. At the counter, crew or staff finds the customer's mobile order at 5030a, pulls up or recalls the mobile order at 5030b, marks the mobile order as compete at 5030c, and transmits the order to the kitchen at 5030d. In some embodiments, 5030d has the same results or consequences as 5029b. In some cases, as described below, the method enables a customer to proceed via a kiosk instead of the counter.

After the venue (and in some embodiments, the kitchen of the venue) prepares the order, the venue marks the order number as ready on a customer-facing display at 5029c, generates a receipt at 5029d, and serves or presents the order to the customer at 5029e. It should be appreciated that the customer facing display of 5029c may be a dedicated display that only includes ready or prepared orders.

Table Service Check-in

Figure 39A:
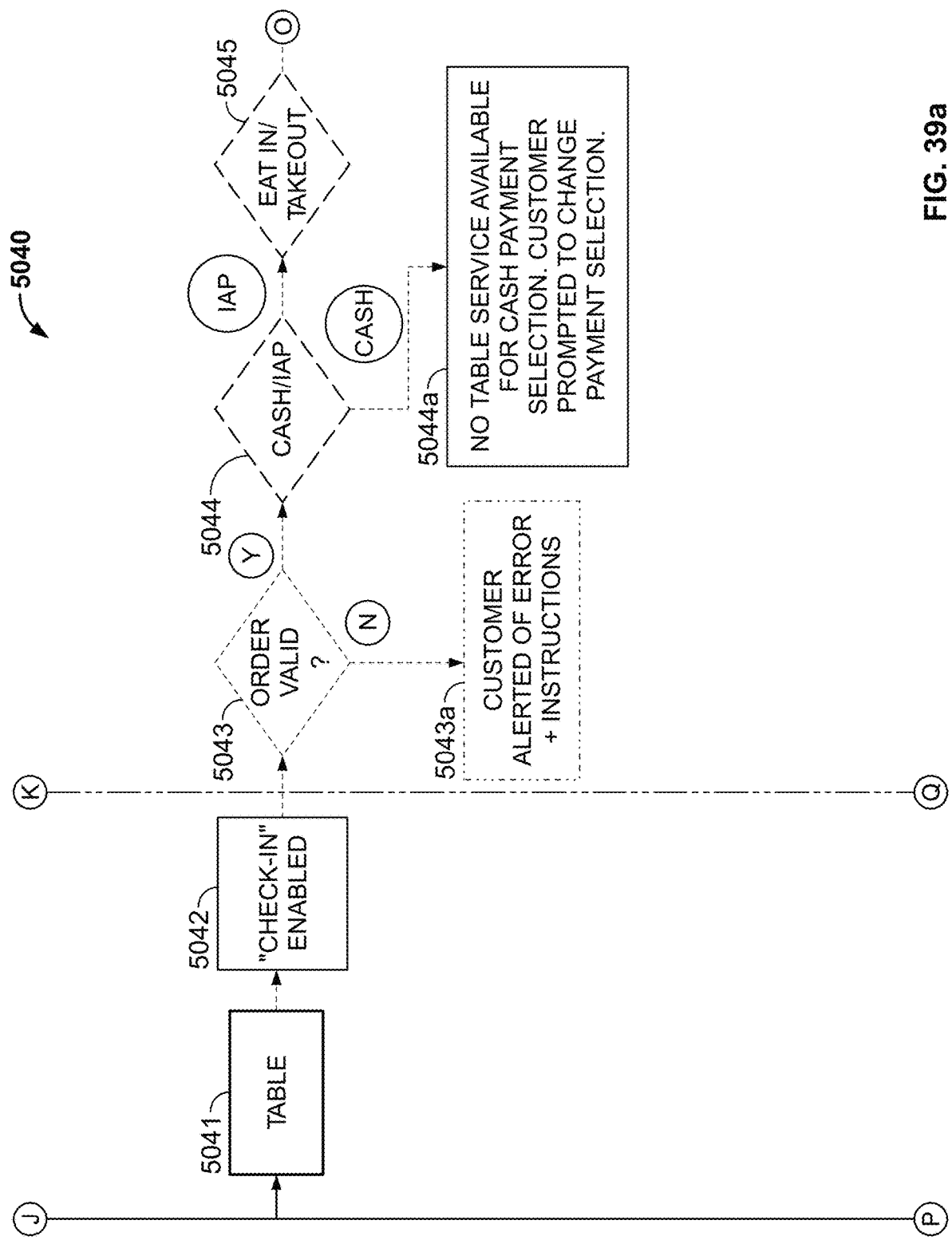
Figure 39B:
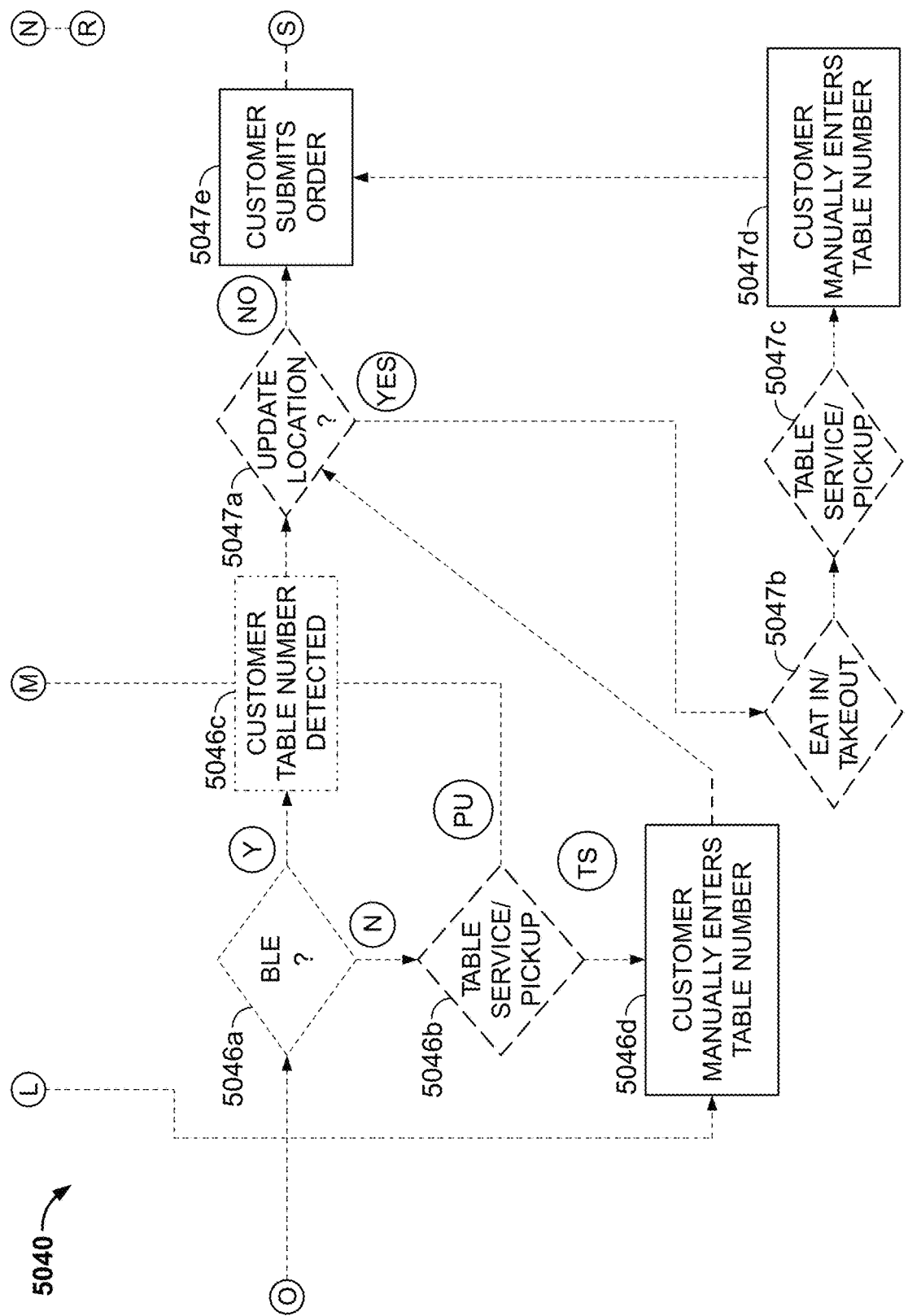
Figure 39C:
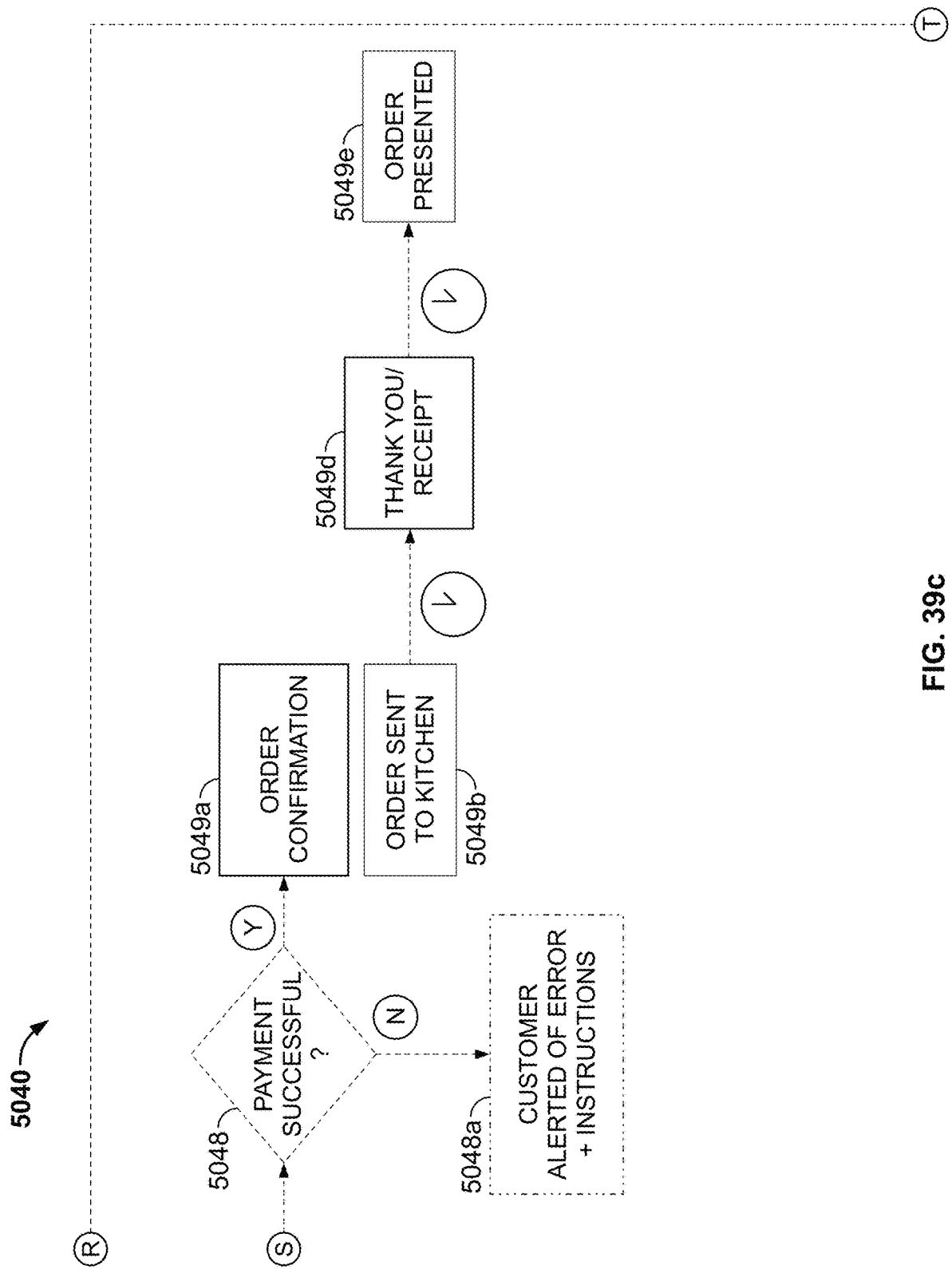

Returning to FIG. 37, the method proceeds to table service at 5041 of FIG. 39. The portion of the method shown in FIG. 39 is generally configured to enable the venue to prepare the customer's order, then serve the customer at a predetermined table.

Upon detecting table service at 5041, the method enables check-in at 5042, determines whether the order is valid at 5043, alerts the customer if the order is invalid at 5043a, offers the customer a choice between TAP or cash at 5044, and further offers the customer a choice between dining in and taking out at 5045. It should be appreciated that in some embodiments, the above description of 5022 to 5025 applies to 5042 to 5045, excluding 5044a. More specifically, in some embodiments, table service may be configured to only accept payment via TAP, as opposed to lobby service, which may be configured to accept payment via both TAP and cash. Thus, when a customer selects cash at 5044 via the ordering app 1118, the ordering app 1118 informs the customer that cash payment is unavailable for lobby service at 5044a, and automatically returns (or presents a link that automatically returns) the customer to an ordering app 1118 display corresponding to 5044. Alternatively, 5044a may offer the customer an option to select between returning to 5044 and switching to lobby service. If the customer chooses lobby service, the method may skip to 5024a of FIG. 38.

After receiving the customer's dining preference at 5045, the venue server 920 attempts to locate the customer (or more specifically, the customer's mobile device 940) at 5046a. If the customer is successfully located, then the venue server 920 identifies a table number associated with the customer's location at 5046c.

Returning to 5046a, if the method fails to detect BLE, then the ordering app 1118 prompts the user to select between table service and pick-up at 5046b. If the customer chooses pick-up, then the method jumps to 5027 of FIG. 38. If the customer chooses table service, then ordering app 1118 prompts the customer to enter a table number at 5046d. Returning to FIG. 38, when a customer chooses table service at 5026a, the method jumps to 5046d.

At 5047a, the method may display the identified table and queries the customer, via options displayed in the ordering app, whether the identified table is correct. If the identified table is correct, the method proceeds to 5047e. If the identified table is incorrect, then the method, via the ordering app 1118, proceeds to 5047b, which mirrors 5025 and 5045. After 5047b, the method proceeds to 5047c, which mirrors 5046b and 5026a. If, at 5047c, the customer re-selects table service, then the ordering app 1118 prompts the customer to manually enter a table at 5047d, wherein the method proceeds to 5047e. At 5047e, similar to 5027, the ordering app 1118 finalizes the order for payment. It should be appreciated that the above disclosure related to 5028, 5028a, 5029a, 5029b, 5029d, and 5029e respectively applies to 5048, 5048a, 5049a, 5049b, 5049d, and 5049e.

Curb-Side Service Check-in

Figure 40A:
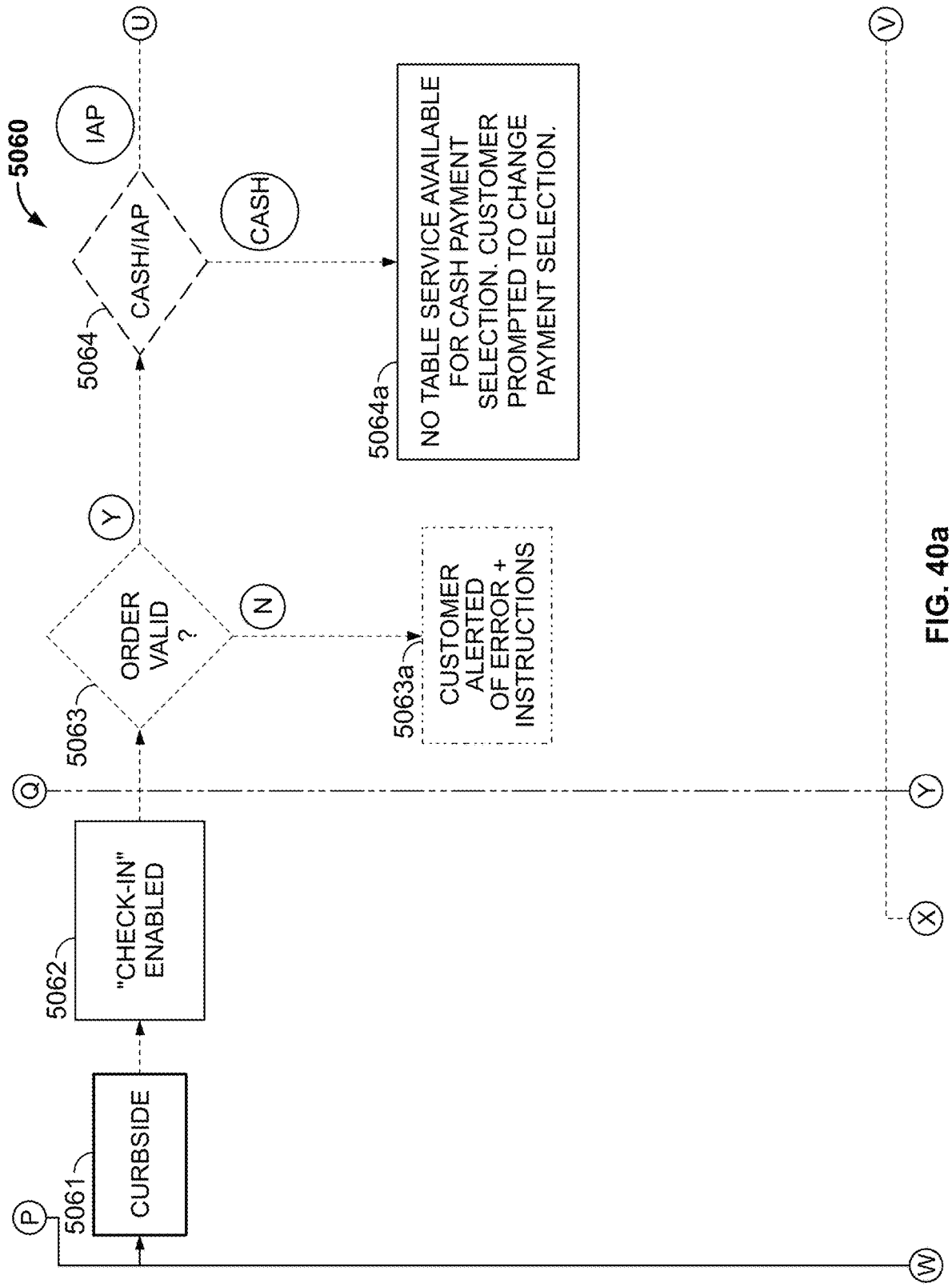
Figure 40B:
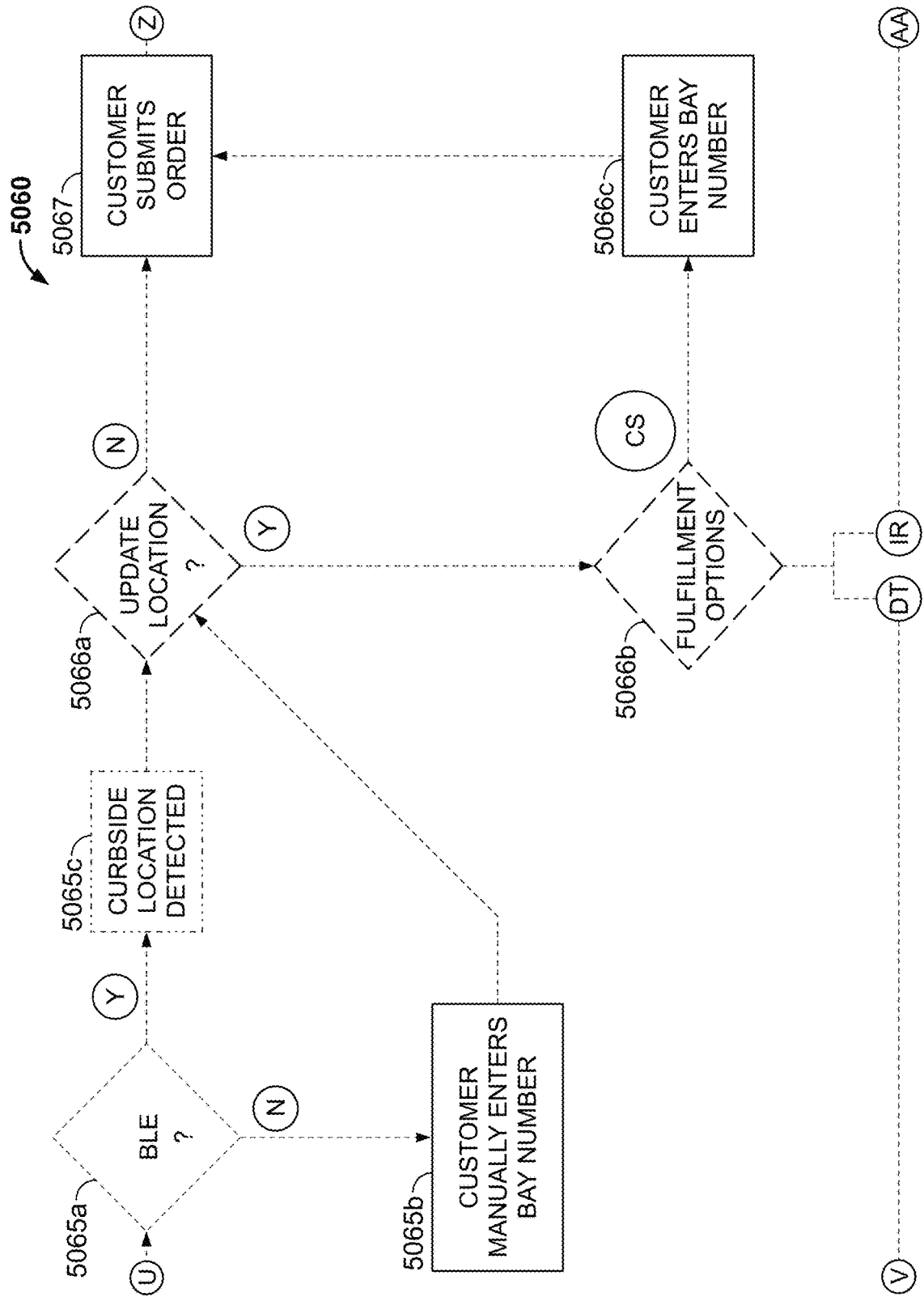
Figure 40C:
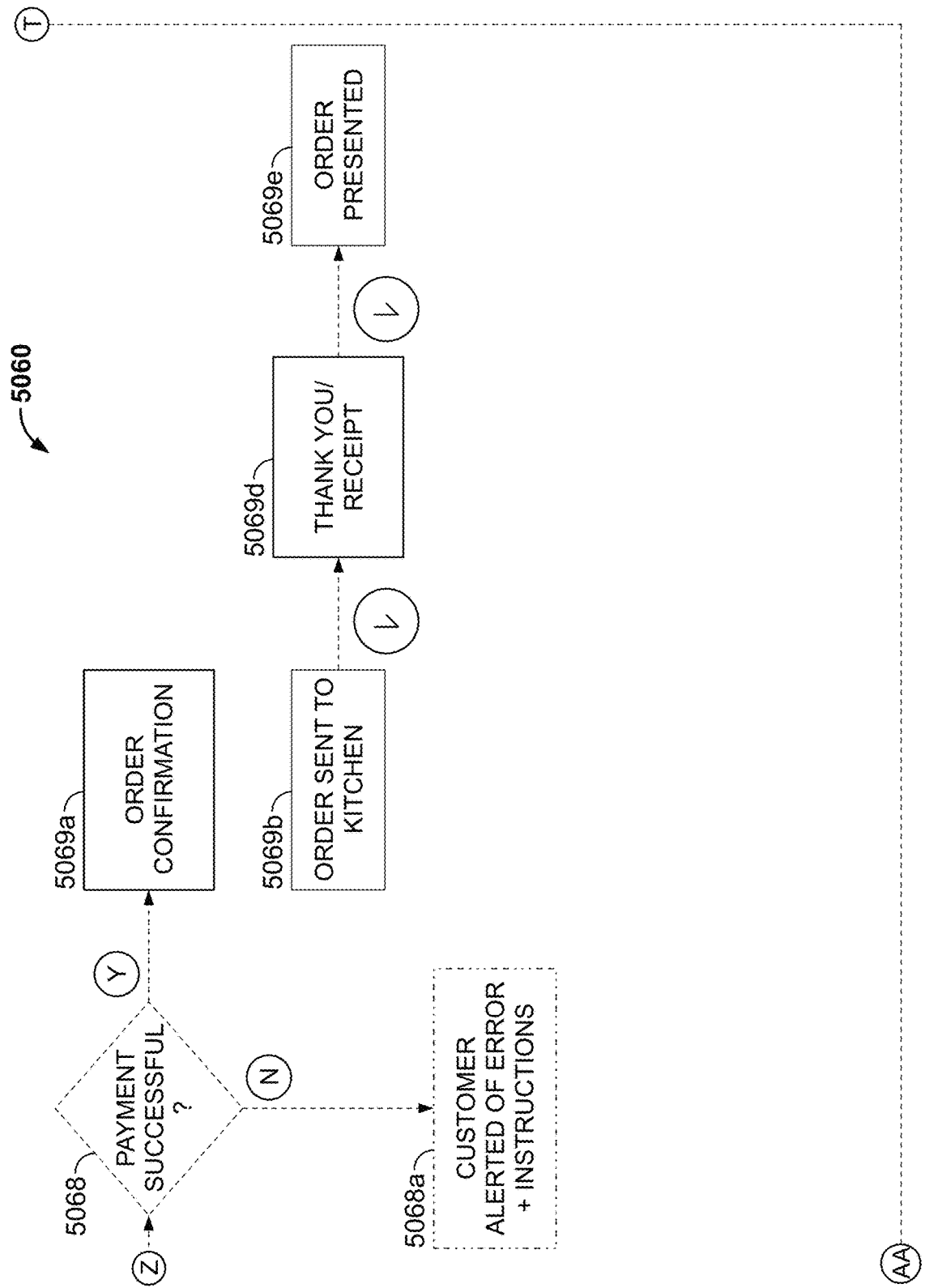

The method proceeds to curbside service at 5061 of FIG. 40. The portion of the method shown in FIG. 40 is generally configured to enable the venue to prepare the customer's order, then serve the customer at a predetermined outdoor location, such as a parking spot.

Upon detecting curbside service at 5061, the method proceeds to 5062, 5063, 5063a, 5064, and 5064a. The above disclosure related to 5042, 5043, 5043a, 5044, and 5044a applies to 5062, 5063, 5063a, 5064, and 5064a.

At 5065a, as in 5046a, the method attempts to link with the customer's mobile device 940 via BLE. If the link is unsuccessful, then ordering app 1118 prompts the customer to enter a bay number at 5065b. Each curb-side parking space may be marked with a distinct bay number. If the link is successful, then the venue server 920 approximates the customer's location at 5065c. Thereafter, the ordering app 1118 displays the customer's approximated location and prompts the customer for confirmation. If the customer confirms that the approximated location is accurate, then the method proceeds to 5067. If the customer conveys that the approximated location is inaccurate, then the method proceeds to 5067b where the ordering app 1118 prompts the user to select between drive-thru service, curbside service, and in-venue service. If the customer selects drive-thru service, then the method jumps to 5082a. If the customer selects in-venue service, then the method jumps to 5025. If the customer selects curb-side service, then the method proceeds to 5066c, which mirrors 5065b. After 5066c, the method proceeds to 5067, 5068, 5068a, 5069a, 5069b, 5069d, and 5069e, which respectively mirror 5047e, 5048, 5048a, 5049a, 5049b, 5049d, and 5049e.

Drive-Thru Service Check-in

Figure 41A:
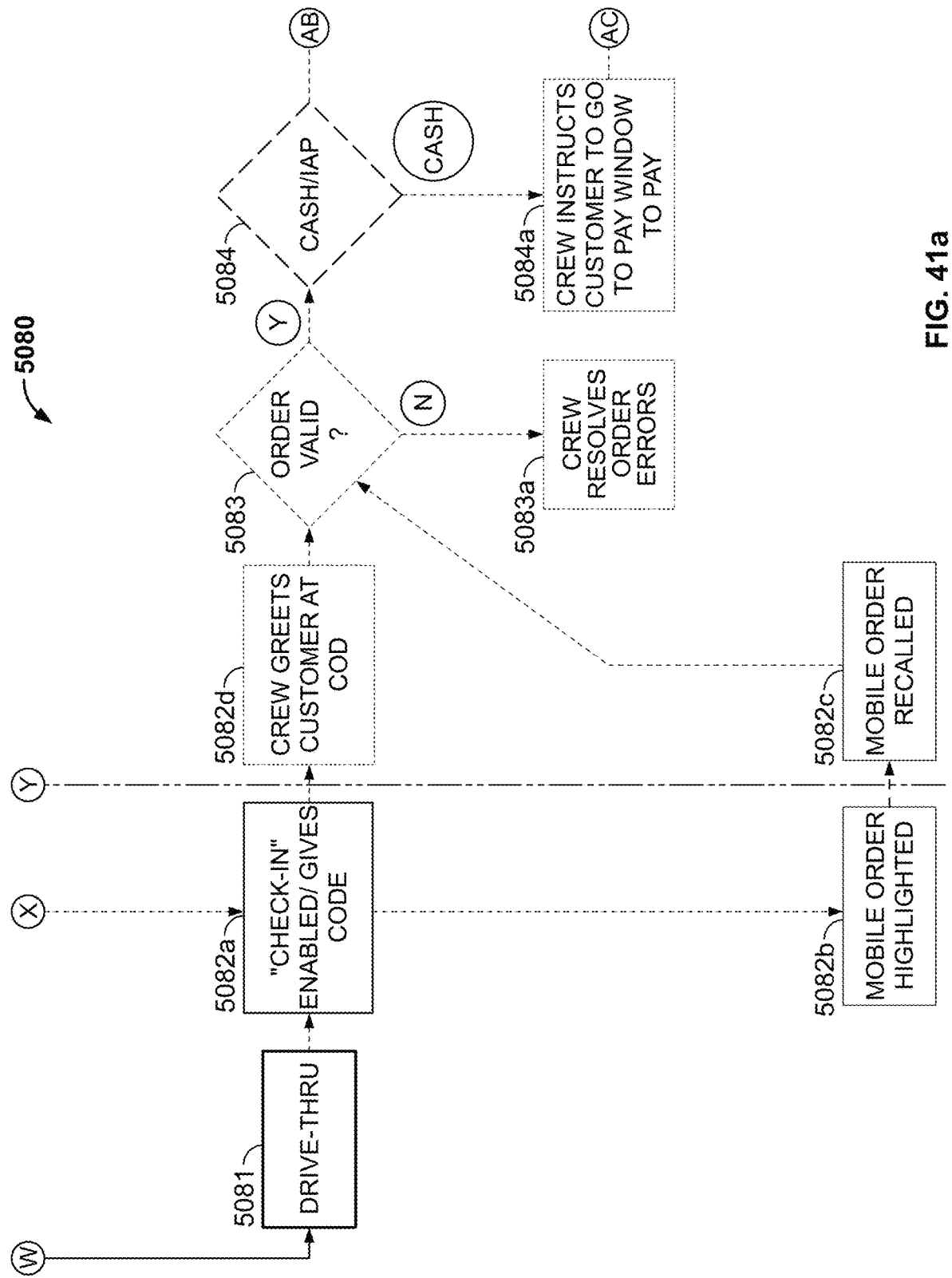
Figure 41B:
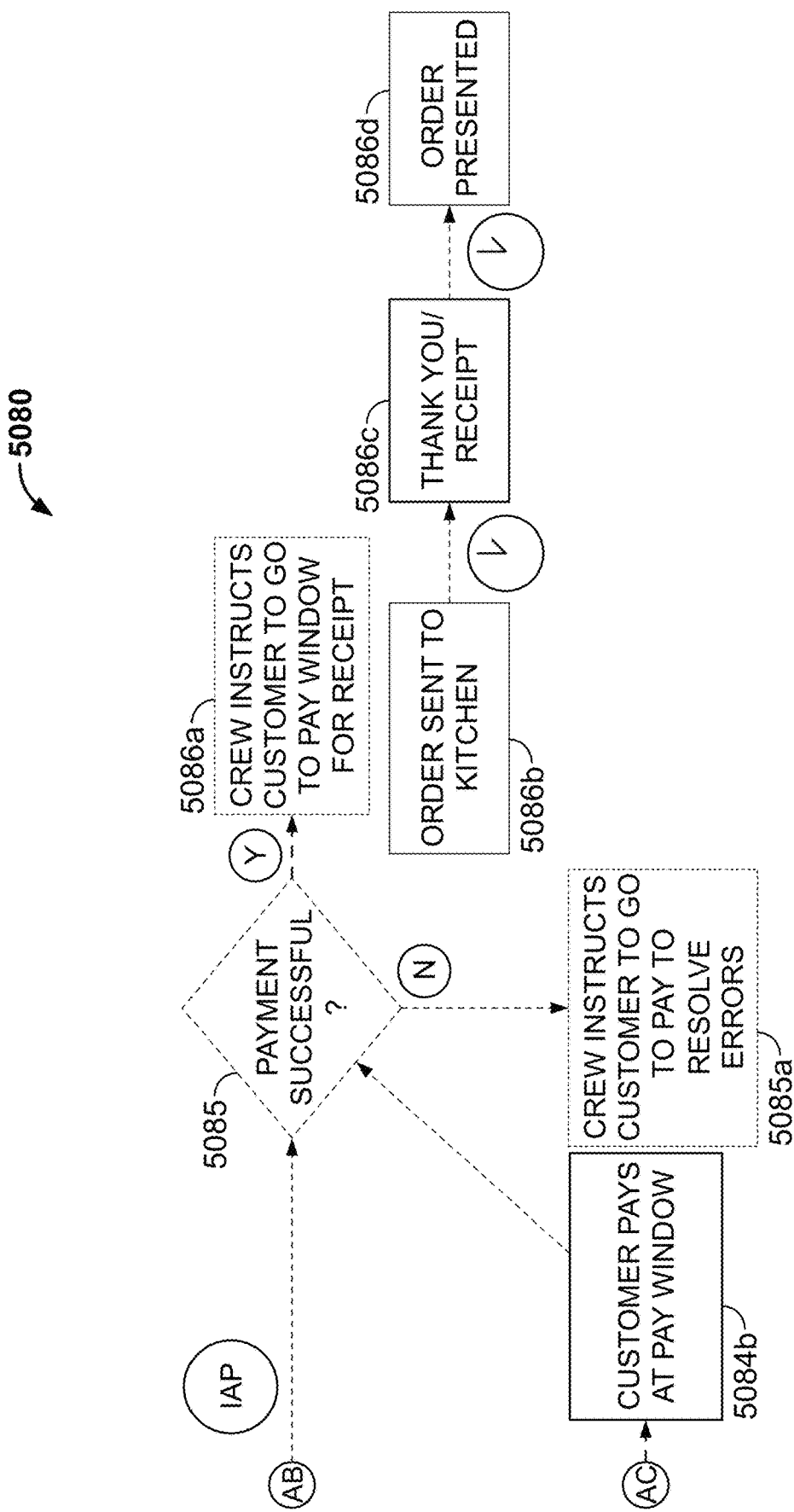

The method proceeds to drive-thru service at 5081 of FIG. 41. The portion of the method shown in FIG. 41 is generally configured to enable the venue to prepare the customer's order, then serve the customer at a drive-thru counter.

At 5082a, the customer provides an order number to crew. At 5082b, the crew highlight the order number on a point of sale system. At 5082c, the crew recalls the full order on the point of sale system by pressing an updated icon on the point of sale system (discussed in detail below). In various embodiments, 5082c causes one or more of the OMS server 910 and the venue server 920 to advance the order from the production module to the cooking module. The plug-in may perform this step. If the order contains invalid items (as in some embodiments, detected via the plug-in), then selection of this icon may cause the POS system to display new icons such as a recall available items icon and a cancel order icon. The recall available items icon causes only valid items to advance from the order staging module to the production module. The cancel order icon cancels the order. Point of sale systems are discussed in detail below.

One or more of the OMS server 910 and the venue server 920 determine whether the order is valid at 5083. If the order is invalid, drive-thru crew resolve the order at 5083a. The ordering app 1118 prompts the user to choose between cash and TAP at 5084. If the customer chooses TAP, then the method proceeds directly to 5085, wherein the OMS server 910 determines whether the customer's payment was successfully processed. If the customer chooses cash, then one or more of the ordering app 1118 and the drive-thru crew instruct the customer to pay at a drive-thru window at 5084a and 5084b.

If the ordering app 1118 or OMS server 910 unsuccessfully processes payment at 5085, then one or more of the ordering app 1118 and the crew instructs the customer to proceed to the pay window to close the order with cash. If payment is successful, then the crew instructs the customer to proceed to the pay window for a copy of a receipt at 5086a, the order is sent to the cooking module at 5086b, the crew supply the receipt at 5086c, and the crew serves the customer at 5086d. As explained below, these steps can be alternatively be performed via a kiosk.

Geofences

It should be appreciated that in various embodiments, each geofence is administrator adjustable, but not user adjustable. As generally shown in FIG. 9, administrator adjustable generally means that an adjustment must made via an administrator logged into the remote server hosting the relevant software or programs. Administrative adjustments cannot be made via the app interface running on a mobile device 940.

The administrator may adjust each geofence to extend in a particular shape. The administrator may adjust each geofence to extend a particular radius around the location. In some embodiments, each geofence has an individualized radius. The administrator may set these radiuses to specific value, or the radiuses may be configured to depend on one or more conditions. These conditions may include order-conditions (e.g., price of order, size of order (e.g., total number of items), kind of order, whether the order has been prepaid), customer-conditions (e.g., historical probability of the customer picking up a finalized order, whether the customer is detected, based on location data, to be walking, biking, or driving), venue-specific-conditions (e.g., venue efficiency in preparing orders, average traffic through venue), and external conditions (e.g., weather, traffic in-between the customer and the venue). The OMS server 910 may collect information associated with these conditions.

It should be appreciated that the coarse geofence and the fine geofence may observe certain predetermined relationships. For example, a radius defining the fine geofence may be some fixed percentage of a radius defining the coarse geofence. In some embodiments, the fine geofence is a function of the conditions described above and the coarse geofence is simply a function of the radius of the fine geofence. In other embodiments, the reverse is the true (i.e., the coarse geofence is a function of the conditions and the fine geofence is a function of the radius of the coarse geofence). In some embodiments, both the coarse geofence and the fine geofence are a function of the above conditions (possibly different conditions), but the fine geofence is defined to always exist within the coarse geofence as generally shown in FIG. 42. In some embodiments, the OMS server 910 is configured such that fine geofences of related venues do not overlap. When fine geofences of venues within the system do overlap, the method may notify an administrator and/or automatically shift one or more of the fine geofences to eliminate overlap. In some embodiments, the same is true for coarse geofences of related venues. In other embodiments, the method (and specifically, the OMS server 910) ignores overlap of coarse geofences. In some embodiments, the method enables an administrator to implement one set of rules for overlapping fine geofences and another set of rules for overlapping coarse geofences.

Inter or Intra Server Order Movement Via the Plug-in

The above method includes transferring orders from the OMS server 910 to the venue server 920. To accomplish this task, the OMS server 940 generates an internal request to inject the mobile order to an order-staging module of the venue server 920 via a plug-in. In various embodiments, the request includes a token, an ID, and a payload. The token is a string of numbers that uniquely identifies the request. The ID is a key number that encodes the payload and the response. The Payload is an XML message representing the customer's order. Before commanding the plug-in to perform the injection, the OMS server 940 may compare the payload to lists stored in one or more of the venue server 920 and the OMS server 940. If the payload includes items absent from the lists (or, if the lists represent excluded or unavailable items, then on the list), then one or more of the venue server 920 and the OMS server generates an error code. If the OMS server 910 validates the payload, then the OMS server instructs the plugin to inject the order into the venue server 920 The plugin returns a code to the OMS server identifying whether the injection was successful.

In some embodiments, validation includes the plug-in comparing the order to properties hosted on one or more of the venue server and the remote server. One of these servers, for example, may include a dynamically updated list of supplies available at the venue. The order may be compared against this list of supplies to determine whether the specific venue has the proper supplies to prepare the customer's order. As another example, the order may compare a quoted or estimated order price displayed to an actual price, calculated.

If the quoted price exceeds the actual price by a predetermined value or percentage (which may be zero, i.e., the actual price must not exceed the quoted price), then the order may be rendered invalid. In some embodiments, the method enables a venue to automatically honor a quoted or estimated price that falls within a predetermined percentage or absolute value of the actual price. In some embodiments, the method enables a venue to automatically honor a quoted or estimated price that was valid at the time of check-out in step 5002, but has expired in the interim (e.g., a promotion for two dollar coffee ended at 10 am; the customer checked out at 9:50 am, but checked-in at 10:05 am). One or more of the above described servers may be configured to accept administrator preferences, and then execute these automatic processes based on the administrator preferences.

At some, but not necessary all validation steps, the plug-in causes the ordering app 1118 to alert the customer of an order error and optionally offers the customer a set of instructions to redeem the order. The set of instructions may include the customer agreeing to enhance the price from the quoted or estimated price to the actual price. In some embodiments, the set of instructions includes the reason for the order being declared invalid (e.g., venue A exhausted its supply of lettuce at 8:05 am). In some embodiments, the set of instructions includes a coupon code for the customer to redeem at a participating venue. In some embodiments, the set of instructions includes a list of alternate venues, ranked according to distance from the customer, which can serve the customer's full order.

The above method also includes advancing orders from one module or portion of the venue server 910 to another module or portion of the venue server 910. In some embodiments, order advancement instructions originate at the OMS server 910 in response to information collected from the venue server 920. In some embodiments, the OMS server 910 re-validates the order before advancing it using the validation process described above. The OMS server 910 may advance the order by issuing a corresponding instruction to the plug-in.

In various embodiments, the plug-in is configured to perform the following functions: (1) Advance orders from one module in the venue server 920 to another module in the venue server 920. This includes transferring orders from a staging module to a production module when the checks-in. (2) Return a list of all orders in a specific module. (3) Search the staging module or the production module by order number. (4) Return orders from one module in the venue server 920 to another module in the venue server 920. (5) Automatically notify the OMS server 910 of an advancement or return of any order within the venue server 920. (6) Inject orders from the OMS server 910 into a predetermined module within the venue server 920.

The OMS server 910 may be configured to periodically clean up one or more of the modules. More specifically, the OMS server 910 may be configured to check the orders in each module at a predetermined interval. Upon checking, the OMS server determines the resident time of each order in its respective module. If the resident time exceeds a predetermined resident time, then the OMS server instructs the module to clear the order. If the resident time does not exceed the predetermined resident time, then the OMS server takes no action.

Kiosks

The above method includes two different counter-pay scenarios. The first counter-pay scenario includes steps 5024a and 5030a to 5030d. The second counter-pay scenario includes steps 5084a and 5084b. It should be appreciated that both of the first and second scenario may be executed at an automated kiosk. In some embodiments, the kiosk is in operative communication with both the OMS server 910 and the venue server 920. In other embodiments, the kiosk is only in operative communication with the OMS server 910.

The kiosk typically has a housing that supports a display, a processor, memory, various user-input devices, a credit card reader, and a bill acceptor. The bill acceptor includes at least one motor configured to draw a bill, such as paper money into the kiosk. The bill acceptor also includes a scanner configured to sense whether the paper money is true currency. The motor may be in operative communication with the scanner such that the motor only fully draws the paper money into the kiosk when the scanner determines that the paper money is true currency. Both of the credit card reader and the bill acceptor may include a slot protruding from the housing configured to respectively accept a credit card and a bill. In various embodiments, the slots are made from a hard plastic. The kiosk may be mounted to the floor or to a supporting structure (i.e., a counter-top). The bill acceptor, the credit card reader, and the display may be located on the kiosk such that they exist two to six feet above the floor. If the kiosk extends all the way to the floor, this means that the bill acceptor, the credit card reader, and the display are located between two to six feet from the lowermost surface of the kiosk. The housing of the kiosk may define a printing slot, configured to receive a printed receipt from an internal kiosk printer. The printing slot may be thin (e.g., less than two inches) in the vertical dimension, to preclude user access to the printer components. The housing of the kiosk may be generally rectangular and define a generally rectangular central cutout for the display.

It should be appreciated that the method 5000 may be performed on the kiosk via a kiosk app. The kiosk app executes 5001, 5002, 5003a, 5003b, then jumps to 5022. The method continues as discussed below with reference to pucks and tents.

Pucks and Tents

At 5024a the method instructs the customer to proceed to the counter. As described above, this could mean that the customer proceeds to a kiosk. The customer would then complete steps 5030a to 5030d at the kiosk. At 5026a, the ordering app 1118 enables the customer to choose between pick-up in the lobby at table service. If the customer chooses table service, then the customer manually enters the table number at 5046d.

It should be appreciated that both 5030 and 5046d may include the customer electronically associating a puck or tent with their order. More specifically, the customer may link the puck or tent at the kiosk at 5030 or may link the puck or tent with the mobile device 940. The customer may associate the puck or tent with their order by entering a number printed on the puck or tent. Alternatively, the customer may associate the puck or tent with their order by holding the puck or tent near the kiosk or mobile device 940. A program (in some cases, the ordering app 1118) electronically communicates with the puck or tent via near field communication technology (NFC) or radio frequency identification device technology (RFID). The communication includes the mobile device 940 or the kiosk receiving a unique identifier of the puck or tent. In response, the mobile device 940 or the kiosk pairs the customer's order with the puck or tent and sends an update to one or both of the OMS server 910 and the venue server 920.

The customer then takes the puck or tent and places it on a table inside the venue. If a number is printed on the puck or tent, then crew may look for the number when serving the order. Alternatively or in addition, the puck or tent may be automatically located via one or more of BLE, RFID, and NFC. BLE location is explained in detail below and includes one or more beacons or transmitters pairing with the puck or tent. RFID and NFC pairing include the puck or tent associating with a NFC or RFID tag applied (and in some cases, adhered) to an in-venue location. In one example, NFC or RFID tags are placed under each table. When the puck or tent sits on the table, it pairs with the NFC or RFID tag.

In some cases, this causes the puck or tent, upon pairing with or recognizing the NFC or RFID tag, to send a signal to the mobile device 940 including a unique number associated with the NFC or RFID tag. The mobile device 940 forwards this unique number to one or both of the venue server 920 and the OMS server 910, which correspondingly update the customer's order to include the unique identifier of the NFC or RFID tag. In some cases, the venue includes RFID receivers located around the store. The puck may be configured to broadcast a time-stamped RFID signal that the RFID receivers intake. The RFID receivers then communicate with one or more of the OMS server 910 and the venue server 920. The communication includes the identity of the puck, the time that the RFID receivers picked up the puck's time stamped signal, and the identity of the transmitting receiver. The OMS server 910 or the venue server 920 now triangulate the original puck broadcast and append the approximated location of the puck to the customer's order associated with the puck.

In other cases, this causes the puck or tent to send a signal to a beacon or transmitter (such as a WiFi router or a BLE beacon) located within the venue. The beacon or transmitter then forwards the unique number to one or both of the venue server 920 and the OMS server 910, which correspondingly update the customer's order to include the unique identifier of the NFC or RFID tag.

In some instances, the customer's mobile device 940 may be configured for NFC or RFID communication without proxying through a puck or tent. For example, many Android mobile devices 940 are equipped for NFC communication. In these instances, the customer may skip the puck or tent, and proceed directly to the table. The mobile device 940 communicates with the NFC or RFID tag adhered to the table, and sends a corresponding update to one or both of the venue server 920 and the OMS server 910. In some cases, the ordering app 1118 may recognize whether the mobile device 940 is NFC or RFID enabled. If the mobile device 940 is enabled, it may direct the customer to skip the kiosk and proceed directly to a table when the customer selects table service at 5024*a* or 5026*a*. If the mobile device 940 is not NFC or RFID enabled, then the ordering app 1118 may direct the customer to a kiosk.

In some cases, the puck includes a thin housing with a top surface, a bottom surface, and sides or edges connecting the top surface to the bottom surface. The puck includes a battery, memory, and one or more processors linked to suitable antennas. The puck may be sized to be held with a single hand and/or weigh less than one and a half pounds. The bottom surface of the puck may include one or more feet, such as rubber feet extending vertically from the bottom surface of the puck. Preferred embodiments include at least three feet of a substantially equal vertical height. If the bottom surface of the puck is curved with respect to the vertical dimension, then the feet may be of different height such that a bottom surface of each foot occupies the same horizontal reference plane. The term rubber is exemplary and any suitable polymer or polymer substitute is acceptable. These feet enable the puck, and specifically the electronic components within the puck, to rest above a top surface of the table, thus protecting the internals of the puck from spills. Puck housings are disclosed, for example, in the Pager Genius USA Digital Restaurant Coaster listing, which is hereby incorporated by reference in its entirety.

The tent may include two sides. Each side may two ends. A first end includes a flat bottom surface. A second end includes a connecting portion. The connecting portions of the two sides link to each other. The connecting portions may link via a rotatable joint, such that the tent may fold into a flat, storable configuration. The connecting portions may be integrally attached with one another, such that the entire tent is made from a single sheet of bended polymer. At least one side of the tent may include an engraving in the shape of a tent number. Tent structure is disclosed, for example, in the Cal-Mil 271-1 Red Replacement Engraved Number Tent Sign listing, which is hereby incorporated by reference in its entirety.

In some cases, the NFC or RFID tag includes an adhesive, such as glue, mucilage, or paste for affixing the tag to the table (or other suitable substrate). The adhesive may be a drying adhesive such as a solvent-based adhesive or a polymer dispersion adhesive. The adhesive may be a pressure sensitive adhesive. In some embodiments, the adhesive forms a permanent chemical bond with the substrate.

The tag further includes an NFC or RFID chip configured to append the tag's unique identifier to a signal generated by the NFC or RFID chip. In some cases, the tag lacks a battery.

Beacons or Transmitters

The above disclosure references BLE transmissions to and from various devices. It should be appreciated that the above disclosure related to "to" and "from" was purely exemplary, and in some cases, may be reversed. It should be appreciated that any time the above disclosure refers to a BLE transmission, the below disclosure applies, and in some embodiments, supersedes any inconsistent above disclosure.

BLE transmissions generally involve a beacon or transmitter (now referred to as beacons) and a movable device, such as a puck, a tent, or a mobile device 940. The purpose of the BLE transmissions is to locate (or at least approximate) the location of the movable device within the venue. This can work via triangulation or correlation.

For triangulation, one or more first objects pick up a signal generated by one or more second objects. The first objects then approximate the location of the second object by comparing the time that the various first objects picked up the signal. In some cases, the first objects are the BLE beacons. In some cases, the second objects are the movable devices. As previously described, triangulation requires time stamps of the signals. The time stamp may be the signal's generation time and/or the signal's reception time. The time stamp may be paired with a unique identifier of the signal originator and/or the signal receiver. The beacons may be linked to a centralized server that performs the triangulation process. The centralized server can be one or more of the OMS server 910 and the venue server 920. Alternatively, the beacons may forward the time stamps to the movable device, which then either performs the triangulation via a suitable program, or forwards the time stamps to one or more of the OMS server 910 and the venue server 920.

Alternatively, in some cases, the first objects are the movable device and the second objects are the BLE beacons. In this example, the BLE beacons transmit a signal, which the movable device picks up. The signal may include a time or signal origination along with a unique identifier of the beacon. In some cases, the unique identifier includes a known position of the beacon. The movable device may now perform the triangulation itself, based on the known locations of the signal generators and the time stamps. In other cases, the movable device forwards the information to a separate server, such as the OMS server 910 or the venue server 920, which performs the triangulation.

It should therefore be appreciated that the triangulation process may include signals generated by a passive device, which can either be the movable device or the beacons. In other words, the passive device may only send, and not receive a BLE signal. The passive BLE signal, as described above, may include a time stamp and a unique identifier of the device broadcasting the passive signal. The active device, which receives the passive signal, then forwards a triangulation result, or simply the information included in the BLE signal to another server.

Correlation, as opposed to triangulation, results in a location radius. Because triangulation includes at least three devices (the device to be located and at least two devices sending or receiving time-stamped signals), triangulation may pinpoint the device to be located within at least two-dimensions. In contrast, correlation involves communication (for the purposes of location) between two devices. One device broadcasts a signal. The other device receives the signal. The broadcast may be passive. The broadcast range is generally known. Based on the known range of the signal, one may infer that the two devices must be located within the signal range. In some embodiments, the mobile device 940 or the puck broadcasts the signal and the beacon receives the signal. In preferred embodiments, the beacon broadcasts the signal and the mobile device 940 or the puck receives the signal. The signal includes a unique identifier of the broadcasting device. The receiving device forwards the unique identifier to an external server, such as the OMS server 910 or the venue server 920, which correlates the broadcasting device with the receiving device. The external server knows the location of at least one of the broadcasting device and the receiving device. Based on this information, the external server causes at least one of the OMS server 910 and the venue server 920 to update the order to associate the order with the approximated location.

In some cases, the update of the order includes associating a table number with the order. If a plurality of tables fit within a predetermined proximity of the customer's location (i.e., the method has a low or moderate confidence in the customer's exact table), then the method may mark the table as approximate and/or include a set of possible tables.

In some cases, the update of the order includes associating an approximate drive-thru line position with the order. For example, the drive-thru line may include a plurality of beacons. A first beacon corresponds to the beginning of the drive-thru line, a second beacon corresponds to the middle of the drive-thru line, and a third beacon corresponds to the end of the drive-thru line. As the customer advances through the drive-thru line, the customer's mobile device transfers from one beacon to the next. The ordering app on the mobile device transmits an update to the OMS server 910 when the mobile device picks up a signal of a new beacon. The OMS server, in turn, builds a list identifying a sequence of customers in the drive-thru line. The sequence may be based on the relative timing of the mobile devices picking up the various beacon signals (e.g., a new order is appended to the end of the list when a customer's mobile device picks up the first beacon). The OMS server provides this list to the venue server 920 for display on a crew-facing screen.

The above disclosure refers to time-stamps. In some embodiments, signal strength indicators are substituted for the time-stamps. The triangulation and/or correlation is performed with reference to the measured signal strengths.

Kitchen Appliances

The kitchen may include kitchen appliances such as one or more stoves, one or more ovens, one or more refrigerators, and one or more automatic ingredient dispensers, such as a robotic ingredient dispenser. In some embodiments, the forwarding of the order to the production module and/or the cooking module enables crew to automatically cause the ingredient dispensers to dispense one or more constituent ingredients from trays in a food assembly station or from trays stored in a refrigerator.

In some embodiments, the forwarding of the order places the order into a cooking queue. One or more appliances, such as the ingredient dispensers, stoves, ovens, and automatic beverage dispensers may be configured to automatically execute operations based on the queue. For example, the queue (and in some cases, the first-in-line or next-in-line in the queue) may cause the ingredient dispensers to dispense ingredients at a predetermined time, as discussed above. Further, the queue information may cause the stoves or ovens to heat to predetermined temperatures in anticipation of receiving the ingredients. The queue information may cause the stoves or ovens to heat the food at the predetermined temperature for a predetermined amount of time (i.e., the stoves or ovens load cooking times with reference to the queue). The same concept applies to automatic beverage dispensers, which may be configured to, based on the queue, automatically load a cup into position, and then pump a pressurized fluid into the cup from a fluid source. In some embodiments, the venue server includes the queue. In other embodiments, various controllers linked to the venue server include the queue. In some embodiments, each appliance includes one or more controllers including a processor and memory electronically linked to one or more of the venue server and the various controllers. In various embodiments, the various controllers are considered to be part of the venue server.

The stoves and ovens include a heating element. The heating element may be a resistive heating element that converts a supply of electricity into heat. The heating element may be a burner that burns a source of fuel, such as natural gas. The stoves and ovens may include various conveyers coupled with motors that move food into or on the stoves and ovens. Example automatic appliances are disclosed in U.S. Publication No. 2003/0196558 and 2005/0115418 and U.S. Pat. No. 6,053,359, all of which are hereby incorporated by reference in their entirety.

The refrigerator may include a refrigeration cycle with a compressor configured to compress a refrigerant, an evaporator, a condenser, and an expansion device. The expansion device may include a capillary tube or an expansion valve, such as an electronic expansion valve. The compressor may be a fixed or variable capacity compressor, which is in operative electronic communication with a refrigerator controller. The refrigerator controller may be in electronic communication with the venue server.

OMS Server 910 vs. Venue Server 920

The above disclosure refers to the OMS server 910 and the venue server 920. It should be appreciated that any or all of the processes performed by the OMS server 910 may be performed by the venue server 920. It should be appreciated that any or all of the processes performed by the venue server 920 may be performed by the OMS server 910. As described above, the OMS server 910 may be a collection of servers. As described above, the venue server 920 may be a collection of servers. For the purposes of the claims, it should be appreciated that the term "server" such as "venue server" refers to one or more servers.

In various embodiments, both of the ordering app is configured to only communicate with the venue server 920 via the OMS server 910. In other words, the OMS server 910 routes all communication (i.e., serves as an intermediary) between the ordering app and the venue server.

The above disclosure refers to various methods and operations. It should be appreciated that the disclosed devices may be configured to perform the associated methods and operations. More specifically, the disclosed devices may include one or more programs that when executed by a processor, cause the processor to perform the associated methods and operations.

Additional Embodiments

Additional embodiments of the invention are generally shown in FIGS. 45*a* to 45*d*. It should be appreciated that any element or feature of the above disclosure may apply, where consistent, to these additional embodiments. These additional embodiments include the mobile device 940, the OMS server 910, and the venue server 920. These additional embodiments enable a customer to place an order or check-out on the mobile device 940 via the ordering app 1118, check-in at the venue, and ultimately receive their order.

A method 8000 reflecting these additional embodiments begins at 8001. There, the customer picks items from a menu on the ordering app 1118 at 8001*a*, selects a venue at 8001*b*, selects a service preference for the venue 8001*c* and confirms their payment profile at 8001*d*. Thereafter, the customer checks out on the ordering app 1118 at 8002. In some embodiments, the ordering app 1118 receives updates from the OMS server 910 or the venue server 920 indicating which service preferences are offered at the particular venue. The ordering app 1118 may gray out or hide unavailable service preferences.

Checking out, at 8002, includes the ordering app 1118 transmitting the order to the OMS server 910. As stated above, the order may include the selected menu items, the customer's identity, a unique identifier associated with the customer's mobile device, etc. The OMS server 910 generates an order number for the customer at 8003a. The order number may be alphanumeric. The OMS server 910 updates the order to include this order number at 8003b. The OMS server 910 transmits the order number to the customer's mobile device 940 at 8003c. As discussed above, each venue may be associated with a coarse geofence. The OMS server associates the geofence of the selected venue with the customer's order at 8003d. As discussed below, the OMS server 910 may inject the order into the order staging module of the venue server 920 at 8003e. As previously discussed, injection may include order validation. In some embodiments, the plug-in only validates the order when the order is advanced from the order staging module of the venue server 920 to the production module of the venue server 920.

At 8004a, the customer's mobile device 940 transmits the customer's current location to the OMS server. The ordering app 1118 may interface, via an API, with location services of the customer's mobile device 1118. Alternatively or in addition, at 8004b, the customer's mobile device 940 listens for beacon signals. It should be appreciated that 8004a and 8004b may be continuously enabled, only enabled when the ordering app 1118 is open (i.e., selectively enabled), continuously or selectively enabled after the customer checks out at 8002, or continuously or selectively enabled after the ordering app 1118 on the mobile device 940 receives the order number.

The OMS server 910 detects when the customer crosses the coarse geofence at 8005a. Alternatively or in addition, the OMS server 910 detects, via an update issued by the customer's mobile device 940, when the customer's mobile device 940 is in range of an in-venue beacon or transmitter at 8005b. As discussed above, in various embodiments the customer's mobile device 940 broadcasts a signal, which the in-venue beacon or transmitter receives and forwards to the OMS server 910. As discussed above, it should generally be appreciated that any time two devices link, only one of the devices may generate a transmission confirming the link. Any one of the linked devices may be passive and any one of the linked devices may be active (i.e., generate the transmission).

Either of 8005a and 8005b may cause the OMS server 910 to validate the order at 8006a and inject the order into the venue server at 8006b. The plug-in may perform both of these steps. In some embodiments, the OMS server 910 injects the order into the venue server 920 at 8003. These embodiments may skip 8005a and 8005b. Alternatively, these embodiments may validate the order at 8005a. In any event, the order now resides in an order-staging module of the venue server.

Point of sale systems in operative communication with the venue server 920 update at 8007. More specifically, the point of sale systems update one or more icons when (a) the order resides in the order staging module of the venue server, and (b) the customer is detected via at least one of 8005a and 8005b. More specifically, the point of sale systems may be configured to display, in one selectable screen, all orders present in the ordering staging module of the venue server 920. An icon may exist next to each order on the screen.

When the customer is detected at 8005, the icon may change its appearance including its color. When the icon's appearance has changed, it may become selectable. When crew select the icon, one or more of the OMS server 910 and the venue server 920 may advance the order from the order staging module to the production module. The plug-in may perform this step. If the order contains invalid items (as in some embodiments, detected via the plug-in via the validation step), then selection of this icon may cause the POS system to display new icons such as a recall available items icon and a cancel order icon. The recall available items icon causes only valid items to advance from the order staging module to the production module. The cancel order icon cancels the order.

Point of sale systems may be registers. The registers may include processor(s), memory, a display in operative communication with the processor(s), a cash drawer, a cash drawer lock, a cash drawer deployer, and a credit card slot for processing credit card transactions. The cash drawer may be made from a polymer, such as a tough plastic. It may include ridges defining a plurality of recesses there-between. Each recess may be sized to receive paper currency, such as dollars. The cash drawer lock fixes the cash drawer within register housing. The lock may include a latch that selectively latches to the cash drawer. The lock may be linked with a lock actuator, such as a spring or motor, which actuates based on commands from the processor. The cash drawer may be slideable along cash drawer rails. The cash drawer deployer may bias the cash drawer into an accessible position that exposes the plurality of recesses to crew. The cash drawer deployer may be one or more biasing springs. The cash drawer deployer may be one or more motors, in operative communication with the processor and configured to push or slide the cash drawer outward. The cash drawer may further include fingers configured to exert a downward force on items present in the recesses. In some embodiments, the cash drawer includes at least three fingers positioned over generally rectangular recesses. In some embodiments, the fingers are rotatable via a pivot point. The pivot point may be a pin fixing the finger to a body of the cash drawer.

The ordering app 1118 returns to the customer's service preference at 8008. In some embodiments, the ordering app 1118 receives updates from the OMS server 910 or the venue server 920 indicating which service preferences are offered at the particular venue. The ordering app 1118 may gray out or hide unavailable service preferences.

If the customer did not pick a service preference at 8001c, then the ordering app 1118 prompts the customer to pick a service preference at 8008. If the customer picked an unavailable service preference, then the ordering app 1118 prompts the customer to pick an available service preference at 8008. If the customer picked an available service preference at 8001c, then the ordering app 1118 prompts the customer to confirm the selected service preference at 8008. If the customer picked an available service preference at 8001c, linked with a beacon at 8005b, and the linked beacon is inconsistent with the selected preference, then the ordering app 1118 may modify the confirmation screen to highlight the discrepancy. This could happen, for example, if the customer selected drive-thru at 8001c, but linked with a lobby beacon at 8005b. Contrarily, if the customer picked an available service preference at 8001c, linked with a beacon at 8005b, and the linked beacon is consistent with the selected preference, then the ordering app 1118 may modify the confirmation screen to highlight the consistency. In some embodiments, the ordering app 1118 automatically confirms the service preference and generates a corresponding display upon detecting consistency. Operation of the beacons or transmitters is discussed in detail above.

In various embodiments, the available service preferences include drive-thru service, in-venue service, and curb-side service. In-venue service includes lobby service and table service. Method 8200 represents drive-thru service, method 8300 represents in-venue service, and method 8400 represents curb-side service. Each of these methods 8200 through 8400 is a part of the overall method 8000.

The customer picks or confirms drive-thru service at 8201. Various technologies may identify the customer's drive-thru presence at 8202. These technologies include beacons or transmitters, kiosks, and point of sale systems. Beacons or transmitters are discussed in detail above. If the customer's presence was established via beacon technology at 8005b, then the method may skip 8202. Kiosks and point of sale systems enable the customer to confirm their presence via a voice code spoken into a microphone, via manual entry via a keyboard, or via a scan of a QR code generated and displayed by the customer's mobile device.

The customer's payment is processed at 8203. Payment processing may include cash payment via the kiosk or point of sale system. Payment processing may include credit card payment via the kiosk or point of sale system. Payment processing may include one or more of the OMS server 910 and the venue server 920 causing the customer's financial information to be processed via a financial server. Payment processing is discussed in detail above.

When payment is successful, the order is advanced from the order-staging module of the venue server 920 to the order production module of the venue server 920 at 8204. As discussed in detail above, the plug-in may perform the advancement. In response to the order advancing to the order production module of the venue server 920, crew and/or automated appliances prepare the order at 8205. Automated food preparation is discussed in detail above. Crew and/or automated appliances serve the customer at 8206.

The customer picks or confirms in-venue service at 8301. Various technologies may identify the customer's in-venue presence at 8302. These technologies include beacons or transmitters, kiosks, and point of sale systems. Beacons or transmitters are discussed in detail above. If the customer's presence was established via beacon technology at 8005b, then the method may skip 8302. Kiosks and point of sale systems enable the customer to confirm their presence via a voice code spoken into a microphone, via manual entry via a keyboard, or via a scan of a QR code generated and displayed by the customer's mobile device.

The customer chooses between dining-in at taking-out at 8303. The customer makes this selection on the ordering app 1118 or on the kiosk. In various embodiments, checking-in at the kiosk causes the ordering app 1118 (via a communication sent via the OMS server 910) to present the customer with the choice via a suitable screen. If the customer selects take-out, then the kiosk or the ordering-app 1118 instructs the user to proceed to the lobby. The method jumps to 8203.

If the customer selects dine-in, then the ordering app 1118 or the kiosk presents the customer with available in-venue service preferences such as lobby service and table service at 8304. If the customer selects lobby service, then the method jumps to 8203. If the customer chooses table service, then the kiosk or the ordering app 1118 prompt the user to identify their table at 8305. The customer may accomplish this in the following ways: (a) by manually entering a table number printed on a desired table, (b) by holding the mobile device 940 near a suitable tag, such as the tag having the NFC chip and the adherent, mounted on the table, (c) by manually entering a tent number printed on the side of a tent, (d) by associating a puck with their order via suitable technology of the kiosk or the mobile device 940. These operations are discussed in detail above. After the user accomplished at least one of (a) to (d), the method jumps to 8203. In some embodiments, 8305 occurs in-between 8203 and 8204. Crew ultimately serve the order to the customer's table.

The customer picks or confirms curb-side service at 8401. The ordering app 1118 now identifies the customer's bay number at 8402. The ordering app 1118 may automatically fill-in the customer's bay number via location services or beacon technology. The ordering app 1118 may prompt the user to manually enter a bay number. If the ordering app 1118 automatically fills-in the bay number, it may prompt the user to confirm the bay number. When the bay number has been confirmed, the method jumps to 8203. In some embodiments, 8402 occurs in-between 8203 and 8204. Crew serve the order to the customer's bay.

CONCLUSION

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

It should also be understood that the present invention can be adapted to use with venues other quick service restaurants, such as, for example, retail stores, convenience stores, or other venues where placement of remote orders for goods or services would be desired. Unless specifically stated otherwise in the language of the particular claim at issue, it is intended that the following claims include such other types of venues.

What is claimed is:

1. An order transmission and notification system comprising:
   a first venue server including a processor and memory and corresponding with a first venue;
   a second venue server including a processor and memory and corresponding with a second venue;
   an input device at each of the first and second venues, the input device to receive input indicative that a mobile device is within the corresponding one of the venues;
   a central server located remotely from the first and second venues and including a processor and memory, to:
   receive at the central server an order from a mobile device and then subsequently receive at the central server periodically transmitted information representing a current location of the mobile device;
   link a first enclosed virtual area to the first venue at the central server, the first enclosed virtual area including a first coarse virtual geofence;
   link a second enclosed virtual area to the second venue at the central server, the second enclosed virtual area including a second coarse virtual geofence;
   in response to detecting the mobile device entering the coarse virtual geofence of one of the first or second enclosed virtual areas, transmit the order from the central server to a first module of the venue server of the corresponding venue; and transmit a notification from the central server to the mobile device.

2. The system of claim 1, wherein the input device is an automated kiosk, and wherein the automated kiosk includes a code reader to read a scannable code that is generated by the mobile device.

3. The system of claim 1, wherein the input device is an automated kiosk, and wherein the automated kiosk includes keypad to receive a code that is displayed by the mobile device.

4. The system of claim 1, wherein the input device is an automated kiosk, and wherein the automated kiosk includes microphone to receive a voice code displayed by the mobile device.

5. The system of claim 1, wherein the input device is the plurality of wireless beacons, and wherein each of the plurality of wireless beacons are located in the venue to facilitate approximation of the in-venue location of the mobile device.

6. The system of claim 1 wherein the order does not specify a particular venue.

7. The system of claim 1 wherein the first enclosed virtual area including a first fine virtual geofence, and the second enclosed virtual area including a second fine virtual geofence.

8. The system of claim 7 wherein in response to detecting the mobile device entering the fine virtual geofence of one of the first or second enclosed virtual areas:
transmit the order to a second module of the venue server of the corresponding venue and delete the order from the first module of the venue server of any other venue.

9. The system of claim 1 wherein the transmission of the notification to the mobile device includes a target order location request for the mobile device to respond to, indicating a target order location.

10. An order transmission and notification system comprising:
an input device for a venue, the input device to receive input indicative that a mobile device is within the venue;
a venue server including a processor and memory and corresponding with the venue, the venue server maintaining, in memory, a staging queue to receive orders and a separate preparation queue to trigger preparation of the orders, the venue server configured to:
receive the order from the mobile device and place the order in the staging queue, and then subsequently receive periodically transmitted information representing a current location of the mobile device;
link an enclosed virtual area to the venue, the enclosed virtual area including a virtual geofence;
in response to detecting the mobile device entering the virtual geofence, transmit the order from the staging queue to the preparation queue; and
transmit a notification to the mobile device.

11. The order transmission and notification system of claim 10, wherein the virtual geofence is a fine virtual geofence.

12. The order transmission and notification system of claim 10, wherein the virtual geofence is a coarse virtual geofence.

13. The order transmission and notification system of claim 10, wherein the virtual geofence uses GPS coordinates.

14. The order transmission and notification system of claim 10, wherein the input device is a plurality of wireless beacons, and wherein each of the plurality of wireless beacons are located in the venue to facilitate approximation of the in-venue location of the mobile device.

15. The order transmission and notification system of claim 10, wherein the order specifies the venue.

16. An order transmission and notification system comprising:
a venue server including a processor and memory and corresponding with a venue, the venue server maintaining, in memory, a staging queue to receive orders and a preparation queue to trigger preparation of the orders;
an input device at the venue, the input device to receive input indicative that a mobile device is within the venue;
a central server located remotely from the venue and including a processor and memory, the central server configured to:
receive at the central server the order from the mobile device, the order specifying the venue, and then subsequently receive at the central server periodically transmitted information representing a current location of the mobile device;
transmit the order to the venue to be placed in the staging queue;
link an enclosed virtual area to the first venue at the central server, the enclosed virtual area including a virtual geofence;
in response to detecting the mobile device entering the virtual geofence of the virtual areas, transmit instructions from the central server to the venue server to transfer the order from the staging queue to the preparation queue; and
transmit a notification from the central server to the mobile device.

17. The order transmission and notification system of claim 10, wherein the virtual geofence is a fine virtual geofence.

18. The order transmission and notification system of claim 10, wherein the virtual geofence is a coarse virtual geofence.

19. The order transmission and notification system of claim 10, wherein the virtual geofence used GPS coordinates.

20. The order transmission and notification system of claim 10, wherein the input device is the plurality of wireless beacons, and wherein each of the plurality of wireless beacons are located in the venue to facilitate approximation of the in-venue location of the mobile device.

* * * * *